US012322563B2

(12) United States Patent
Yoo et al.

(10) Patent No.: US 12,322,563 B2
(45) Date of Patent: Jun. 3, 2025

(54) ARC PATH GENERATION UNIT AND DIRECT CURRENT RELAY INCLUDING SAME

(71) Applicant: LS ELECTRIC CO., LTD., Anyang-si (KR)

(72) Inventors: Jung Woo Yoo, Anyang-si (KR); Han Mi Ru Kim, Anyang-si (KR); Young Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 208 days.

(21) Appl. No.: 18/013,692

(22) PCT Filed: Jun. 21, 2021

(86) PCT No.: PCT/KR2021/007738
§ 371 (c)(1),
(2) Date: Dec. 29, 2022

(87) PCT Pub. No.: WO2022/005079
PCT Pub. Date: Jan. 6, 2022

(65) Prior Publication Data

US 2023/0352258 A1 Nov. 2, 2023

(30) Foreign Application Priority Data

Jun. 29, 2020 (KR) ........................ 10-2020-0079597
Jun. 29, 2020 (KR) ........................ 10-2020-0079606
Jun. 29, 2020 (KR) ........................ 10-2020-0079609

(51) Int. Cl.
*H01H 50/42* (2006.01)
*H01H 50/54* (2006.01)
*H01H 51/29* (2006.01)

(52) U.S. Cl.
CPC ........... *H01H 50/42* (2013.01); *H01H 50/546* (2013.01); *H01H 51/29* (2013.01)

(58) Field of Classification Search
CPC ...... H01H 50/42; H01H 50/546; H01H 51/29; H01H 9/443; H01H 50/38
(Continued)

(56) References Cited

U.S. PATENT DOCUMENTS 8,482,368 B2 * 7/2013 Sasaki ................ H01H 51/2236 335/201
8,853,585 B2 * 10/2014 Tachikawa ............. H01H 9/443 335/201
(Continued)

FOREIGN PATENT DOCUMENTS

JP 2010062054 A 3/2010
JP 2014062054 A 4/2014
(Continued)

OTHER PUBLICATIONS

International Search Report for related International Application No. PCT/KR2021/007738; action dated Jan. 6, 2022; (7 pages).
(Continued)

*Primary Examiner* — Shawki S Ismail
*Assistant Examiner* — Lisa N Homza
(74) *Attorney, Agent, or Firm* — K&L Gates LLP

(57) ABSTRACT

Disclosed are an arc path generation unit and a direct current relay including the same. An arc path generation unit according to various exemplary embodiments of the present disclosure comprises a Halbach array and a magnet part which form a magnetic field in a space part formed in the arc path generation unit. The magnetic field formed by the Halbach array and the magnet part forms an electromagnetic force, together with the current applied to each of fixed contacts. The electromagnetic force formed near each fixed contact is
(Continued)

formed in a direction going away from the center of the space part, or in a direction going away from each fixed contact. Therefore, generated arcs can be rapidly suppressed and discharged through induction by the electromagnetic force.

64 Claims, 86 Drawing Sheets

(58) Field of Classification Search
USPC .......................................................... 335/201
See application file for complete search history.

(56) References Cited

U.S. PATENT DOCUMENTS

| | | | | |
|---|---|---|---|---|
| 9,087,655 | B2 * | 7/2015 | Enomoto | H01H 50/546 |
| 12,230,464 | B2 * | 2/2025 | Yoo | H01H 50/54 |
| 2011/0240603 | A1 * | 10/2011 | Hoffmann | H01H 9/443<br>218/26 |
| 2012/0175345 | A1 | 7/2012 | Tachikawa et al. | |
| 2012/0181860 | A1 * | 7/2012 | Hsu | H01H 9/443<br>218/24 |
| 2015/0042424 | A1 | 2/2015 | Maruyama et al. | |
| 2023/0298839 | A1 * | 9/2023 | Yoo | H01H 50/54<br>335/177 |
| 2023/0411096 | A1 * | 12/2023 | Yoo | H01H 9/443 |

FOREIGN PATENT DOCUMENTS

| | | | |
|---|---|---|---|
| JP | 201936431 | A | 3/2019 |
| JP | 2019036431 | A | 3/2019 |
| KR | 102009875 | B1 | 8/2019 |

OTHER PUBLICATIONS

Written Opinion for related International Application No. PCT/KR2021/007738; action dated Jan. 6, 2022; (21 pages).
Office Action for related Korean Application No. 10-2020-0079597; action dated Feb. 25, 2022; (4 pages).

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(a)

(a)

(b)

(a)

(b)

(a)

(b)

(a)

(b)

(a)

(b)

ARC PATH GENERATION UNIT AND DIRECT CURRENT RELAY INCLUDING SAME

CROSS-REFERENCE TO RELATED APPLICATION

This application is a National Stage of International Application No. PCT/KR2021/007738 filed on Jun. 21, 2021 claims priority to and the benefit of Korean Patent Application No. 10-2020-0079597, filed on Jun. 29, 2020, Korean Patent Application No. 10-2020-0079606, filed on Jun. 29, 2020, and Korean Patent Application No. 10-2020-0079609, filed on Jun. 29, 2020, the disclosures of which are incorporated herein by reference in their entirety.

FIELD

The present disclosure relates to an arc path generation unit and a DC relay including the same, and more specifically to an arc path generation unit having a structure capable of electively inducing a generated arc to the outside and a DC relay including the same.

BACKGROUND

A direct current (DC) relay is a device that transmits a mechanical drive or current signal by using the principle of an electromagnet. The direct current relay is also called a magnetic switch and is generally classified as an electrical circuit switch.

The direct current relay includes a fixed contact and a movable contact. The fixed contact is electrically connected to an external power source and load. The fixed contact and the movable contact may be in contact with each other or may be spaced apart from each other.

By the contact and separation of the fixed contact and the movable contact, the conduction through the DC relay is allowed or blocked. The movement is achieved by a drive unit that applies a drive force to the movable contact.

When the fixed contact and the movable contact are spaced apart, an arc is generated between the fixed contact and the movable contact. An arc is a flow of high-pressure, high-temperature current. Accordingly, the generated arc must be rapidly discharged from the DC relay through a preset path.

The discharge path of arc is formed by a magnet provided in the DC relay. The magnet forms a magnetic field in the space where the fixed contact and the movable contact are in contact. The discharge path of arc may be formed by the formed magnetic field and the electromagnetic force generated by the flow of current.

Referring to FIG. 1, a space in which a fixed contact 1100 and a movable contact 1200 provided in a DC relay 1000 according to prior art are in contact with each other is illustrated. As described above, a permanent magnet 1300 is provided in the space.

The permanent magnet 1300 includes a first permanent magnet 1310 positioned on the upper side and a second permanent magnet 1320 positioned on the lower side.

A plurality of first permanent magnets 1310 are provided, and the polarities of each surface facing the second permanent magnet 1320 are magnetized with different polarities. The lower side of the first permanent magnet 1310 located on the left side of FIG. 1 is magnetized to the N pole, and the second permanent magnet 1310 located on the right side of FIG. 1 is magnetized to the S pole.

In addition, a plurality of second permanent magnets 1320 are also provided, and the polarities of each surface facing the first permanent magnet 1310 are magnetized with different polarities. The upper side of the second permanent magnet 1320 positioned on the left side of FIG. 1 is magnetized to the S pole, and the upper side of the second permanent magnet 1320 positioned on the right side of FIG. 1 is magnetized to the N pole.

(a) of FIG. 1 illustrates a state in which current flows in through the fixed contact 1100 on the left side and flows out through the fixed contact 1100 on the right side. According to Fleming's Left-Hand Rule, the electromagnetic force is formed like a hatched arrow.

Specifically, in the case of the fixed contact 1100 located on the left side, the electromagnetic force is formed toward the outside. Accordingly, the arc generated at the position may be discharged to the outside.

However, in the case of the fixed contact 1100 located on the right side, the electromagnetic force is formed toward the inner side, that is, the central portion of the movable contact 1200. Accordingly, the arc generated at the corresponding position is not immediately discharged to the outside.

In addition, (b) of FIG. 1 illustrates a state in which current flows in through the fixed contact 1100 on the right side and flows out through the fixed contact 1100 on the left side. According to Fleming's Left-Hand Rule, the electromagnetic force is formed with a hatched arrow.

Specifically, in the case of the fixed contact 1100 located on the right side, the electromagnetic force is formed toward the outside. Accordingly, the arc generated at the position may be discharged to the outside.

However, in the case of the fixed contact 1100 located on the left side, the electromagnetic force is formed toward the inside, that is, the central portion of the movable contact 1200. Accordingly, the arc generated at the position is not immediately discharged to the outside.

In the central portion of the DC relay 1000, that is, in the space between each fixed contact 1100, various members for driving the movable contact 1200 in the vertical direction are provided. For example, a shaft, a spring member inserted through the shaft and the like are provided at the position.

Therefore, when the arc generated as shown in FIG. 1 is moved toward the central portion, and if the arc moved to the center (C) cannot be moved to the outside immediately, there is a risk that various members provided at the position may be damaged by the energy of the arc.

In addition, as illustrated in FIG. 1, the direction of the electromagnetic force formed inside the DC relay 1000 according to prior art depends on the direction of the current flowing through the fixed contact 1200. That is, the position of the electromagnetic force formed in the inward direction among the electromagnetic forces generated at each fixed contact point 1100 is different depending on the direction of the current.

In other words, the user must consider the direction of current whenever using a DC relay. This may cause inconvenience to the use of the DC relay. In addition, regardless of the intention of the user, a situation in which the direction of the current applied to the DC relay is changed due to inexperienced operation or the like cannot be excluded.

In this case, the members provided in the central portion of the DC relay may be damaged by the generated arc. Accordingly, the durability life of the DC relay is reduced, and there is a risk that safety accidents may occur.

Korean Registered Patent No. 10-1696952 discloses a DC relay. Specifically, it discloses a DC relay having a structure capable of preventing the movement of a movable contact by using a plurality of permanent magnets.

However, the DC relay having the above-described structure can prevent the movement of a movable contact by using a plurality of permanent magnets, but there is a limitation in that there is no consideration of a method for controlling the direction of the arc discharge path.

Korean Registered Patent No. 10-1216824 discloses a DC relay. Specifically, it discloses a DC relay having a structure capable of preventing arbitrary separation between a movable contact and a fixed contact by using a damping magnet.

However, the DC relay having the above-described structure proposes only a method for maintaining the contact state between the movable contact and the fixed contact. That is, there is a limitation in that it cannot propose a method for forming an arc discharge path generated when the movable contact and the fixed contact are spaced apart.

(Patent Document 1) Korean Registered Patent No. 10-1696952 (Jan. 16, 2017)

(Patent Document 2) Korean Registered Patent No. 10-1216824 (Dec. 28, 2012)

SUMMARY

An object of the present disclosure is to provide an arc path generation unit having a structure capable of solving the above-described problems, and a DC relay including the same.

First, an object of the present disclosure is to provide an arc path generation unit having a structure capable of rapidly extinguishing and discharging an arc generated as current is cut off, and a DC relay including the same.

In addition, an object of the present disclosure is to provide an arc path generation unit having a structure capable of strengthening the magnitude of the force for inducing the generated arc, and a DC relay including the same.

In addition, an object of the present disclosure is to provide an arc path generation unit having a structure capable of preventing damage to components for energization by the generated arc, and a DC relay including the same.

In addition, an object of the present disclosure is to provide an arc path generation unit having a structure in which arcs generated at a plurality of positions can proceed without meeting each other, and a DC relay including the same.

In addition, an object of the present disclosure is to provide an arc path generation unit having a structure capable of achieving the above-described objects without excessive design changes, and a DC relay including the same.

In order to achieve the above objects, the present disclosure provides an arc path generation unit, including a magnetic frame having a space part in which a fixed contact and a movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame includes a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array includes a plurality of blocks which are arranged side by side in the one direction and formed of a magnetic material, and is positioned adjacent to any one or more surfaces of the first surface and the second surface, wherein a plurality of magnet parts are provided such that at least any one of the plurality of magnet parts is positioned adjacent to the third surface, and wherein at least one other of the plurality of magnet parts is positioned adjacent to the fourth surface.

In addition, the magnet part of the arc path generation unit may include a first magnet part and a second magnet part which are positioned adjacent to any one surface of the third surface and the fourth surface and arranged side by side with each other in the other direction; a third magnet part and a fourth magnet part which are positioned adjacent to the other one surface of the third surface and the fourth surface and arranged side by side with each other in the other direction; and a fifth magnet part which is positioned adjacent to the other one surface of the first surface and the second surface and arranged to face the Halbach array with the space part therebetween.

In addition, each surface of the arc path generation unit on which any one block of a plurality of blocks and the fifth magnet part face each other is magnetized with the same polarity, and wherein each surface on which the first magnet part and the second magnet part face each other, and each surface on which the third magnet part and the fourth magnet part face each other are magnetized with a polarity different from the polarity.

In addition, a plurality of blocks of the Halbach array of the arc path generation unit may include a first block which is positioned to be biased toward any one surface of the third surface and the fourth surface; a third block which is positioned to be biased toward the other one surface of the third surface and the fourth surface; and a second block which is positioned between the first block and the third block, wherein a surface of the surfaces of the first block facing the second block, a surface of the surfaces of the third block facing the second block and a surface of the surfaces of the second block facing the fifth magnet are magnetized with the same polarity as the polarity.

In addition, a plurality of blocks of the Halbach array of the arc path generation unit may include a first block which is to be biased toward any one surface of the third surface and the fourth surface; a fifth block which is positioned to be biased toward the other one surface of the third surface and the fourth surface; and a second block, a third block and a fourth block which are positioned between the first block and the fifth block and sequentially arranged in a direction from the first block to the fifth block, wherein a surface of the surfaces of the second block facing the third block, a surface of the surfaces of the fourth block facing the third block and a surface of the surfaces of the third block facing the fifth magnet part are magnetized with the same polarity as the polarity.

In addition, the Halbach array of the arc path generation unit may include a first Halbach array which is positioned adjacent to any one surface of the first surface and the second surface; and a second Halbach array which is positioned adjacent to the other one surface of the first surface and the second surface, and disposed to face the first Halbach array with the space part therebetween, and wherein the magnet part includes a first magnet part and a second magnet part which are positioned adjacent to any one surface of the third surface and the fourth surface and arranged side by side with each other in the other direction; and a third magnet part and a fourth magnet part which are positioned adjacent to the other one surface of the third surface and the fourth surface and arranged side by side with each other in the other direction.

Further, in the arc path generation unit, each surface on which any one block of the plurality of blocks included in the first Halbach array and any one block of the plurality of blocks included in the second Halbach array face each other is magnetized with the same polarity, and wherein each surface on which the first magnet part and the second magnet part face each other, and each surface on which the third magnet part and the fourth magnet part face each other are magnetized with a polarity different from the polarity.

In addition, the first Halbach array and the second Halbach array of the arc path generation unit may respectively include a first block which is positioned to be biased toward any one surface of the third surface and the fourth surface; a fifth block which is positioned to be biased toward the other one surface of the third surface and the fourth surface; and a second block, a third block and a fourth block which are positioned between the first block and the fifth block and sequentially arranged in a direction from the first block to the fifth block, wherein in the first Halbach array, a surface of the surfaces of the second block facing the third block, a surface of the surfaces of the fourth block facing the third block and a surface of the surfaces of the third block facing the second Halbach array are magnetized with the same polarity as the polarity, and wherein in the second Halbach array, a surface of the surfaces of the second block facing the third block, a surface of the surfaces of the fourth block facing the third block and a surface of the surfaces of the third block facing the first Halbach array are magnetized with a polarity different from the polarity.

In addition, the first Halbach array and the second Halbach array of the arc path generation unit may respectively include a first block which is positioned to be biased toward any one surface of the third surface and the fourth surface; a third block which is positioned to be biased toward the other one surface of the third surface and the fourth surface; and a second block which is positioned between the first block and the third block, wherein in the first Halbach array, a surface of the surfaces of the first block facing the second block, a surface of the surfaces of the third block facing the second block and a surface of the surfaces of the second block facing the second Halbach array are magnetized with the same polarity as the polarity, and wherein in the second Halbach array, a surface of the surfaces of the first block facing the second block, a surface of the surfaces of the third block facing the second block and a surface of the surfaces of the second block facing the first Halbach array are magnetized with a polarity different from the polarity.

In addition, the first Halbach array of the arc path generation unit may include a first block which is positioned to be biased toward any one surface of the third surface and the fourth surface; a third block which is positioned to be biased toward the other one surface of the third surface and the fourth surface; and a second block which is positioned between the first block and the third block, wherein the second Halbach array may include a first block which is positioned to be biased toward any one surface of the third surface and the fourth surface; a fifth block which is positioned to be biased toward the other one surface of the third surface and the fourth surface; and a second block, a third block and a fourth block which are positioned between the first block and the fifth block and sequentially arranged in a direction from the first block to the fifth block, wherein in the first Halbach array, a surface of the surfaces of the first block facing the second block, a surface of the surfaces of the third block facing the second block and a surface of the surfaces of the second block facing the second Halbach array are magnetized with the same polarity as the polarity, and wherein in the second Halbach array, a surface of the surfaces of the second block facing the third block, a surface of the surfaces of the fourth block facing the third block and a surface of the surfaces of the third block facing the first Halbach array are magnetized with a polarity different from the polarity.

In addition, the Halbach array of the arc path generation unit may include a first Halbach array which is positioned adjacent to any one surface of the first surface and the second surface; and a second Halbach array which is positioned adjacent to the other one surface of the first surface and the second surface, and disposed to face the first Halbach array with the space part therebetween, and wherein the magnet part may include a first magnet part which is positioned adjacent to any one surface of the third surface and the fourth surface, and is positioned to be biased toward any one surface of the first surface and the second surface; and a second magnet part which is positioned adjacent to the other one surface of the third surface and the fourth surface, and is positioned to be biased toward the other one surface of the first surface and the second surface.

Further, in the arc path generation unit, each surface on which any one block of the plurality of blocks included in the first Halbach array and any one block of the plurality of blocks included in the second Halbach array face each other is magnetized with the same polarity, and wherein a surface of the first surface and the second surface among the surfaces of the first magnet part facing the other one surface, and a surface of the first surface and the second surface among the surfaces of the second magnet part facing the any one surface are magnetized with a polarity different from the polarity.

In addition, the first Halbach array and the second Halbach array of the arc path generation unit may respectively include a first block which is positioned to be biased toward any one surface of the third surface and the fourth surface; a third block which is positioned to be biased toward the other one surface of the third surface and the fourth surface; and a second block which is positioned between the first block and the third block, wherein in the first Halbach array, a surface of the surfaces of the first block facing the second block, a surface of the surfaces of the third block facing the second block and a surface of the surfaces of the second block facing the second Halbach array are magnetized with the same polarity as the polarity, and wherein in the second Halbach array, a surface of the surfaces of the first block facing the second block, a surface of the surfaces of the third block facing the second block and a surface of the surfaces of the second block facing the first Halbach array are magnetized with a polarity different from the polarity.

In addition, the first Halbach array and the second Halbach array of the arc path generation unit may respectively include a first block which is positioned to be biased toward any one surface of the third surface and the fourth surface; a fifth block which is positioned to be biased toward the other one surface of the third surface and the fourth surface; and a second block, a third block and a fourth block which are positioned between the first block and the fifth block and sequentially arranged in a direction from the first block to the fifth block, wherein in the first Halbach array, a surface of the surfaces of the second block facing the third block, a surface of the surfaces of the fourth block facing the third block and a surface of the surfaces of the third block facing the second Halbach array are magnetized with the same polarity as the polarity, and wherein in the second Halbach array, a surface of the surfaces of the second block facing the third block, a surface of the surfaces of the fourth block facing the third block and a surface of the surfaces of the third block facing the first Halbach array are magnetized with a polarity different from the polarity.

In addition, the present disclosure provides a direct current relay, including a plurality of fixed contacts provided to be spaced apart from each other in one direction; a movable contact contacting or spaced apart from the fixed contact; a magnetic frame having a space part in which the fixed contact and the movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a plurality of blocks which are arranged side by side in the one direction and formed of a magnetic material, and is positioned adjacent to any one or more surfaces of the first surface and the second surface, wherein a plurality of magnet parts are provided such that at least one of the plurality of magnet parts is positioned adjacent to the third surface, and wherein at least one other of the plurality of magnet parts is positioned adjacent to the fourth surface.

In addition, the magnet part of the direct current relay may include a first magnet part and a second magnet part which are positioned adjacent to any one surface of the third surface and the fourth surface and arranged side by side with each other in the other direction; a third magnet part and a fourth magnet part which are positioned adjacent to the other one surface of the third surface and the fourth surface and arranged side by side with each other in the other direction; and a fifth magnet part which is positioned adjacent to the other one surface of the first surface and the second surface and arranged to face the Halbach array with the space part therebetween, wherein each surface on which any one block of a plurality of blocks and the fifth magnet part face each other is magnetized with the same polarity, and wherein each surface on which the first magnet part and the second magnet part face each other, and each surface on which the third magnet part and the fourth magnet part face each other are magnetized with a polarity different from the polarity.

In addition, the Halbach array of the direct current relay may include a first Halbach array which is positioned adjacent to any one surface of the first surface and the second surface; and a second Halbach array which is positioned adjacent to the other one surface of the first surface and the second surface, and disposed to face the first Halbach array with the space part therebetween, and wherein the magnet part may include a first magnet part and a second magnet part which are positioned adjacent to any one surface of the third surface and the fourth surface and arranged side by side with each other in the other direction; and a third magnet part and a fourth magnet part which are positioned adjacent to the other one surface of the third surface and the fourth surface and arranged side by side with each other in the other direction, wherein each surface on which any one block of the plurality of blocks included in the first Halbach array and any one block of the plurality of blocks included in the second Halbach array face each other is magnetized with the same polarity, and wherein each surface on which the first magnet part and the second magnet part face each other, and each surface on which the third magnet part and the fourth magnet part face each other are magnetized with a polarity different from the polarity.

In addition, the Halbach array of the direct current relay may include a first Halbach array which is positioned adjacent to any one surface of the first surface and the second surface; and a second Halbach array which is positioned adjacent to the other one surface of the first surface and the second surface, and disposed to face the first Halbach array with the space part therebetween, and wherein the magnet part may include a first magnet part and a second magnet part which are positioned adjacent to any one surface of the third surface and the fourth surface and arranged side by side with each other in the other direction; and a third magnet part and a fourth magnet part which are positioned adjacent to the other one surface of the third surface and the fourth surface and arranged side by side with each other in the other direction, wherein each surface on which any one block of the plurality of blocks included in the first Halbach array and any one block of the plurality of blocks included in the second Halbach array face each other is magnetized with the same polarity, and wherein a surface of the surfaces of the first magnet part facing the other one surface of the first surface and the second surface, and a surface of the surfaces of the second magnet part facing the any one surface of the first surface and the second surface are magnetized with a polarity different from the polarity.

In addition, the present disclosure provides an arc path generation unit, including a magnetic frame having a space part in which a plurality of fixed contacts and a plurality of movable contacts are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a first Halbach array including a plurality of blocks that are arranged side by side in the one direction and formed of a magnetic material, and which is arranged adjacent to any one surface of the first surface and the second surface; and a second Halbach array including a plurality of blocks that are arranged side by side in the one direction and formed of a magnetic material, and which is arranged adjacent to the other one surface of the first surface and the second surface, and wherein the first Halbach array and the second Halbach array are arranged to overlap any one or more of the plurality of fixed contacts along the other direction, respectively.

Further, in the arc path generation unit, each surface on which the first Halbach array and the second Halbach array face each other is magnetized with the same polarity.

In addition, the first Halbach array of the arc path generation unit may include a second block which is positioned to be biased toward any one surface of the third surface and the fourth surface; a third block which is positioned to be biased toward the other one surface of the third surface and the fourth surface; and a first block which is positioned between the second block and the third block, and wherein the second Halbach array may include a second block which is positioned to be biased toward the any one surface of the third surface and the fourth surface; a third block which is positioned to be biased toward the other one surface of the third surface and the fourth surface; and a first block which is positioned between the second block and the third block.

Further, in the arc path generation unit, each surface on which the first block of the first Halbach array and the first block of the second Halbach array face each other is magnetized with the same polarity.

In addition, the first Halbach array of the arc path generation unit may include a second block which is positioned to be biased toward any one surface of the third surface and the fourth surface; a third block which is positioned to be biased toward the other one surface of the third surface and the fourth surface; a first block which is positioned between the second block and the third block; a fourth block which is positioned between the first block and the second block; and a fifth block which is positioned between the first block and the third block, and wherein the second Halbach array may include a second block which is positioned to be biased toward the any one of the third surface and the fourth surface; a third block which is positioned to be biased toward the other one surface of the third surface and the fourth surface; a first block which is positioned between the second block and the third block; a fourth block which is positioned between the first block and the second block; and a fifth block which is positioned between the first block and the third block Further, in the arc path generation unit, each surface on which the first block of the first Halbach array and the first block of the second Halbach array face each other is magnetized with the same polarity, wherein each surface on which the second block of the first Halbach array and the second block of the second Halbach array face each other is magnetized with a polarity different from the polarity, and wherein each surface on which the third block of the first Halbach array and the third block of the second Halbach array face each other is magnetized with a polarity different from the polarity.

In addition, the first Halbach array of the arc path generation unit may include a second block which is positioned to be biased toward any one surface of the third surface and the fourth surface; a third block which is positioned to be biased toward the other one surface of the third surface and the fourth surface; and a first block which is positioned between the second block and the third block, wherein the second Halbach array may include a second block which is positioned to be biased toward the any one surface of the third surface and the fourth surface; a third block which is positioned to be biased toward the other one surface of the third surface and the fourth surface; a first block which is positioned between the second block and the third block; a fourth block which is positioned between the first block and the second block; and a fifth block which is positioned between the first block and the third block, and wherein the first Halbach array is positioned to be biased toward any one surface of the third surface and the fourth surface.

Further, in the arc path generation unit, each surface on which the first block of the first Halbach array and the first block of the second Halbach array face each other is magnetized with the same polarity, and wherein each surface on which the second block of the second Halbach array faces the first Halbach array, and each surface on which the third block of the second Halbach array faces the first Halbach array are magnetized with a polarity different from the polarity.

In addition, the present disclosure provides an arc path generation unit, including a magnetic frame having a space part in which a plurality of fixed contacts and a plurality of movable contacts are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a first Halbach array including a plurality of blocks that are arranged side by side in the one direction and formed of a magnetic material, and which is arranged adjacent to any one surface of the first surface and the second surface; and a second Halbach array including a plurality of blocks that are arranged side by side in the one direction and formed of a magnetic material, and which is arranged adjacent to the other one surface of the first surface and the second surface, and is positioned to be biased toward the other one surface of the third surface and the fourth surface.

Further, in the arc path generation unit, each surface on which the first Halbach array and the second Halbach array face each other is magnetized with the same polarity.

In addition, the first Halbach array of the arc path generation unit may include a first block which is arranged to overlap the second Halbach array along the other direction; and a second block which is positioned to be biased toward the other one surface of the third surface and the fourth surface, and wherein the second Halbach array may include a first block which is arranged to overlap the first Halbach array along the other direction; and a second block which is positioned to be biased toward the any one surface of the third surface and the fourth surface.

Further, in the arc path generation unit, each surface on which the first block of the first Halbach array and the first block of the se d Halbach array face each other is magnetized with the same polarity.

In addition, the first Halbach array of the arc path generation unit may include a second block which is positioned to be biased toward the any one surface of the third surface and the fourth surface; a third block which is positioned to be biased toward the other one surface of the third surface and the fourth surface; and a first block which is positioned between the second block and the third block, wherein the second Halbach array may include a second block which is positioned to be biased toward the other one surface of the third surface and the fourth surface; a third block which is positioned to be biased toward the any one surface of the third surface and the fourth surface; and a first block which is positioned between the second block and the third block, wherein the first Halbach array is arranged to overlap any one of the plurality of fixed contacts along the other direction, and wherein the second Halbach array is arranged to overlap the other one of the plurality of fixed contacts along the other direction.

Further, in the arc path generation unit, each surface of the surfaces of the first block of the first Halbach array facing the space part and each surface of the surfaces of the first block of the second Halbach array facing the space part are magnetized with the same polarity.

In addition, the present disclosure provides an arc path generation unit, including a magnetic frame having a space part in which a plurality of fixed contacts and a plurality of movable contacts are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a plurality of blocks that are arranged side by side in the one direction and formed of a magnetic material, wherein a plurality of Halbach arrays are provided, and at least one of the plurality of Halbach arrays is disposed adjacent to any one surface of the first surface and the second surface, and wherein the at least two other of the plurality of Halbach arrays are disposed adjacent to the other one surface of the first surface and the second surface.

Further, in the arc path generation unit, each surface on which the at least one Halbach array disposed adjacent to the any one surface of the first surface and the second surface, and the at least two Halbach arrays disposed adjacent to the other one surface of the first surface and the second surface face each other are magnetized with the same polarity.

In addition, the plurality of Halbach arrays of the arc path generation unit may include a first Halbach array which is positioned adjacent to the any one surface of the first surface and the second surface, and is positioned to be biased toward any one surface of the third surface and the fourth surface; a second Halbach array which is positioned adjacent to the any one surface of the first surface and the second surface, and is positioned to be biased toward the other one surface of the third surface and the fourth surface; a third Halbach array which is positioned adjacent to the other one surface of the first surface and the second surface, and is positioned to be biased toward the any one surface of the third surface and the fourth surface; and a fourth Halbach array which is positioned adjacent to the other one surface of the first surface and the second surface, and is positioned to be biased toward the other one surface of the third surface and the fourth surface.

In addition, the first Halbach array, the second Halbach array, the third Halbach array and the fourth Halbach array of the arc path generation unit may respectively include a second block which is positioned to be biased toward any one surface of the third surface and the fourth surface; a third block which is positioned to be biased toward the other one surface of the third surface and the fourth surface; and a first block which is positioned between the second block and the third block.

Further, in the arc path generation unit, a surface of the surfaces of the first block of the first Halbach array facing the space part and a surface of the surfaces of the first block of the third Halbach array facing the space part are respectively magnetized with the same polarity, and wherein a surface of the surfaces of the first block of the second Halbach array facing the space part and a surface of the surfaces of the first block of the fourth Halbach array facing the space part are respectively magnetized with the same polarity as the polarity.

In addition, the plurality of Halbach arrays of the arc path generation unit may include a first Halbach array which is positioned adjacent to the any one surface of the first surface and the second surface, and is positioned to be biased toward any one surface of the third surface and the fourth surface; a second Halbach array which is positioned adjacent to the other one surface of the first surface and the second surface, and is positioned to be biased toward any one surface of the third surface and the fourth surface; and a third Halbach array which is positioned adjacent to the other one surface of the first surface and the second surface, and is positioned to be biased toward the other one surface of the third surface and the fourth surface, and wherein the first Halbach array is arranged to overlap any one of the second Halbach array and the third Halbach array along the other direction.

In addition, the first Halbach array, the second Halbach array and the third Halbach array of the arc path generation unit may respectively include a second block which is positioned to be biased toward any one surface of the third surface and the fourth surface; a third block which is positioned to be biased toward the other one surface of the third surface and the fourth surface; and a first block which is positioned between the second block and the third block.

Further, in the arc path generation unit, a surface of the surfaces of the first block of the first Halbach array facing the space part, a surface of the surfaces of the first block of the second Halbach array facing the space part and a surface of the surfaces of the first block of the third Halbach array facing the space part are respectively magnetized with the same polarity.

In addition, the plurality of Halbach arrays of the arc path generation unit may include a first Halbach array which is positioned to be biased toward any one surface of the third surface and the fourth surface; a second Halbach array which is positioned adjacent to the other one surface of the first surface and the second surface, and is positioned to be biased toward any one surface of the third surface and the fourth surface; and a third Halbach array which is positioned adjacent to the other one surface of the first surface and the second surface, and is positioned to be biased toward the other one surface of the third surface and the fourth surface, and wherein the first Halbach array is arranged to overlap the second Halbach array and the third Halbach array along the other direction, respectively.

In addition, the first Halbach array, the second Halbach array and the third Halbach array of the arc path generation unit may respectively include a second block which is positioned to be biased toward any one surface of the third surface and the fourth surface; a third block which is positioned to be biased toward the other one surface of the third surface and the fourth surface; and a first block which is positioned between the second block and the third block.

Further, in the arc path generation unit, a surface of the surfaces of the first block of the first Halbach array facing the space part, a surface of the surfaces of the first block of the second Halbach array facing the space part and a surface of the surfaces of the first block of the third Halbach array facing the space part are respectively magnetized with the same polarity.

In addition, the present disclosure provides a direct current relay, including a plurality of fixed contacts provided to be spaced apart from each other in one direction; a movable contact contacting or spaced apart from the fixed contact; a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a first Halbach array including a plurality of blocks which are arranged side by side in the one direction and formed of a magnetic material, and which is disposed adjacent to any one surface of the first surface and the second surface; and a second Halbach array including a plurality of blocks which are arranged side by side in the one direction and formed of a magnetic material, and which is disposed adjacent to the other one surface of the first surface and the second surface, wherein the first Halbach array and the second Halbach array are arranged to overlap any one or more of the plurality of fixed contacts along the other direction, respectively, and wherein each surface on which the first Halbach array and the second Halbach array face each other is magnetized with the same polarity.

In addition, the present disclosure provides a direct current relay, including a plurality of fixed contacts provided to be spaced apart from each other in one direction; a movable contact contacting or spaced apart from the fixed contact; a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a first Halbach array including a plurality of blocks which are arranged side by side in the one direction and formed of a magnetic material, and which is disposed adjacent to any one surface of the first surface and the second surface, and is positioned to be biased toward any one surface of the third surface and the fourth surface; and a second Halbach array including a plurality of blocks which are arranged side by side in the one direction and formed of a magnetic material, and which is disposed adjacent to the other one surface of the first surface and the second surface, and is positioned to be biased toward the other one surface of the third surface and the fourth surface, and wherein each surface on which the first Halbach array and the second Halbach array face each other is magnetized with the same polarity.

In addition, the present disclosure provides a direct current relay, including a plurality of fixed contacts provided to be spaced apart from each other in one direction; a movable contact contacting or spaced apart from the fixed contact; a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a plurality of blocks that are arranged side by side in the one direction and are formed of a magnetic material, wherein a plurality of Halbach arrays are provided, and at least one of the plurality of Halbach arrays is disposed adjacent to any one surface of the first surface and the second surface, wherein at least two other of the plurality of Halbach arrays are disposed adjacent to the other one surface of the first surface and the second surface, and wherein each surface on which the at least one Halbach array which is disposed adjacent to the any one surface of the first surface and the second surface, and the at least two of the Halbach arrays which are disposed adjacent to the other one surface of the first surface and the second surface face each other is magnetized with the same polarity.

In addition, the present disclosure provides an arc path generation unit, including a magnetic frame having a space part in which a plurality of fixed contacts and a plurality of movable contacts are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, and wherein the Halbach array may include a plurality of blocks which are arranged side by side in the one direction and formed of a magnetic material, and is arranged adjacent to any one surface of the first surface and the second surface, so as to be disposed to overlap any one or more of the plurality of fixed contacts in the other direction.

In addition, the Halbach array of the arc path generation unit is positioned to be biased toward any one surface of the third surface and the fourth surface, is positioned to overlap any one of the plurality of fixed contacts in the other direction, and may include: a first block which is positioned to be biased toward the any one surface of the third surface and the fourth surface; and a second block which is positioned to be biased toward the other one surface of the third surface and the fourth surface.

In addition, the Halbach array of the arc path generation unit may include a first Halbach array which is biased toward any one surface of the third surface and the fourth surface; and a second Halbach array which is biased toward the other one surface of the third surface and the fourth surface.

Further, in the arc path generation unit, a surface of the surfaces of the first Halbach array facing the space part and a surface of the surfaces of the second Halbach array facing the space part are magnetized with the same polarity.

In addition, the first Halbach array and the second Halbach array of the arc path generation unit may respectively include a second block which is positioned to be biased toward the any one surface of the third surface and the fourth surface; a third block which is positioned to be biased toward the other one surface of the third surface and the fourth surface; and a first block which is positioned between the second block and the third block.

Further, in the arc path generation unit, a surface of the surfaces of the first block of the first Halbach array facing the space part and a surface of the surfaces of the first block of the second Halbach array facing the space part are magnetized with the same polarity.

In addition, the Halbach array of the arc path generation unit may include a second block which is positioned to be biased toward any one surface of the third surface and the fourth surface; a third block which is positioned to be biased toward the other one surface of the third surface and the fourth surface; a first block which is positioned between the second block and the third block; a fourth block which is positioned between the first block and the second block; and a fifth block which is positioned between the first block and the third block.

Further, in the arc path generation unit, a surface of the surfaces of the second block facing the space part and a surface of the surfaces of the third block facing the space part are magnetized with the same polarity, and wherein a surface of the surfaces of the first block facing the space part is magnetized with a polarity different from the polarity.

In addition, the present disclosure provides an arc path generation unit, including a magnetic frame having a space part in which a plurality of fixed contacts and a plurality of movable contacts are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a plurality of blocks which are arranged side by side in the one direction and formed of a magnetic material, and is arranged adjacent to any one surface of the first surface and the second surface, and wherein the magnet part extends in the one direction and is disposed adjacent to the other one surface of the first surface and the second surface, so as to be disposed to face the Halbach array with the space part therebetween.

In addition, the Halbach array of the arc path generation unit is positioned to be biased toward any one surface of the third surface and the fourth surface, and is arranged to overlap any one of the plurality of fixed contacts in the other direction.

Further, in the arc path generation unit, each surface on which the magnet part and the Halbach array face each other is magnetized with the same polarity.

In addition, the Halbach array of the arc path generation unit may include a first block which is positioned to be biased toward the other one surface of the third surface and the fourth surface; and a second block which is positioned to be biased toward the any one surface of the third surface and the fourth surface.

Further, in the arc path generation unit, a surface of the surfaces of the first block of the Halbach array facing the magnet part and a surface of the surfaces of the magnet part facing the Halbach array are magnetized with the same polarity.

In addition, the Halbach array of the arc path generation unit may include a first Halbach array which is positioned to be biased toward any one surface of the third surface and the fourth surface, and is arranged to overlap any one of the plurality of fixed contacts in the other direction; and a second Halbach array which is positioned to be biased toward the other one surface of the third surface and the fourth surface, and is arranged to overlap the other one of the plurality of fixed contacts in the other direction.

Further, in the arc path generation unit, each surface on which the magnet part and the first Halbach array face each other and each surface on which the magnet part and the second Halbach array face each other are magnetized with the same polarity.

In addition, the first Halbach array and the second Halbach array of the arc path generation unit may respectively include a second block which is positioned to be biased toward the any one surface of the third surface and the fourth surface; a third block which is positioned to be biased toward the other one surface of the third surface and the fourth surface; and a first block which is positioned between the second block and the third block.

Further, in the arc path generation unit, a surface of the surfaces of the first block of the first Halbach array facing the magnet part, a surface of the surfaces of the first block of the second Halbach array facing the magnet part and a surface of the surfaces of the magnet part facing the space part are magnetized with the same polarity.

In addition, the Halbach array of the arc path generation unit may include a second block which is positioned to be biased toward any one surface of the third surface and the fourth surface; a third block which is positioned to be biased toward the other one surface of the third surface and the fourth surface; a first block which is positioned between the second block and the third block; a fourth block which is positioned between the first block and the second block; and a fifth block which is positioned between the first block and the third block.

Further, in the arc path generation unit, a surface of the surfaces of the second block facing the magnet part and a surface of the surfaces of the third block facing the magnet part are magnetized with the same polarity, and wherein each surface on which the first block and the magnet part face each other is magnetized with a polarity different from the polarity.

In addition, the present disclosure provides an arc path generation unit, including a magnetic frame having a space part in which a plurality of fixed contacts and a plurality of movable contacts are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a plurality of blocks which are arranged side by side in the one direction and formed of a magnetic material, and is arranged adjacent to any one surface of the first surface and the second surface, and wherein a plurality of magnet parts are provided, and the plurality of magnet parts are arranged adjacent to the other one of the first surface and the second surface, and are respectively positioned to be biased toward different surfaces of the third surface and the fourth surface, so as to be disposed to face the Halbach array with the space part therebetween.

In addition, the magnet part of the arc path generation unit may include a first magnet part which is positioned to be biased toward any one surface of the third surface and the fourth surface; and a second magnet part which is positioned to be biased toward the other one surface of the third surface and the fourth surface, and wherein the Halbach array is positioned to be biased toward the any one surface of the third surface and the fourth surface, so as to be arranged to overlap any one of the first magnet part and the second magnet part in the other direction.

Further, in the arc path generation unit, each surface on which the first magnet part and the Halbach array face each other, and each surface on which the second magnet part and the Halbach array face each other are magnetized with the same polarity.

In addition, the Halbach array of the arc path generation unit may include a first block which is positioned to be biased toward the other one surface of the third surface and the fourth surface; and a second block which is positioned to be biased toward the any one surface of the third surface and the fourth surface, and is disposed to face any one of the first magnet part and the second magnet part.

Further, in the arc path generation unit, a surface of the surfaces of the first block of the Halbach array facing the first magnet part or the second magnet part, a surface of the surfaces of the first magnet part facing the Halbach array and a surface of the surfaces of the second magnet part facing the Halbach array are magnetized with the same polarity.

In addition, the Halbach array of the arc path generation unit may include a first Halbach array which is positioned to be biased toward any one surface of the third surface and the fourth surface; and a second Halbach array which is positioned to be biased toward the other one surface of the third surface and the fourth surface, wherein the magnet part extends beyond a distance in which the plurality of fixed contacts are spaced apart from each other.

In addition, each surface on which the first Halbach array and the magnet part of the arc path generation unit face each other, and each surface on which the second Halbach array and the magnet part face each other are magnetized with the same polarity.

In addition, the first Halbach array and the second Halbach array of the arc path generation unit may respectively include a second block which is positioned to be biased toward any one surface of the third surface and the fourth surface; a third block which is positioned to be biased toward the other one surface of the third surface and the fourth surface; and a first block which is positioned between the second block and the third block.

In addition, a surface of the surfaces of the first block of the first Halbach array facing the magnet part, a surface of the surfaces of the first block of the second Halbach array facing the magnet part and a surface of the surfaces of the magnet part, facing the first Halbach array or the second Halbach array are magnetized with the same polarity.

In addition, the Halbach array of the arc path generation unit may include a second block which is positioned to be biased toward any one surface of the third surface and the fourth surface; a third block which is positioned to be biased toward the other one surface of the third surface and the fourth surface; a first block which is positioned between the second block and the third block; a fourth block which is positioned between the first block and the second block; and a fifth block which is positioned between the first block and the third block.

In addition, a surface of the surfaces of the second block of the arc path generation unit facing the magnet part and a surface of the surfaces of the third block facing the magnet part are magnetized with the same polarity, and wherein each surface on which the first block and the magnet part face each other is magnetized with a polarity different from the polarity.

In addition, the present disclosure provides a direct current relay, including a plurality of fixed contacts provided to be spaced apart from each other in one direction; a movable contact contacting or spaced apart from the fixed contact; a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, and wherein the Halbach array may include a plurality of blocks that are arranged side by side in the one direction and are formed of a magnetic material, and is arranged adjacent to any one surface of the first surface and the second surface, so as to be arranged to overlap any one or more of the plurality of fixed contacts in the other direction.

In addition, the present disclosure provides a direct current relay, including a plurality of fixed contacts provided to be spaced apart from each other in one direction; a movable contact contacting or spaced apart from the fixed contact; a magnetic frame having a space part in which the fixed contact and the movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a plurality of blocks that are arranged side by side in the one direction and are formed of a magnetic material, and is arranged adjacent to any one surface of the first surface and the second surface, and wherein the magnet part extends in the one direction, and is arranged adjacent to the other one surface of the first surface and the second surface, so as to be disposed to face the Halbach array with the space part therebetween.

In addition, the present disclosure provides a direct current relay, including a plurality of fixed contacts provided to be spaced apart from each other in one direction; a movable contact contacting or spaced apart from the fixed contact; a magnetic frame having a space part in which the fixed contact and the movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array may include a plurality of blocks that are arranged side by side in the one direction and are formed of a magnetic material, and is arranged adjacent to any one surface of the first surface and the second surface, and wherein a plurality of magnet parts are provided, and the plurality of magnet parts are arranged adjacent to the other one surface of the first surface and the second surface, and are respectively positioned to be biased toward the other surface of the third surface and the fourth surface, so as to be disposed to face the Halbach array with the space part therebetween.

Advantageous Effects

According to an exemplary embodiment of the present disclosure, the following effects can be achieved.

First, the arc path generation unit includes a Halbach array and a magnet part. The Halbach array and the magnet part form a magnetic field inside the arc path generation unit, respectively. The formed magnetic field forms an electromagnetic force together with the current passed through the fixed contact and the movable contact which are accommodated in the arc path generation unit.

In this case, the generated arc is formed in a direction away from each fixed contact. The arc generated by the fixed contact and the movable contact being spaced apart may be induced by the electromagnetic force.

Accordingly, the generated arc can be quickly extinguished and discharged to the outside of the arc path generation unit and the DC relay.

In addition, the arc path generation unit includes a Halbach array. The Halbach array includes a plurality of magnetic materials that are arranged side by side in one direction. The plurality of magnetic materials may further enhance the strength of the magnetic field on either side of both sides of the one direction and the other direction.

In this case, in the Halbach array, the one side, that is, the direction in which the strength of the magnetic field is strengthened, is disposed toward the space part of the arc path generation unit. That is, by the Halbach array, the strength of the magnetic field formed inside the space may be strengthened.

Accordingly, the strength of the electromagnetic force that depends on the strength of the magnetic field may also be strengthened. As a result, the intensity of the electromagnetic force that induces the generated arc is strengthened, and thus, the generated arc can be effectively extinguished and discharged.

In addition, the direction of the electromagnetic force formed by the magnetic field formed by the Halbach array and the magnet part and the current passed through the fixed contact and the movable contact is formed in a direction away from the center.

Furthermore, as described above, since the strength of the magnetic field and electromagnetic force is strengthened by the Halbach array and the magnet part, the generated arc can be extinguished and moved quickly in a direction away from the center.

Accordingly, it is possible to prevent damage to various components provided near the center for the operation of the DC relay.

Further, in various exemplary embodiments, a plurality of fixed contacts may be provided. The Halbach array or magnet part provided in the arc path generation unit forms magnetic fields in different directions in the vicinity of each fixed contact. Accordingly, the paths of arcs generated in the vicinity of each fixed contact proceed in different directions.

Accordingly, arcs generated in the vicinity of each fixed contact do not meet each other. Accordingly, it is possible to prevent a malfunction or a safety accident that may be caused by the collision of arcs generated at different positions.

Further, in order to achieve the above-described objects and effects, the arc path generation unit includes a Halbach array and a magnet part provided in the space part. The Halbach array and the magnet part are located inwardly on each surface of the magnetic frame surrounding the space part. That is, separate design changes for disposing the Halbach array and the magnet part outside the space part are not required.

Accordingly, the arc path generation unit according to various exemplary embodiments of the present disclosure may be provided in the DC relay without excessive design changes. Accordingly, the time and cost for applying the arc path generation unit according to various exemplary embodiments of the present disclosure may be reduced.

DETAILED DESCRIPTION

Figure 1:
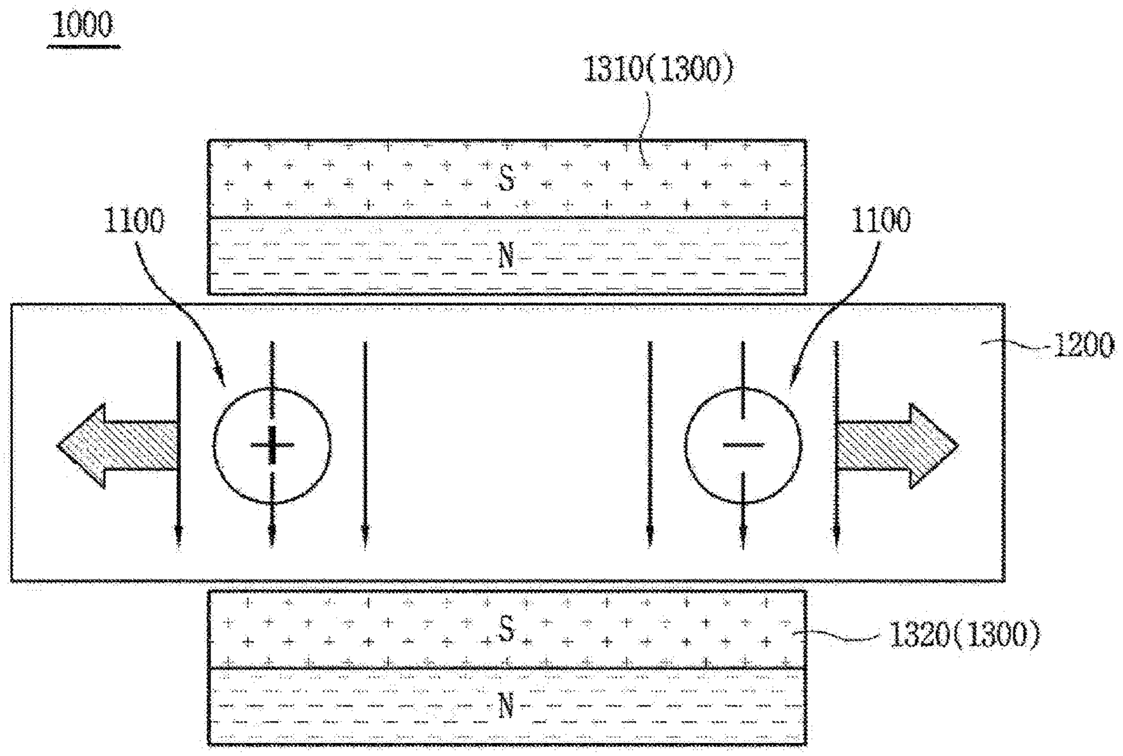
FIG. 1 is a conceptual diagram illustrating a DC relay according to prior art.
Figure 1:
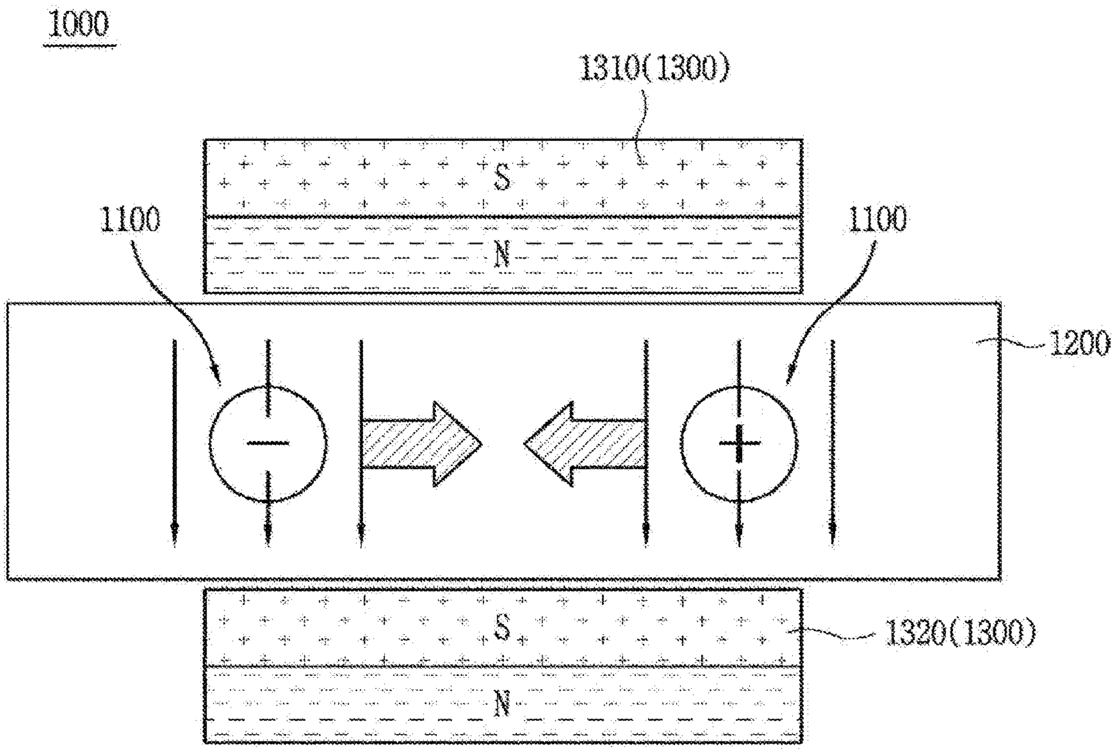

Hereinafter, the arc path generation units 100, 200, 300, 400, 500, 600, 700, 800, 900 and the DC relay 1 including the same according to an exemplary embodiment of the present disclosure will be described in detail with reference to the accompanying drawings.

In the following description, in order to clarify the characteristics of the present disclosure, the descriptions of some components may be omitted.

1. Definition of Terms

When an element is referred to as being "connected" to or "joined" with another element, it will be understood that it may be directly connected to or joined with the other element, but other elements may exist in between.

On the other hand, when it is mentioned that a certain element is "directly connected" to or "directly joined" with another element, it will be understood that other elements do not exist in the middle.

As used herein, the singular expression includes the plural expression unless the context clearly dictates otherwise.

The term "magnetize" used in the following description refers to a phenomenon in which an object becomes magnetic in a magnetic field.

The term "polarity" used in the following description refers to different properties that the anode and cathode of an electrode have. In an exemplary embodiment, the polarity may be classified into the N pole or the S pole.

The term "electric current" used in the following description refers to a state in which two or more members are electrically connected.

The term "arc path (A.P)" used in the following description means a path through which the generated arc is moved or extinguished.

"⊙" illustrated in the following drawings means a direction in which the current flows from a movable contact 43 toward a fixed contact 22 (i.e., an upward direction), that is, the flow in a direction coming out of the ground.

"⊗" illustrated in the following drawings means a direction in which the current flows from a fixed contact 22 toward a movable contact 43 (i.e., downward direction), that is, a direction that penetrates the ground.

The term "Halbach Array" used in the following description refers to an aggregate composed of a plurality of magnetic materials arranged side by side and configured in a column or a row.

A plurality of magnetic materials constituting the Halbach array may be arranged according to a predetermined rule. The plurality of magnetic materials may form a magnetic field on their own or with each other.

The Halbach array contains two relatively long surfaces and the other two relatively short surfaces. The magnetic field formed by the magnetic materials constituting the Halbach array may be formed with a stronger intensity on the outside of any one of the two long surfaces.

The term "magnet part" used in the following description means an object of any shape that is formed of a magnetic material and may form a magnetic field. In an exemplary embodiment, the magnet part may be provided with a permanent magnet or an electromagnet. It will be understood that the magnet part is a magnetic material which is different from the magnetic materials forming the Halbach array, that is, a magnetic material which is provided separately from the Halbach array.

The magnet part may form a magnetic field by itself or in conjunction with another magnetic material.

The magnet part may extend in one direction. The magnet part may be magnetized to have different polarities at both ends in the one direction (i.e., it has different polarities in the longitudinal direction). In addition, the magnet part may be magnetized to have different polarities on both side surfaces of the one direction and the other direction (i.e., it has different polarities in the width direction).

In the following description, it is described by assuming that the strength of the magnetic field in a direction toward the space parts 115, 215, 315, 415, 515, 615, 715, 815, 915 is formed to be stronger among the magnetic fields formed by the Halbach array.

The magnetic field formed by the arc path generation units 100, 200, 300, 400, 500, 600, 700, 800, 900 according to an exemplary embodiment of the present disclosure is illustrated by a dashed-dotted line in each drawing.

Figure 2:
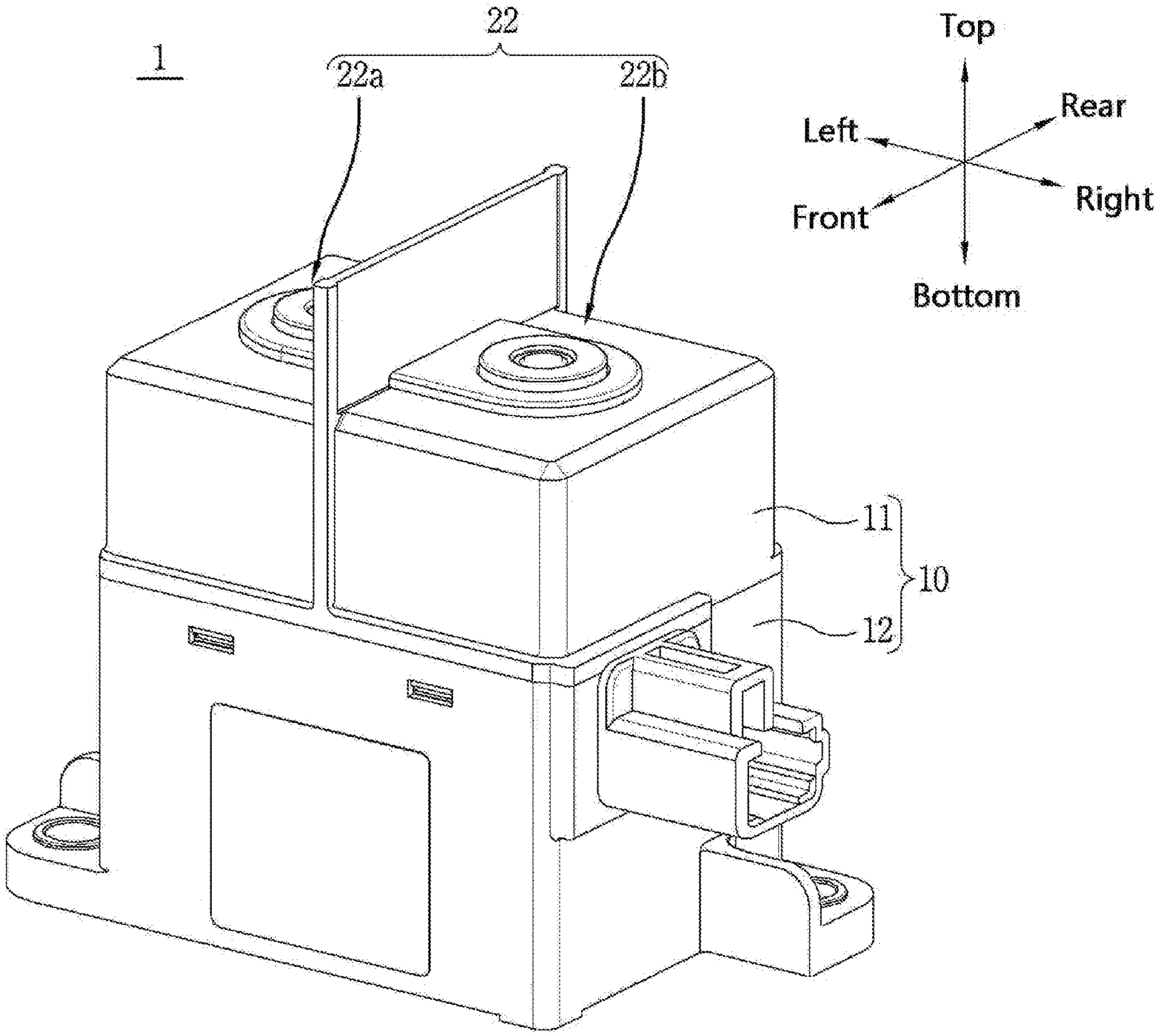
FIG. 2 is a perspective view illustrating the DC relay according to an exemplary embodiment of the present disclosure.

The terms "left", "right", "top", "bottom", "front" and "rear" used in the following description will be understood with reference to the coordinate system illustrated in FIG. 2.

Figure 3:
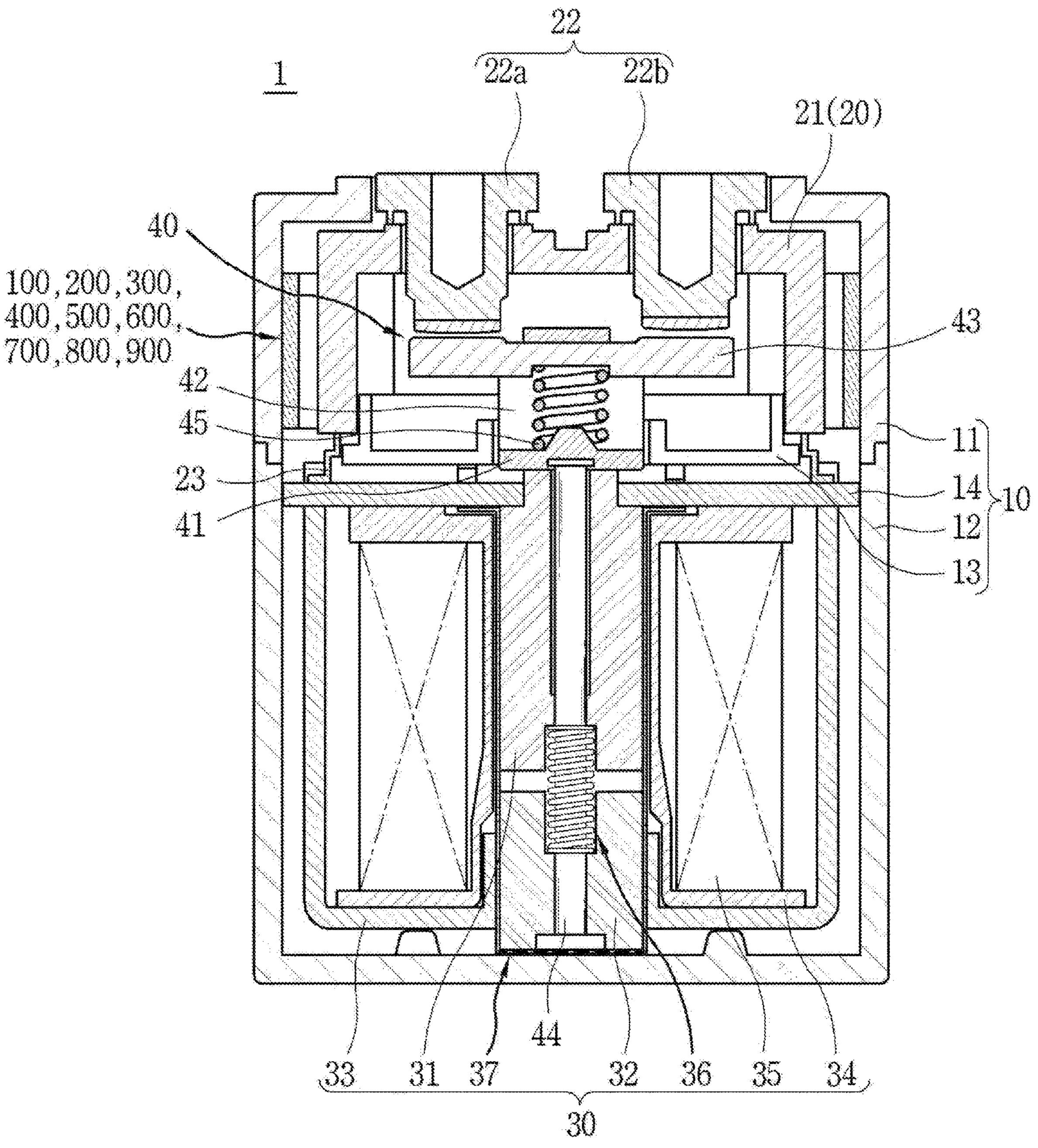
FIG. 3 is a cross-sectional view showing the configuration of the DC relay of FIG. 2.

2. Description of the Configuration of the DC Relay 1 According to an Exemplary Embodiment of the Present Disclosure Referring to FIGS. 2 to 3, the DC relay 1 according to an exemplary embodiment of the present disclosure includes a frame part 10, an opening/closing part 20, a core part 30 and a movable contact part 40.

Figure 4:
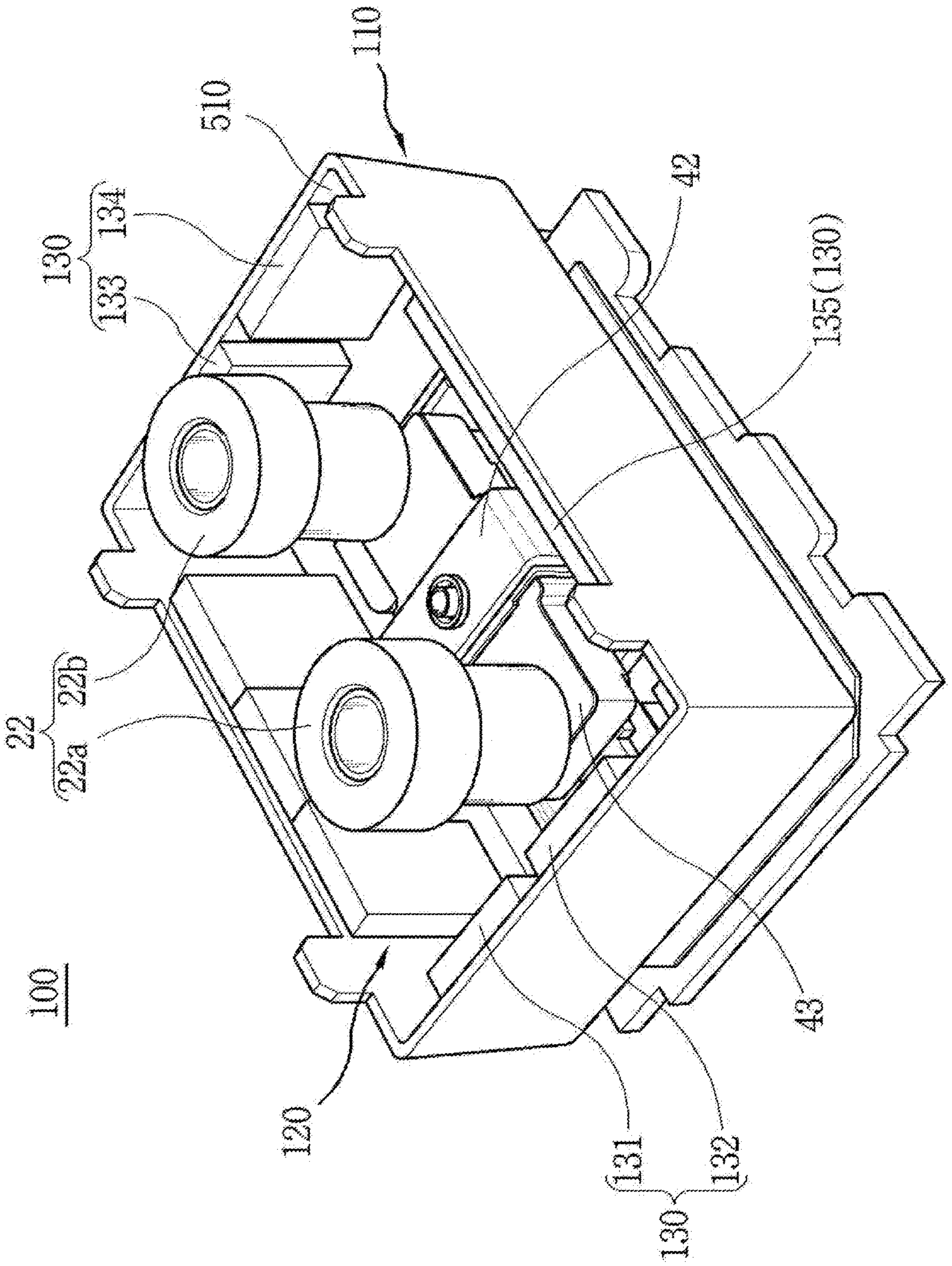
FIG. 4 is an open perspective view illustrating the first example of an arc path generation unit provided in the DC relay of FIG. 2.
Figure 86:
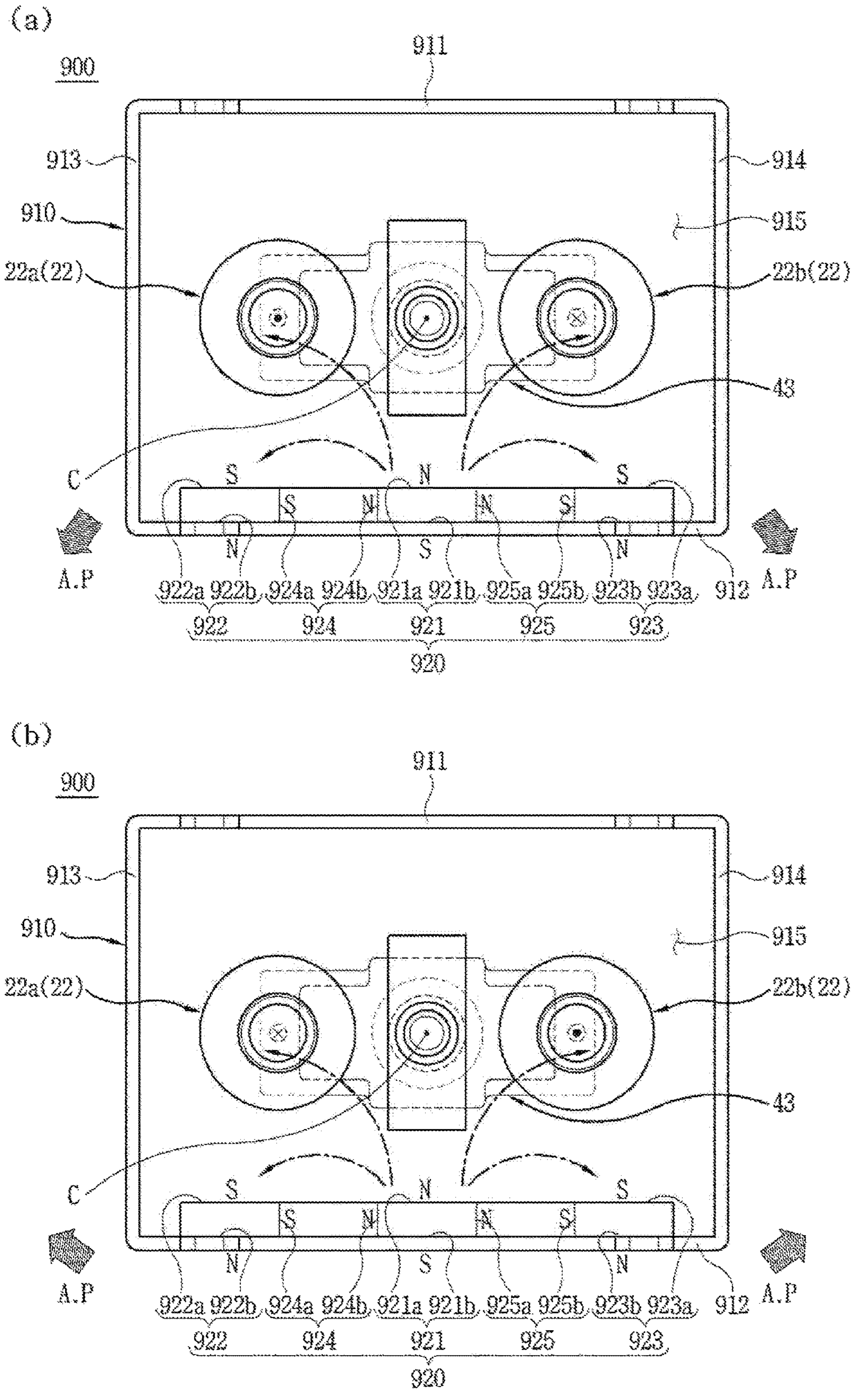
FIG. 86 is a conceptual diagram illustrating the paths of a magnetic field and an arc formed by the arc path generation unit according to the exemplary embodiment shown in FIGS. 84 and 85.

In addition, referring to FIGS. 4 to 86, the DC relay 1 according to an exemplary embodiment of the present disclosure includes arc path generation units 100, 200, 300, 400, 500, 600, 700, 800, 900.

The arc path generation units 100, 200, 300, 400, 500, 600, 700, 800, 900 may form a discharge path of the generated arc.

Hereinafter, each configuration of the DC relay 1 according to an exemplary embodiment of the present disclosure will be described with reference to the accompanying drawings, but the arc path generation units 100, 200, 300, 400, 500, 600, 700, 800, 900 are explained in a separate section.

The arc path generation units 100, 200, 300, 400, 500, 600, 700, 800, 900 according to various exemplary embodiments to be described below are described on the assumption that these are provided in a direct current relay 1.

However, it will be understood that the arc path generation units 100, 200, 300, 400, 500, 600, 700, 800, 900 may be applied to the type of devices that are capable of being energized and de-energized with the outside by the contact and separation of a fixed contact and a movable contact such as magnetic contacts and magnetic switches.

(1) Description of the Frame Part 10

The frame part 10 forms the outside of the DC relay 1. A predetermined space is formed inside the frame part 10. Various devices that perform a function for the DC relay 1 to apply or block an externally transmitted current may be accommodated in the space.

That is, the frame part 10 functions as a type of housing.

The frame part 10 may be formed of an insulating material such as synthetic resin or the like. This is to prevent arbitrarily energizing the inside and outside of the frame part 10.

The frame part 10 includes an upper frame 11, a lower frame 12, an insulating plate 13 and a support plate 14.

The upper frame 11 forms the upper side of the frame part 10. A predetermined space is formed inside the upper frame 11.

The opening/closing part 20 and the movable contact part 40 may be accommodated in the inner space of the upper frame 11. In addition, the arc path generation units 100, 200, 300, 400, 500, 600, 700 may be accommodated in the inner space of the upper frame 11.

The upper frame 11 may be coupled to the lower frame 12. An insulating plate 13 and a support plate 14 may be provided in a space between the upper frame 11 and the lower frame 12.

On one side of the upper frame 11, the fixed contact 22 of the opening/closing part 20 is positioned on the upper side in the illustrated exemplary embodiment. A portion of the fixed contact 22 is exposed on the upper side of the upper frame 11, and it may be connected to an external power source or a load to be energized.

To this end, a through-hole through which the fixing contact 22 is coupled may be formed on the upper side of the upper frame 11.

The lower frame 12 forms the lower side of the frame part 10. A predetermined space is formed inside the lower frame 12. The core part 30 may be accommodated in the inner space of the lower frame 12.

The lower frame 12 may be coupled to the upper frame 11. An insulating plate 13 and a support plate 14 may be provided in a space between the lower frame 12 and the upper frame 11.

The insulating plate 13 and the supporting plate 14 electrically and physically separate the inner space of the upper frame 11 and the inner space of the lower frame 12.

The insulating plate 13 is positioned between the upper frame 11 and the lower frame 12. The insulating plate 13 electrically separates the upper frame 11 and the lower frame 12 from each other. To this end, the insulating plate 13 may be formed of an insulating material such as synthetic resin or the like.

By the insulating plate, it is possible to prevent any electrical conduction between the opening/closing part 20, the movable contact part 40 and the arc path generation units 100, 200, 300, 400, 500, 600, 700, 800, 900 accommodated inside the upper frame 11 by the insulating plate 1, with the core part 30 accommodated inside the lower frame 12.

A through-hole (not illustrated) is formed in the center of the insulating plate 13. The shaft 44 of the movable contact part 40 is coupled through the through-hole (not illustrated) to be movable in the vertical direction.

A support plate 14 is positioned on the lower side of the insulating plate 13. The insulating plate 13 may be supported by the support plate 14.

The support plate 14 is positioned between the upper frame 11 and the lower frame 12.

The support plate 14 physically separates the upper frame 11 and the lower frame 12 from each other. In addition, the support plate 14 supports the insulating plate 13.

The support plate 14 may be formed of a magnetic material. Accordingly, the support plate 14 may form a magnetic circuit together with the yoke 33 of the core part 30. By the magnetic path, a driving force for moving the movable core 32 of the core part 30 toward the fixed core 31 may be formed.

A through-hole (not illustrated) is formed in the center of the support plate 14. A shaft 44 is coupled through the through-hole (not illustrated) to be movable in the vertical direction.

Accordingly, when the movable core 32 is moved in a direction toward the fixed core 31 or in a direction spaced apart from the fixed core 31, the shaft 44 and the movable contact 43 connected to the shaft 44 may also be moved together in the same direction.

(2) Description of the Opening/Closing Part 20

The opening/closing unit 20 permits or blocks the flow of current according to the operation of the core part 30. Specifically, the opening/closing unit 20 may allow or block the flow of current by contacting or separating the fixed contact 22 and the movable contact 43 from each other.

The opening/closing part 20 is accommodated in the inner space of the upper frame 11. The opening/closing part 20 may be electrically and physically spaced apart from the core part by the insulating plate 13 and the supporting plate 14.

The opening/closing part 20 includes an arc chamber 21, a fixed contact 22 and a sealing member 23.

In addition, the arc path generation units 100, 200, 300, 400, 500, 600, 700, 800, 900 may be provided outside the arc chamber 21. The arc path generation units 100, 200, 300, 400, 500, 600, 700, 800, 900 may form a magnetic field for forming the path (A.P) of an arc generated inside the arc chamber 21. The detailed description thereof will be provided below.

The arc chamber 21 extinguishes the arc generated by the fixed contact 22 and the movable contact 43 being spaced apart from each other in the inner space. Accordingly, the arc chamber 21 may be referred to as an "arc extinguishing unit."

The arc chamber 21 hermetically accommodates the fixed contact 22 and the movable contact 43. That is, the fixed contact 22 and the movable contact 43 are accommodated inside the arc chamber 21. Accordingly, the arc generated by the fixed contact 22 and the movable contact 43 being spaced apart does not flow out arbitrarily to the outside.

The arc chamber 21 may be filled with an extinguishing gas. The extinguishing gas allows the generated arc to be extinguished and discharged to the outside of the DC relay 1 through a preset path. To this end, a communication hole (not illustrated) may be formed through the wall surrounding the inner space of the arc chamber 21.

The arc chamber 21 may be formed of an insulating material. In addition, the arc chamber 21 may be formed of a material having high pressure resistance and high heat resistance. This is because the generated arc is a flow of high-temperature and high-pressure electrons. In an exemplary embodiment, the arc chamber 21 may be formed of a ceramic material.

A plurality of through-holes may be formed on the upper side of the arc chamber 21. A fixed contact 22 is through-coupled to each of the through-holes.

In the illustrated exemplary embodiment, the fixed contact 22 is provided in two, including a first fixed contact 22*a* and a second fixed contact 22*b*. Accordingly, two through-holes formed on the upper side of the arc chamber 21 may also be formed.

When the fixed contact 22 is through-coupled to the through-hole, the through-hole is sealed. That is, the fixed contact 22 is hermetically coupled to the through-hole. Accordingly, the generated arc is not discharged to the outside through the through-hole.

The lower side of the arc chamber 21 may be open. The insulating plate 13 and the sealing member 23 are in contact with the lower side of the arc chamber 21. That is, the lower side of the arc chamber 21 is sealed by the insulating plate 13 and the sealing member 23.

Accordingly, the arc chamber 21 may be electrically and physically spaced apart from the outer space of the upper frame 11.

The arc extinguished in the arc chamber 21 is discharged to the outside of the DC relay 1 through a preset path. In an exemplary embodiment, the extinguished arc may be discharged to the outside of the arc chamber 21 through the communication hole (not illustrated).

The fixed contact 22 is in contact with or spaced apart from the movable contact 43 to apply or cut off electric conduction inside and outside the DC relay 1.

Specifically, when the fixed contact 22 is in contact with the movable contact 43, the inside and the outside of the DC relay 1 may be energized. On the other hand, when the fixed contact 22 is spaced apart from the movable contact 43, the electric current inside and outside the DC relay 1 is cut off.

As the name implies, the fixed contact 22 is not moved. That is, the fixed contact 22 is fixedly coupled to the upper frame 11 and the arc chamber 21. Accordingly, contact and separation of the fixed contact 22 and the movable contact 43 are achieved by the movement of the movable contact 43.

One end of the fixed contact 22, which is an upper end in the illustrated exemplary embodiment, is exposed to the outside of the upper frame 11. A power source or a load is connected to the one end to be energized, respectively.

A plurality of fixed contacts 22 may be provided. In the illustrated exemplary embodiment, the fixed contact 22 is provided in a total of two, including a first fixed contact 22*a* on the left side and a second fixed contact 22*b* on the right side.

The first fixed contact 22*a* is positioned to be biased toward one side from the center in the longitudinal direction of the movable contact 43, which is to the left side in the illustrated exemplary embodiment. In addition, the second fixed contact 22*b* is positioned to be biased toward the other side from the center in the longitudinal direction of the movable contact 43, which is to the right in the illustrated exemplary embodiment.

Power may be energably connected to any one of the first fixed contact 22*a* and the second fixed contact 22*b*. In addition, a load may be electrically connected to the other one of the first fixed contact 22*a* and the second fixed contact 22*b*.

The DC relay 1 according to an exemplary embodiment of the present disclosure may form an arc path (A.P) regardless of the direction of the power or load connected to the fixed contact 22. This is accomplished by the arc path generation units 100, 200, 300, 400, 500, 600, 700, 800, 900, which will be described below in detail.

The other end of the fixed contact 22, which is the lower end in the illustrated exemplary embodiment, extends toward the movable contact 43.

When the movable contact 43 is moved in a direction toward the fixed contact 22, which is the upper side in the illustrated exemplary embodiment, the lower end is in contact with the movable contact 43. Accordingly, the outside and the inside of the DC relay 1 may be energized.

The lower end of the fixed contact 22 is positioned inside the arc chamber 21.

When the control power is cut off, the movable contact 43 is spaced apart from the fixed contact 22 by the elastic force of a return spring 36.

In this case, as the fixed contact 22 and the movable contact 43 are spaced apart, an arc is generated between the fixed contact 22 and the movable contact 43. The generated arc may be extinguished by the extinguishing gas inside the arc chamber 21, and discharged to the outside along the path formed by the arc path generation units 100, 200, 300, 400, 500, 600, 700, 800, 900.

The sealing member 23 blocks any communication between the arc chamber 21 and the space inside the upper frame 11. The sealing member 23 seals the lower side of the arc chamber 21 together with the insulating plate 13 and the support plate 14.

Specifically, the upper side of the sealing member 23 is coupled to the lower side of the arc chamber 21. In addition, the radially inner side of the sealing member 23 is coupled to the outer periphery of the insulating plate 13, and the lower side of the sealing member 23 is coupled to the support plate 14.

Accordingly, the arc generated in the arc chamber 21 and the arc extinguished by the extinguishing gas do not arbitrarily flow into the inner space of the upper frame 11.

In addition, the sealing member 23 may be configured to block any communication between the inner space of the cylinder 37 and the inner space of the frame part 10.

(3) Description of the Core Part 30

The core part 30 moves the movable contact part 40 upward according to the application of control power. In addition, when the application of control power is released, the core part 30 moves the movable contact part 40 downward again.

The core part 30 may be connected to an external control power supply (not illustrated) so as to be energized, and may receive a control power supply.

The core part 30 is positioned on the lower side of the opening/closing part 20. In addition, the core part 30 is accommodated inside the lower frame 12. The core part 30 and the opening/closing part 20 may be electrically and physically spaced apart from each other by the insulating plate 13 and the support plate 14.

A movable contact part 40 is positioned between the core part 30 and the opening/closing part 20. The movable contact part 40 may be moved by the driving force applied by the core part 30. Accordingly, the movable contact 43 and the fixed contact 22 may be in contact such that the DC relay 1 may be energized.

The core part 30 includes a fixed core 31, a movable core 32, a yoke 33, a bobbin 34, a coil 35, a return spring 36 and a cylinder 37.

The fixed core 31 is magnetized by the magnetic field generated by the coil 35 to generate electromagnetic attraction. By the electromagnetic attraction, the movable core 32 is moved toward the fixed core 31 (an upward direction in FIG. 3).

The fixed core 31 does not move. That is, the fixed core 31 is fixedly coupled to the support plate 14 and the cylinder 37.

The fixed core 31 may be provided in any shape capable of generating electromagnetic force by being magnetized by a magnetic field. In an exemplary embodiment, the fixed core 31 may be provided with a permanent magnet or an electromagnet.

The fixed core 31 is partially accommodated in the upper space inside the cylinder 37. In addition, the outer periphery of the fixed core 31 is in contact with the inner periphery of the cylinder 37.

The fixed core 31 is positioned between the support plate 14 and the movable core 32.

A through-hole (not illustrated) is formed in the center of the fixed core 31. The shaft 44 is coupled through the through-hole (not illustrated) so as to be movable up and down.

The fixed core 31 is positioned to be spaced apart from the movable core 32 by a predetermined distance. Accordingly, the distance at which the movable core 32 can be moved toward the fixed core 31 may be limited to the predetermined distance. Accordingly, the predetermined distance may be defined as "a moving distance of the movable core 32."

One end of the return spring 36, which is the upper end in the illustrated exemplary embodiment, is in contact with the lower side of the fixed core 31. When the fixed core 31 is magnetized and the movable core 32 is moved upward, the return spring 36 is compressed and a restoring force is stored.

Accordingly, when the application of the control power is released and the magnetization of the fixed core 31 is terminated, the movable core 32 may be returned to the lower side by the restoring force.

The movable core 32 is moved toward the fixed core 31 by electromagnetic attraction generated by the fixed core 31 when control power is applied.

As the movable core 32 moves, the shaft 44 coupled to the movable core 32 is moved upward in the direction toward the fixed core 31, which is the upper side in the illustrated exemplary embodiment. In addition, as the shaft 44 is moved, the movable contact part 40 coupled to the shaft 44 is moved upward.

Accordingly, the fixed contact 22 and the movable contact 43 are brought into contact such that the DC relay 1 may be energized with an external power source or load.

The movable core 32 may be provided in any shape capable of receiving attractive force by electromagnetic force. In an exemplary embodiment, the movable core 32 may be formed of a magnetic material, or may be provided with a permanent magnet or an electromagnet.

The movable core 32 is accommodated in the cylinder 37. In addition, the movable core 32 may be moved in the longitudinal direction of the cylinder 37 inside the cylinder 37, which is the vertical direction in the illustrated exemplary embodiment.

Specifically, the movable core 32 may be moved in a direction toward the fixed core 31 and in a direction away from the fixed core 31.

The movable core 32 is coupled to the shaft 44. The movable core 32 may move integrally with the shaft 44. When the movable core 32 is moved upward or downward, the shaft 44 is also moved upward or downward. Accordingly, the movable contact 43 is also moved upward or downward.

The movable core 32 is located on the lower side of the fixed core 31. The movable core 32 is spaced apart from the fixed core 31 by a predetermined distance. As described above, the predetermined distance is a distance at which the movable core 32 can be moved in the vertical direction.

The movable core 32 is formed to extend in the longitudinal direction. A hollow part extending in the longitudinal direction is recessed by a predetermined distance inside the movable core 32. A return spring 36 and a lower side of the shaft 44 through-coupled to the return spring 36 are partially accommodated in the hollow part.

A through-hole is formed through the lower side of the hollow part in the longitudinal direction. The hollow part and the through-hole communicate with each other. The lower end of the shaft 44 inserted into the hollow part may proceed toward the through-hole.

A space part is recessed by a predetermined distance at the lower end of the movable core 32. The space part communicates with the through-hole. The lower head of the shaft 44 is positioned in the space.

The yoke 33 forms a magnetic circuit as control power is applied. The magnetic path formed by the yoke 33 may be configured to adjust the direction of the magnetic field formed by the coil 35.

Accordingly, when control power is applied, the coil 35 may generate a magnetic field in a direction in which the movable core 32 moves toward the fixed core 31. The yoke 33 may be formed of a conductive material capable of conducting electricity.

The yoke 33 is accommodated in the lower frame 12. The yoke 33 surrounds the coil 35. The coil 35 may be accommodated in the yoke 33 so as to be spaced apart from the inner circumferential surface of the yoke 33 by a predetermined distance.

The bobbin 34 is accommodated inside the yoke 33. That is, from the outer periphery of the lower frame 12 to the radially inward direction, the yoke 33, the coil 35 and the bobbin 34 on which the coil 35 is wound are sequentially arranged.

The upper side of the yoke 33 is in contact with the support plate 14. In addition, the outer periphery of the yoke 33 may be positioned to be in contact with the inner periphery of the lower frame 12 or to be spaced apart from the inner periphery of the lower frame 12 by a predetermined distance.

A coil 35 is wound around the bobbin 34. The bobbin 34 is accommodated inside the yoke 33.

The bobbin 34 may include flat upper and lower portions, and a cylindrical column extending in the longitudinal direction to connect the upper and lower portions. That is, the bobbin 34 has a bobbin shape.

The upper portion of the bobbin 34 is in contact with the lower side of the support plate 14. A coil 35 is wound around the column part of the bobbin 34. The thickness around which the coil 35 is wound may be equal to or smaller than the diameters of the upper and lower portions of the bobbin 34.

A hollow part extending in the longitudinal direction is formed through the column part of the bobbin 34. A cylinder 37 may be accommodated in the hollow part. The column part of the bobbin 34 may be disposed to have the same central axis as the fixed core 31, the movable core 32 and the shaft 44.

The coil 35 generates a magnetic field by the applied control power. The fixed core 31 is magnetized by the magnetic field generated by the coil 35, and electromagnetic attraction may be applied to the movable core 32.

The coil 35 is wound around a bobbin 34. Specifically, the coil 35 is wound on the column part of the bobbin 34, and is stacked radially outward of the column part. The coil 35 is accommodated inside the yoke 33.

When the control power is applied, the coil 35 generates a magnetic field. In this case, the strength or direction of the magnetic field generated by the coil 35 may be controlled by the yoke 33. The fixed core 31 is magnetized by the magnetic field generated by the coil 35.

When the fixed core 31 is magnetized, the movable core 32 receives an electromagnetic force in a direction toward the fixed core 31, that is, an attractive force. Accordingly, the movable core 32 is moved in a direction toward the fixed core 31, which is upward in the illustrated exemplary embodiment.

The return spring 36 provides a restoring force for the movable core 32 to return to its original position when the application of the control power is released after the movable core 32 is moved toward the fixed core 31.

The return spring 36 is compressed as the movable core 32 is moved toward the fixed core 31 and stores a restoring force. In this case, it is preferable that the stored restoring force is smaller than the electromagnetic attraction force exerted on the movable core 32 by magnetizing the fixed core 31. This is to prevent the movable core 32 from being arbitrarily returned to its original position by the return spring 36 while the control power is applied.

When the application of the control power is released, the movable core 32 receives a restoring force by the return spring 36. Certainly, gravity due to the empty weight of the movable core 32 may also act on the movable core 32. Accordingly, the movable core 32 may be moved in a direction away from the fixed core 31 to return to the original position.

The return spring 36 may be provided in any shape that is deformed in shape to store the restoring force, returns to its original shape, and transmits the restoring force to the outside. In an exemplary embodiment, the return spring 36 may be provided as a coil spring.

A shaft 44 is through-coupled to the return spring 36. The shaft 44 may be moved in the vertical direction regardless of the shape deformation of the return spring 36 in a state where the return spring 36 is coupled.

The return spring 36 is accommodated in a hollow part which is formed to be recessed on the upper side of the movable core 32. In addition, one end of the return spring 36 facing the fixed core 31, which is the upper end in the illustrated exemplary embodiment, is accommodated in the hollow part which is formed to be recessed in the lower side of the fixed core 31.

The cylinder 37 accommodates the fixed core 31, the movable core 32, the return spring 36 and the shaft 44. The movable core 32 and the shaft 44 may move upward and downward in the cylinder 37.

The cylinder 37 is positioned in a hollow part formed in the column part of the bobbin 34. The upper end of the cylinder 37 is in contact with the lower surface of the support plate 14.

The side surface of the cylinder 37 is in contact with the inner peripheral surface of the column part of the bobbin 34. The upper opening of the cylinder 37 may be sealed by the fixed core 31. The lower surface of the cylinder 37 may be in contact with the inner surface of the lower frame 12.

(4) Description of the Movable Contact Part 40

The movable contact part 40 includes a movable contact 43 and a structure for moving the movable contact 43. By the movable contact part 40, the DC relay 1 may be energized with an external power source or load.

The movable contact part 40 is accommodated in the inner space of the upper frame 11. In addition, the movable contact part 40 is accommodated in the arc chamber 21 to be movable up and down.

A fixed contact 22 is positioned on the upper side of the movable contact part 40. The movable contact part 40 is accommodated in the arc chamber 21 so as to be movable in a direction toward the fixed contact 22 and a direction away from the fixed contact 22.

The core part 30 is positioned on the lower side of the movable contact part 40. The movement of the movable contact part 40 may be achieved by movement of the movable core 32.

The movable contact part 40 includes a housing 41, a cover 42, a movable contact 43, a shaft 44 and an elastic part 45.

The housing 41 accommodates the movable contact 43 and the elastic part 45 for elastically supporting the movable contact 43.

In the illustrated exemplary embodiment, the housing 41 has one side and the other side opposite thereto open. The movable contact 43 may be inserted through the open portion.

The unopened side surface of the housing 41 may be configured to surround the accommodated movable contact 43.

A cover 42 is provided on the upper side of the housing 41. The cover 42 covers the upper surface of the movable contact 43 accommodated in the housing 41.

The housing 41 and the cover 42 are preferably formed of an insulating material to prevent unintentional energization. In an exemplary embodiment, the housing 41 and the cover 42 may be formed of synthetic resin or the like.

The lower side of the housing 41 is connected to the shaft 44. When the movable core 32 connected to the shaft 44 is moved upward or downward, the housing 41 and the movable contact 43 accommodated therein may also be moved upward or downward.

The housing 41 and the cover 42 may be coupled by any member. In an exemplary embodiment, the housing 41 and the cover 42 may be coupled by a fastening member (not illustrated) such as a bolt or a nut.

The movable contact 43 is in contact with the fixed contact 22 according to the application of the control power such that the DC relay 1 is energized with an external power source and a load. In addition, the movable contact 43 is spaced apart from the fixed contact 22 when the application of the control power is released such that the DC relay 1 does not conduct electricity with an external power source and a load.

The movable contact 43 is positioned adjacent to the fixed contact 22.

The upper side of the movable contact 43 is partially covered by the cover 42. In an exemplary embodiment, a portion of the upper surface of the movable contact 43 may be in contact with the lower surface of the cover 42.

The lower side of the movable contact 43 is elastically supported by the elastic part 45. In order to prevent the movable contact 43 from being arbitrarily moved downward, the elastic part 45 may elastically support the movable contact 43 in a compressed state by a predetermined distance.

The movable contact 43 is formed to extend in the longitudinal direction, which is the left-right direction in the illustrated exemplary embodiment. That is, the length of the movable contact 43 is formed to be longer than the width. Accordingly, both ends in the longitudinal direction of the movable contact 43 accommodated in the housing 41 are exposed to the outside of the housing 41.

Contact protrusions formed to protrude upward by a predetermined distance may be formed at both ends. A fixed contact 22 is in contact with the contact protrusion.

The contact protrusion may be formed at a position corresponding to each of the fixed contacts 22*a*, 22*b*. Accordingly, the moving distance of the movable contact 43 may be reduced, and the contact reliability between the fixed contact 22 and the movable contact 43 may be improved.

The width of the movable contact 43 may be the same as a distance at which each side surface of the housing 41 is spaced apart from each other. That is, when the movable contact 43 is accommodated in the housing 41, both side surfaces of the movable contact 43 in the width direction may contact the inner surface of each side surface of the housing 41.

Accordingly, a state in which the movable contact 43 is accommodated in the housing 41 may be stably maintained.

The shaft 44 transmits a driving force generated when the core part 30 is operated to the movable contact part 40. Specifically, the shaft 44 is connected to the movable core 32 and the movable contact 43. When the movable core 32 is moved upward or downward, the movable contact 43 may also be moved upward or downward by the shaft 44.

The shaft 44 is formed to extend in the longitudinal direction, which is the vertical direction in the illustrated exemplary embodiment.

The lower end of the shaft 44 is insertedly coupled to the movable core 32. When the movable core 32 is moved in the vertical direction, the shaft 44 may be moved in the vertical direction together with the movable core 32.

The body part of the shaft 44 is vertically movably coupled through the fixed core 31. A return spring 36 is coupled through the body part of the shaft 44.

The upper end of the shaft 44 is coupled to the housing 41. When the movable core 32 is moved, the shaft 44 and the housing 41 may be moved together.

The upper and lower ends of the shaft 44 may be formed to have a larger diameter than the body part of the shaft. Accordingly, the shaft 44 may be stably maintained in a coupled state with the housing 41 and the movable core 32.

The elastic part 45 elastically supports the movable contact 43. When the movable contact 43 comes into contact with the fixed contact 22, the movable contact 43 tends to be separated from the fixed contact 22 by electromagnetic repulsive force.

In this case, the elastic part 45 elastically supports the movable contact 43, and prevents the movable contact 43 from being arbitrarily separated from the fixed contact 22.

The elastic part 45 may be provided in any shape capable of storing a restoring force by deformation of a shape and providing the stored restoring force to another member. In an exemplary embodiment, the elastic part 45 may be provided as a coil spring.

One end of the elastic part 45 facing the movable contact 43 is in contact with the lower side of the movable contact 43. In addition, the other end opposite to the one end is in contact with the upper side of the housing 41.

The elastic part 45 may be compressed by a predetermined distance to elastically support the movable contact 43 in a state where the restoring force is stored. Accordingly, even if an electromagnetic repulsive force is generated between the movable contact 43 and the fixed contact 22, the movable contact 43 is not arbitrarily moved.

For stable coupling of the elastic part 45, a protrusion (not illustrated) inserted into the elastic part 45 may be protruded under the movable contact 43. Similarly, a protrusion (not illustrated) inserted into the elastic part 45 may protrude from the upper side of the housing 41.

3. Description of the Arc Path Generation Unit According to the First Example of the Present Disclosure Referring to FIGS. 4 to 26, the arc path generation units 100, 200, 300, 400, 500, 600, 700 according to various exemplary embodiments of the present disclosure are illustrated. Each of the arc path generation units 100, 200, 300, 400, 500, 600, 700 forms a magnetic field inside the arc chamber 21. An electromagnetic force is formed inside the arc chamber 21 by the current flowing through the DC relay 1 and the formed magnetic field.

The arc generated as the fixed contact 22 and the movable contact 43 are spaced apart is moved to the outside of the arc chamber 21 by the formed electromagnetic force. Specifically, the generated arc is moved along the above direction of the formed electromagnetic force. Accordingly, it may be said that the arc path generation units 100, 200, 300, 400, 500, 600, 700 form the arc path (A.P), which is a path through which the generated arc flows.

The arc path generation units 100, 200, 300, 400, 500, 600, 700 are positioned in a space formed inside the upper frame 11. The arc path generation units 100, 200, 300, 400, 500, 600, 700 are disposed to surround the arc chamber 21. In other words, the arc chamber 21 is located inside the arc path generation units 100, 200, 300, 400, 500, 600, 700.

A fixed contact 22 and a movable contact 43 are positioned inside the arc path generation units 100, 200, 300, 400, 500, 600, 700. The arc generated by the fixed contact 22 and the movable contact 43 being spaced apart may be induced by an electromagnetic force formed by the arc path generation units 100, 200, 300, 400, 500, 600, 700.

The arc path generation units 100, 200, 300, 400, 500, 600, 700 according to various exemplary embodiments of the present disclosure includes a Halbach array or a magnet part. The Halbach array or the magnet part forms a magnetic field inside the arc path generation units 100, 200, 300, 400, 500, 600, 700, in which the fixed contact 22 and the movable contact 43 are accommodated. In this case, the Halbach array or the magnet part may form a magnetic field by itself and between each other.

The magnetic field formed by the Halbach array and the magnet part forms an electromagnetic force together with the current passed through the fixed contact 22 and the movable contact 43. The formed electromagnetic force induces an arc generated when the fixed contact 22 and the movable contact 43 are spaced apart.

In this case, the arc path generation units 100, 200, 300, 400, 500, 600, 700 form an electromagnetic force in a direction away from the center (C) of the space parts 115, 215, 315, 415, 515, 615, 715. Accordingly, the arc path (A.P) is also formed in a direction away from the center (C) of the space.

As a result, each component provided in the DC relay 1 is not damaged by the generated arc. Furthermore, the generated arc may be rapidly discharged to the outside of the arc chamber 21.

Hereinafter, with reference to the accompanying drawings, the configuration of each of the arc path generation units 100, 200, 300, 400, 500, 600, 700 and the path (A.P) of arc formed by each of the arc path generation units 100, 200, 300, 400, 500, 600, 700 will be described in detail.

The arc path generation units 100, 200, 300, 400, 500, 600, 700 according to various exemplary embodiments to be described below may have a Halbach array located on one or more sides of the front side and the rear side.

In addition, the arc path generation units 100, 200, 300, 400, 500, 600, 700 may include a magnet part having a polarity in a longitudinal direction, which is positioned on at least one side of the left and right sides.

As will be described below, the rear side may be defined as a direction which is adjacent to first surfaces 111, 211, 311, 411, 511, 611, 711, and the front side may be defined as a direction which is adjacent to second surfaces 112, 212, 312, 412, 512, 612, 712.

In addition, the left side may be defined as a direction which is adjacent to third surfaces 113, 213, 313, 413, 513, 613, 713, and the right side may be defined as a direction which is adjacent to fourth surfaces 114, 214, 314, 414, 514, 614, 714.

(1) Description of the Arc Path Generation Unit 100 According to an Exemplary Embodiment of the Present Disclosure Hereinafter, the arc path generation unit 100 according to an exemplary embodiment of the present disclosure will be described in detail with reference to FIGS. 5 and 6.

Figure 5:
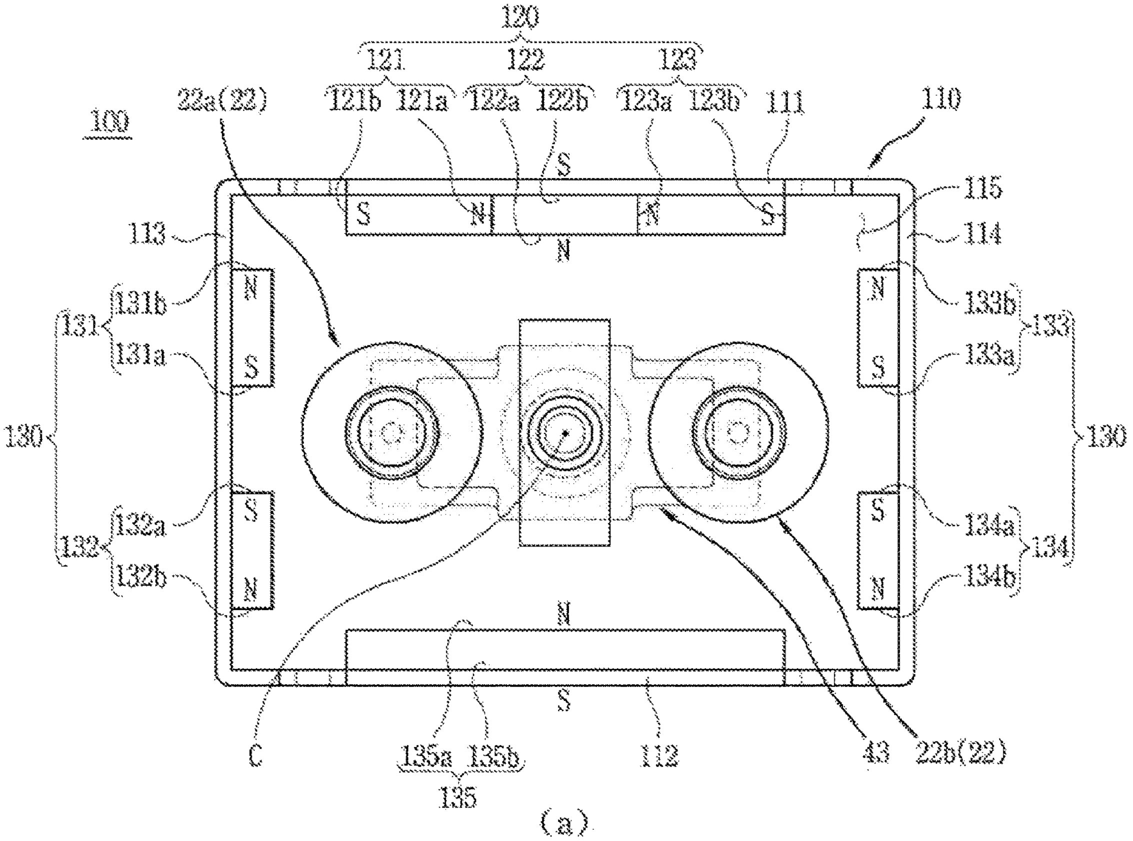
FIG. 5 is a conceptual diagram illustrating the arc path generation unit according to an exemplary embodiment of the present disclosure.
Figure 5:
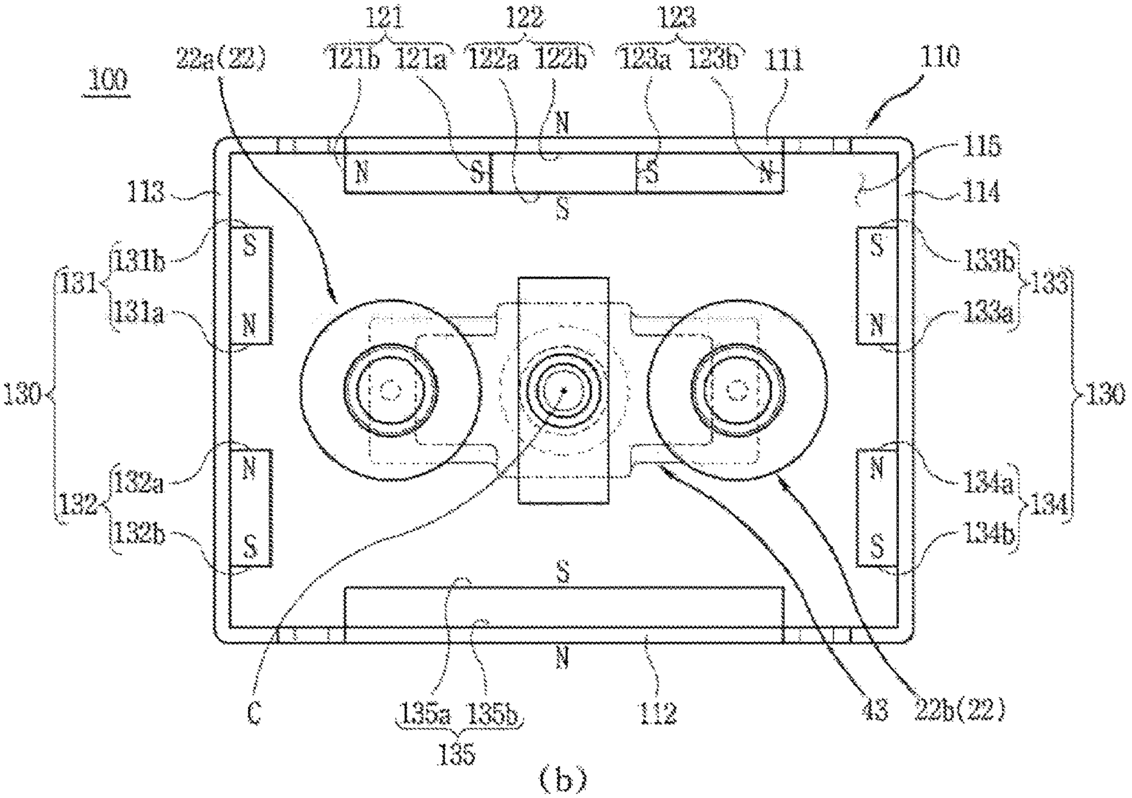

Referring to FIG. 5, the arc path generation unit 100 according to the illustrated exemplary embodiment includes a magnetic frame 110, a Halbach array 120 and a magnet part 130.

The magnetic frame 110 forms a skeleton of the arc path generation unit 100. A Halbach array 120 and a magnet part 130 are disposed on the magnetic frame 110. In an exemplary embodiment, the Halbach array 120 and the magnet part 130 may be coupled to the magnetic frame 110.

The magnetic frame 110 has a rectangular cross-section extending in the longitudinal direction, which is the left-right direction in the illustrated exemplary embodiment. The shape of the magnetic frame 110 may be changed according to the shapes of the upper frame 11 and the arc chamber 21.

The magnetic frame 110 includes a first surface 111, a second surface 112, a third surface 113, a fourth surface 114 and a space part 115.

The first surface 111, the second surface 112, the third surface 113 and the fourth surface 114 form an outer peripheral surface of the magnetic frame 110. That is, the first surface 111, the second surface 112, the third surface 113 and the fourth surface 114 function as a wall of the magnetic frame 110.

Outside of the first surface 111, the second surface 112, the third surface 113 and the fourth surface 114 may be in contact with or fixedly coupled to the inner surface of the upper frame 11. In addition, the Halbach array 120 and the magnet part 130 may be positioned inside the first surface 111, the second surface 112, the third surface 113 and the fourth surface 114.

In the illustrated exemplary embodiment, the first surface 111 forms the rear side. The second surface 112 forms a front side surface and faces the first surface 111. In addition, the third surface 113 forms the left surface. The fourth surface 114 forms the right side surface and faces the third surface 113.

That is, the first surface 111 and the second surface 112 face each other with the space part 115 interposed therebetween. In addition, the third surface 113 and the fourth surface 114 face each other with the space part 115 interposed therebetween.

The first surface 111 is continuous with the third surface 113 and the fourth surface 114. The first surface 111 may be coupled to the third surface 113 and the fourth surface 114 at a predetermined angle. In an exemplary embodiment, the predetermined angle may be a right angle.

The second surface 112 is continuous with the third surface 113 and the fourth surface 114. The second surface 112 may be coupled to the third surface 113 and the fourth surface 114 at a predetermined angle. In an exemplary embodiment, the predetermined angle may be a right angle.

Each edge at which the first surface 111 to the fourth surface 114 are connected to each other may be tapered.

In an exemplary embodiment, the Halbach array 120 and the magnet part 130 may be coupled to each surface 111, 112, 113, 114. A fastening member (not illustrated) may be provided for coupling each surface 111, 112, 113, 114 to the magnet part 130.

Although not illustrated, an arc discharge hole (not illustrated) may be formed through at least one of the first surface 111, the second surface 112, the third surface 113 and the fourth surface 114. The arc discharge hole (not illustrated) may function as a passage through which the arc generated in the space part 115 is discharged.

The space surrounded by the first surface 111 to the fourth surface 114 may be defined as the space part 115.

The fixed contact 22 and the movable contact 43 are accommodated in the space part 115. In addition, the arc chamber 21 is accommodated in the space part 115.

In the space part 115, the movable contact 43 may be moved in a direction toward the fixed contact 22 (i.e., a downward direction) or a direction away from the fixed contact 22 (i.e., an upward direction).

In addition, a path (A.P) of the arc generated in the arc chamber 21 is formed in the space part 115. This is achieved by the magnetic field formed by the Halbach array 120 and the magnet part 130.

A central portion of the space part 115 may be defined as a center (C). A straight-line distance from each corner where the first to fourth surfaces 111, 112, 113, 114 are connected to each other to the center (C) may be formed to be the same.

The center (C) is positioned between the first fixed contact 22*a* and the second fixed contact 22*b*. In addition, the central portion of the movable contact portion 40 is positioned vertically below the center (C). That is, the central portions of the housing 41, the cover 42, the movable contact 43, the shaft 44 and the elastic part 45 are positioned vertically below the center (C).

Accordingly, when the generated arc is moved toward the center (C), the above components may be damaged. In order to prevent this, the arc path generation unit 100 according to the present exemplary embodiment includes the Halbach array 120 and the magnet part 130.

In the illustrated exemplary embodiment, a plurality of magnetic materials constituting the Halbach array 120 are sequentially arranged side by side from left to right. That is, the Halbach array 120 is formed to extend in the left-right direction.

The Halbach array 120 may form a magnetic field together with other magnetic materials. In the illustrated exemplary embodiment, the Halbach array 120 may form a magnetic field together with the first to fifth magnet parts 131, 132, 133, 134, 135 of the magnet part 130.

The Halbach array 120 may be positioned adjacent to any one of the first and second surfaces 111 and 112. In an exemplary embodiment, the Halbach array 120 may be coupled to the inner side (i.e., a direction toward the space part 115) of any one of the surfaces.

In the illustrated exemplary embodiment, the Halbach array 120 is disposed on the inner side of the first surface 111 and adjacent to the first surface 111. Although not illustrated, the Halbach array 120 may be disposed on the inside the second surface 112 and adjacent to the second surface 112.

The Halbach array 120 is disposed to face any one of the magnet parts 130. In the illustrated exemplary embodiment, the Halbach array 120 is disposed to face the fifth magnet part 135 located on the inner side of the second surface 112.

Between the Halbach array 120 and the fifth magnet part 135, the space part 115 and the fixed contact 22 and the movable contact 43 accommodated in the space part 115 are positioned.

The Halbach array 120 may enhance the strength of the magnetic field formed by itself and the magnetic field formed with the magnet part 130. Since the direction of the magnetic field formed by the Halbach array 120 and the process of strengthening the magnetic field are well-known techniques, the detailed description thereof will be omitted.

In the illustrated exemplary embodiment, the Halbach array 120 includes a first block 121, a second block 122 and a third block 123. It will be understood that the plurality of magnetic materials constituting the Halbach array 120 are named as blocks 121, 122, 123, respectively.

The first to third blocks 121, 122, 123 may be formed of a magnetic material. In an exemplary embodiment, the first to third blocks 121, 122, 123 may be provided as permanent magnets or electromagnets.

The first to third blocks 121, 122, 123 may be arranged side by side in one direction. In the illustrated exemplary embodiment, the first to third blocks 121, 122, 123 are arranged side by side in the extending direction of the first surface 111, that is, in the left-right direction.

Among the first to third blocks 121, 122, 123, the first block 121 is disposed on the leftmost side, and the third block 123 is disposed on the rightmost side. In addition, the second block 122 is positioned between the first block 121 and the third block 123.

In an exemplary embodiment, the second block 122 may contact the first and third blocks 121 and 123, respectively.

The first and third blocks 121 and 123 may be disposed to overlap each of the fixing contacts 22*a*, 22*b* in a direction toward the space part 115, which is the front-rear direction in the illustrated exemplary embodiment.

Each block 121, 122, 123 includes a plurality of surfaces.

Specifically, the first block 121 includes a first inner surface 121*a* facing the second block 122 and a first outer surface 121*b* opposite to the second block 122.

The second block 122 includes a second inner surface 122*a* facing the space part 115 or the fifth magnet part 135 and a second outer surface 122*b* opposite to the space part 115 or the fifth magnet part 135.

In addition, the third block 123 includes a third inner surface 123*a* facing the second block 122 and a third outer surface 123*b* opposite to the third block 123.

The plurality of surfaces of each block 121, 122, 123 may be magnetized according to a predetermined rule to constitute a Halbach array.

Specifically, the first to third inner surfaces 121*a*, 122*a*, 123*a* are magnetized with the same polarity. In this case, the first to third inner surfaces 121*a*, 122*a*, 123*a* may be magnetized with the same polarities as the first to fourth opposite surfaces 131*b*, 132*b*, 133*b*, 134*b* and the fifth opposite surface 135*a* of the magnet part 130.

In addition, the first to third outer surfaces 121*b*, 122*b*, 123*b* are magnetized to have a polarity different from the polarity. In this case, the first to third outer surfaces 121*b*, 122*b*, 123*b* may be magnetized with the same polarities as the first to fourth opposing surfaces 131*a*, 132*a*, 133*a*, 134*a* and the fifth opposite surface 135*b* of the magnet part 130.

The magnet part 130 forms a magnetic field on its own or with the Halbach array 120. The path (A.P) of arc may be formed inside the arc chamber 21 by the magnetic field formed by the magnet part 130.

The magnet part 130 may be provided in any shape capable of forming a magnetic field by being magnetized. In an exemplary embodiment, the magnet part 130 may be provided with a permanent magnet or an electromagnet.

A plurality of magnet parts 130 may be provided. In the illustrated exemplary embodiment, the magnet part 130 includes first to fifth magnet parts 131, 132, 133, 134, 135.

The plurality of magnet parts 130 may be positioned adjacent to the remaining surface of the first to fourth surfaces 111, 112, 113, 114. In an exemplary embodiment, each of the plurality of magnet parts 130 may be coupled to the inner side of the other surface of the first to fourth surfaces 111, 112, 113, 114 (i.e., a direction toward the space part 115).

In the illustrated exemplary embodiment, the first and second magnet parts 131, 132 are positioned adjacent to the third surface 113. The third and fourth magnet parts 133 and 134 are positioned adjacent to the fourth surface 114. In addition, the fifth magnet part 135 is positioned adjacent to the second surface 112.

The first to fourth magnet parts 131, 132, 133, 134 are formed to extend in one direction. In the illustrated exemplary embodiment, the first to fourth magnet parts 131, 132, 133, 134 are formed to extend in the front-rear direction.

The fifth magnet part 135 is formed to extend in a different direction. In the illustrated exemplary embodiment, the fifth magnet part 135 is formed to extend in the left-right direction.

The first and second magnet parts 131, 132 may be arranged to face each other in parallel along the extension direction (i.e., the front-rear direction in the illustrated exemplary embodiment). The first and second magnet parts 131, 132 are positioned adjacent to each other. In an exemplary embodiment, the first and second magnet parts 131, 132 may be in contact with each other.

The third and fourth magnet parts 133, 134 may be arranged side by side to face each other along the extension direction (i.e., the front-rear direction in the illustrated exemplary embodiment). The third and fourth magnet parts 133, 134 are positioned adjacent to each other. In an exemplary embodiment, the third and fourth magnet parts 133, 134 may be in contact with each other.

Each of the magnet parts 131, 132, 133, 134, 135 includes a plurality of surfaces.

Specifically, the first magnet part 131 includes a first opposite surface 131*a* facing the second magnet part 132 and a first opposite surface 131*b* opposite to the second magnet part 132.

The second magnet part 132 includes a second opposite surface 132*a* facing the first magnet part 131 and a second opposite surface 132*b* opposite to the first magnet part 131.

The third magnet part 133 includes a third opposing surface 133*a* facing the fourth magnet part 134 and a third opposite surface 133*b* facing the fourth magnet part 134.

The fourth magnet part 134 includes a fourth opposing surface 134*a* facing the third magnet part 133 and a fourth opposite surface 134*b* facing the third magnet part 133.

In addition, the fifth magnet part 135 includes a fifth opposing surface 135*a* facing the space part 115 or Halbach array 120 and a fifth opposite surface 135*b* facing the space part 115 or Halbach array 120.

Each surface of the first to fifth magnet parts 131, 132, 133, 134, 135 may be magnetized according to a predetermined rule.

Specifically, the first to fourth opposing surfaces 131*a*, 132*a*, 133*a*, 134*a* are magnetized with the same polarity as the first to third outer surfaces 121*b*, 122*b*, 123*b* of the Halbach array 120 and the fifth opposite surface 135*b*.

Similarly, the first to fourth opposite surfaces 131*b*, 132*b*, 133*b*, 134*b* are magnetized with the same polarity as the first to third inner surfaces 121*a*, 122*a*, 123*a* of the Halbach array 120 and the fifth opposing surface 135*a*.

Hereinafter, the arc path (A.P) formed by the arc path generation unit 100 according to the present exemplary embodiment will be described in detail with reference to FIG. 6.

Figure 6:
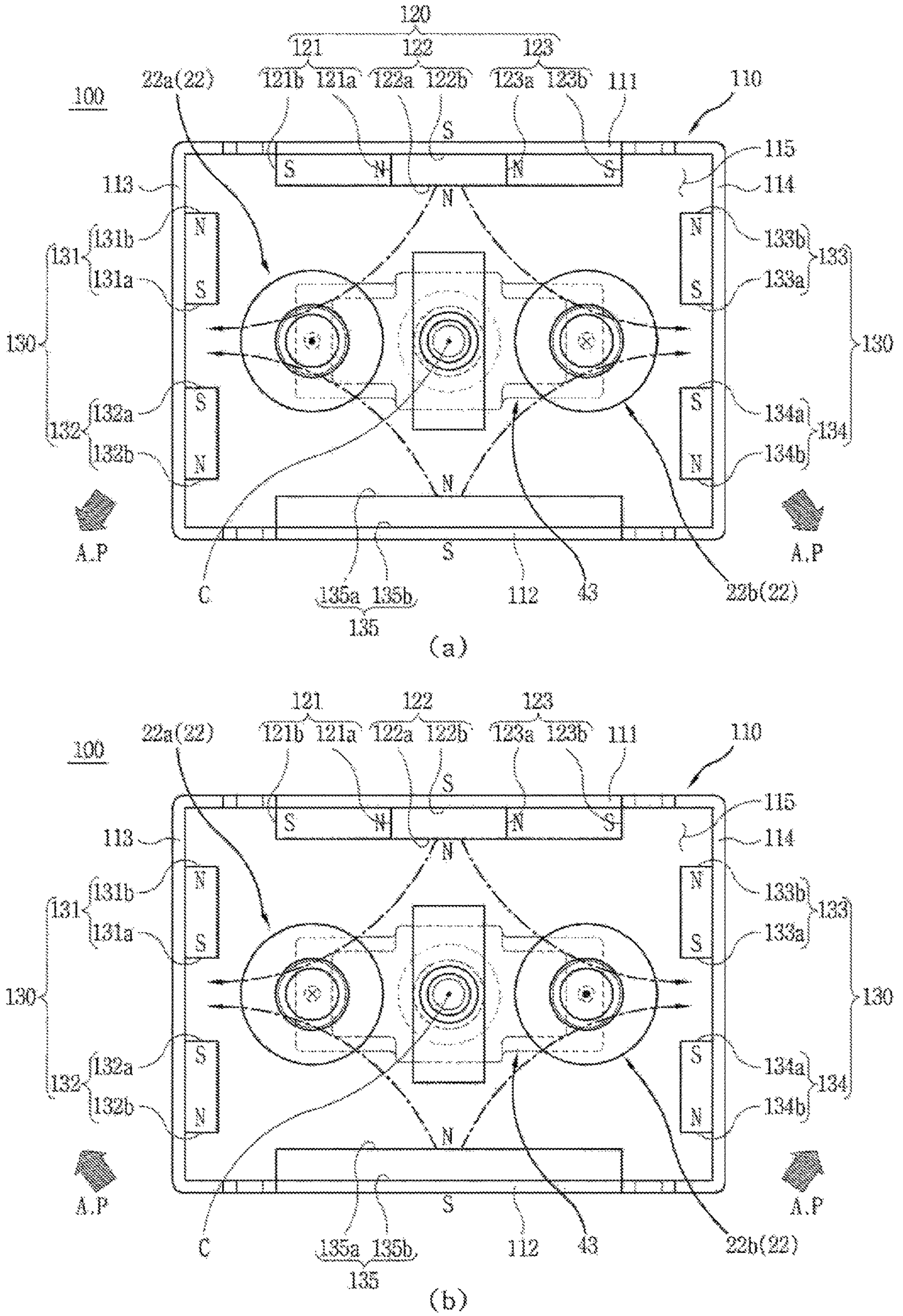
FIG. 6 is a conceptual diagram illustrating the paths of a magnetic field and an arc formed by the arc path generation unit according to the exemplary embodiment of FIG. 5.

Referring to FIG. 6, the first to third inner surfaces 121*a*, 122*a*, 123*a* of the Halbach array 120 and the fifth opposing surface 135*a* of the fifth magnet part 135 are magnetized to the N pole. In addition, according to the predetermined rule, each of the opposing surfaces 131*a*, 132*a*, 133*a*, 134*a* is magnetized to the S pole which is a different polarity.

Accordingly, a magnetic field is formed between the Halbach array 120 and the fifth magnet part 135 in a direction to repel each other. In addition, between the Halbach array 120 and the first to fourth magnet parts 131, 132, 133, 134, a magnetic field is formed in a direction from the second inner surface 122*a* toward the first to fourth opposing surfaces 131*a*, 132*a*, 133*a*, 134*a*.

Furthermore, between the fifth magnet part 135 and the first to fourth magnet parts 131, 132, 133, 134, a magnetic field is formed in a direction from the fifth opposing surface 135*a* toward the first to fourth opposing surfaces 131*a*, 132*a*, 133*a*, 134*a*.

In the exemplary embodiment illustrated in (a) of FIG. 6, the direction of the current flows into the second fixed contact 22*b* and exits to the first fixed contact 22*a* through the movable contact 43.

When Fleming's Left-Hand Rule is applied to the first fixed contact 22*a*, the electromagnetic force generated in the vicinity of the first fixed contact 22*a* is formed toward the front left side. Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side. Accordingly, the arc path (A.P) in the vicinity of the second fixed contact 22*b* is also formed toward the front right side.

In the exemplary embodiment illustrated in (b) of FIG. 6, the direction of the current flows into the first fixed contact 22*a* and exits to the second fixed contact 22*b* through the movable contact 43.

When Fleming's Left-Hand Rule is applied to the first fixed contact 22*a*, the electromagnetic force generated in the vicinity of the first fixed contact 22*a* is formed toward the rear left side. Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side. Accordingly, the arc path (A.P) in the vicinity of the second fixed contact 22*b* is also formed toward the rear right side.

Although not illustrated, when the polarity of each surface of the Halbach array 120 and the magnet part 130 is changed, the directions of the magnetic fields formed in the Halbach array 120 and the magnet part 130 are reversed. Accordingly, the path (A.P) of the generated electromagnetic force and arc is also formed in the reverse direction.

That is, in the energized situation as shown in (a) of FIG. 6, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 6, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 120 and the magnet part 130 or the direction of the current flowing through the DC relay 1, the arc path generation unit 100 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 may be improved.

(2) Description of the Arc Path Generation Unit 200 According to Another Exemplary Embodiment of the Present Disclosure Hereinafter, the arc path generation unit 200 according to another exemplary embodiment of the present disclosure will be described with reference to FIGS. 7 and 8.

Figure 7:
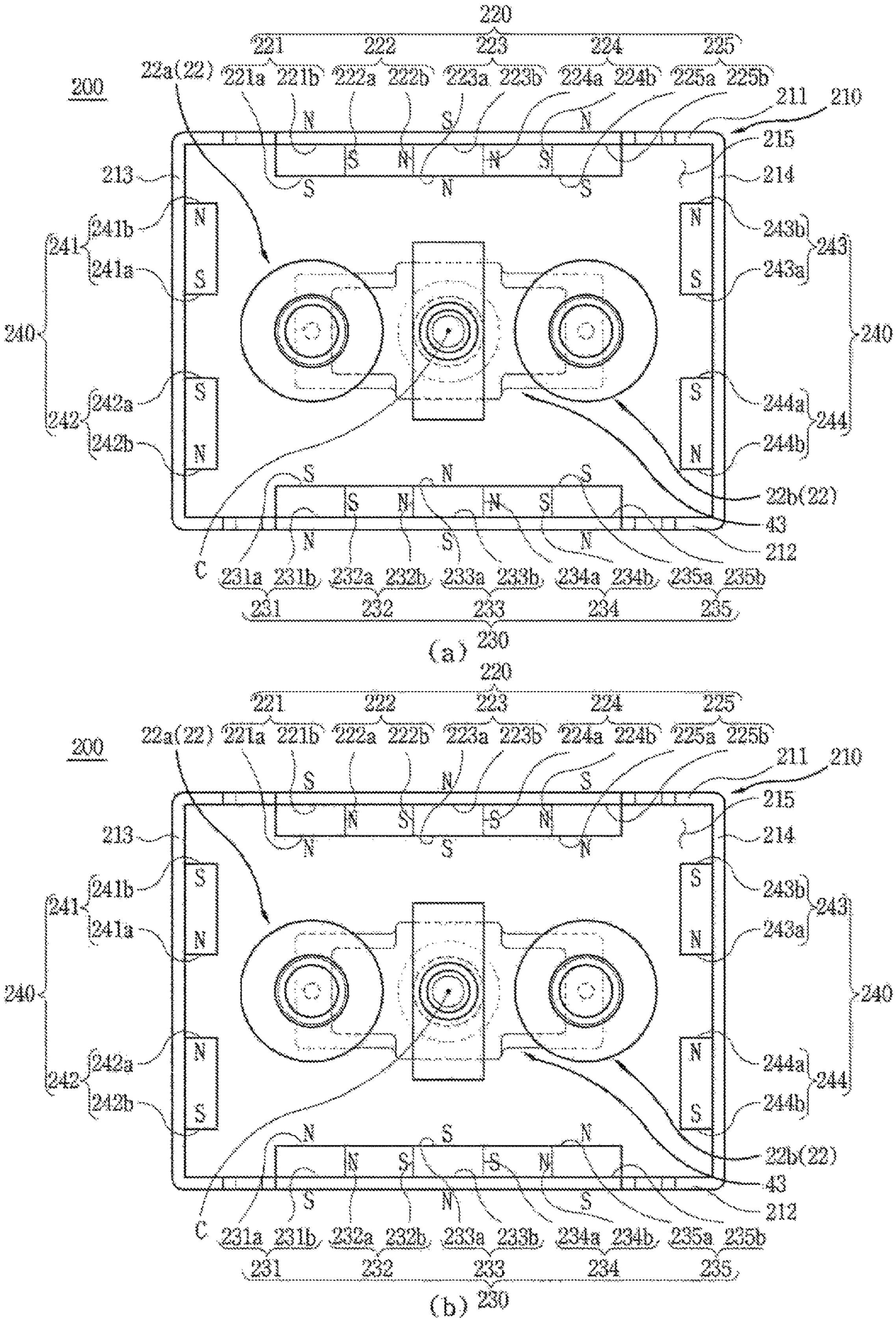
FIG. 7 is a conceptual diagram illustrating the arc path generation unit according to another exemplary embodiment of the present disclosure.

Referring to FIG. 7, the arc path generation unit 200 according to the illustrated exemplary embodiment includes a magnetic frame 210, a first Halbach array 220, a second Halbach array 230 and a magnet part 240.

The magnetic frame 210 according to the present exemplary embodiment has the same structure and function as the magnetic frame 110 according to the above-described exemplary embodiment. However, there is a difference in the arrangement method of the first Halbach array 220, the second Halbach array 230 and the magnet part 240 disposed on the magnetic frame 210 according to the present exemplary embodiment.

Accordingly, the description of the magnetic frame 210 will be replaced with the description of the magnetic frame 110 according to the above-described exemplary embodiment.

In the illustrated exemplary embodiment, a plurality of magnetic materials constituting the first Halbach array 220 are sequentially arranged side by side from left to right. That is, in the illustrated exemplary embodiment, the first Halbach array 220 is formed to extend in the left-right direction.

The first Halbach array 220 may form a magnetic field together with other magnetic materials. In the illustrated exemplary embodiment, the first Halbach array 220 may form a magnetic field together with the second Halbach array 230 and the magnet part 240.

The first Halbach array 220 may be positioned adjacent to any one of the first and second surfaces 211 and 212. In an exemplary embodiment, the first Halbach array 220 may be coupled to the inner side of the any one surface (i.e., a direction toward the space part 215).

In the illustrated exemplary embodiment, the first Halbach array 220 is disposed on the inner side of the first surface 211, adjacent to the first surface 211, so as to face the second Halbach array 230 which is disposed on the inner side of the second surface 212.

Between the first Halbach array 220 and the second Halbach array 230, the space part 215 and the fixed contact 22 and the movable contact 43 accommodated in the space part 215 are positioned.

The first Halbach array 220 may enhance the strength of the magnetic field formed by itself and the magnetic field formed with the second Halbach array 230 and the magnet part 240. Since the direction of the magnetic field formed by the first Halbach array 220 and the process of strengthening the magnetic field are well-known techniques, the detailed description thereof will be omitted.

In the illustrated exemplary embodiment, the first Halbach array 220 includes a first block 221, a second block 222, a third block 223, a fourth block 224 and a fifth block 225. It will be understood that the plurality of magnetic materials constituting the first Halbach array 220 are each named blocks 221, 222, 223, 224 225, respectively.

The first to fifth blocks 221, 222, 223, 224, 225 may be formed of a magnetic material. In an exemplary embodiment, the first to fifth blocks 221, 222, 223, 224, 225 may be provided as permanent magnets or electromagnets.

The first to fifth blocks 221, 222, 223, 224, 225 may be arranged side by side in one direction. In the illustrated exemplary embodiment, the first to fifth blocks 221, 222, 223, 224, 225 are arranged side by side in the extending direction of the first surface 211, that is, in the left-right direction.

The first to fifth blocks 221, 222, 223, 224, 225 are arranged side by side along the above direction. Specifically, in the first to fifth blocks 221, 222, 223, 224, 225, the first block 221 is disposed on the leftmost side and the fifth block 225 is disposed on the rightmost side. In addition, the second to fourth blocks 222, 223, 224 are sequentially disposed between the first and fifth blocks 221 and 225 in a direction from left to right.

In an exemplary embodiment, each of the blocks 221, 222, 223, 224, 225 disposed adjacent to each other may contact each other.

In this case, the first and fifth blocks 221, 225 may be disposed to overlap each of the fixed contacts 22*a*, 22*b* in a direction toward the space part 215, which is the front-rear direction in the illustrated exemplary embodiment.

Each of the blocks 221, 222, 223, 224, 225 includes a plurality of surfaces.

Specifically, the first block 221 includes a first inner surface 221*a* facing the space part 215 or the second Halbach array 230 and a first outer surface 221*b* opposite to the space part 215 or the second Halbach array 230.

The second block 222 includes a second inner surface 222*a* facing the first block 221 and a second outer surface 222*b* facing the third block 223.

The third block 223 includes a third inner surface 223*a* facing the space part 215 or the second Halbach array 230 and a third outer surface 223*b* opposite to the space part 215 or the second Halbach array 230.

The fourth block 224 includes a fourth inner surface 224*a* facing the third block 223 and a fourth outer surface 224*b* facing the fifth block 225.

The fifth block 225 includes a fifth inner surface 225*a* facing the space part 215 or the second Halbach array 230 and a fifth outer surface 225*b* opposite to the space part 215 or the second Halbach array 230.

The plurality of surfaces of each of the blocks 221, 222, 223, 224 and 225 may be magnetized according to a predetermined rule to constitute a Halbach array.

Specifically, the first, second and fifth inner surfaces 221*a*, 222*a*, 225*a* and the third and fourth outer surfaces 223*b*, 224*b* are magnetized with the same polarity. In this case, the polarity may be the same polarity as each of the opposite surfaces 241*a*, 242*a*, 243*a*, 244*a* of the magnet part 240.

In addition, the first, second and fifth outer surfaces 221*b*, 222*b*, 225*b* and the third and fourth inner surfaces 223*a*, 224*a* are all magnetized to have a polarity different from the polarity. In this case, the polarity may be the same polarity as each of the opposite surfaces 241*b*, 242*b*, 243*b*, 244*b* of the magnet part 240.

In the illustrated exemplary embodiment, a plurality of magnetic materials constituting the second Halbach array 230 are sequentially arranged side by side from left to right. That is, in the illustrated exemplary embodiment, the second Halbach array 230 is formed to extend in the left-right direction.

The second Halbach array 230 may form a magnetic field together with other magnetic materials. In the illustrated exemplary embodiment, the second Halbach array 230 may form a magnetic field together with the first Halbach array 220 and the magnet part 240.

The second Halbach array 230 may be positioned adjacent to the other one of the first and second surfaces 211 and 212. In an exemplary embodiment, the second Halbach array 230 may be coupled to the inner side of the other surface (i.e., a direction toward the space part 215).

In the illustrated exemplary embodiment, the second Halbach array 230 is disposed on the inner side of the second surface 212, adjacent to the second surface 212, so as to face the first Halbach array 220 which is disposed on the inner side of the first surface 211.

Between the second Halbach array 230 and the first Halbach array 220, the space part 215 and the fixed contact 22 and the movable contact 43 accommodated in the space part 215 are positioned.

The second Halbach array 230 may enhance the strength of the magnetic field formed by itself and the magnetic field formed with the first Halbach array 220 and the magnet part 240. Since the direction of the magnetic field formed by the second Halbach array 230 and the process of strengthening the magnetic field are well-known techniques, the detailed description thereof will be omitted.

In the illustrated exemplary embodiment, the second Halbach array 230 includes a first block 231, a second block 232, a third block 233, a fourth block 234 and a fifth block 235. It will be understood that a plurality of magnetic materials constituting the second Halbach array 230 are each named blocks 231, 232, 233, 234, 235, respectively.

The first to fifth blocks 231, 232, 233, 234, 235 may be formed of a magnetic material. In an exemplary embodiment, the first to fifth blocks 231, 232, 233, 234, 235 may be provided as permanent magnets or electromagnets.

The first to fifth blocks 231, 232, 233, 234, 235 may be arranged side by side in one direction. In the illustrated exemplary embodiment, the first to fifth blocks 231, 232, 233, 234, 235 are arranged side by side in the extending direction of the second surface 212, that is, in the left-right direction.

The first to fifth blocks 231, 232, 233, 234, 235 are arranged side by side along the above direction. Specifically, in the first to fifth blocks 231, 232, 233, 234, 235, the first block 231 is disposed on the leftmost side and the fifth block 235 is disposed on the rightmost side. In addition, the second to fourth blocks 232, 233, 234 are sequentially arranged from left to right between the first and fifth blocks 231, 235 along the above direction.

In an exemplary embodiment, the blocks 231, 232, 233, 234, 235 disposed adjacent to each other may contact each other.

In this case, the first and fifth blocks 231, 235 may be disposed to overlap each of the fixed contacts 22*a*, 22*b* in a direction toward the space part 215, which is the front-rear direction in the illustrated exemplary embodiment.

In addition, each of the blocks 221, 222, 223, 224, 225 of the first Halbach array 220 and each of the blocks 231, 232, 233, 234, 235 of the second Halbach array 230 may be arranged to overlap each other in the front-rear direction.

Each of the blocks 231, 232, 233, 234, 235 includes a plurality of surfaces.

Specifically, the first block 231 includes a first inner surface 231*a* facing the space part 215 or the first Halbach array 220 and a first outer surface 231*b* opposite to the space part 215 or the first Halbach array 220.

The second block 232 includes a second inner surface 232*a* facing the first block 231 and a second outer surface 232*b* facing the third block 233.

The third block 233 includes a third inner surface 233*a* facing the space part 215 or the first Halbach array 220 and a third outer surface 233*b* opposite to the space part 215 or the first Halbach array 220.

The fourth block 234 includes a fourth inner surface 234*a* facing the third block 233 and a fourth outer surface 234*b* facing the fifth block 235.

The fifth block 235 includes a fifth inner surface 235*a* facing the space part 215 or the first Halbach array 220 and a fifth outer surface 235*b* opposite to the space part 215 or the first Halbach array 220.

The plurality of surfaces of each of the blocks 231, 232, 233, 234, 235 may be magnetized according to a predetermined rule to constitute a Halbach array.

Specifically, the first, second and fifth inner surfaces 231*a*, 232*a*, 235*a* and the third and fourth outer surfaces 233*b*, 234*b* are magnetized with the same polarity. In this case, the polarity may be the same polarity as each of the opposing surfaces 241*a*, 242*a*, 243*a*, 244*a* of the magnet part 240.

In addition, the first, second and fifth outer surfaces 231*b*, 232*b*, 235*b* and the third and fourth inner surfaces 233*a*, 234*a* are all magnetized to have a polarity different from the polarity. In this case, the polarity may be the same polarity as each of the opposite surfaces 241*b*, 242*b*, 243*b*, 244*b* of the magnet part 240.

In addition, the polarity of each surface of each of the blocks 231, 232, 233, 234, 235 of the second Halbach array 230 may be formed to have the same polarity as each surface of each of the blocks 221, 222, 223, 224, 225 of the first Halbach array 220.

That is, the first, second and fifth inner surfaces 221*a*, 222*a*, 225*a* and the third and fourth outer surfaces 223*b*, 224*b* of the first Halbach array 220 are magnetized with the same polarity as the first, second and fifth inner surfaces 231*a*, 232*a*, 235*a* and the third and fourth outer surfaces 233*b*, 234*b* of the second Halbach array 230.

In addition, the first, second and fifth outer surfaces 221*b*, 222*b*, 225*b* and the third and fourth inner surfaces 223*a*, 224*a* of the first Halbach array 220 are magnetized with the same polarity as the first, second and fifth outer surfaces 231*b*, 232*b*, 235*b* and the third and fourth inner surfaces 233*a*, 234*a* of the second Halbach array 230.

The relative polarity relationship of the first and second Halbach arrays 220, 230 may be expressed as geometrically symmetrical in the front-rear direction.

That is, the first and second Halbach arrays 220, 230 are magnetized to be line-symmetrical with respect to an imaginary straight line passing through each of the fixed contacts 22*a*, 22*b*.

The magnet part 240 forms a magnetic field with itself and with the first and second Halbach arrays 220, 230. The arc path (A.P) may be formed in the arc chamber 21 by the magnetic field formed by the magnet part 240.

The magnet part 240 may be provided in any shape capable of forming a magnetic field by being magnetized. In an exemplary embodiment, the magnet part 240 may be provided with a permanent magnet or an electromagnet.

A plurality of magnet parts 240 may be provided. In the illustrated exemplary embodiment, the magnet part 240 includes first to fourth magnet parts 241, 242, 243, 244.

The plurality of magnet parts 240 may be positioned adjacent to the remaining surface of the first to fourth surfaces 211, 212, 213, 214. In an exemplary embodiment, each of the plurality of magnet parts 240 may be coupled to the inner side of the other surface of the first to fourth surfaces 211, 212, 213, 214 (i.e., a direction toward the space part 215).

In the illustrated exemplary embodiment, the first and second magnet parts 241, 242 are positioned adjacent to the third surface 213. The third and fourth magnet parts 243, 244 are positioned adjacent to the fourth surface 214.

The first to fourth magnet parts 241, 242, 243, 244 are formed to extend in one direction. In the illustrated exemplary embodiment, the first to fourth magnet parts 241, 242, 243, 244 are formed to extend in the front-rear direction.

The first and second magnet parts 241, 242 may be arranged side by side to face each other along the extension direction (i.e., the front-rear direction in the illustrated exemplary embodiment). The first and second magnet parts 241, 242 are positioned adjacent to each other in the extension direction. In an exemplary embodiment, the first and second magnet parts 241, 242 may be in contact with each other.

The third and fourth magnet parts 243, 244 may be arranged side by side to face each other along the extension direction (i.e., the front-rear direction in the illustrated exemplary embodiment). The third and fourth magnet parts 243, 244 are positioned adjacent to each other in the extension direction. In an exemplary embodiment, the third and fourth magnet parts 243, 244 may be in contact with each other.

Each of the magnet parts 241, 242, 243, 244 includes a plurality of surfaces.

Specifically, the first magnet part 241 includes a first opposing surface 241*a* facing the second magnet part 242 and a first opposite surface 241*b* which is opposite to the second magnet part 242.

The second magnet part 242 includes a second opposing surface 242*a* facing the first magnet part 241 and a second opposite surface 242*b* which is opposite to the first magnet part 241.

The third magnet part 243 includes a third opposing surface 243*a* facing the fourth magnet part 244 and a third opposite surface 243*b* which is opposite to the fourth magnet part 244.

The fourth magnet part 244 includes a fourth opposing surface 244*a* facing the third magnet part 243 and a fourth opposite surface 244*b* which is opposite to the third magnet part 243.

Each surface of the first to fourth magnet parts 241, 242, 243, 244 may be magnetized according to a predetermined rule.

Specifically, each of the opposing surfaces 241*a*, 242*a*, 243*a*, 244*a* is magnetized with the same polarity as the first and fifth inner surfaces 221*a*, 231*a*, 225*a*, 235*a* of each of the Halbach arrays 220, 230.

Similarly, each of the opposite surfaces 241*b*, 242*b*, 243*b*, 244*b* is magnetized with the same polarity as the third inner faces 223*a*, 233*a* of each of the Halbach arrays 220, 230.

Hereinafter, the arc path (A.P) formed by the arc path generation unit 200 according to the present exemplary embodiment will be described in detail with reference to FIG. 8.

Figure 8:
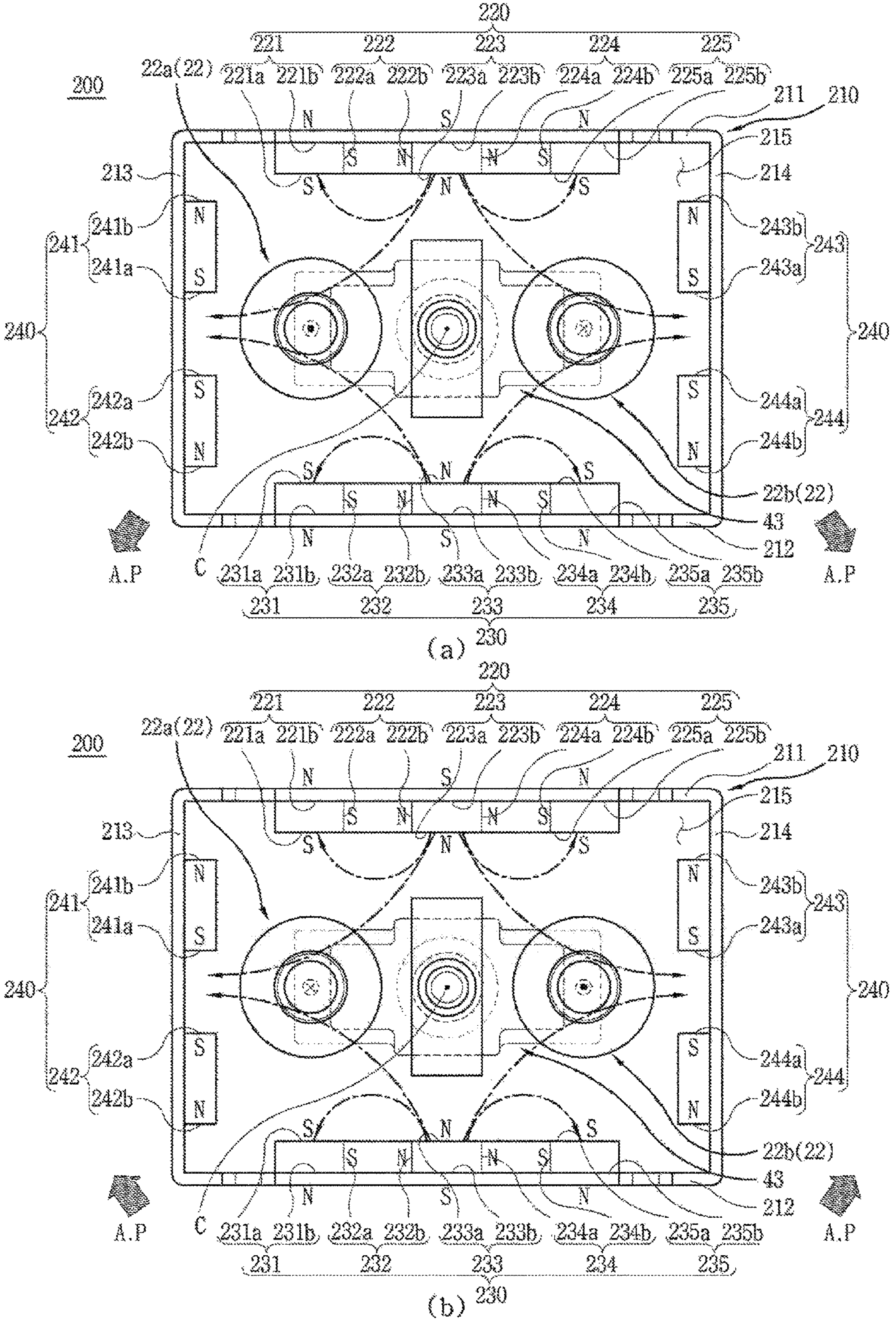
FIG. 8 is a conceptual diagram illustrating the paths of a magnetic field and an arc formed by the arc path generation unit according to the exemplary embodiment of FIG. 7.

Referring to FIG. 8, the first and fifth inner surfaces 221*a*, 231*a*, 225*a*, 235*a* of the first and second Halbach arrays 220 and 230 are magnetized to the S pole. In this case, the third inner surfaces 223*a*, 233*a* of the first and second Halbach arrays 220 and 230 are magnetized to the N pole.

In addition, according to the predetermined rule, each of the opposite surfaces 241*a*, 242*a*, 243*a*, 244*a* of the magnet part 240 is magnetized to the S pole.

Accordingly, a magnetic field in a direction to repel each other is formed between the first and second Halbach arrays 220, 230. In addition, between the first and second Halbach arrays 220, 230 and the magnet part 240, a magnetic field in a direction from the third inner surfaces 223*a*, 233*a* toward the opposite surfaces 241*a*, 242*a*, 243*a*, 244*a* is formed.

In the exemplary embodiment illustrated in (a) of FIG. 8, the direction of the current flows into the second fixed contact 22*b* and exits to the first fixed contact 22*a* through the movable contact 43.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 8, the direction of the current flows into the first fixed contact 22*a* and exits to the second fixed contact 22*b* through the movable contact 43.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 220 and 230 and the magnet part 240 is changed, the directions of the magnetic field formed in each of the Halbach arrays 220, 230 and the magnet part 240 become reversed. Accordingly, the path (A.P) of the generated electromagnetic force and arc is also formed to be reversed in the front-rear direction.

That is, in the energized situation as shown in (a) of FIG. 8, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 8, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 220 and the magnet part 240 or the direction of the current flowing through the DC relay 1, the arc path generation unit 200 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 may be improved.

(3) Description of the Arc Path Generation Unit 300 According to Another Exemplary Embodiment of the Present Disclosure Hereinafter, the arc path generation unit 300 according to another exemplary embodiment of the present disclosure will be described with reference to FIGS. 9 to 12.

Figure 9:
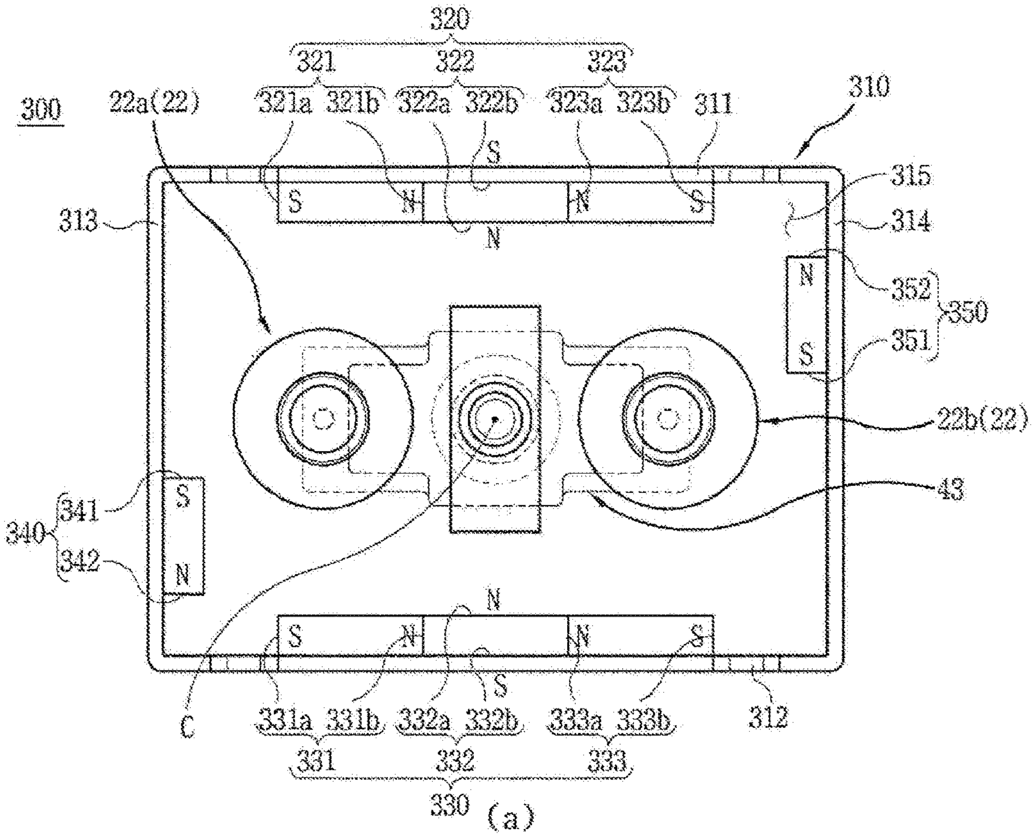
FIGS. 9 and 10 are conceptual diagrams illustrating the arc path generation unit according to still another exemplary embodiment of the present disclosure.
Figure 9:
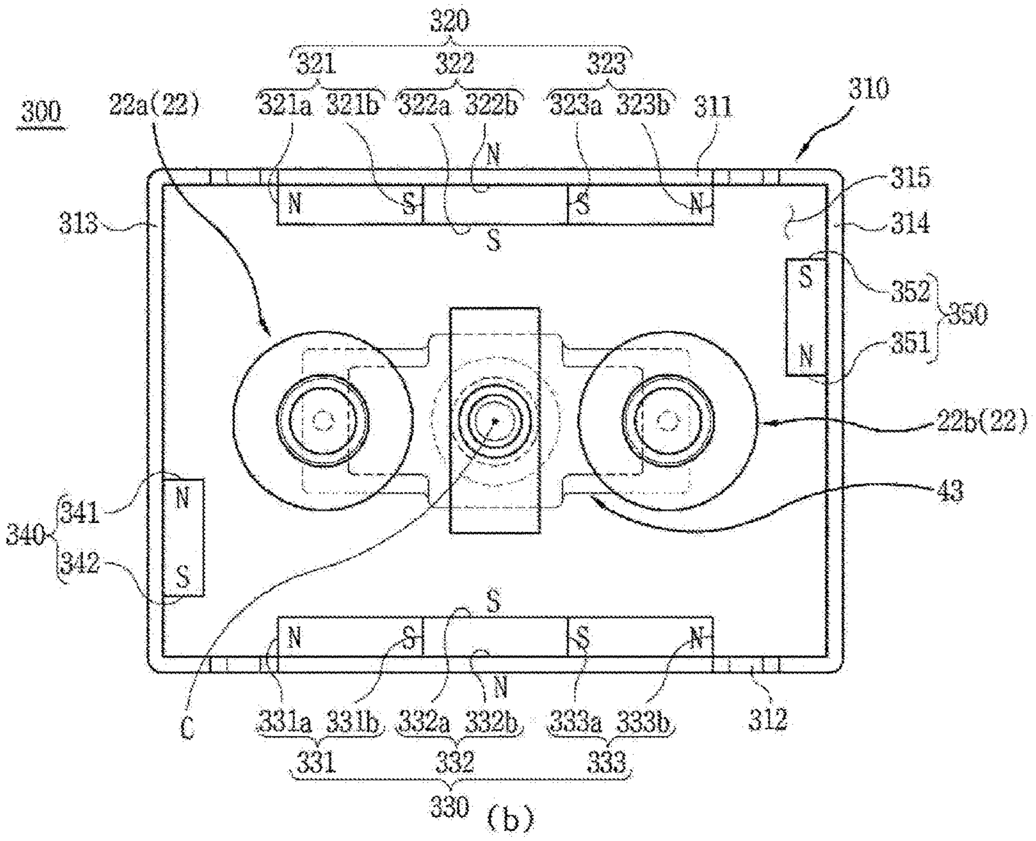
Figure 10:
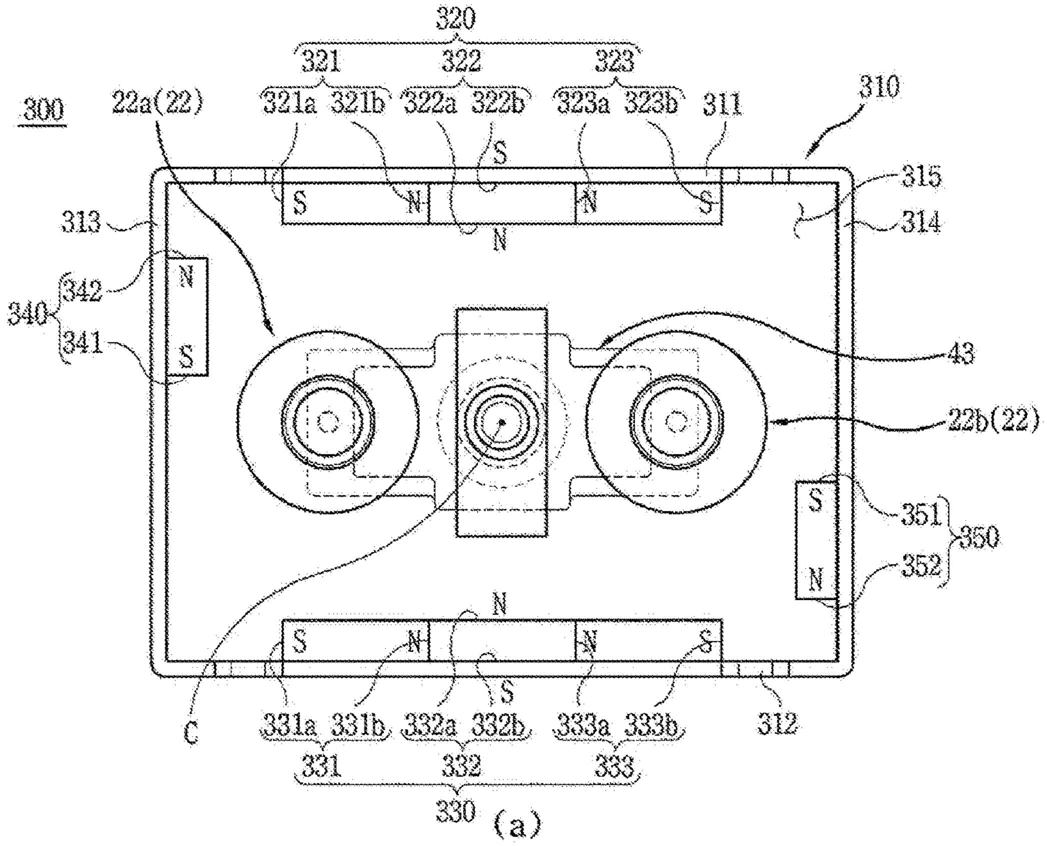
Figure 10:
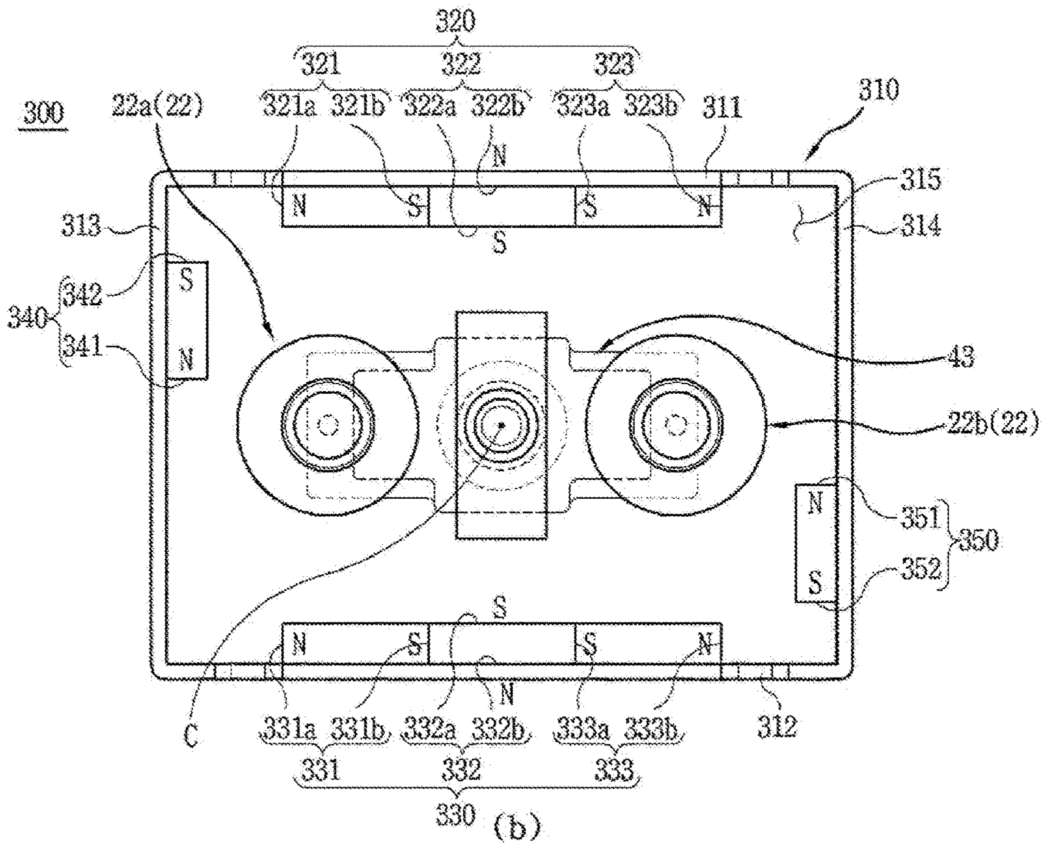

Referring to FIGS. 9 and 10, the arc path generation unit 300 according to the illustrated exemplary embodiment includes a magnetic frame 310, a first Halbach array 320, a second Halbach array 330, a first magnet part 340 and a second magnet part 350.

The magnetic frame 310 according to the present exemplary embodiment has the same structure and function as the magnetic frame 110 according to the above-described exemplary embodiment. However, there is a difference in the arrangement method of the first Halbach array 320, the second Halbach array 330, the first magnet part 340 and the second magnet part 350 disposed on the magnetic frame 310 according to the present exemplary embodiment/

Accordingly, the description of the magnetic frame 310 will be replaced with the description of the magnetic frame 110 according to the above-described exemplary embodiment.

In the illustrated exemplary embodiment, a plurality of magnetic materials constituting the first Halbach array 320 are sequentially arranged side by side from left to right. That is, in the illustrated exemplary embodiment, the first Halbach array 320 is formed to extend in the left-right direction.

The first Halbach array 320 may form a magnetic field together with other magnetic materials. In the illustrated exemplary embodiment, the first Halbach array 320 may form a magnetic field together with the second Halbach array 330 and the first and second magnet parts 340, 350.

The first Halbach array 320 may be positioned adjacent to any one of the first and second surfaces 311, 312. In an exemplary embodiment, the first Halbach array 320 may be coupled to the inner side of the any one surface (i.e., a direction toward the space part 315).

In the illustrated exemplary embodiment, the first Halbach array 320 is disposed on the inner side of the first surface 311, adjacent to the first surface 311, so as to face the second Halbach array 330 disposed on the inner side of the second surface 312.

Between the first Halbach array 320 and the second Halbach array 330, the space part 315 and the fixed contact 22 and the movable contact 43 accommodated in the space part 315 are positioned.

The first Halbach array 320 may enhance the strength of the magnetic field formed by itself and the magnetic field formed with the second Halbach array 330 and the first and second magnet parts 340, 350. Since the direction of the magnetic field formed by the first Halbach array 320 and the process of strengthening the magnetic field are well-known techniques, the detailed description thereof will be omitted.

In the illustrated exemplary embodiment, the first Halbach array 320 includes a first block 321, a second block 322 and a third block 323. It will be understood that the plurality of magnetic materials constituting the first Halbach array 320 are each named blocks 321, 322, 323, respectively.

The first to third blocks 321, 322, 323 may be formed of a magnetic material. In an exemplary embodiment, the first to third blocks 321, 322, 323 may be provided with a permanent magnet or an electromagnet.

The first to third blocks 321, 322, 323 may be arranged side by side in one direction. In the illustrated exemplary embodiment, the first to third blocks 321, 322, 323 are arranged side by side in the extending direction of the first surface 311, that is, in the left-right direction.

The first to third blocks 321, 322, 323 are arranged side by side along the above direction. Specifically, in the first to third blocks 321, 322, 323, the first block 321 is disposed on the leftmost side, and the third block 323 is disposed on the rightmost side. In addition, the second block 322 is positioned between the first and third blocks 321, 323.

In an exemplary embodiment, the second block 322 may be in contact with the first and third blocks 321, 323.

In this case, the first and third blocks 321, 323 may be disposed to overlap the first and second fixed contacts 22*a*, 22*b*, respectively, in a direction toward the space part 315, which is the front-rear direction in the illustrated exemplary embodiment.

Each of the blocks 321, 322, 323 includes a plurality of surfaces.

Specifically, the first block 321 includes a first inner surface 321*a* opposite to the second block 322 and a first outer surface 321*b* facing the second block 322.

The second block 322 includes a second inner surface 322*a* facing the space part 315 or the second Halbach array 330 and a second outer surface 322*b* opposite to the space part 315 or the second Halbach array 330.

The third block 323 includes a third inner surface 323*a* facing the second block 322 and a third outer surface 323*b* opposite to the second block 322.

The plurality of surfaces of each of the blocks 321, 322, 323 may be magnetized according to a predetermined rule so as to constitute a Halbach array.

Specifically, the first inner surface 321*a* and the second and third outer surfaces 322*b*, 323*b* are magnetized with the same polarity. In this case, the polarity may be the same polarity as the first inner surface 331*a* and the second and third outer surfaces 332*b*, 333*b* of the second Halbach array 330 and each of the opposing surfaces 341, 351 of each of the magnet part 340, 350.

In addition, the first outer surface 321*b* and the second and third inner surfaces 322*a*, 323*a* are magnetized to have a polarity different from the polarity. In this case, the polarity may be the same polarity as the first outer surface 331*b* and the second and third inner surfaces 332*a*, 333*a* of the second Halbach array 330 and each of the opposite surfaces 342, 352 of each of the magnet parts 340, 350.

A plurality of magnetic materials constituting the second Halbach array 330 are sequentially arranged side by side from left to right. That is, in the illustrated exemplary embodiment, the second Halbach array 330 is formed to extend in the left-right direction.

The second Halbach array 330 may form a magnetic field together with other magnetic materials. In the illustrated exemplary embodiment, the second Halbach array 330 may form a magnetic field together with the first Halbach array 320 and the first and second magnet parts 340, 350.

The second Halbach array 330 may be positioned adjacent to the other surface of the first and second surfaces 311, 312. In an exemplary embodiment, the second Halbach array 330 may be coupled to the inner side of the other surface (i.e., a direction toward the space part 315).

In the illustrated exemplary embodiment, the second Halbach array 330 is disposed on the inner side of the second surface 312, adjacent to the second surface 312, so as to face the first Halbach array 320.

Between the second Halbach array 330 and the first Halbach array 320, the space part 315 and the fixed contact 22 and the movable contact 43 accommodated in the space part 315 are positioned.

The second Halbach array 330 may enhance the strength of the magnetic field formed by itself and the magnetic field formed with the first Halbach array 320 and the first and second magnet parts 340, 350. Since the direction of the magnetic field formed by the second Halbach array 330 and the process of strengthening the magnetic field are well-known techniques, the detailed description thereof will be omitted.

In the illustrated exemplary embodiment, the second Halbach array 330 includes a first block 331, a second block 332 and a third block 333. It will be understood that the plurality of magnetic materials constituting the second Halbach array 330 are each named blocks 331, 332, 333, respectively.

The first to third blocks 331, 332, 333 may be formed of a magnetic material. In an exemplary embodiment, the first to third blocks 331, 332, 333 may be provided as permanent magnets or electromagnets.

The first to third blocks 331, 332, 333 may be arranged side by side in one direction. In the illustrated exemplary embodiment, the first to third blocks 331, 332, 333 are arranged side by side in the extending direction of the second surface 312, that is, in the left-right direction.

The first to third blocks 331, 332, 333 are arranged side by side along the above direction. Specifically, in the first to third blocks 331, 332, 333, the first block 331 is disposed on the leftmost side, and the third block 333 is disposed on the rightmost side. In addition, the second block 332 is positioned between the first and third blocks 331, 323.

In an exemplary embodiment, the second block 332 may be in contact with the first and third blocks 331, 323.

In this case, the first and third blocks 331, 333 may be disposed to overlap the first and second fixed contacts 22*a*, 22*b* in a direction toward the space part 315, which is the front-rear direction in the illustrated exemplary embodiment, respectively.

In addition, each of the blocks 321, 322, 323 of the first Halbach array 320 and each of the blocks 331, 332, 333 of the second Halbach array 330 may be arranged to overlap each other in the front-rear direction.

Each of the blocks 331, 332, 333 includes a plurality of surfaces.

Specifically, the first block 331 includes a first inner surface 331*a* opposite to the second block 332 and a first outer surface 331*b* facing the second block 332.

The second block 332 includes a second inner surface 332*a* facing the space part 315 or the first Halbach array 320 and a second outer surface opposite 332*b* opposite to the space part 315 or the first Halbach array 320.

The third block 333 includes a third inner surface 333*a* facing the second block 332 and a third outer surface 333*b* opposite to the second block 332.

The plurality of surfaces of each of the blocks 331, 332 333 may be magnetized according to a predetermined rule to constitute a Halbach array.

Specifically, the first inner surface 331*a* and the second and third outer surfaces 332*b*, 333*b* are magnetized with the same polarity. In this case, the polarity may be the same polarity as the first inner surface 321*a* and the second and third outer surfaces 322*b*, 323*b* of the first Halbach array 320, and each of the opposing surfaces 341, 351 of the first and second magnet parts 340, 350.

In addition, the first outer surface 331*b* and the second and third inner surfaces 332*a*, 333*a* are magnetized to have a polarity different from the polarity. In this case, the polarity may be the same polarity as the first outer surface 321*b* and the second and third inner surfaces 322*a*, 323*a* of the first Halbach array 320, and each of the opposing surfaces 342, 351 of the first and second magnet parts 340, 350.

The first and second magnet parts 340, 350 form a magnetic field on their own or together with the first and second Halbach arrays 320, 330. An arc path (A.P) may be formed inside the arc chamber 21 by the magnetic field formed by the first and second magnet parts 340, 350.

The first and second magnet parts 340, 350 may be provided in any shape capable of forming a magnetic field by being magnetized. In an exemplary embodiment, the first and second magnet parts 340, 350 may be provided as permanent magnets or electromagnets.

The first magnet part 340 may be positioned adjacent to any one of the third surface 313 and the fourth surface 314. In addition, the second magnet part 350 may be positioned adjacent to the other one of the third surface 313 and the fourth surface 314.

In an exemplary embodiment, the first and second magnet parts 340, 350 may be coupled to the inner side (i.e., a direction toward the space part 315) of the third surface 313 and the fourth surface 314, respectively.

In the illustrated exemplary embodiment, the first magnet part 340 is positioned adjacent to the third surface 313. In addition, the second magnet part 350 is positioned adjacent to the fourth surface 314.

The first and second magnet parts 340, 350 are formed to extend in one direction. In the illustrated exemplary embodiment, the first and second magnet parts 340, 350 are formed to extend in the front-rear direction.

The first and second magnet parts 340, 350 may be disposed to face each other with the space part 315 interposed therebetween.

The first magnet part 340 is positioned to be biased toward any one of the first surface 311 and the second surface 312. In addition, the second magnet part 350 is positioned to be biased toward the other one of the first surface 311 and the second surface 312.

In the exemplary embodiment illustrated in FIG. 9, the first magnet part 340 is positioned to be biased toward the second surface 312, and the second magnet part 350 is positioned to be biased toward the first surface 311, respectively. In the exemplary embodiment shown in FIG. 10, the first magnet part 340 is positioned to be biased toward the first surface 311, and the second magnet part 350 is positioned to be biased toward the second surface 312, respectively.

The first magnet part 340 includes a first opposing surface 341 opposite to the any one surface that is positioned to be biased and a first opposite surface 342 facing the any one surface. That is, the distance between the first opposing surface 341 and the any one surface is longer than the distance between the first opposite surface 342 and the any one surface.

The second magnet part 350 includes a second opposing surface 351 opposite to the other one surface which is positioned to be biased and a second opposite surface 352 facing the any one surface. That is, the distance between the second opposing surface 351 and the other one surface is longer than the distance between the second opposite surface 352 and the other one surface.

Each surface of the first to second magnet parts 340, 350 may be magnetized according to a predetermined rule.

Specifically, each of the opposing surfaces 341, 351 is magnetized with the same polarity as the first inner surfaces 321*a*, 331*a* and the second and third outer surfaces 322*b*, 332*b*, 323*b*, 333*b* of the first and second Halbach array 320, 330.

Similarly, each of the opposite surfaces 342, 352 is magnetized with the same polarity as the first outer surfaces 321*b*, 331*b* and the second and third inner surfaces 322*a*, 332*a*, 323*a*, 333*a* of the first and second Halbach arrays 320, 330.

Hereinafter, the arc path (A.P) formed by the arc path generation unit 300 according to the present exemplary embodiment will be described in detail with reference to FIGS. 11 and 12.

Figure 11:
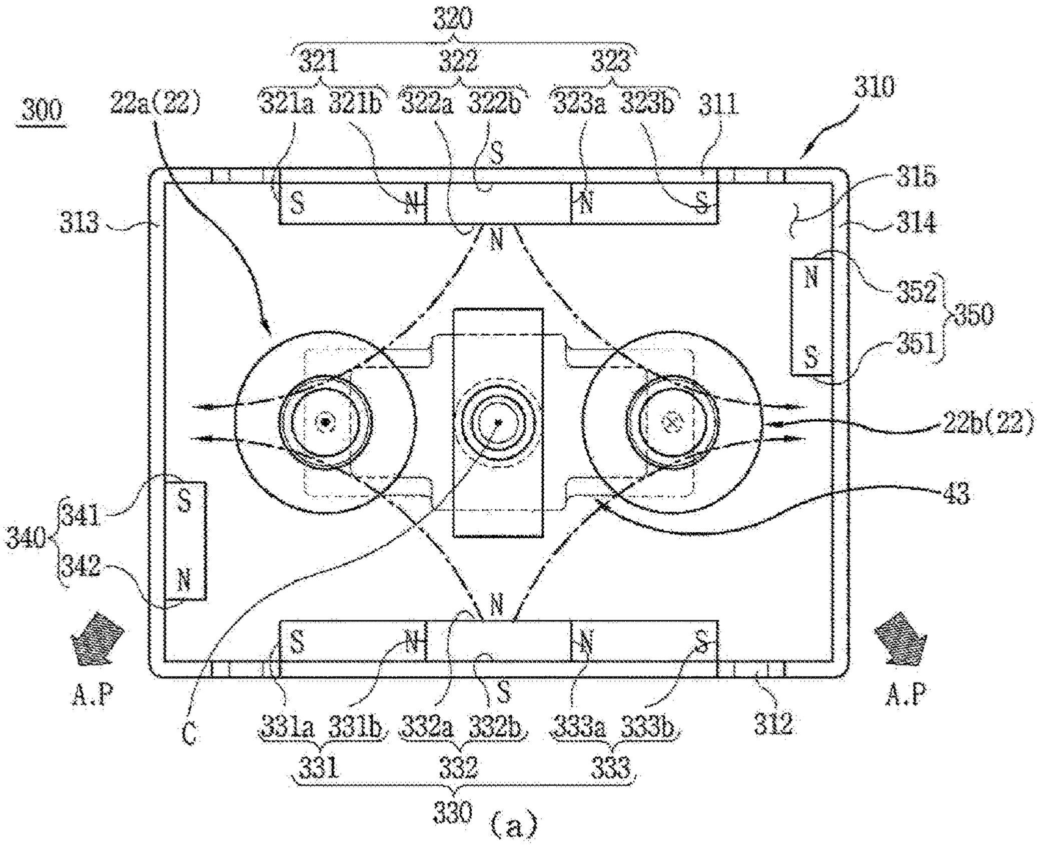
FIGS. 11 and 12 are conceptual diagrams illustrating the paths of a magnetic field and an arc formed by the arc path generation unit according to the exemplary embodiment of FIGS. 9 and 10.
Figure 11:
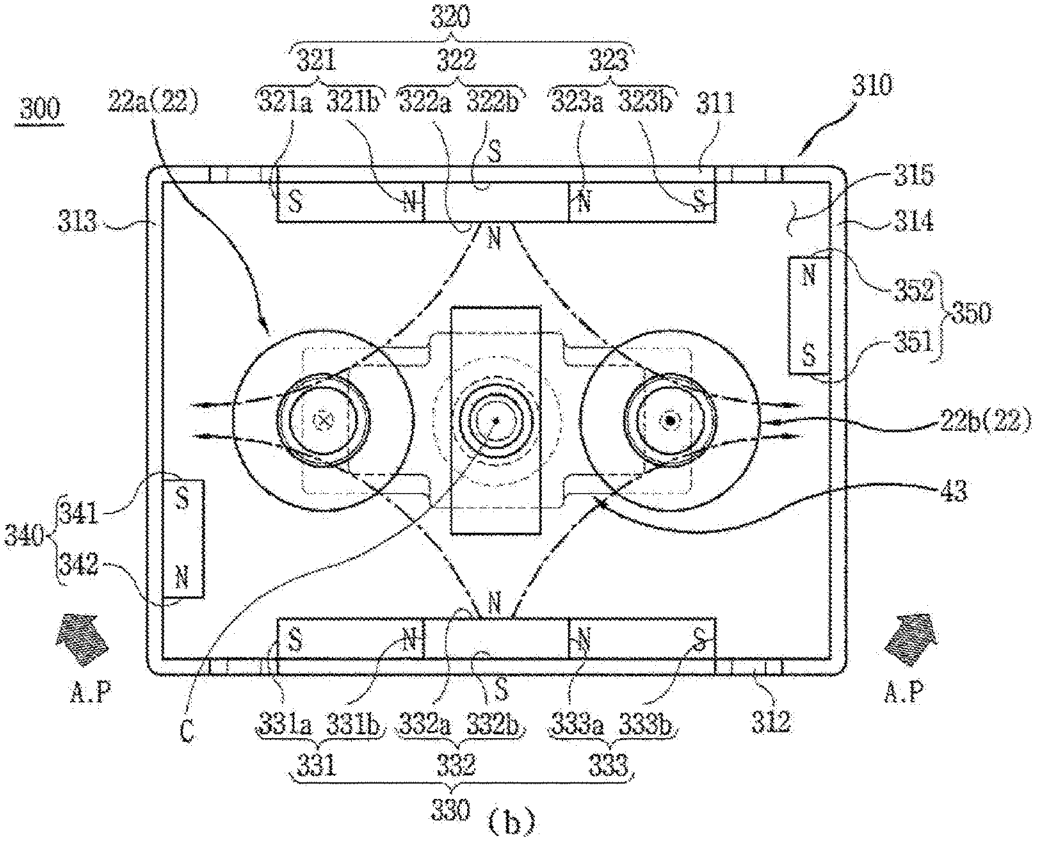

Referring to FIG. 11, the second inner surfaces 322*a*, 332*a* of the first and second Halbach arrays 320, 330 are magnetized to the N pole. In addition, according to the predetermined rule, each of the opposite surfaces 341, 351 is magnetized to the S pole which is a different polarity.

Accordingly, a magnetic field is formed between the first and second Halbach arrays 320, 330 in a direction to repel each other. In addition, between the first and second Halbach arrays 320, 330 and the first and second magnet parts 340, 350, a magnetic field in a direction toward the opposite surfaces 341, 351 is formed in the second inner surfaces 322*a*, 332*a*.

Figure 12:
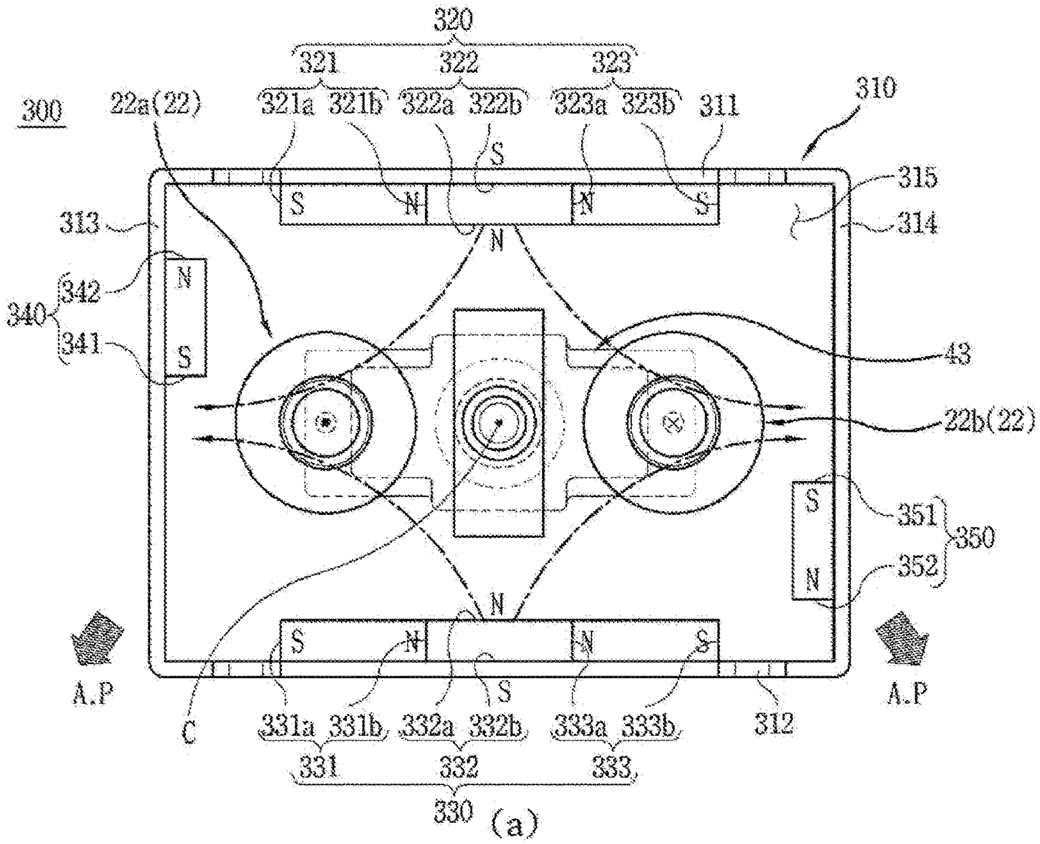
Figure 12:
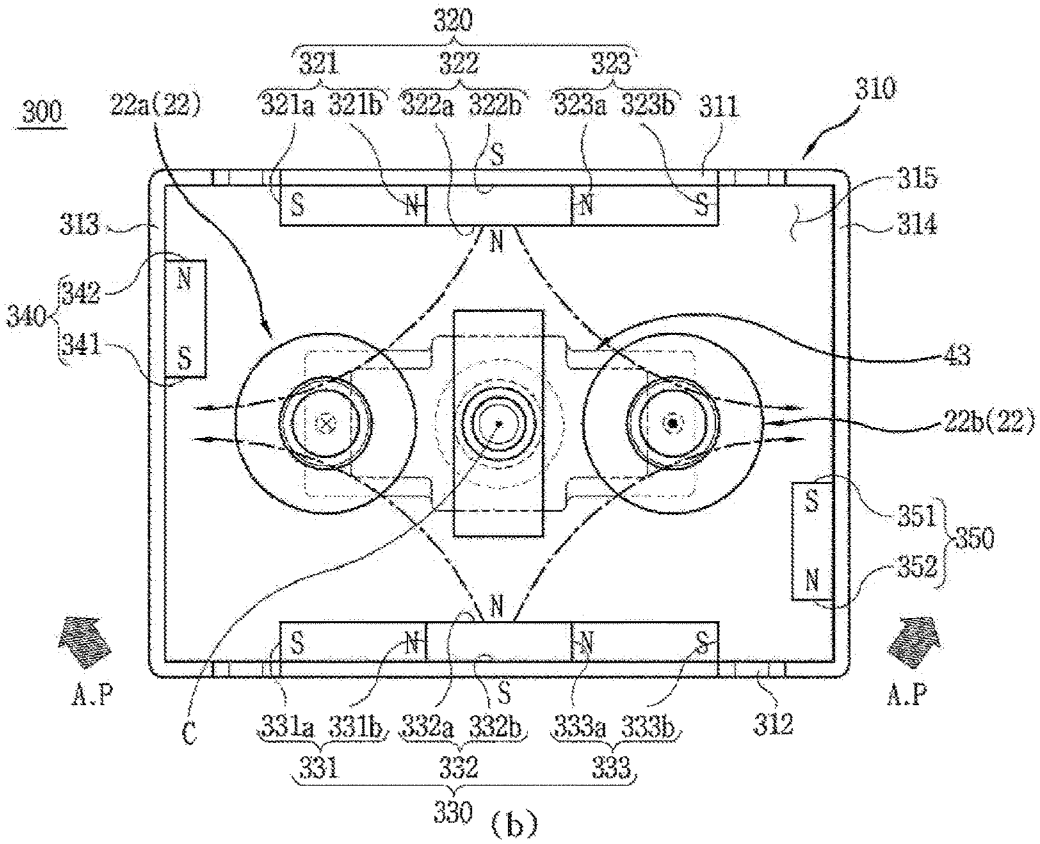

In the exemplary embodiment shown in (a) of FIG. 11 and (a) of FIG. 12, the direction of the current is a direction of flowing into the second fixed contact 22*b* and passing through the movable contact 43 to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 11 and (b) of FIG. 12, the direction of the current is a direction of flowing into the first fixed contact 22*a* and passing through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 320, 330 and the first and second magnet parts 340, 350, the directions of the magnetic fields formed in the first and second Halbach arrays 320, 330 and the first and second magnets 340, 350 become reversed. Accordingly, the path (A.P) of the generated electromagnetic force and arc is also formed to be reversed in the front-rear direction.

That is, in the energized situation as shown in (a) of FIG. 11 and (a) of FIG. 12, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 11 and (b) of FIG. 12, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first and second Halbach arrays 320, 330 and the first and second magnet parts 340, 350 or the direction of the current flowing to the DC relay 1, the arc path generation unit 300 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(4) Description of the Arc Path Generation Unit 400 According to Another Exemplary Embodiment of the Present Disclosure Hereinafter, the arc path generation unit 400 according to another exemplary embodiment of the present disclosure will be described with reference to FIGS. 13 to 16.

Figure 13:
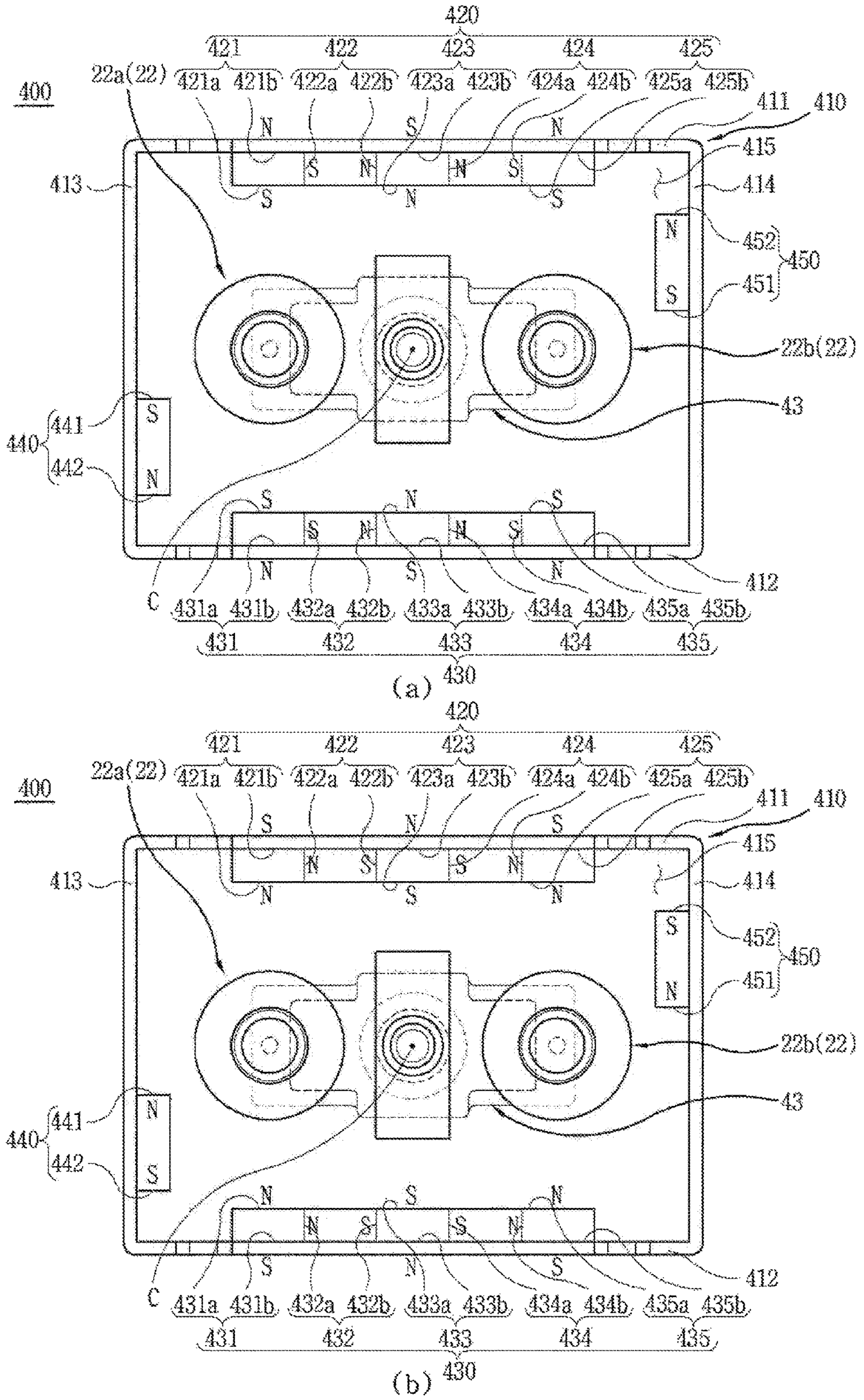
FIGS. 13 and 14 are conceptual diagrams illustrating the arc path generation unit according to still another exemplary embodiment of the present disclosure.
Figure 14:
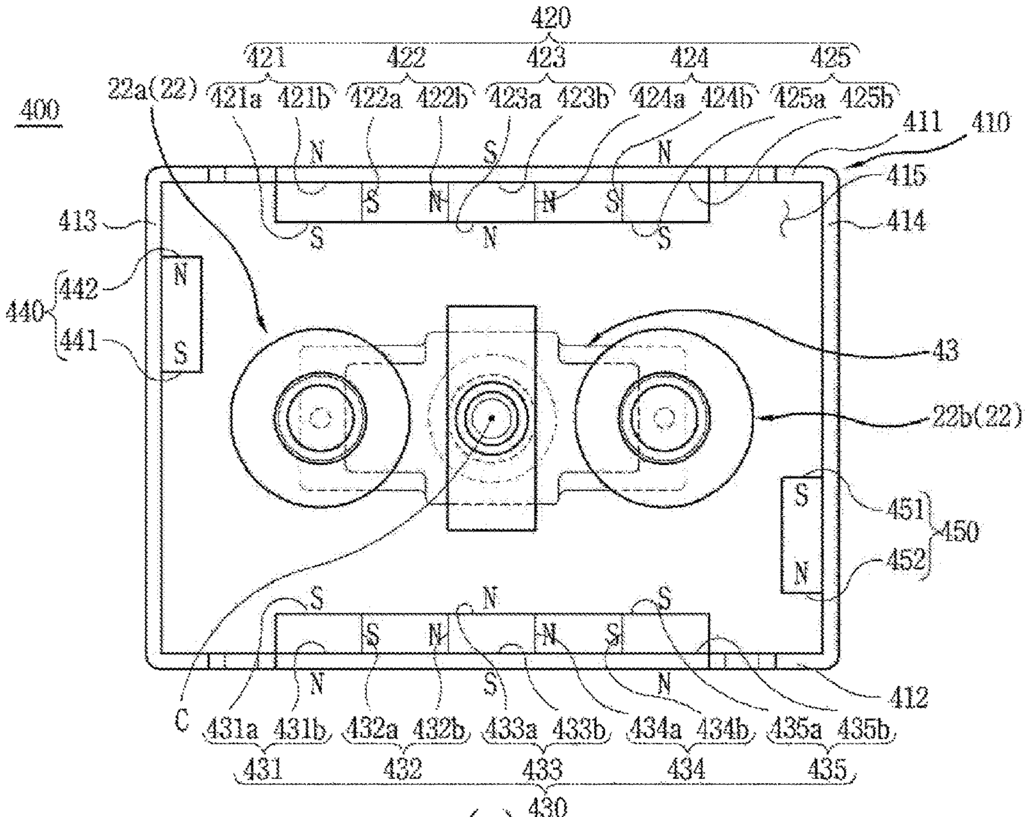
Figure 14:
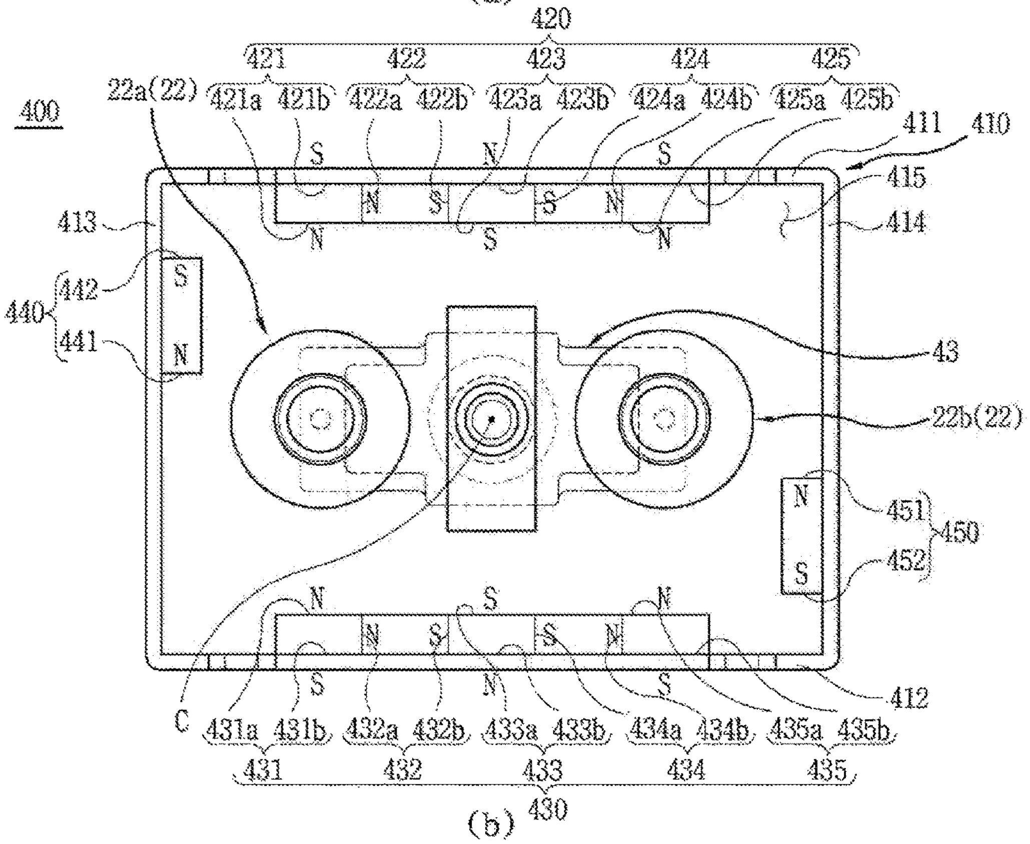

Referring to FIGS. 13 and 14, the arc path generation unit 400 according to the illustrated exemplary embodiment includes a magnetic frame 410, a first Halbach array 420, a second Halbach array 430, a first magnet part 440 and a second magnet part 450.

The magnetic frame 410 according to the present exemplary embodiment has the same structure and function as the magnetic frame 110 according to the above-described exemplary embodiment. However, there is a difference in the arrangement method of the first Halbach array 420, the second Halbach array 430, the first magnet part 440 and the second magnet part 450 disposed on the magnetic frame 410 according to the present exemplary embodiment.

Accordingly, the description of the magnetic frame 410 will be replaced with the description of the magnetic frame 110 according to the above-described exemplary embodiment.

A plurality of magnetic materials constituting the first Halbach array 420 are sequentially arranged side by side from left to right. That is, in the illustrated exemplary embodiment, the first Halbach array 420 is formed to extend in the left-right direction.

The first Halbach array 420 may form a magnetic field together with other magnetic materials. In the illustrated exemplary embodiment, the first Halbach array 420 may form a magnetic field together with the second Halbach array 430 and the first and second magnet parts 440, 450.

The first Halbach array 420 may be positioned adjacent to any one of the first and second surfaces 411 and 412. In an exemplary embodiment, the first Halbach array 420 may be coupled to the inner side of any one surface of the surfaces (i.e., a direction toward the space part 415).

In the illustrated exemplary embodiment, the first Halbach array 420 is positioned inside of the first surface 411, adjacent to the first surface 411, so as to face the second Halbach array 430 which is disposed on the inner side of the second surface 412.

Between the first Halbach array 420 and the second Halbach array 430, the space part 415 and the fixed contact 22 and the movable contact 43 accommodated in the space part 415 are positioned.

The first Halbach array 420 may enhance the strength of the magnetic field formed by itself and the magnetic field formed with the second Halbach array 430 and the first and second magnet parts 440, 450. Since the direction of the magnetic field formed by the first Halbach array 420 and the process of strengthening the magnetic field are well-known techniques, the detailed description thereof will be omitted.

In the illustrated exemplary embodiment, the first Halbach array 420 includes a first block 421, a second block 422, a third block 423, a fourth block 424 and a fifth block 425. It will be understood that a plurality of magnetic materials constituting the first Halbach array 420 are each named blocks 421, 422, 423, 424, 425, respectively.

The first to fifth blocks 421, 422, 423, 424, 425 may be formed of a magnetic material. In an exemplary embodiment, the first to fifth blocks 421, 422, 423, 424, 425 may be provided as permanent magnets or electromagnets.

The first to fifth blocks 421, 422, 423, 424, 425 may be arranged side by side in one direction. In the illustrated exemplary embodiment, the first to fifth blocks 421, 422, 423, 424, 425 are arranged side by side in the extending direction of the first surface 411, that is, in the left-right direction.

The first to fifth blocks 421, 422, 423, 424, 425 are arranged side by side along the above direction. Specifically, in the first to fifth blocks 421, 422, 423, 424, 425, the first block 421 is disposed on the leftmost side and the fifth block 425 is disposed on the rightmost side. In addition, the second to fourth blocks 422, 423, 424 are arranged side by side in a direction from left to right between the first and fifth blocks 421, 425.

In an exemplary embodiment, the first to fifth blocks 421, 422, 423, 424, 425 may contact other adjacent blocks.

In this case, the first and fifth blocks 421, 425 may be disposed to overlap each of the fixed contacts 22*a*, 22*b* in a direction toward the space part 415, which is the front-rear direction in the illustrated exemplary embodiment.

Each of the blocks 421, 422, 423, 424, 425 includes a plurality of surfaces.

Specifically, the first block 421 includes a first inner surface 421*a* facing the space part 415 or the second Halbach array 430 and a first outer surface 421*b* opposite to the second Halbach array 430.

The second block 422 includes a second inner surface 422*a* facing the first block 421 and a second outer surface 422*b* facing the third block 423.

The third block 423 includes a third inner surface 423*a* facing the space part 415 or the second Halbach array 430 and a third outer surface 423*b* opposite to the space part 415 or the second Halbach array 430.

The fourth block 424 includes a fourth inner surface 424*a* facing the third block 423 and a fourth outer surface 424*b* facing the fifth block 425.

The fifth block 425 includes a fifth inner surface 425*a* facing the space part 415 or the second Halbach array 430 and a fifth outer surface 425*b* opposite to the space part 415 or the second Halbach array 430.

The plurality of surfaces of each of the blocks 421, 422, 423, 424, 425 may be magnetized according to a predetermined rule to constitute a Halbach array.

Specifically, the first, second and fifth inner surfaces 421*a*, 422*a*, 425*a* and the third and fourth outer surfaces 423*b*, 424*b* are magnetized with the same polarity. In this case, the polarity may be the same polarity as the first, second and fifth inner surfaces 431*a*, 432*a*, 435*a* and the third and fourth outer surfaces 433*b*, 434*b* of the second Halbach array 430, and each of the opposing surfaces 441, 451 of the first and second magnet parts 440, 450.

In addition, the first, second and fifth outer surfaces 421*b*, 422*b*, 425*b* and the third and fourth inner surfaces 423*a*, 424*a* are magnetized with a polarity different from the polarity. In this case, the polarity may be the same polarity as the first, second and fifth outer surfaces 431*b*, 432*b*, 435*b* and the third and fourth inner surfaces 433*a*, 434*a* of the second Halbach array 430, and each of the opposite surfaces 442, 452 of the first and second magnet parts 440, 450.

A plurality of magnetic materials constituting the second Halbach array 430 are sequentially arranged side by side from left to right. That is, in the illustrated exemplary embodiment, the second Halbach array 430 is formed to extend in the left-right direction.

The second Halbach array 430 may form a magnetic field together with other magnetic materials. In the illustrated exemplary embodiment, the second Halbach array 430 may form a magnetic field together with the first Halbach array 420 and the magnet parts 440 and 450.

The second Halbach array 430 may be positioned adjacent to the other one surface of the first and second surfaces 411, 412. In an exemplary embodiment, the second Halbach array 430 may be coupled to the inner side of the other one surface (i.e., a direction toward the space part 415).

In the illustrated exemplary embodiment, the second Halbach array 430 is disposed on the inner side of the second surface 412, adjacent to the second surface 412, so as to face the first Halbach array 420 which is disposed on the inner side of the first surface 441.

Between the second Halbach array 430 and the first Halbach array 420, the space part 415 and the fixed contact 22 and the movable contact 43 accommodated in the space part 415 are positioned.

The second Halbach array 430 may enhance the strength of the magnetic field formed by itself and the magnetic field formed with the first Halbach array 420 and the magnet parts 440, 450. Since the direction of the magnetic field formed by the second Halbach array 430 and the process of strengthening the magnetic field are well-known techniques, the detailed description thereof will be omitted.

In the illustrated exemplary embodiment, the second Halbach array 430 includes a first block 431, a second block 432, a third block 433, a fourth block 434 and a fifth block 435. It will be understood that a plurality of magnetic materials constituting the second Halbach array 430 are each named blocks 431, 432, 433, 434, 435, respectively.

The first to fifth blocks 431, 432, 433, 434, 435 may be formed of a magnetic material. In an exemplary embodiment, the first to fifth blocks 431, 432, 433, 434, 435 may be provided as permanent magnets or electromagnets.

The first to fifth blocks 431, 432, 433, 434, 435 may be arranged side by side in one direction. In the illustrated exemplary embodiment, the first to fifth blocks 431, 432, 433, 434, 435 are arranged side by side in the extending direction of the second surface 412, that is, in the left-right direction.

The first to fifth blocks 431, 432, 433, 434, 435 are arranged side by side along the above direction. Specifically, in the first to fifth blocks 431, 432, 433, 434, 435, the first block 431 is disposed on the leftmost side and the fifth block 435 is disposed on the rightmost side. In addition, the second to fourth blocks 432, 433, 434 are arranged side by side in a direction from left to right between the first and fifth blocks 431, 435.

In an exemplary embodiment, the first to fifth blocks 431, 432, 433, 434, 435 may contact other adjacent blocks.

In this case, the first and fifth blocks 431, 435 may be disposed to overlap each of the fixed contacts 22*a*, 22*b* in a direction toward the space part 415, which is the front-rear direction in the illustrated exemplary embodiment, respectively.

Each of the blocks 431, 432, 433, 434, 435 includes a plurality of surfaces.

Specifically, the first block 431 includes a first inner surface 431*a* facing the space part 415 or the first Halbach array 420, and a first outer surface 431*b* opposite to the space part 415 or the first Halbach array 420.

The second block 432 includes a second inner surface 432*a* facing the first block 431 and a second outer surface 432*b* facing the third block 433.

The third block 433 includes a third inner surface 433*a* facing the space part 415 or the first Halbach array 420, and a third outer surface 433*b* opposite to the space part 415 or the first Halbach array 420.

The fourth block 434 includes a fourth inner surface 434*a* facing the third block 433 and a fourth outer surface 434*b* facing the fifth block 435.

The fifth block 435 includes a fifth inner surface 435*a* facing the space part 415 or the first Halbach array 420 and a fifth outer surface 435*b* opposite to the space part 415 or the first Halbach array 420.

The plurality of surfaces of each of the blocks 431, 432, 433, 434, 435 may be magnetized according to a predetermined rule to constitute a Halbach array.

Specifically, the first, second and fifth inner surfaces 431*a*, 432*a*, 435*a* and the third and fourth outer surfaces 433*b*, 434*b* are magnetized with the same polarity. In this case, the polarity may be the same polarity as the first, second and fifth inner surfaces 421*a*, 422*a*, 425*a* and the third and fourth outer surfaces 423*b*, 424*b* of the first Halbach array, and each of the opposing surfaces 441, 451 of the first and second magnet parts 440, 450.

In addition, the first, second and fifth outer surfaces 431*b*, 432*b*, 435*b* and the third and fourth inner surfaces 433*a*,

434*a* are magnetized with a polarity different from the polarity. In this case, the polarity may be the same polarity as the first, second and fifth outer surfaces 421*b*, 422*b*, 425*b* and the third and fourth inner surfaces 423*a*, 424*a* of the first Halbach array 420, and each of the opposite surfaces 442, 452 of the first and second magnet parts 440, 450.

The first and second magnet parts 440, 450 form a magnetic field on their own or together with the first and second Halbach arrays 420, 430. An arc path (A.P) may be formed inside the arc chamber 21 by the magnetic field formed by the first and second magnet parts 440, 450.

The first and second magnet parts 440, 450 may be provided in any shape capable of forming a magnetic field by being magnetized. In an exemplary embodiment, the first and second magnet parts 440, 450 may be provided as permanent magnets or electromagnets.

The first magnet part 440 may be positioned adjacent to any one of the third surface 413 and the fourth surface 414. In addition, the second magnet part 450 may be positioned adjacent to the other one of the third surface 413 and the fourth surface 414.

In the illustrated exemplary embodiment, the first magnet part 440 is positioned adjacent to the third surface 413. In addition, the second magnet part 450 is positioned adjacent to the fourth surface 414.

In an exemplary embodiment, each of the first and second magnet parts 440, 450 may be coupled to the inner side of the third surface 413 and the fourth surface 414 (i.e., a direction toward the space part 415).

The first and second magnet parts 440, 450 are formed to extend in one direction. In the illustrated exemplary embodiment, the first and second magnet parts 440, 450 are formed to extend in the front-rear direction.

The first and second magnet parts 440, 450 may be disposed to face each other with the space part 415 interposed therebetween.

The first magnet part 440 is positioned to be biased toward any one of the first surface 411 and the second surface 412. In addition, the second magnet part 450 is positioned to be biased toward the other one of the first surface 411 and the second surface 412.

In the exemplary embodiment illustrated in FIG. 13, the first magnet part 440 is positioned to be biased toward the second surface 412, and the second magnet part 450 is positioned to be biased toward the first surface 411, respectively. In the exemplary embodiment illustrated in FIG. 14, the first magnet part 440 is positioned to be biased toward the first surface 411, and the second magnet part 450 is positioned to be biased toward the second surface 412, respectively.

The first magnet part 440 includes a first opposing surface 441 opposite to any one surface that is positioned to be biased and a first opposite surface 442 facing the any one surface. That is, the distance between the first opposite surface 441 and the any one surface is longer than the distance between the first opposite surface 442 and the any one surface.

The second magnet part 450 includes a second opposing surface 451 opposite to the other surface that is positioned to be biased and a second opposite surface 452 facing the any one face. That is, the distance between the second opposing surface 451 and the other one surface is longer than the distance between the second opposite surface 452 and the other surface.

Each surface of the first to second magnet parts 440, 450 may be magnetized according to a predetermined rule.

Specifically, each of the opposing surfaces 441, 451 is magnetized with the same polarity as the first, second and fifth inner surfaces 421*a*, 431*a*, 422*a*, 432*a*, 425*a*, 435*a* and the third and fourth outer surfaces 423*b*, 433*b*, 424*b*, 434*b* of each of the Halbach arrays 420, 430.

Similarly, each of the opposite surfaces 442, 452 is magnetized with the same polarity as the first, second and fifth outer surfaces 421*b*, 431*b*, 422*b*, 432*b*, 425*b*, 435*b* and the third and fourth inner surfaces 423*a*, 433*a*, 424*a*, 434*a* of each of the Halbach arrays 420, 430.

Hereinafter, the arc path (A.P) formed by the arc path generation unit 400 according to the present exemplary embodiment will be described in detail with reference to FIGS. 15 and 16.

Figure 15:
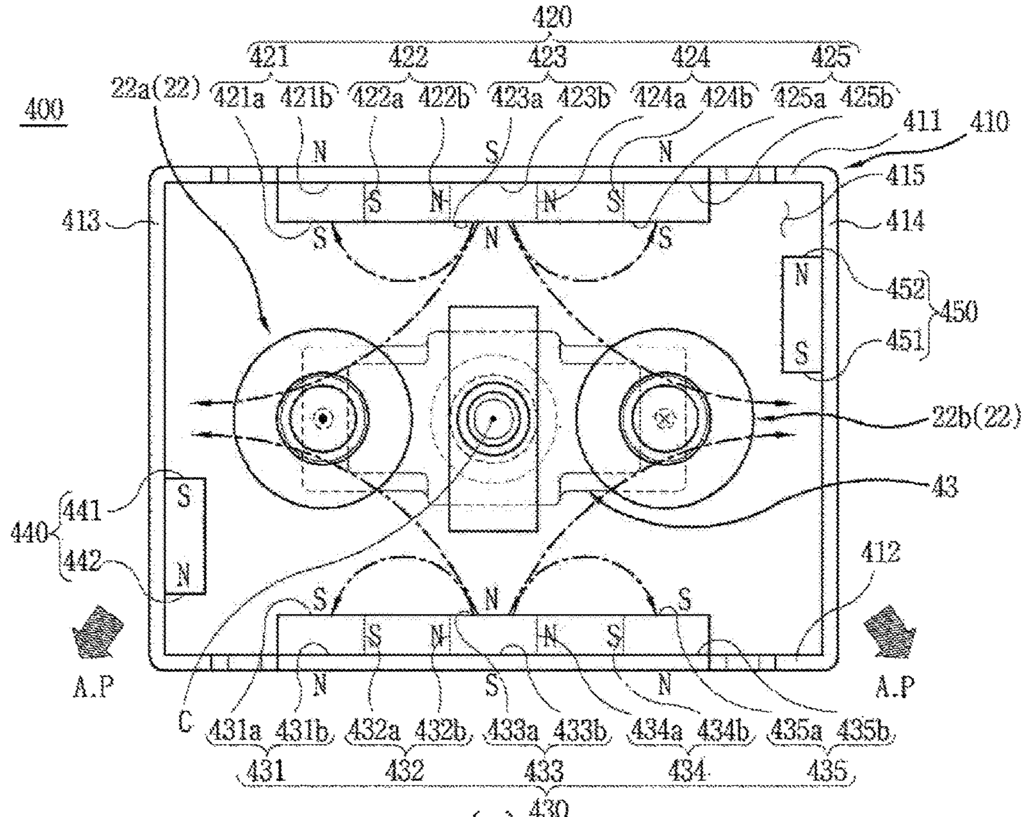
FIGS. 15 and 16 are conceptual diagrams illustrating the paths of a magnetic field and an arc formed by the arc path generation unit according to the exemplary embodiment of FIGS. 13 and 14.
Figure 15:
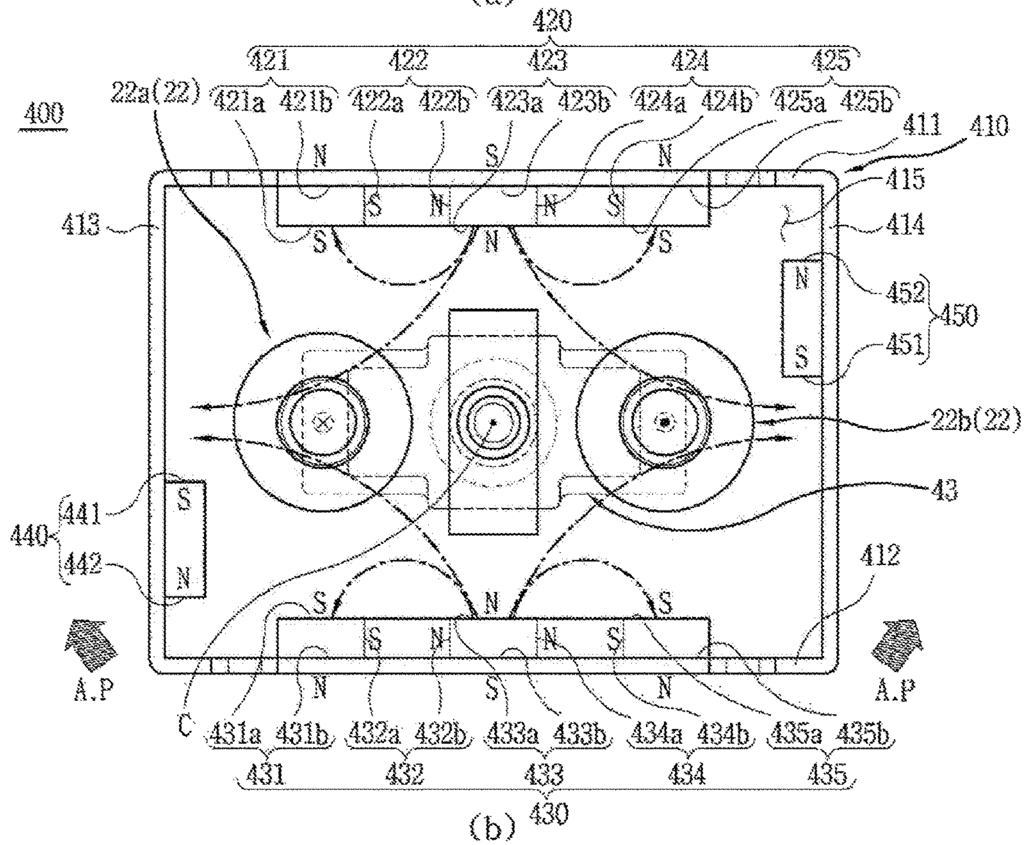

Referring to FIG. 15, the first, second and fifth outer surfaces 421*b*, 431*b*, 422*b*, 432*b*, 425*b*, 435*b* and the third and fourth inner surfaces 423*a*, 433*a*, 424*a*, 434*a* of the first and second Halbach arrays 420, 430 are magnetized to the N pole. In addition, according to the predetermined rule, the opposing surfaces 441, 451 of the first and second magnet parts 440, 450 are magnetized to the S pole, which is a different polarity.

Accordingly, a magnetic field is formed between the first and second Halbach arrays 420, 430 and the first and second magnet parts 440, 450 according to polarities.

Specifically, a magnetic field in a direction to repel each other is formed between the first and second Halbach arrays 420, 430. In addition, between the first and second Halbach arrays 420, 430 and the first and second magnet parts 440 and 450, a magnetic field in a direction from the third inner surfaces 423*a*, 433*a* toward the opposing surfaces 441, 451 is formed.

Figure 16:
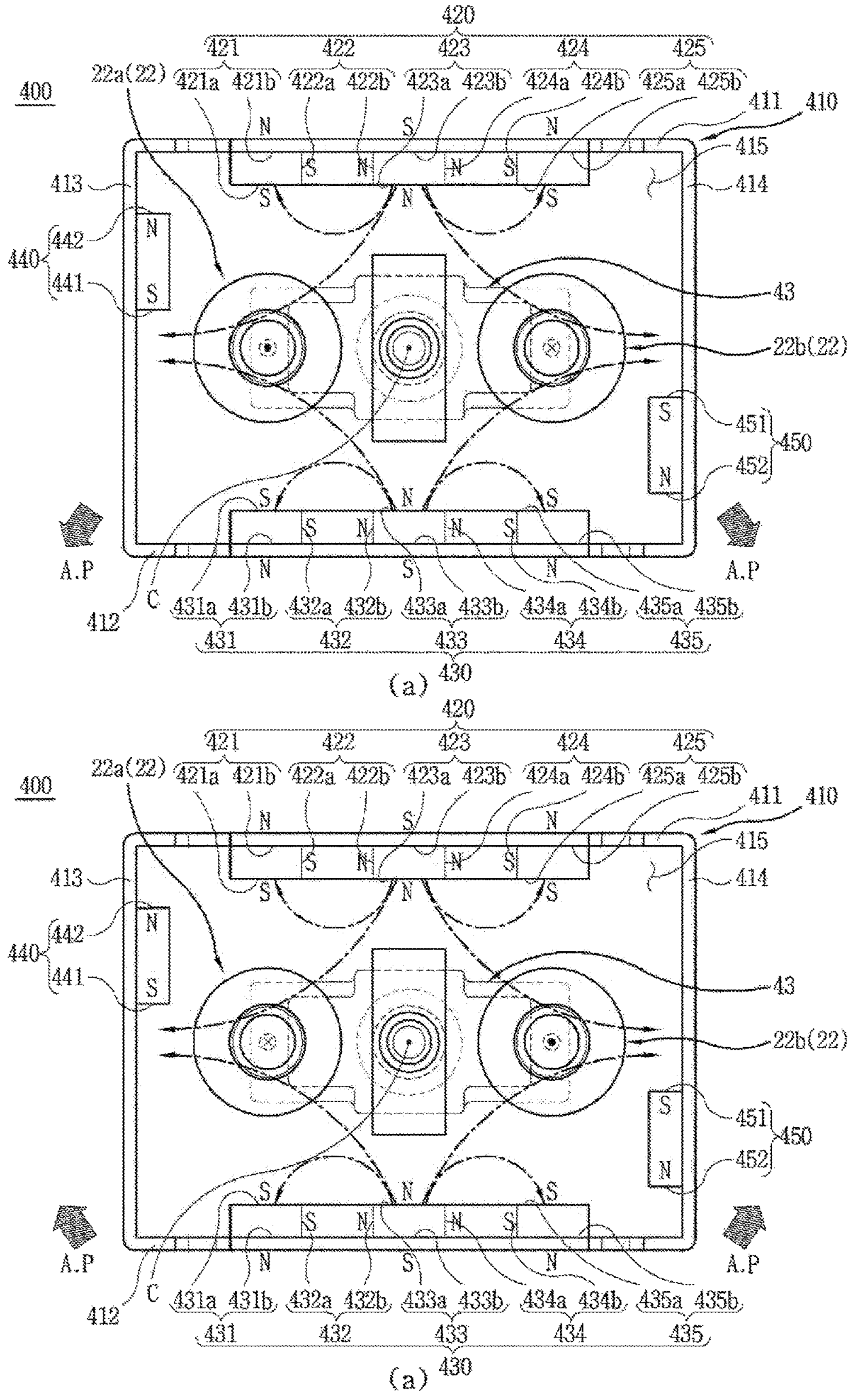

In the exemplary embodiment illustrated in (a) of FIG. 15 and (a) of FIG. 16, the direction of the current is a direction of flowing into the second fixed contact 22*b* and passing through the movable contact 43 to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 15 and (b) of FIG. 16, the direction of the current is a direction of flowing into the first fixed contact 22*a* and passing through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 420, 430 and the first and second magnet parts 440, 450 is changed, the directions of the magnetic fields formed in the first and second Halbach arrays 420, 430 and the first and second magnets 440, 450 become reversed. Accordingly, the path (A.P) of the generated electromagnetic force and arc is also formed to be reversed in the front-rear direction.

That is, in the energized situation as shown in (a) of FIG. 15 and (a) of FIG. 16, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIGS. 15 and (b) of FIG. 16, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 420 and the magnet part 430 or the direction of the current flowing through the DC relay 1, the arc path generation unit 400 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(5) Description of the Arc Path Generation Unit 500 According to Another Exemplary Embodiment of the Present Disclosure Hereinafter, the arc path generation unit 500 according to another exemplary embodiment of the present disclosure will be described with reference to FIGS. 17 and 18.

Figure 17:
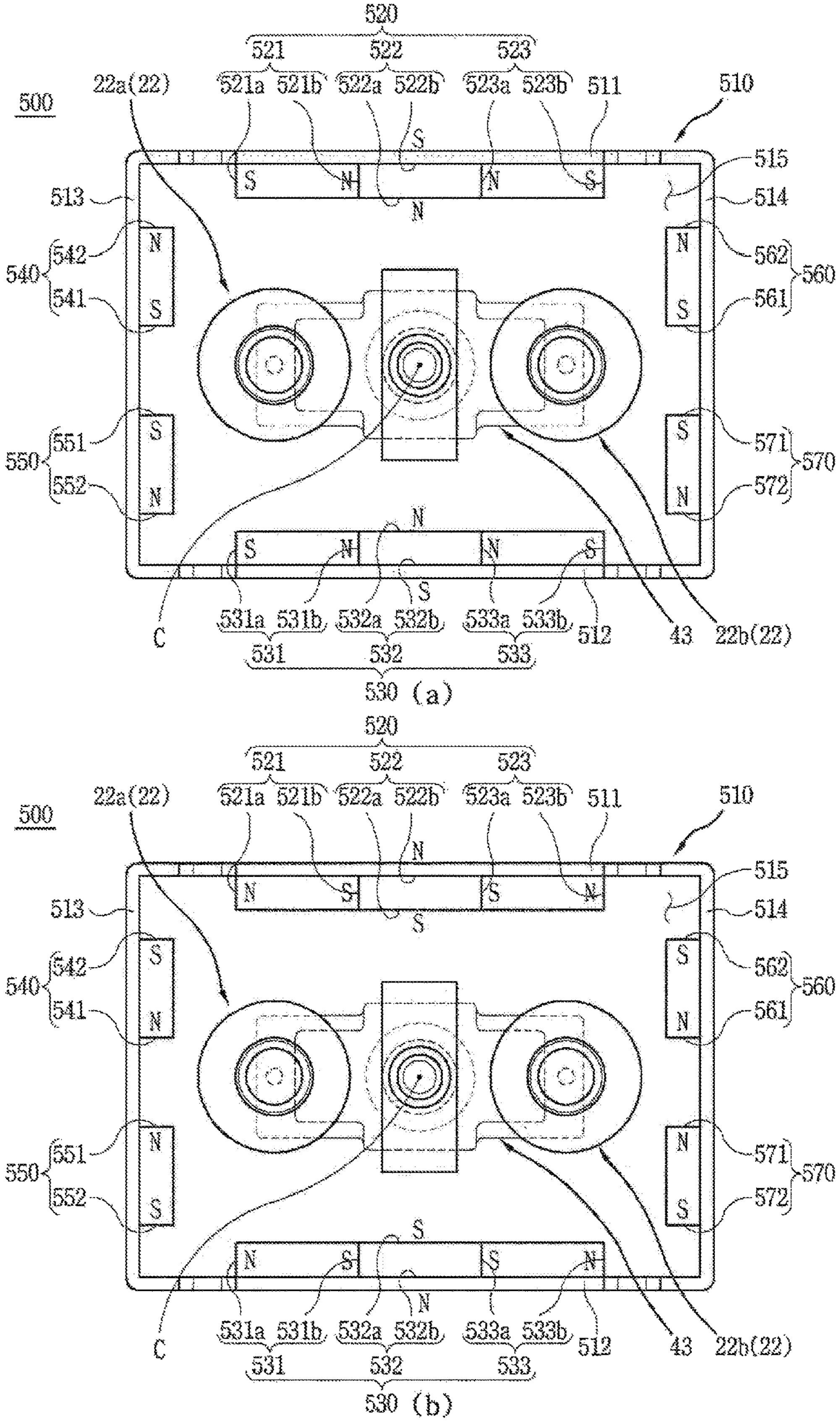
FIG. 17 is a conceptual diagram illustrating the arc path generation unit according to still another exemplary embodiment of the present disclosure.

Referring to FIG. 17, the arc path generation unit 500 according to the illustrated exemplary embodiment includes a magnetic frame 510, a first Halbach array 520, a second Halbach array 530, and a first magnet part 540, a second magnet part 550, a third magnet part 560 and a fourth magnet part 570.

The magnetic frame 510 according to the present exemplary embodiment has the same structure and function as the magnetic frame 110 according to the above-described exemplary embodiment. However, there is a difference in the arrangement method of the first Halbach array 520, the second Halbach array 530, the first magnet part 540, the second magnet part 550, the third magnet part 560 and the fourth magnet part 570 disposed in the magnetic frame 510 according to the present exemplary embodiment.

Accordingly, the description of the magnetic frame 510 will be replaced with the description of the magnetic frame 110 according to the above-described exemplary embodiment.

A plurality of magnetic materials constituting the first Halbach array 520 are sequentially arranged side by side from left to right. That is, in the illustrated exemplary embodiment, the first Halbach array 520 is formed to extend in the left-right direction.

The first Halbach array 520 may form a magnetic field together with other magnetic materials. In the illustrated exemplary embodiment, the first Halbach array 520 may form a magnetic field together with the second Halbach array 530 and the first to fourth magnet parts 540, 550, 560, 570.

The first Halbach array 520 may be positioned adjacent to any one of the first and second surfaces 511, 512. In an exemplary embodiment, the first Halbach array 520 may be coupled to the inner side of the any one surface (i.e., a direction toward the space part 515).

In the illustrated exemplary embodiment, the first Halbach array 520 is disposed on the inner side of the first surface 511, adjacent to the first surface 511, so as to face the second Halbach array 530 which is disposed on the inner side of the second surface 512.

Between the first Halbach array 520 and the second Halbach array 530, the space part 515 and the fixed contact 22 and the movable contact 43 accommodated in the space part 515 are positioned.

The first Halbach array 520 may enhance the strength of the magnetic field formed by itself and the magnetic field formed with the second Halbach array 530 and the magnet parts 540, 550, 560, 570. Since the direction of the magnetic field formed by the first Halbach array 520 and the process of strengthening the magnetic field are well-known techniques, the detailed description thereof will be omitted.

In the illustrated exemplary embodiment, the first Halbach array 520 includes a first block 521, a second block 522 and a third block 523. It will be understood that a plurality of magnetic materials constituting the first Halbach array 520 are each named as blocks 521, 522, 523, respectively.

The first to third blocks 521, 522, 523 may be formed of a magnetic material. In an exemplary embodiment, the first to third blocks 521, 522, 523 may be provided as permanent magnets or electromagnets.

The first to third blocks 521, 522, 523 may be arranged side by side in one direction. In the illustrated exemplary embodiment, the first to third blocks 521, 522, 523 are arranged side by side in the extending direction of the first surface 511, that is, in the left-right direction.

The first to third blocks 521, 522, 523 are arranged side by side along the above direction. Specifically, in the first to third blocks 521, 522, 523, the first block 521 is disposed on the leftmost side and the third block 523 is disposed on the rightmost side. In addition, the second block 522 is positioned between the first and third blocks 521, 523.

In an exemplary embodiment, the first to third blocks 521, 522, 523 may contact other adjacent blocks.

In this case, the first and third blocks 521, 523 may be disposed to overlap each of the fixed contacts 22*a*, 22*b* in a direction toward the space part 515, which is the front-rear direction in the illustrated exemplary embodiment.

Each of the blocks 521, 522, 523 includes a plurality of surfaces.

Specifically, the first block 521 includes a first inner surface 521*a* opposite to the second block 522 and a first outer surface 521*a* facing the second block 522.

The second block 522 includes a second inner surface 522*a* facing the space part 515 or the second Halbach array 530 and a second outer surface 522*b* opposite to the space part 515 or the second Halbach array 530.

The third block 523 includes a third inner surface 523*a* facing the second block 522 and a third outer surface 523*b* opposite to the second block 522.

The plurality of surfaces of each of the blocks 521, 522, 523 may be magnetized according to a predetermined rule to constitute a Halbach array.

Specifically, the first outer surface 521*b* and the second and third inner surfaces 522*a*, 523*a* are magnetized with the same polarity. In this case, the polarity may be the same polarity as the first outer surface 531*b* and the second and third inner surfaces 532*a*, 533*a* of the second Halbach array 530, and each of the opposite surfaces 542, 552, 562, 572 of the first and fourth magnet parts 540, 550, 560, 570.

In addition, the first inner surface 521*a* and the second and third outer surfaces 522*b*, 523*b* are magnetized with the same polarity. In this case, the polarity may be the same polarity as the first inner surface 531*a* and the second and third outer surfaces 532*b*, 533*b* of the second Halbach array 530, and each of the opposing surfaces 541, 551, 561, 571 of the first to fourth magnet parts 540, 550, 560, 570.

A plurality of magnetic materials constituting the second Halbach array 530 are sequentially arranged side by side from left to right. That is, in the illustrated exemplary embodiment, the second Halbach array 530 is formed to extend in the left-right direction.

The second Halbach array 530 may form a magnetic field together with other magnetic materials. In the illustrated exemplary embodiment, the second Halbach array 530 may form a magnetic field together with the first Halbach array 520 and the magnet parts 540, 550, 560, 570.

The second Halbach array 530 may be positioned adjacent to the other one surface of the first and second surfaces 511, 512. In an exemplary embodiment, the second Halbach array 530 may be coupled to the inner side of the other one surface (i.e., a direction toward the space part 515).

In the illustrated exemplary embodiment, the second Halbach array 530 is disposed on the inner side of the second surface 512, adjacent to the second surface 512, so as to face the first Halbach array 520 which is disposed on the inner side of the first surface 511.

Between the second Halbach array 530 and the first Halbach array 520, the space part 515 and the fixed contact 22 and the movable contact 43 accommodated in the space part 515 are positioned.

The second Halbach array 530 may enhance the strength of the magnetic field formed by itself and the magnetic field formed with the first Halbach array 520 and the magnet parts 540, 550, 560, 570. Since the direction of the magnetic field formed by the second Halbach array 530 and the process of strengthening the magnetic field are well-known techniques, the detailed description thereof will be omitted.

In the illustrated exemplary embodiment, the second Halbach array 530 includes a first block 531, a second block 532 and a third block 533. It will be understood that a plurality of magnetic materials constituting the second Halbach array 530 are each named blocks 531, 532, 533, respectively.

The first to third blocks 531, 532, 533 may be formed of a magnetic material. In an exemplary embodiment, the first to third blocks 531, 532, 533 may be provided as permanent magnets or electromagnets.

The first to third blocks 531, 532, 533 may be arranged side by side in one direction. In the illustrated exemplary embodiment, the first to third blocks 531, 532, 533 are arranged side by side in the extending direction of the second surface 512, that is, in the left-right direction.

The first to third blocks 531, 532, 533 are arranged side by side along the above direction. Specifically, in the first to third blocks 531, 532, 533, the first block 531 is disposed on the leftmost side and the third block 533 is disposed on the rightmost side.

In addition, the second block 532 is positioned between the first and third blocks 531, 533.

In an exemplary embodiment, the first to third blocks 531, 532, 533 may contact other adjacent blocks.

In this case, the first and third blocks 531, 533 may be disposed to overlap each of the fixed contacts 22*a*, 22*b* in a direction toward the space part 515, which is the front-rear direction in the illustrated exemplary embodiment.

Each of the blocks 531, 532, 533 includes a plurality of surfaces.

Specifically, the first block 531 includes a first inner surface 531*a* opposite to the second block 532 and a first outer surface 531*a* facing the second block 532.

The second block 532 includes a second inner surface 532*a* facing the space part 515 or the first Halbach array 520 and a second outer surface 532*b* opposite to the space part 515 or the first Halbach array 520.

The third block 533 includes a third inner surface 533*a* facing the second block 522 and a third outer surface 523*b* opposite to the second block 532.

The plurality of surfaces of each of the blocks 531, 532, 533 may be magnetized according to a predetermined rule to constitute a Halbach array.

Specifically, the first outer surface 531*b* and the second and third inner surfaces 532*a*, 533*a* are magnetized with the same polarity. In this case, the polarity may be the same polarity as the first outer surface 521*b* and the second and third inner surfaces 522*a*, 523*a* of the first Halbach array 520, and each of the opposite surfaces 542, 552, 562, 572 of the first to fourth magnet parts 540, 550, 560, 570.

In addition, the first inner surface 531*a* and the second and third outer surfaces 532*b*, 533*b* are magnetized with the same polarity. In this case, the polarity may be the same polarity as the first inner surface 521*a* and the second and third outer surfaces 522*b*, 523*b* of the first Halbach array, and each of the opposing surfaces 541, 551, 561, 571 of the first to fourth magnet parts 540, 550, 560, 570.

The first to fourth magnet parts 540, 550, 560, 570 form a magnetic field on their own or together with the first and second Halbach arrays 520, 530. The arc path (A.P) may be formed inside the arc chamber 21 by the magnetic field formed by the first to fourth magnet parts 540, 550, 560, 570.

The first to fourth magnet parts 540, 550, 560, 570 may be provided in any shape capable of forming a magnetic field by being magnetized. In an exemplary embodiment, the first to fourth magnet parts 540, 550, 560, 570 may be provided as permanent magnets or electromagnets.

The first magnet part 540 and the second magnet part 550 may be positioned adjacent to any one of the third surface 513 and the fourth surface 514. In the illustrated exemplary embodiment, the first magnet part 540 and the second magnet part 550 are positioned adjacent to the third surface 513.

The first magnet part 540 and the second magnet part 550 may be disposed side by side and adjacent to each other in an extension direction thereof, which is the front-rear direction in the illustrated exemplary embodiment. In an exemplary embodiment, the first magnet part 540 and the second magnet part 550 may be in contact with each other.

The first magnet part 540 and the second magnet part 550 may be positioned to be biased toward any one surface of the first surface 511 and the second surface 512, respectively. In the illustrated exemplary embodiment, the first magnet part 540 is positioned to be biased toward the first surface 511, and the second magnet part 550 is positioned to be biased toward the second surface 512.

The third magnet part 560 and the fourth magnet part 570 may be positioned adjacent to the other one surface of the third surface 513 and the fourth surface 514. In the illustrated exemplary embodiment, the third magnet part 560 and the fourth magnet part 570 are positioned adjacent to the fourth surface 514.

The third magnet part 560 and the fourth magnet part 570 may be disposed side by side and adjacent to each other in an extension direction thereof, which is the front-rear direction in the illustrated exemplary embodiment. In an exemplary embodiment, the third magnet part 560 and the fourth magnet part 570 may be in contact with each other.

The third magnet part 560 and the fourth magnet part 570 may be positioned to be biased toward the other surface of the first surface 511 and the second surface 512, respectively. In the illustrated exemplary embodiment, the third magnet part 560 is positioned to be biased toward the first surface 511, and the fourth magnet part 570 is positioned to be biased toward the second surface 512.

In an exemplary embodiment, the first and second magnet parts 540, 550 may be coupled to the third surface 513, and the third and fourth magnet parts 560, 570 may be coupled to the inner side of the fourth surface 514 (i.e., direction toward the space part 515), respectively.

The first to fourth magnet parts 540, 550, 560, 570 are formed to extend in one direction. In the illustrated exemplary embodiment, the first to fourth magnet parts 540, 550, 560, 570 are formed to extend in the front-rear direction.

The first and third magnet parts 540, 560 may be disposed to face each other with the space part 515 interposed therebetween. In addition, the second and fourth magnet parts 550, 570 may be disposed to face each other with the space part 515 interposed therebetween.

Each of the magnet parts 540, 550, 560, 570 includes a plurality of surfaces.

The first magnet part 540 includes a first opposing surface 541 facing the second magnet part 550 and a first opposite surface 542 opposite to the second magnet part 550.

The second magnet part 550 includes a second opposing surface 551 facing the first magnet part 540 and a second opposite surface 552 facing the first magnet part 540.

The third magnet part 560 includes a third opposing surface 561 facing the fourth magnet part 570 and a third opposite surface 562 opposite to the fourth magnet part 570.

The fourth magnet part 570 includes a fourth opposing surface 571 facing the third magnet part 560 and a fourth opposite surface 572 opposite to the third magnet part 560.

Each surface of the first to fourth magnet parts 540, 550, 560, 570 may be magnetized according to a predetermined rule.

Specifically, each of the opposing surfaces 541, 551, 561, 571 is magnetized with the same polarity as the first inner surface 521*a*, 531*a* and the second and third outer surface 522*b*, 532*b* of the first and second Halbach arrays 520, 530, 523*b*, 533*b*.

Similarly, each of the opposite surfaces 542, 552, 562, 572 is magnetized with the same polarity as the first outer surfaces 521*b*, 531*b* and the second and third inner surfaces 522*a*, 532*a*, 523*a*, 533*a* of the first and second Halbach arrays 520, 530.

Hereinafter, the arc path (A.P) formed by the arc path generation unit 500 according to the present exemplary embodiment will be described in detail with reference to FIG. 18.

Figure 18:
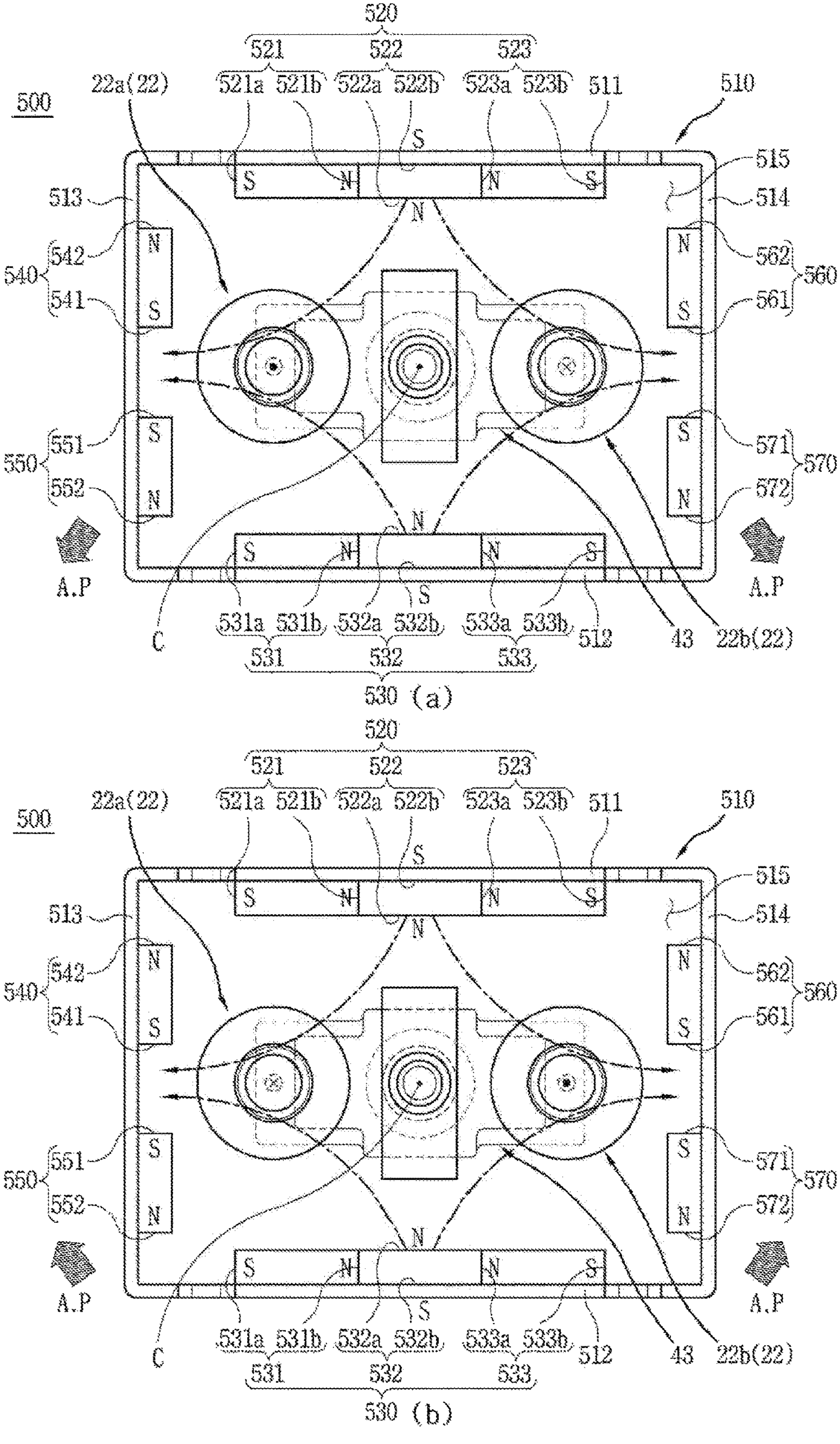
FIG. 18 is a conceptual diagram illustrating paths of a magnetic field and an arc formed by the arc path generation unit according to the exemplary embodiment of FIG. 17.

Referring to FIG. 18, the first outer surfaces 521*b*, 531*b* and the second and third inner surfaces 522*a*, 532*a*, 523*a*, 533*a* of the first and second Halbach arrays 520, 530 are magnetized to the N pole. In addition, according to the predetermined rule, the opposing surfaces 541, 551, 561, 571 of the first to fourth magnet parts 540, 550, 560, 570 are magnetized to the S pole, which is a different polarity.

Accordingly, a magnetic field is formed between the first and second Halbach arrays 520, 530 in a direction to repel each other. In addition, between the first and second Halbach arrays 520, 530 and the first to fourth magnet parts 540, 550, 560, 570, a magnetic field in a direction toward each of the opposing surfaces 541, 551, 561, 571 is formed on each of the second inner surfaces 522*a*, 532*a*.

In the exemplary embodiment illustrated in (a) of FIG. 18, the direction of the current is a direction from the second fixed contact 22*b* to the movable contact 43 and out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 18, the direction of the current is a direction from the first fixed contact 22*a* to the movable contact 43 and out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach arrays 520, 530 and the magnet parts 540, 550, 560, 570 is changed, the directions of the magnetic fields formed in the Halbach arrays 520, 530 and the magnet parts 540, 550, 560, 570 become reversed. Accordingly, the path (A.P) of the generated electromagnetic force and arc is also formed to be reversed in the front-rear direction.

That is, in the energized situation as shown in (a) of FIG. 18, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 18, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach arrays 520, 530 and the magnet parts 540, 550, 560, 570 or the direction of the current supplied to the DC relay 1, the arc path generation unit 500 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(6) Description of the Arc Path Generation Unit 600 According to Another Exemplary Embodiment of the Present Disclosure Hereinafter, the arc path generation unit 600 according to another exemplary embodiment of the present disclosure will be described with reference to FIGS. 19 to 22.

Figure 19:
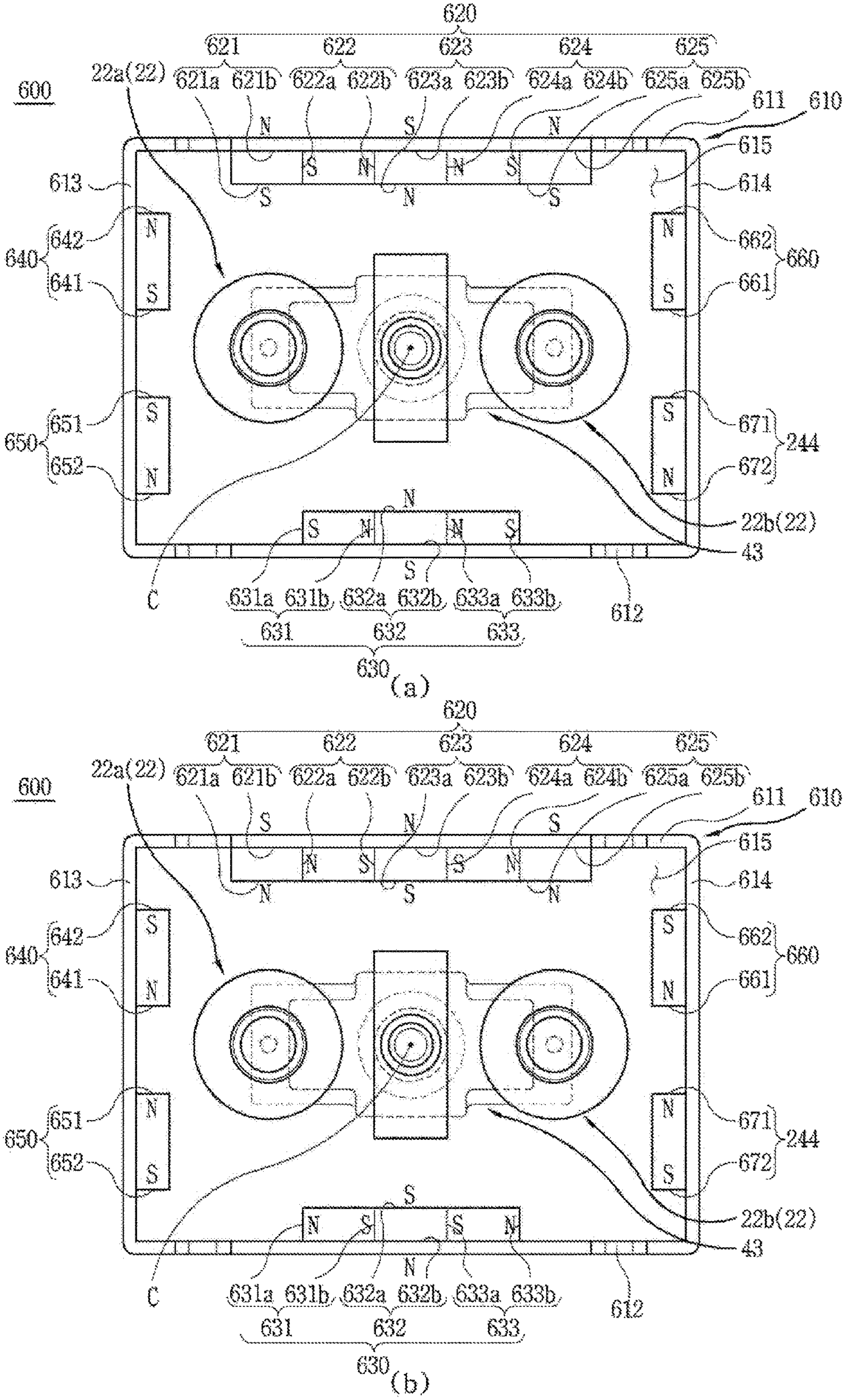
FIGS. 19 and 20 are conceptual diagrams illustrating the arc path generation unit according to still another exemplary embodiment of the present disclosure.
Figure 20:
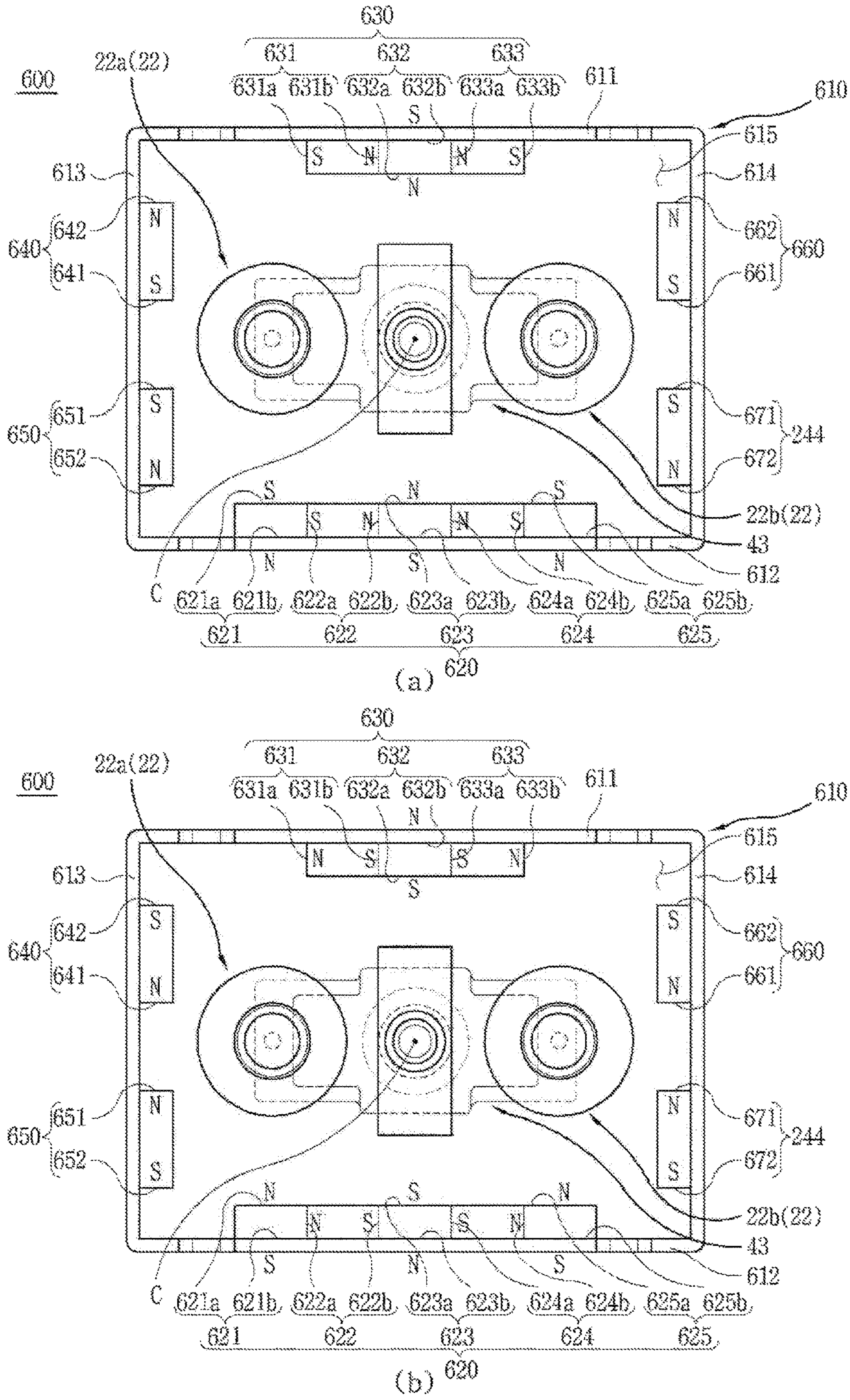

Referring to FIGS. 19 to 20, the arc path generation unit 600 according to the illustrated exemplary embodiment includes a magnetic frame 610, a first Halbach array 620, a second Halbach array 630, and a first magnet part 640, a second magnet part 650, a third magnet part 660 and a fourth magnet part 670.

The magnetic frame 610 according to the present exemplary embodiment has the same structure and function as the magnetic frame 110 according to the above-described exemplary embodiment. However, there is a difference in the arrangement method of the first Halbach array 620, the second Halbach array 630, the first magnet part 640, the second magnet part 650, the third magnet part 660 and the fourth magnet part 670 disposed on the magnetic frame 610 according to the present exemplary embodiment.

Accordingly, the description of the magnetic frame 610 will be replaced with the description of the magnetic frame 110 according to the above-described exemplary embodiment.

A plurality of magnetic materials constituting the first Halbach array 620 are sequentially arranged side by side from left to right. That is, in the illustrated exemplary embodiment, the first Halbach array 620 is formed to extend in the left-right direction.

The first Halbach array 620 may form a magnetic field together with other magnetic materials. In the illustrated exemplary embodiment, the first Halbach array 620 may form a magnetic field together with the second Halbach array 630 and the first to fourth magnet parts 640, 650, 660, 670.

The first Halbach array 620 may be positioned adjacent to any one surface of the first and second surfaces 611, 612. In an exemplary embodiment, the first Halbach array 620 may be coupled to the inner side of the any one surface (i.e., a direction toward the space part 615).

In the exemplary embodiment illustrated in FIG. 19, the first Halbach array 620 is disposed on the inner side of the first surface 611, adjacent to the first surface 611, so as to face the second Halbach array 630 which is disposed on the inner side of the second surface 612.

In the exemplary embodiment illustrated in FIG. 20, the first Halbach array 620 is disposed on the inner side of the second surface 612, adjacent to the second surface 612, so as to face the second Halbach array 630 which is disposed on the inner side of the first surface 611.

Between the first Halbach array 620 and the second Halbach array 630, the space part 615 and the fixed contact 22 and the movable contact 43 accommodated in the space part 615 are positioned.

The first Halbach array 620 may strengthen the magnetic field formed by itself and the strength of the magnetic field formed with the second Halbach array 630 and the first to fourth magnet parts 640, 650, 660, 670. Since the direction of the magnetic field formed by the first Halbach array 620 and the process of strengthening the magnetic field are well-known techniques, the detailed description thereof will be omitted.

In the illustrated exemplary embodiment, the first Halbach array 620 includes a first block 621, a second block 622, a third block 623, a fourth block 624 and a fifth block 625. It will be understood that a plurality of magnetic materials constituting the first Halbach array 620 are each named blocks 621, 622, 623, 624, 625, respectively.

The first to fifth blocks 621, 622, 623, 624, 625 may be formed of a magnetic material. In an exemplary embodiment, the first to fifth blocks 621, 622, 623, 624, 625 may be provided as permanent magnets or electromagnets.

The first to fifth blocks 621, 622, 623, 624, 625 may be arranged side by side in one direction. In the illustrated exemplary embodiment, the first to fifth blocks 621, 622, 623, 624, 625 are arranged side by side in the extending direction of the first surface 611 or the second surface 612, that is, in the left-right direction.

The first to fifth blocks 621, 622, 623, 624, 625 are arranged side by side along the above direction. Specifically, in the first to fifth blocks 621, 622, 623, 624, 625, the first block 621 is disposed on the leftmost side and the fifth block 625 is disposed on the rightmost side. In addition, the second to fourth blocks 622, 623, 624 are arranged side by side in a direction from left to right between the first and fifth blocks 621, 625.

In an exemplary embodiment, the first to fifth blocks 621, 622, 623, 624, 625 may contact other adjacent blocks.

In this case, the first and fifth blocks 621, 625 may be disposed to overlap each of the fixing contacts 22*a*, 22*b* in a direction toward the second surface 612, which is the front-rear direction in the illustrated exemplary embodiment.

Each of the blocks 621, 622, 623, 624, 625 includes a plurality of surfaces.

Specifically, the first block 621 includes a first inner surface 621*a* facing the space part 615 or the second Halbach array 630 and a first outer surface 621*b* opposite to the space part 615 or the second Halbach array 630.

The second block 622 includes a second inner surface 622*a* facing the first block 621 and a second outer surface 622*b* facing the third block 623.

The third block 623 includes a third inner surface 623*a* facing the space part 615 or the second Halbach array 630 and a third outer surface 623*b* opposite to the space part 615 or the second Halbach array 630.

The fourth block 624 includes a third inner surface 624*a* facing the third block 623 and a fourth outer surface 624*b* facing the fifth block 625.

The fifth block 625 includes a fifth inner surface 625*a* facing the space part 615 or second Halbach array 630 and a fifth outer surface 625*b* opposite to the space part 615 or second Halbach array 630.

The plurality of surfaces of each of the blocks 621, 622, 623, 624, 625 may be magnetized according to a predetermined rule to constitute a Halbach array.

Specifically, the first, second and fifth inner surfaces 621*a*, 622*a*, 625*a* and the third and fourth outer surfaces 623*b*, 624*b* are magnetized with the same polarity. In this case, the polarity may be the same polarity as the first inner surface 631*a* and the second and third outer surfaces 632*b*, 633*b* of the second Halbach array 630, and each of the opposing surfaces 641, 651, 661, 671 of the first to fourth magnet parts 640, 650, 660, 670.

In addition, the first, second and fifth outer surfaces 621*b*, 622*b*, 625*b* and the third and fourth inner surfaces 623*a*, 624*a* are magnetized with a polarity different from the polarity. In this case, the polarity may be the same polarity as the second and third inner surfaces 632*a*, 633*a* and the first outer surface 631*b* of the second Halbach array 630, and each of the opposite surfaces 642, 652, 662, 672 of the first to fourth magnet parts 640, 650, 660, 670.

A plurality of magnetic materials constituting the second Halbach array 630 are sequentially arranged side by side from left to right. That is, in the illustrated exemplary embodiment, the second Halbach array 630 is formed to extend in the left-right direction.

The second Halbach array 630 may form a magnetic field together with other magnetic materials. In the illustrated exemplary embodiment, the second Halbach array 630 may form a magnetic field together with the first Halbach array 620 and the first to fourth magnet parts 640, 650, 660, 670.

The second Halbach array 630 may be positioned adjacent to the other one surface of the first and second surfaces 611, 612. In an exemplary embodiment, the second Halbach array 630 may be coupled to the inner side of the other one surface (i.e., a direction toward the space part 615).

In the exemplary embodiment illustrated in FIG. 19, the second Halbach array 630 is disposed on the inner side of the second surface 612, adjacent to the second surface 612, so as to face the first Halbach array 620 which is disposed on the inner side of the first surface 611.

In the exemplary embodiment illustrated in FIG. 20, the second Halbach array 630 is disposed on the inner side of the first surface 611, adjacent to the first surface 611, so as to face the first Halbach array which is disposed on the inner side of the second surface 612.

Between the second Halbach array 630 and the first Halbach array 620, the space part 615 and the fixed contact 22 and the movable contact 43 accommodated in the space part 615 are positioned.

The second Halbach array 630 may strengthen the magnetic field formed by itself and the strength of the magnetic field formed with the first Halbach array 620 and the first to fourth magnet parts 640, 650, 660, 670. Since the direction of the magnetic field formed by the second Halbach array 630 and the process of strengthening the magnetic field are well-known techniques, the detailed description thereof will be omitted.

In the illustrated exemplary embodiment, the second Halbach array 630 includes a first block 631, a second block 632 and a third block 633. It will be understood that a plurality of magnetic materials constituting the second Halbach array 630 are each named blocks 631, 632, 633, respectively.

The first to third blocks 631, 632, 633 may be formed of a magnetic material. In an exemplary embodiment, the first to third blocks 631, 632, 633 may be provided as permanent magnets or electromagnets.

The first to third blocks 631, 632, 633 may be arranged side by side in one direction. In the illustrated exemplary embodiment, the first to third blocks 631, 632, 633 are arranged side by side in the extending direction of the second surface 612, that is, in the left-right direction.

The first to third blocks 631, 632, 633 are arranged side by side along the above direction. Specifically, in the first to third blocks 631, 632, 633, the first block 631 is disposed on the leftmost side, and the third block 633 is disposed on the rightmost side.

In addition, the second block 632 is positioned between the first and third blocks 631, 633.

In an exemplary embodiment, the first to third blocks 631, 632, 633 may contact other adjacent blocks.

In this case, the first and third blocks 631, 633 may be disposed to overlap each of the fixed contacts 22*a*, 22*b* in a direction toward the second surface 612, which is the front-rear direction in the illustrated exemplary embodiment, respectively. In the above exemplary embodiment, the extension lengths of the first Halbach array 620 and the second Halbach array 630 may be the same.

Each of the blocks 631, 632, 633 includes a plurality of surfaces.

Specifically, the first block 631 includes a first inner surface 631*a* opposite to the second block 632 and a first outer surface 631*a* facing the second block 632.

The second block 632 includes a second inner surface 632*a* facing the space part 615 or first Halbach array 620 and a second outer surface 632*b* opposite to the space part 615 or first Halbach array 620.

The third block 633 includes a third inner surface 633*a* facing the second block 622 and a third outer surface 633*b* opposite to the second block 632.

The plurality of surfaces of each of the blocks 631, 632, 633 may be magnetized according to a predetermined rule to constitute a Halbach array.

Specifically, the first inner surface 631*a* and the second and third outer surfaces 632*b*, 633*b* are magnetized with the same polarity. In this case, the polarity may be the same polarity as the first inner surface 621*a* and the second and third outer surfaces 622*b*, 623*b* of the first Halbach array 620, and each of the opposing surfaces 641, 651, 661, 671 of the first to fourth magnet parts 640, 650, 660, 670.

In addition, the first outer surface 631*b* and the second and third inner surfaces 632*a*, 633*a* are magnetized with a polarity which is different from the polarity. In this case, the polarity may be the same polarity as the first outer surface 621*b* and the second and third inner surfaces 622*a*, 623*a* of the first Halbach array 620, and each of the opposite surfaces 642, 652, 662, 672 of the first to fourth magnet parts 640, 650, 660, 670.

The first to fourth magnet parts 640, 650, 660, 670 form a magnetic field on their own or together with the first and second Halbach arrays 620, 630. The arc path (A.P) may be formed inside the arc chamber 21 by the magnetic field formed by the first to fourth magnet parts 640, 650, 660, 670.

The first to fourth magnet parts 640, 650, 660, 670 may be provided in any shape capable of forming a magnetic field by being magnetized. In an exemplary embodiment, the first to fourth magnet parts 640, 650, 660, 670 may be provided as permanent magnets or electromagnets.

The first magnet part 640 and the second magnet part 650 may be positioned adjacent to any one of the third surface 613 and the fourth surface 614. In the illustrated exemplary embodiment, the first magnet part 640 and the second magnet part 650 are positioned adjacent to the third surface 613.

The first magnet part 640 and the second magnet part 650 may be disposed side by side and adjacent to each other in an extension direction thereof, which is the front-rear direction in the illustrated exemplary embodiment. In an exemplary embodiment, the first magnet part 640 and the second magnet part 650 may be in contact with each other.

The first magnet part 640 and the second magnet part 650 may be positioned to be biased toward any one surface of the first surface 611 and the second surface 612, respectively. In the illustrated exemplary embodiment, the first magnet part 640 is positioned to be biased toward the first surface 611, and the second magnet part 650 is positioned to be biased toward the second surface 612.

The third magnet part 660 and the fourth magnet part 670 may be positioned adjacent to the other of the third surface 613 and the fourth surface 614. In the illustrated exemplary embodiment, the third magnet part 660 and the fourth magnet part 670 are positioned adjacent to the fourth surface 614.

The third magnet part 660 and the fourth magnet part 670 may be disposed side by side and adjacent to each other in an extension direction thereof, which is the front-rear direction in the illustrated exemplary embodiment. In an exemplary embodiment, the third magnet part 660 and the fourth magnet part 670 may contact each other.

The third magnet part 660 and the fourth magnet part 670 may be positioned to be biased toward the other one surface of the first surface 611 and the second surface 612, respectively. In the illustrated exemplary embodiment, the third magnet part 660 is positioned to be biased toward the first surface 611, and the fourth magnet part 670 is positioned to be biased toward the second surface 612.

In an exemplary embodiment, the first and second magnet parts 640, 650 may be coupled to the third surface 613, and the third and fourth magnet parts 660, 670 may be coupled to the inner side of the fourth surface 614 (i.e., a direction toward the space part 615), respectively.

The first to fourth magnet parts 640, 650, 660, 670 are formed to extend in one direction. In the illustrated exemplary embodiment, the first to fourth magnet parts 640, 650, 660, 670 are formed to extend in the front-rear direction.

The first and third magnet parts 640, 660 may be disposed to face each other with the space part 615 interposed therebetween. In addition, the second and fourth magnet parts 650, 670 may be disposed to face each other with the space part 615 interposed therebetween.

Each of the magnet parts 640, 650, 660, 670 includes a plurality of surfaces.

The first magnet part 640 includes a first opposing surface 641 facing the second magnet part 650 and a first opposite surface 642 opposite to the second magnet part 650.

The second magnet part 650 includes a second opposing surface 651 facing the first magnet part 640 and a second opposite surface 652 opposite to the first magnet part 640.

The third magnet part 660 includes a third opposing surface 661 facing the fourth magnet part 670 and a third opposite surface 662 opposite to the fourth magnet part 670.

The fourth magnet part 670 includes a fourth opposing surface 671 facing the third magnet part 660 and a fourth opposite surface 672 opposite to the third magnet part 660.

Each surface of the first to fourth magnet parts 640, 650, 660, 670 may be magnetized according to a predetermined rule.

Specifically, each of the opposing surfaces 641, 651, 661, 671 is magnetized with the same polarity as the first, second and fifth inner surfaces 621*a*, 622*a*, 625*a* and the third and fourth outer surfaces 623*b*, 624*b* of the first Halbach array 620. In addition, each of the opposing surfaces 641, 651, 661, 671 is magnetized with the same polarity as the first inner surface 631*a* and the second and third outer surfaces 632*b*, 633*b* of the second Halbach array 630.

Similarly, each of the opposite surfaces 642, 652, 662, 672 is magnetized with the same polarity as the first, second and fifth outer surfaces 621*b*, 622*b*, 625*b* and third and fourth inner surfaces 623*a*, 624*a* of the first Halbach array 620. In addition, each of the opposite surfaces 642, 652, 662, 672 is magnetized with the same polarity as the first outer surface 631*b* and the second and third inner surfaces 632*a*, 633*a* of the second Halbach array 630.

Hereinafter, the arc path (A.P) formed by the arc path generation unit 600 according to the present exemplary embodiment will be described in detail with reference to FIGS. 21 to 22.

Figure 21:
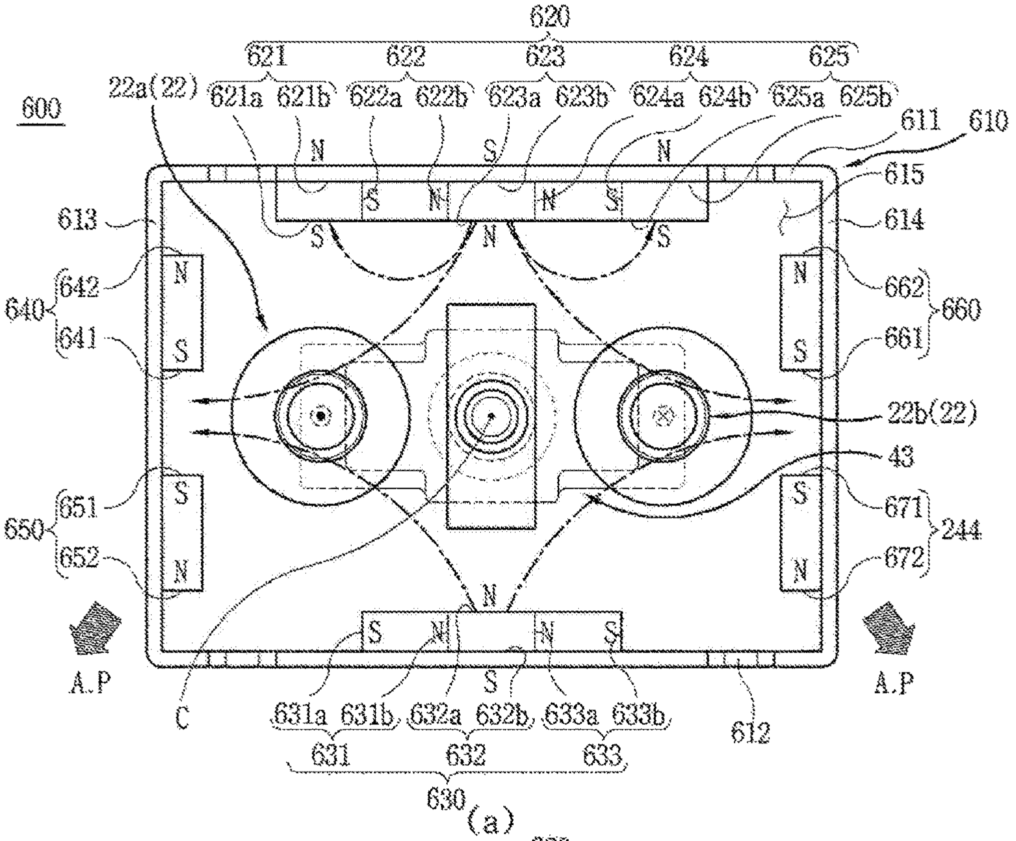
FIGS. 21 and 22 are conceptual diagrams illustrating the paths of a magnetic field and an arc formed by the arc path generation unit according to the exemplary embodiment of FIGS. 19 and 20.
Figure 21:
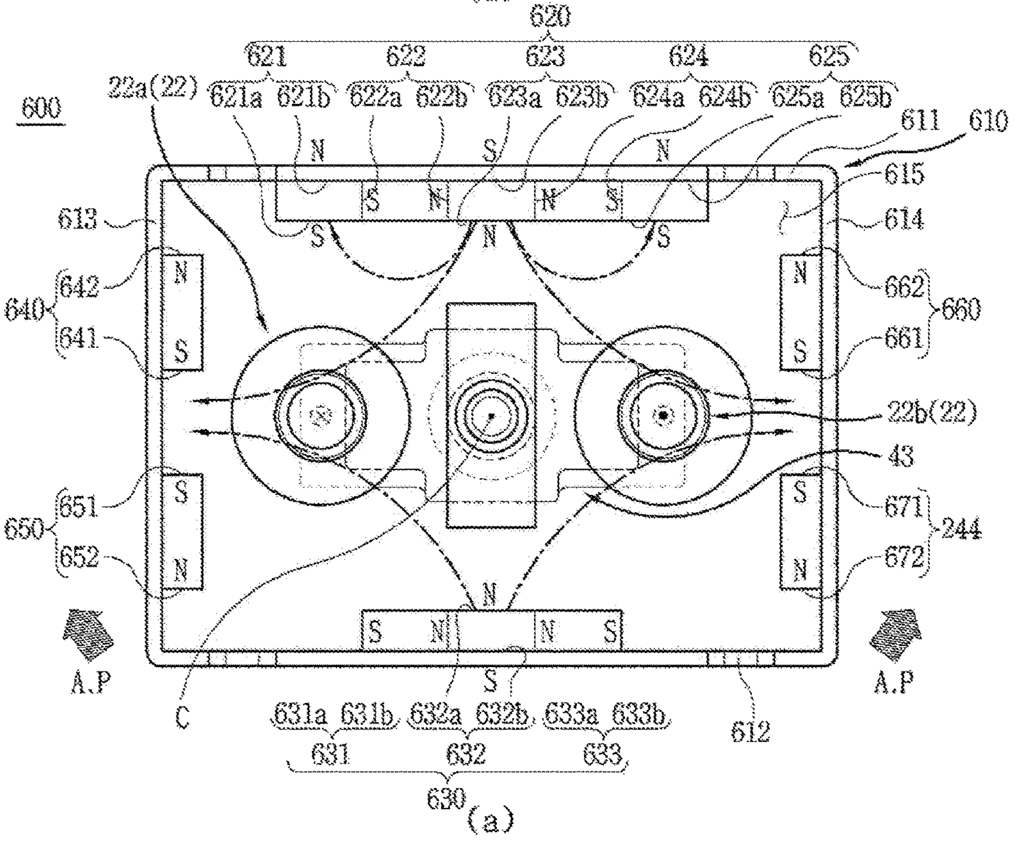
Figure 22:
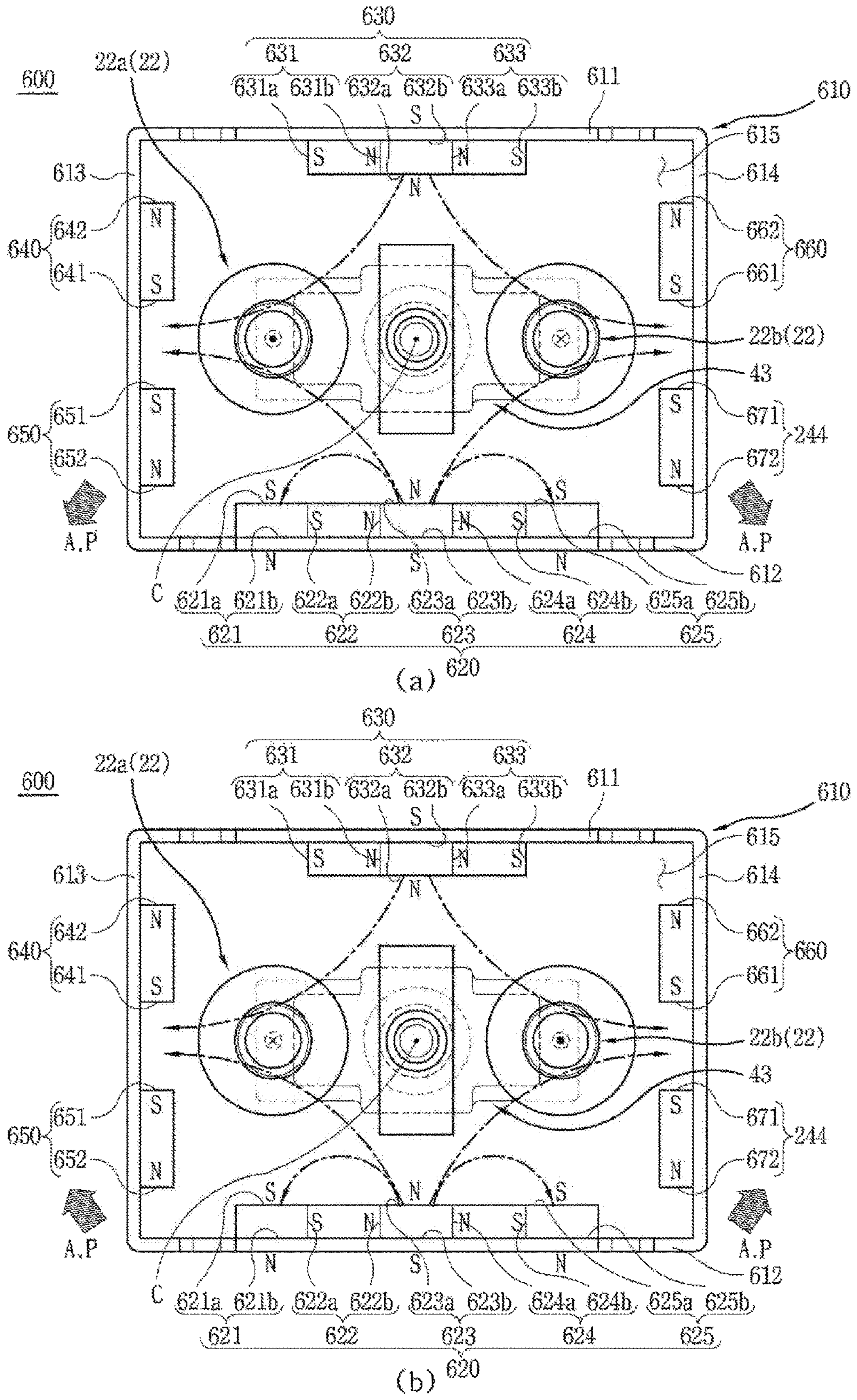

Referring to FIGS. 21 and 22, the first, second and fifth outer surfaces 621*b*, 622*b*, 625*b* and the third and fourth inner surfaces 623*a*, 624*a* of the first Halbach array 620 are magnetized to the N pole. The first outer surface 631*b* and the second and third inner surfaces 632*a*, 633*a* of the second Halbach array 630 are also magnetized to an N-pole.

Furthermore, according to the predetermined rule, the opposing surfaces 641, 651, 661, 671 of the first to fourth magnet parts 640, 650, 660, 670 are magnetized to the S pole, which is a different polarity.

Accordingly, a magnetic field is formed between the first and second Halbach arrays 620, 630 to repel each other. In addition, between the first and second Halbach arrays 620, 630 and the first to fourth magnet parts 640, 650, 660, 670, a magnetic field in a direction from the third inner surface 623*a* and the second inner surface 632*a* toward each of the opposing surfaces 641, 651, 661, 671 is formed.

In the exemplary embodiment illustrated in (a) of FIG. 21 and (a) of FIG. 22, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 21 and (b) of FIG. 22, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach arrays 620, 630 and the magnet parts 640, 650, 660, 670 is changed, the directions of the magnetic fields formed in the Halbach arrays 620, 630 and the magnet parts 640, 650, 660, 670 become reversed. Accordingly, the path (A.P) of the generated electromagnetic force and arc is also formed to be reversed in the front-rear direction.

That is, in the energized situation as shown in (a) of FIG. 21 and (a) of FIG. 22, the path (A.P) of the electromagnetic force and arc in the vicinity of the first fixed contact 22*a* is formed toward the rear left side. In addition, the path (A.P)

of the electromagnetic force and arc in the vicinity of the second fixed contact 22*b* is formed toward the rear right side.

Similarly, in the energized situation as shown in (b) of FIG. 21 and (b) of FIG. 22, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Accordingly, regardless of the polarity of the Halbach arrays 620, 630 and the magnet parts 640, 650, 660, 670 or the direction of the current passed through the DC relay 1, the arc path generation unit 600 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(7) Description of the Arc Path Generation Unit 700 According to Another Exemplary Embodiment of the Present Disclosure Hereinafter, the arc path generation unit 700 according to another exemplary embodiment of the present disclosure will be described with reference to FIGS. 23 to 26.

Figure 23:
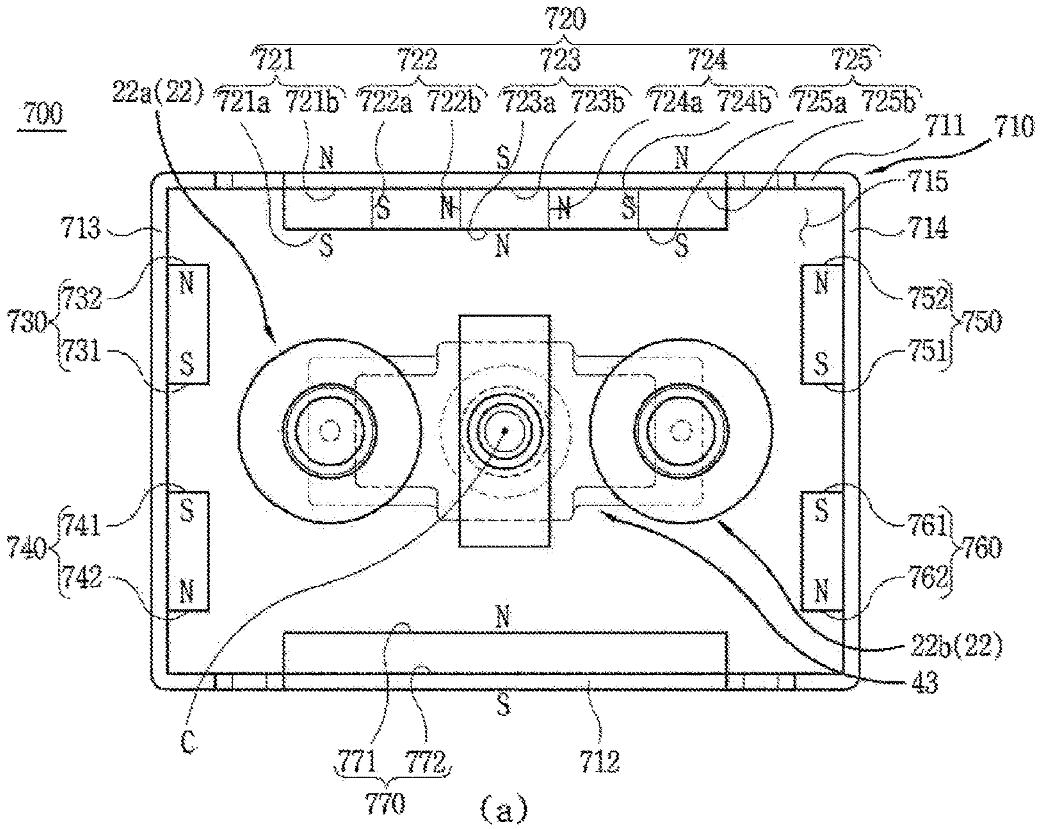
FIGS. 23 and 24 are conceptual diagrams illustrating the arc path generation unit according to still another exemplary embodiment of the present disclosure.
Figure 23:
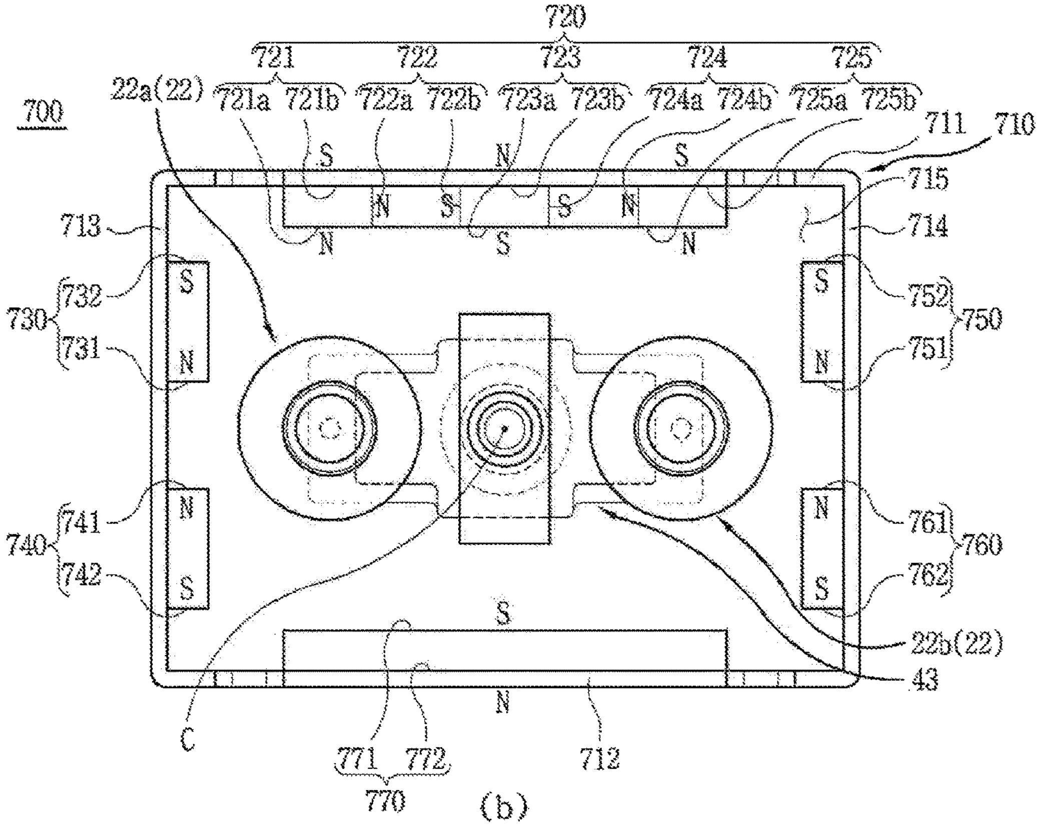
Figure 24:
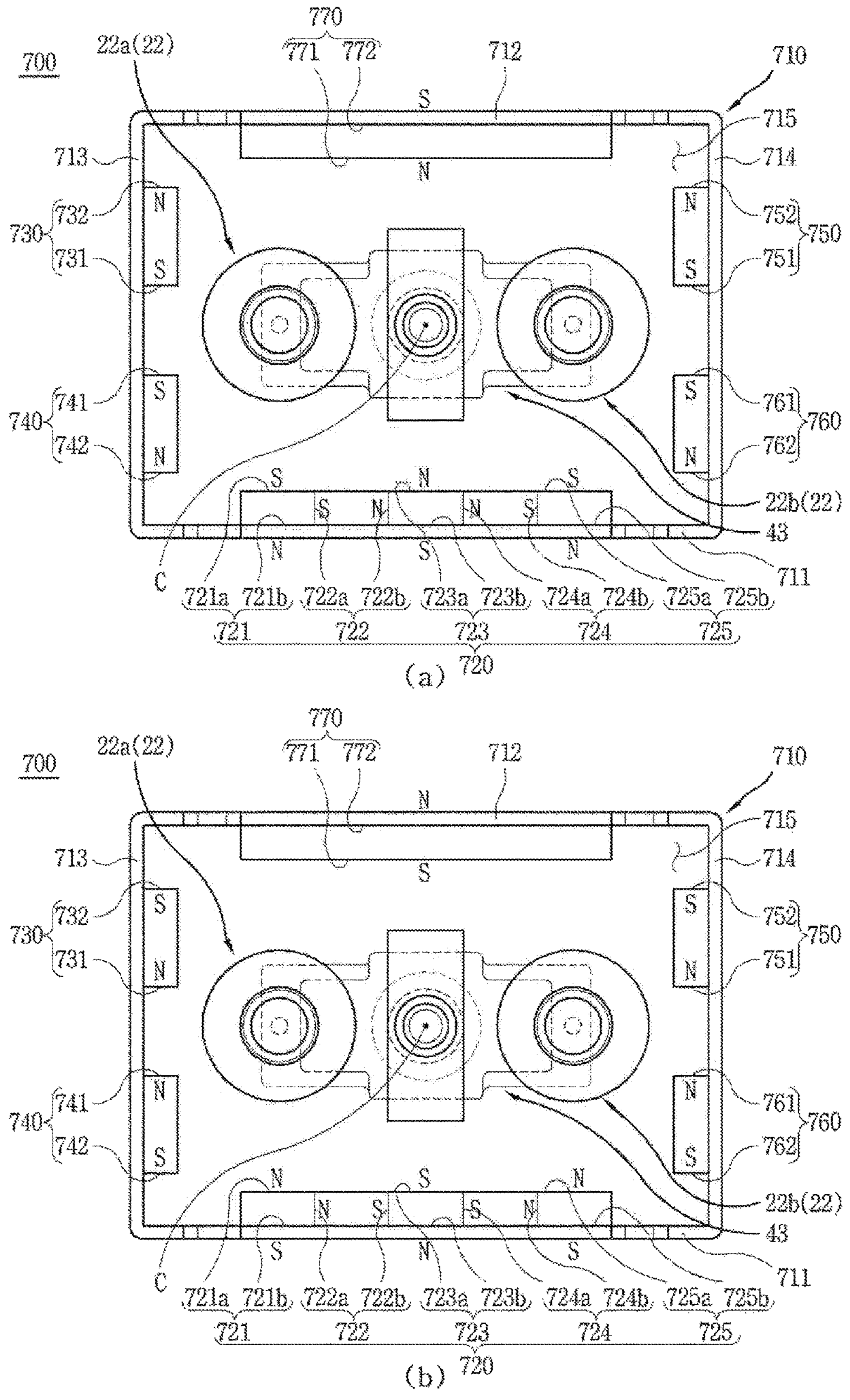

Referring to FIGS. 23 and 24, the arc path generation unit 700 according to the illustrated exemplary embodiment includes a magnetic frame 710, a Halbach array 720, a first magnet part 730, and a second magnet part 740, a third magnet part 750, a fourth magnet part 760 and a fifth magnet part 770.

The magnetic frame 710 according to the present exemplary embodiment has the same structure and function as the magnetic frame 110 according to the above-described exemplary embodiment. However, there is a difference in the arrangement method of the Halbach array 720, the first magnet part 730, the second magnet part 740, the third magnet part 750, the fourth magnet part and the fifth magnet part 770 disposed on the magnetic frame 710 according to the present exemplary embodiment.

Accordingly, the description of the magnetic frame 710 will be replaced with the description of the magnetic frame 110 according to the above-described exemplary embodiment.

A plurality of magnetic materials constituting the Halbach array 720 are sequentially arranged side by side from left to right. That is, in the illustrated exemplary embodiment, the Halbach array 720 is formed to extend in the left-right direction.

The Halbach array 720 may form a magnetic field with other magnetic materials. In the illustrated exemplary embodiment, the Halbach array 720 may form a magnetic field together with the first to fifth magnet parts 730, 740, 750, 760, 770.

The Halbach array 720 may be positioned adjacent to any one surface of the first and second surfaces 711, 712. In an exemplary embodiment, the Halbach array 720 may be coupled to the inner side of the any one surface (i.e., a direction toward the space part 715).

In the exemplary embodiment illustrated in FIG. 23, the Halbach array 720 is disposed on the inner side of the first surface 711, adjacent to the first surface 711 712, so as to face the fifth magnet part 770 which is disposed on the inner side of the second surface 712.

In the exemplary embodiment illustrated in FIG. 24, the Halbach array 720 is disposed on the inner side of the second surface 712, adjacent to the second surface 712, so as to face the fifth magnet part 770 which is disposed on the inner side of the first surface 711.

Between the Halbach array 720 and the fifth magnet part 770, the space part 715 and the fixed contact 22 and the movable contact 43 accommodated in the space part 715 are positioned.

The Halbach array 720 may enhance the strength of the magnetic field formed by itself and the magnetic field formed with the first to fifth magnet parts 730, 740, 750, 760, 770. Since the direction of the magnetic field formed by the Halbach array 720 and the process of strengthening the magnetic field are well-known techniques, the detailed description thereof will be omitted.

In the illustrated exemplary embodiment, the Halbach array 720 includes a first block 721, a second block 722, a third block 723, a fourth block 724 and a fifth block 725. It will be understood that a plurality of magnetic materials constituting the Halbach array 720 are each named as blocks 721, 722, 723, 724, 725, respectively.

The first to fifth blocks 721, 722, 723, 724, 725 may be formed of a magnetic material. In an exemplary embodiment, the first to fifth blocks 721, 722, 723, 724, 725 may be provided as permanent magnets or electromagnets.

The first to fifth blocks 721, 722, 723, 724, 725 may be arranged side by side in one direction. In the illustrated exemplary embodiment, the first to fifth blocks 721, 722, 723, 724, 725 are arranged side by side in the extending direction of the first surface 711, that is, in the left-right direction.

The first to fifth blocks 721, 722, 723, 724, 725 are arranged side by side along the above direction. Specifically, in the first to fifth blocks 721, 722, 723, 724, 725, the first block 721 is disposed on the leftmost side, and the fifth block 725 is disposed on the rightmost side. In addition, the second to fourth blocks 722, 723, 724 are disposed side by side in a direction from left to right between the first and fifth blocks 721, 725.

In an exemplary embodiment, the first to fifth blocks 721, 722, 723, 724, 725 may contact other adjacent blocks.

In this case, the first and fifth blocks 721, 725 are disposed to overlap the first and second fixed contacts 22*a*, 22*b* in a direction toward the second surface 712, which is the front-rear direction in the illustrated exemplary embodiment, respectively.

Each of the blocks 721, 722, 723, 724, 725 includes a plurality of surfaces.

Specifically, the first block 721 includes a first inner surface 721*a* facing the space part 715 or the fifth magnet part 770 and a first outer surface 721*b* opposite to the space part 715 or the fifth magnet part 770.

The second block 722 includes a second inner surface 722*a* facing the first block 721 and a second outer surface 722*b* facing the third block 723.

The third block 723 includes a third inner surface 723*a* facing the space part 715 or the fifth magnet 770 and a third outer surface 723*b* opposite to the space part 715 or the fifth magnet 770.

The fourth block 724 includes a fourth inner surface 724*a* facing the third block 723 and a fourth outer surface 724*b* facing the fifth block 725.

The fifth block 725 includes a fifth inner surface 725*a* facing the space part 715 or the fifth magnet 770 and a fifth outer surface 725*b* opposite to the space part 715 or the fifth magnet 770.

The plurality of surfaces of each of the blocks 721, 722, 723, 724, 725 may be magnetized according to a predetermined rule to constitute a Halbach array.

Specifically, the first, second and fifth inner surfaces 721*a*, 722*a*, 725*a* and the third and fourth outer surfaces 723*b*, 724*b* are magnetized with the same polarity. In this case, the polarity may be the same polarity as the first to fourth opposing surfaces 731, 741, 751, 761 of the first to fourth magnet parts 730, 740, 750, 760 and the fifth opposite surface 772 of the fifth magnet part 770.

In addition, the first, second and fifth outer surfaces 721*b*, 722*b*, 725*b* and the third and fourth inner surfaces 723*a*, 724*a* are magnetized with a polarity different from the polarity. In this case, the polarity may be the same polarity as the first to fourth opposite surfaces 732, 742, 752, 762 of the first to fourth magnet parts 730, 740, 750, 760 and the fifth opposing surface 771 of the fifth magnet part 770.

The first to fifth magnet parts 730, 740, 750, 760, 770 form a magnetic field by themselves or together with the first Halbach array 720. The arc path (A.P) may be formed inside the arc chamber 21 by the magnetic field formed by the first to fifth magnet parts 730, 740, 750, 760, 770.

The first to fifth magnet parts 730, 740, 750, 760, 770 may be provided in any shape capable of forming a magnetic field by being magnetized. In an exemplary embodiment, the first to fifth magnet parts 730, 740, 750, 760, 770 may be provided as permanent magnets or electromagnets.

The first magnet part 730 and the second magnet part 740 may be positioned adjacent to any one of the third surface 713 and the fourth surface 714. In the illustrated exemplary embodiment, the first magnet part 730 and the second magnet part 740 are positioned adjacent to the third surface 713.

The first magnet part 730 and the second magnet part 740 may be disposed side by side and adjacent to each other in an extension direction thereof, which is the front-rear direction in the illustrated exemplary embodiment. In an exemplary embodiment, the first magnet part 730 and the second magnet part 740 may be in contact with each other.

The first magnet part 730 and the second magnet part 740 may be positioned to be biased toward any one of the first surface 711 and the second surface 712, respectively. In the illustrated exemplary embodiment, the first magnet part 730 is positioned to be biased toward the first surface 711, and the second magnet part 740 is positioned to be biased toward the second surface 712.

The third magnet part 750 and the fourth magnet part 760 may be positioned adjacent to the other of the third surface 713 and the fourth surface 714. In the illustrated exemplary embodiment, the third magnet part 750 and the fourth magnet part 760 are positioned adjacent to the fourth surface 714.

The third magnet part 750 and the fourth magnet part 760 may be disposed side by side and adjacent to each other in an extension direction thereof, which is the front-rear direction in the illustrated exemplary embodiment. In an exemplary embodiment, the third magnet part 750 and the fourth magnet part 760 may be in contact with each other.

The third magnet part 750 and the fourth magnet part 760 may be positioned to be biased toward the other of the first surface 711 and the second surface 712, respectively. In the illustrated exemplary embodiment, the third magnet part 750 is positioned to be biased toward the first surface 711, and the fourth magnet part 760 is positioned to be biased toward the second surface 712.

In an exemplary embodiment, the first and second magnet parts 740, 750 may be coupled to the third surface 713, and the third and fourth magnet parts 760, 770 may be coupled to the inner side of the fourth surface 714 (i.e., a direction toward the space part 715), respectively.

The first to fourth magnet parts 730, 740, 750, 760 are formed to extend in one direction. In the illustrated exemplary embodiment, the first to fourth magnet parts 740, 750, 760, 770 are formed to extend in the front-rear direction.

The first and third magnet parts 730, 750 may be disposed to face each other with the space part 715 interposed therebetween. In addition, the second and fourth magnet parts 740, 760 may be disposed to face each other with the space part 715 interposed therebetween.

The fifth magnet part 770 may be positioned adjacent to the other of the first surface 711 and the second surface 712. The fifth magnet part 770 is disposed to face the Halbach array 720 with the space part 715 interposed therebetween.

In the exemplary embodiment illustrated in FIG. 23, the fifth magnet part 770 is positioned adjacent to the second surface 712. In the exemplary embodiment illustrated in FIG. 24, the fifth magnet part 770 is positioned adjacent to the first surface 711.

The fifth magnet part 770 may be positioned at a center of the other one surface. The fifth magnet part 770 is formed to extend in the extending direction of the other surface, which is the left-right direction in the illustrated exemplary embodiment. The fifth magnet part 770 may be disposed to overlap each of the fixed contacts 22*a*, 22*b* in a direction toward the space part 715, which is the front-rear direction in the illustrated exemplary embodiment.

Each of the magnet parts 730, 740, 750, 760, 770 includes a plurality of surfaces.

The first magnet part 730 includes a first opposing surface 731 facing the second magnet part 740 and a first opposite surface 732 opposite to the second magnet part 740.

The second magnet part 740 includes a second opposing surface 741 facing the first magnet part 730 and a second opposite surface 742 opposite to the first magnet part 730.

The third magnet part 750 includes a third opposing surface 751 facing the fourth magnet part 760 and a third opposite surface 752 facing the fourth magnet part 760.

The fourth magnet part 760 includes a fourth opposing surface 761 facing the third magnet part 750 and a fourth opposite surface 762 opposite to the third magnet part 750.

The fifth magnet part 770 has a fifth opposing surface 771 facing the space part 715 or Halbach array 720 and a fifth opposite surface 772 facing the space part 715 or Halbach array 720.

Each surface of the first to fifth magnet parts 730, 740, 750, 760, 770 may be magnetized according to a predetermined rule.

Specifically, the first to fourth opposing surfaces 731, 741, 751, 761 and the fifth opposite surface 772 are magnetized with the same polarity as the first, second and fifth inner surfaces 721*a*, 722*a*, 725*a* and the third and fourth outer surfaces 723*b*, 724*b* of the Halbach array 720.

Similarly, the first to fourth opposite surfaces 732, 742, 752, 762 and the fifth opposite surface 771 are magnetized with the same polarity as the first, second and fifth outer faces 721*b*, 722*b*, 725*b* and the third and fourth inner surfaces 723*a*, 724*a* of the Halbach array 720.

Hereinafter, the arc path (A.P) formed by the arc path generation unit 700 according to the present exemplary embodiment will be described in detail with reference to FIGS. 25 and 26.

Figure 25:
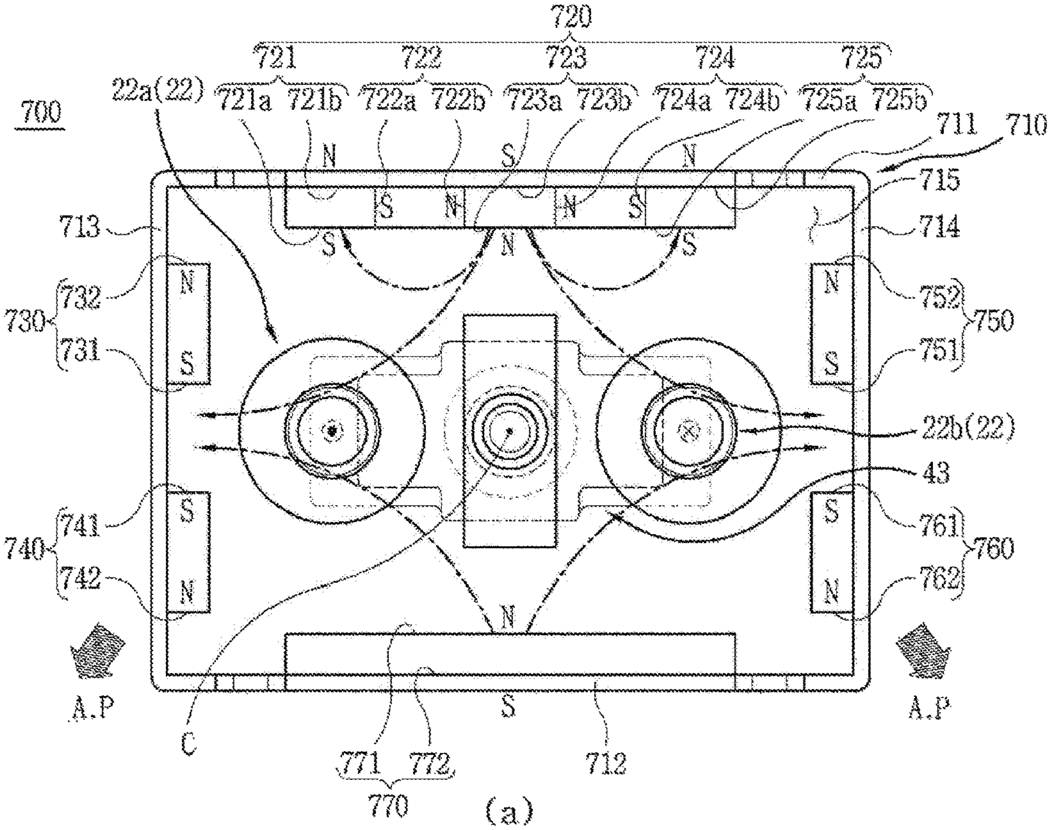
FIGS. 25 and 26 are conceptual diagrams illustrating the paths of a magnetic field and an arc formed by the arc path generation unit according to the exemplary embodiment of FIGS. 23 and 24.
Figure 25:
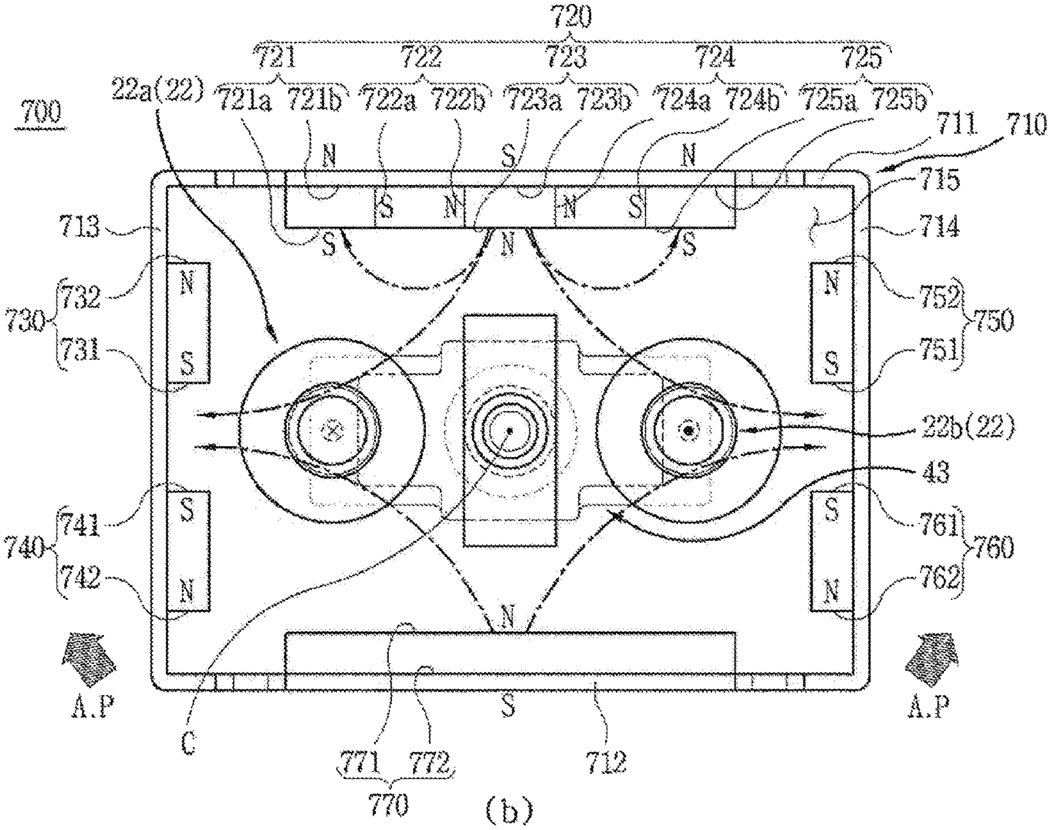
Figure 26:
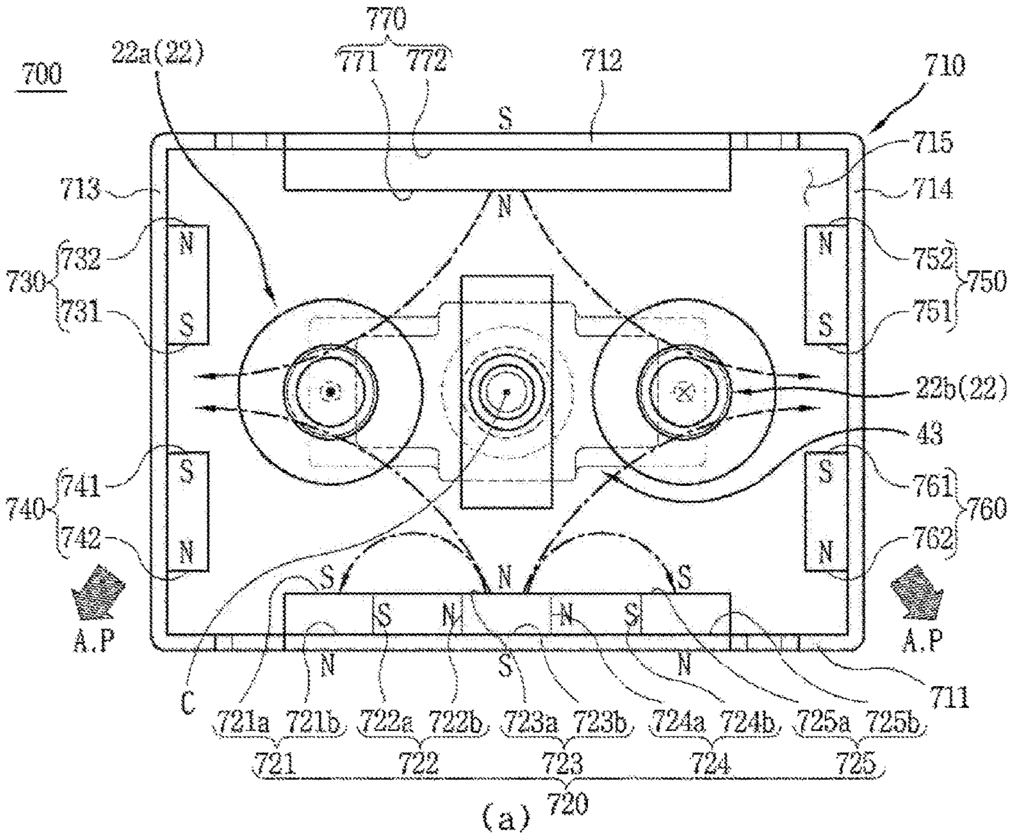
Figure 26:
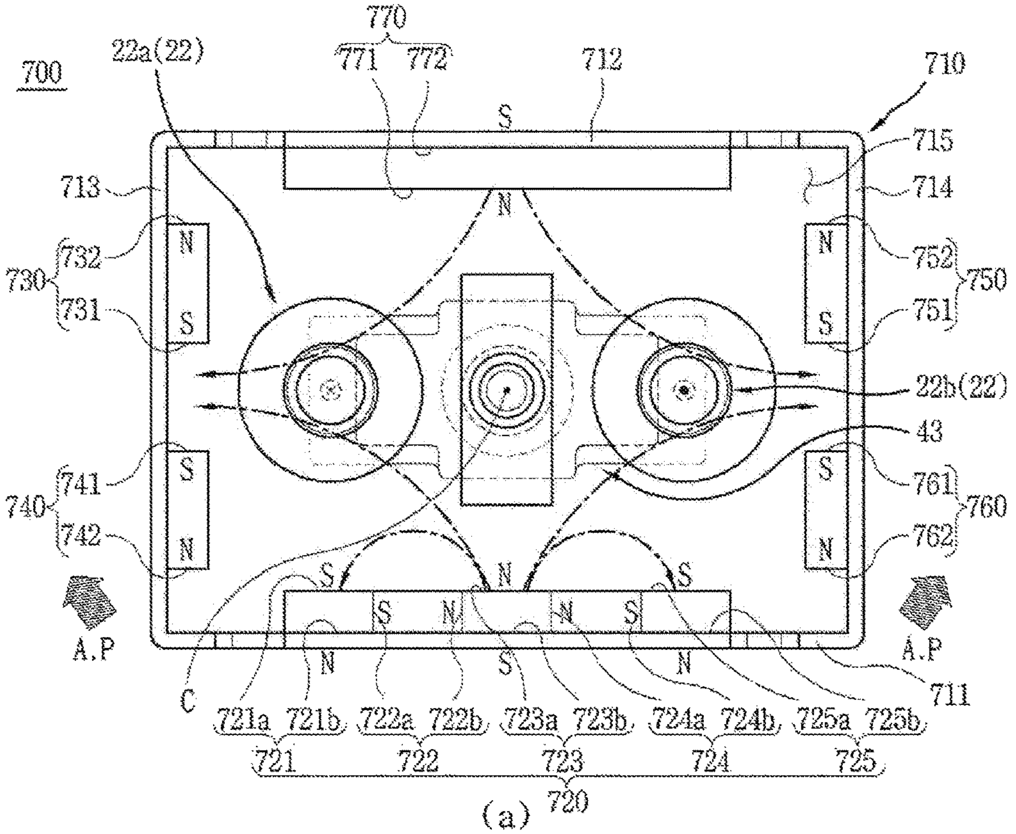
Figure 27:
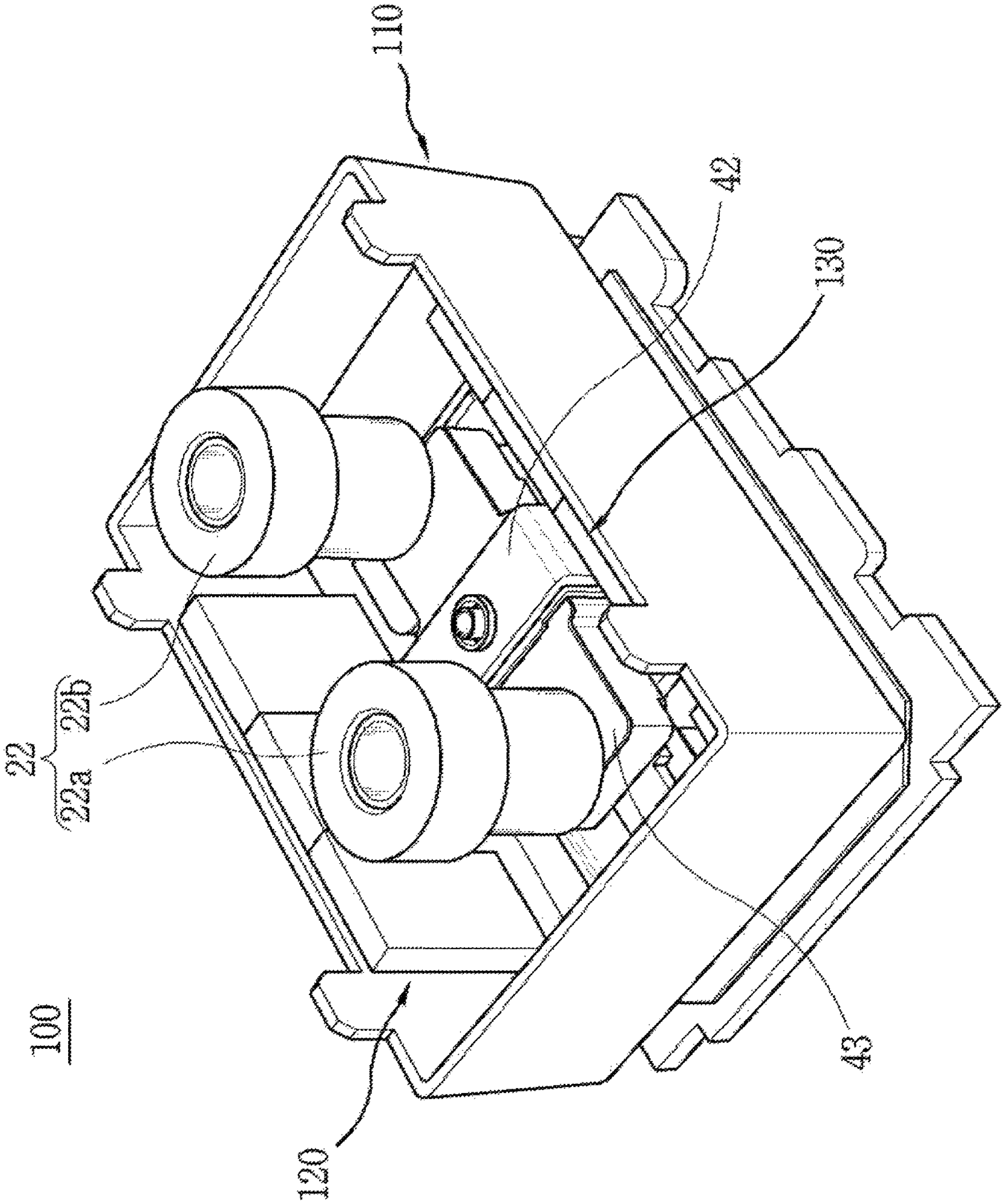
FIG. 27 is an open perspective view illustrating the second example of an arc path generation unit provided in the DC relay of FIG. 2.

Referring to FIGS. 25 and 26, the first, second and fifth outer surfaces 721*b*, 722*b*, 725*b* and the third and fourth inner surfaces 723*a*, 724*a* of the first Halbach array 720 are magnetized to the N pole.

In addition, according to the predetermined rule, the opposing surfaces 731, 741, 751, 761 of the first to fourth magnet parts 730, 740, 750, 760 are magnetized to the S pole which is a different polarity.

Furthermore, according to the predetermined rule, the fifth opposing surface 771 of the fifth magnet part 770 is magnetized to the N pole which is the same polarity as the polarity.

Accordingly, a magnetic field is formed between the Halbach array 720 and the fifth magnet part 770 in a direction to repel each other. In addition, between the Halbach array 720 and the first to fourth magnet parts 730, 740, 750, 760, a magnetic field in a direction from the third inner surface 723*a* toward each of the opposing surfaces 731, 741, 751, 761 is formed.

Similarly, between the fifth magnet part 770 and the first to fourth magnet parts 730, 740, 750, 760, a magnetic field in a direction from the fifth opposing surface 771 toward each of the opposing surfaces 731, 741, 751, 761 is formed.

In the exemplary embodiment illustrated in (a) of FIG. 25 and (a) of FIG. 26, the direction of the current is a direction of flowing into the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 25 and (b) of FIG. 26, the direction of the current is a direction of flowing into the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach array 720 and the first to fifth magnet parts 730, 740, 750, 760, 770 is changed, the directions of the magnetic fields formed in Halbach array 720 and the first to fifth magnet parts 730, 740, 750, 760 770 become reversed. Accordingly, the path (A.P) of the generated electromagnetic force and arc is also formed to be reversed in the front-rear direction.

That is, in the energized situation as shown in (a) of FIG. 25 and (a) of FIG. 26, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 25 and (b) of FIG. 26, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Accordingly, regardless of the polarity or DC relay 1 of the Halbach array 720 and the first to fifth magnet parts 730, 740, 750, 760, 770 and the direction of the current flowing through the DC relay 1, the arc path generation unit 700 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

4. Description of the Arc Path Generation Unit According to the Second Example of the Present Disclosure Referring to FIGS. 27 to 52, the arc path generation units 100, 200, 300, 400, 500, 600, 700, 800 according to various exemplary embodiments of the present disclosure are illustrated. Each of the arc path generation units 100, 200, 300, 400, 500, 600, 700, 800 forms a magnetic field inside the arc chamber 21. An electromagnetic force is formed inside the arc chamber 21 by the current flowing through the DC relay 1 and the formed magnetic field.

The arc generated as the fixed contact 22 and the movable contact 43 are spaced apart is moved to the outside of the arc chamber 21 by the formed electromagnetic force. Specifically, the generated arc is moved along the above direction of the formed electromagnetic force. Accordingly, it can be said that the arc path generation units 100, 200, 300, 400, 500, 600, 700, 800 form the arc path (A.P), which is a path through which the generated arc flows.

The arc path generation units 100, 200, 300, 400, 500, 600, 700, 800 are positioned in a space formed inside the upper frame 11. The arc path generation units 100, 200, 300, 400, 500, 600, 700 800 are disposed to surround the arc chamber 21. In other words, the arc chamber 21 is positioned inside the arc path generation units 100, 200, 300, 400, 500, 600, 700, 800.

The fixed contact 22 and the movable contact 43 are positioned inside the arc path generation units 100, 200, 300, 400, 500, 600, 700, 800. The arc generated by the fixed contact 22 and the movable contact 43 being spaced apart may be induced by an electromagnetic force formed by the arc path generation units 100, 200, 300, 400, 500, 600, 700, 800.

The arc path generation units 100, 200, 300, 400, 500, 600, 700, 800 according to various exemplary embodiments of the present disclosure include a Halbach array. The Halbach array forms a magnetic field inside the arc path generation unit 100 in which the fixed contact 22 and the movable contact 43 are accommodated. In this case, the Halbach array may form a magnetic field by itself and between each other.

The magnetic field formed by the Halbach array forms an electromagnetic force together with the current passed through the fixed contact 22 and the movable contact 43. The formed electromagnetic force induces an arc generated when the fixed contact 22 and the movable contact 43 are spaced apart.

In this case, the arc path generation units 100, 200, 300, 400, 500, 600, 700 800 form an electromagnetic force in a direction away from the center (C) of the space part 115. Accordingly, the arc path (A.P) is also formed in a direction away from the center (C) of the space part.

As a result, each component provided in the DC relay 1 is not damaged by the generated arc. Furthermore, the generated arc may be rapidly discharged to the outside of the arc chamber 21.

Hereinafter, with reference to the accompanying drawings, the configuration of each of the arc path generation units 100, 200, 300, 400, 500, 600, 700, 800 and the arc path (A.P) formed by each of the arc path generation unit 100, 200, 300, 400, 500, 600), 700, 800 will be described in detail.

The arc path generation units 100, 200, 300, 400, 500, 600, 700, 800 according to various exemplary embodiments to be described below may include Halbach arrays which are positioned on the front side and the rear side, respectively.

As will be described below, the rear side may be defined as a direction adjacent to first surfaces 111, 211, 311, 411, 511, 611, 711, 811, and the front side may be defined as a direction adjacent to second surfaces 112, 212, 312, 412, 512, 612, 712, 812.

In addition, the left side may be defined as a direction adjacent to third surfaces 113, 213, 313, 413, 513, 613, 713, 813, and the right side may be defined as a direction adjacent to fourth surfaces 114, 214, 314, 414, 514, 614, 714, 814.

(1) Description of the Arc Path Generation Unit 100 According to an Exemplary Embodiment of the Present Disclosure Hereinafter, the arc path generation unit 100 according to an exemplary embodiment of the present disclosure will be described in detail with reference to FIGS. 28 and 29.

Figure 28:
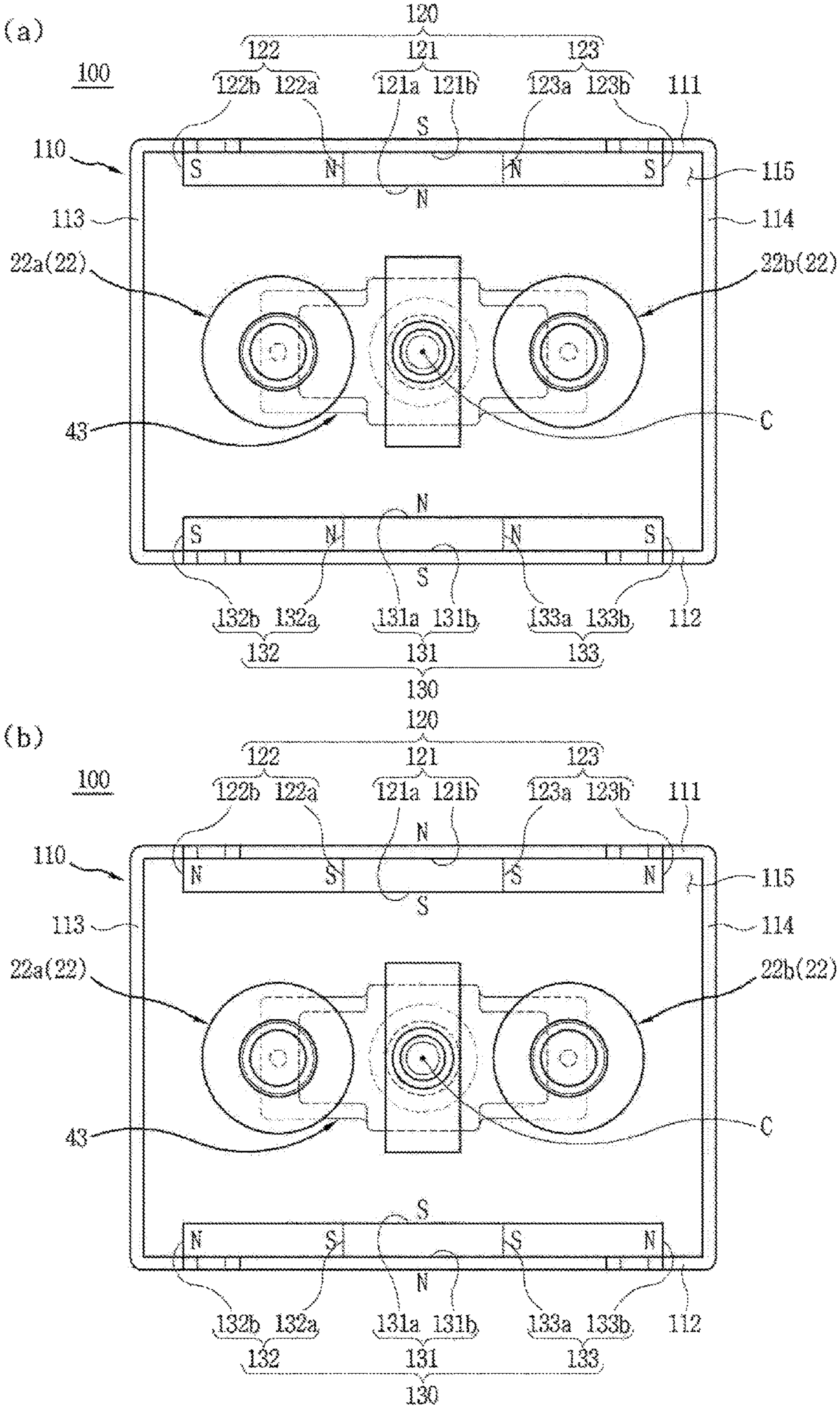
FIG. 28 is a conceptual diagram illustrating the arc path generation unit according to an exemplary embodiment of the present disclosure.

Referring to FIG. 28, the arc path generation unit 100 according to the illustrated exemplary embodiment includes a magnetic frame 110, a first Halbach array 120 and a second Halbach array 130.

The magnetic frame 110 forms a skeleton of the arc path generation unit 100. A Halbach array 120 is disposed on the magnetic frame 110. In an exemplary embodiment, the Halbach array 120 may be coupled to the magnetic frame 110.

The magnetic frame 110 has a rectangular cross-section extending in the longitudinal direction, which is the left-right direction in illustrated exemplary embodiment. The shape of the magnetic frame 110 may be changed according to the shapes of the upper frame 11 and the arc chamber 21.

The magnetic frame 110 includes a first surface 111, a second surface 112, a third surface 113, a fourth surface 114 and a space part 115.

The first surface 111, the second surface 112, the third surface 113 and the fourth surface 114 form an outer peripheral surface of the magnetic frame 110. That is, the first surface 111, the second surface 112, the third surface 113 and the fourth surface 114 function as a wall of the magnetic frame 110.

Outside of the first surface 111, the second surface 112, the third surface 113 and the fourth surface 114 may be in contact with or fixedly coupled to the inner surface of the upper frame 11. In addition, the Halbach array 120 may be positioned inside the first surface 111, the second surface 112, the third surface 113 and the fourth surface 114.

In the illustrated exemplary embodiment, the first surface 111 forms a rear side surface. The second surface 112 forms a front side surface and faces the first surface 111. In addition, the third surface 113 forms a left side surface. The fourth surface 114 forms a right side surface and faces the third surface 113.

That is, the first surface 111 and the second surface 112 face each other with the space part 115 interposed therebetween. In addition, the third surface 113 and the fourth surface 114 face each other with the space part 115 interposed therebetween.

The first surface 111 is continuous with the third surface 113 and the fourth surface 114. The first surface 111 may be coupled to the third surface 113 and the fourth surface 114 at a predetermined angle. In an exemplary embodiment, the predetermined angle may be a right angle.

The second surface 112 is continuous with the third surface 113 and the fourth surface 114. The second surface 112 may be coupled to the third surface 113 and the fourth surface 114 at a predetermined angle. In an exemplary embodiment, the predetermined angle may be a right angle.

Each edge at which the first surface 111 to the fourth surface 114 are connected to each other may be tapered.

For coupling of each of the surfaces 111, 112, 113, 114 with the Halbach array 120, a fastening member (not illustrated) may be provided.

Although not illustrated, an arc discharge hole (not illustrated) may be formed through at least any one of the first surface 111, the second surface 112, the third surface 113 and the fourth surface 114. The arc discharge hole (not illustrated) may function as a passage through which the arc generated in the space part 115 is discharged.

The space surrounded by the first surface 111 to the fourth surface 114 may be defined as the space part 115.

The fixed contact 22 and the movable contact 43 are accommodated in the space part 115. In addition, the arc chamber 21 is accommodated in the space part 115.

In the space part 115, the movable contact 43 may be moved in a direction toward the fixed contact 22 (i.e., a downward direction) or a direction away from the fixed contact 22 (i.e., an upward direction).

In addition, the path (A.P) of arc generated in the arc chamber 21 is formed in the space part 115. This is achieved by the magnetic field formed by the Halbach array 120.

A central portion of the space part 115 may be defined as a center (C). The straight line distances from each corner where the first to fourth surfaces 111, 112, 113, 114 are connected to each other to the center (C) may be formed to be the same.

The center (C) is positioned between the first fixed contact **22*a* and the second fixed contact 22*b*. In addition, the central portion of the movable contact portion 40 is positioned vertically below the center (C). That is, the central portions of the housing 41, the cover 42, the movable contact 43, the shaft 44 and the elastic part 45** are positioned vertically below the center (C).

Accordingly, when the generated arc is moved toward the center (C), the above components may be damaged. In order to prevent this, the arc path generation unit 100 according to the present exemplary embodiment includes a first Halbach array 120 and a second Halbach array 130.

In the illustrated exemplary embodiment, a plurality of magnetic materials constituting the first Halbach array 120 are sequentially arranged side by side from left to right. That is, in the illustrated exemplary embodiment, the first Halbach array 120 is formed to extend in the left-right direction.

The first Halbach array 120 may form a magnetic field together with other magnetic materials. In the illustrated exemplary embodiment, the first Halbach array 120 may form a magnetic field together with the second Halbach array 130.

The first Halbach array 120 may be positioned adjacent to any one surface of the first and second surfaces 111 and 112. In an exemplary embodiment, the first Halbach array 120 may be coupled to the inner side of the any one surface (i.e., a direction toward the space part 115).

In the illustrated exemplary embodiment, the first Halbach array 120 is disposed on the inner side of the first surface 111, adjacent to the first surface 111, so as to face the second Halbach array 130 which is disposed on the inner side of the second surface 112.

Between the first Halbach array 120 and the second Halbach array 130, the space part 115 and the fixed contact 22 and the movable contact 43 accommodated in the space part 115 are positioned.

The first Halbach array 120 may enhance the strength of the magnetic field formed by itself and the magnetic field formed with the second Halbach array 130. Since the direction of the magnetic field formed by the first Halbach array 120 and the process of strengthening the magnetic field are well-known techniques, the detailed description thereof will be omitted.

In the illustrated exemplary embodiment, the first Halbach array 120 includes a first block 121, a second block 122 and a third block 123. It will be understood that the plurality of magnetic materials constituting the first Halbach array 120 are each named blocks 121, 122, 123, respectively.

The first to third blocks 121, 122, 123 may be formed of a magnetic material. In an exemplary embodiment, the first to third blocks 121, 122, 123 may be provided as permanent magnets or electromagnets.

The first to third blocks 121, 122, 123 may be arranged side by side in one direction. In the illustrated exemplary embodiment, the first to third blocks 121, 122, 123 are arranged side by side in the extending direction of the first surface 111, that is, in the left-right direction.

The first to third blocks 121, 122, 123 are arranged side by side along the above direction. Specifically, in the first to third blocks 121, 122, 123, the second block 122 is disposed on the leftmost side, and the third block 123 is disposed on the rightmost side. In addition, the first block 121 is positioned between the second block 122 and the third block 123.

In an exemplary embodiment, each of the blocks 121, 122, 123 disposed adjacent to each other may contact each other.

The first to third blocks 121, 122, 123 may be disposed to overlap the first to third blocks 131, 132, 133 of the second Halbach array 130 in a direction toward the second Halbach array 130, which is the front-rear direction of the illustrated exemplary embodiment, respectively.

In this case, the second block 122 may be disposed to overlap the first fixed contact **22*a* in a direction toward the second surface 112**, which is the front-rear direction in the illustrated exemplary embodiment.

In addition, the third block 123 may be disposed to overlap the second fixed contact **22*b* in a direction toward the second surface 112**, which is the front-rear direction in the illustrated exemplary embodiment.

Each of the blocks 121, 122, 123 includes a plurality of surfaces.

Specifically, the first block 121 includes a first inner surface 121 facing the space part 115 or the second Halbach array 130 and a first outer surface **121*b* opposite to the space part 115 or the second Halbach array 130**.

The second block 122 includes a second inner surface **122*a* facing the first block 121 and a second outer surface 122*b* opposite to the first block 121**.

The third block 123 includes a third inner surface **123*a* facing the first block 121 and a third outer surface 123*b* facing the first block 121**.

The plurality of surfaces of each of the blocks 121, 122, 123 may be magnetized according to a predetermined rule to constitute a Halbach array.

Specifically, the first to third inner surfaces **121*a*, 122*a*, 123*a* may be magnetized with the same polarity. Similarly, the first to third outer surfaces 121*b*, 122*b*, 123*b*** may be magnetized with the same polarity.

In this case, the first to third inner surfaces **121*a*, 122*a*, 123*a* may be magnetized with the same polarity as the first to third inner surfaces 131*a*, 132*a*, 133*a* of the second Halbach array 130. Similarly, the first to third outer surfaces 121*b*, 122*b*, 123*b* may be magnetized with the same polarity as the first to third outer surfaces 131*b*, 132*b*, 133*b* of the second Halbach array 130**.

In the illustrated exemplary embodiment, a plurality of magnetic materials constituting the second Halbach array 130 are sequentially arranged side by side from left to right. That is, in the illustrated exemplary embodiment, the second Halbach array 130 is formed to extend in the left-right direction.

The second Halbach array 130 may form a magnetic field together with other magnetic materials. In the illustrated exemplary embodiment, the second Halbach array 130 may form a magnetic field together with the first Halbach array 120.

The second Halbach array 130 may be positioned adjacent to the other one surface of the first and second surfaces 111, 112. In an exemplary embodiment, the second Halbach array 130 may be coupled to the inner side of the any one surface (i.e., a direction toward the space part 115).

In the illustrated exemplary embodiment, the second Halbach array 130 is disposed on the inner side of the second surface 112, adjacent to the second surface 112, so as to face the first Halbach array 120 which is disposed on the inner side of the first surface 111.

Between the second Halbach array 130 and the first Halbach array 120, the space part 115 and the fixed contact 22 and the movable contact 43 accommodated in the space part 115 are positioned.

The second Halbach array 130 may enhance the strength of the magnetic field formed by itself and the magnetic field formed with the first Halbach array 120. Since the direction of the magnetic field formed by the second Halbach array 130 and the process of strengthening the magnetic field are well-known techniques, the detailed description thereof will be omitted.

In the illustrated exemplary embodiment, the second Halbach array 130 includes a first block 131, a second block 132 and a third block 133. It will be understood that the plurality of magnetic materials constituting the second Halbach array 130 are each named blocks 131, 132, 133, respectively.

The first to third blocks 131, 132, 133 may be formed of a magnetic material. In an exemplary embodiment, the first to third blocks 131, 132, 133 may be provided as permanent magnets or electromagnets.

The first to third blocks 131, 132, 133 may be arranged side by side in one direction. In the illustrated exemplary embodiment, the first to third blocks 131, 132, 133 are arranged side by side in the extending direction of the second surface 112, that is, in the left-right direction.

The first to third blocks 131, 132, 133 are arranged side by side along the above direction. Specifically, in the first to third blocks 131, 132, 133, the second block 132 is disposed on the leftmost side, and the third block 133 is disposed on the rightmost side. In addition, the first block 131 is positioned between the second block 132 and the third block 133.

In an exemplary embodiment, each of the blocks 131, 132, 133 disposed adjacent to each other may contact each other.

The first to third blocks 131, 132, 133 may be disposed to overlap the first to third blocks 121, 122, 123 of the first Halbach array 120 in a direction toward the first Halbach array 120, which is the front-rear direction in the illustrated exemplary embodiment, respectively.

In this case, the second block 132 may be disposed to overlap the first fixed contact 22*a* in a direction toward the first surface 111, which is the front-rear direction in the illustrated exemplary embodiment.

In addition, the third block 133 may be disposed to overlap the second fixed contact 22*b* in a direction toward the first surface 111, which is the front-rear direction in the illustrated exemplary embodiment.

Each of the blocks 131, 132, 133 includes a plurality of surfaces.

Specifically, the first block 131 includes a first inner surface 131*a* facing the space part 115 or the first Halbach array 120 and a first outer surface 131*b* opposite to the space part 115 or the first Halbach array 120.

The second block 132 includes a second inner surface 132*a* facing the first block 131 and a second outer surface 132*b* opposite to the first block 131.

The third block 133 includes a third inner surface 133*a* facing the first block 131 and a third outer surface 133*b* opposite to the first block 131.

The plurality of surfaces of each of the blocks 131, 132, 133 may be magnetized according to a predetermined rule to constitute a Halbach array.

Specifically, the first to third inner surfaces 131*a*, 132*a*, 133*a* may be magnetized with the same polarity. Similarly, the first to third outer surfaces 131*b*, 132*b*, 133*b* may be magnetized with the same polarity.

In this case, the first to third inner surfaces 131*a*, 132*a*, 133*a* may be magnetized with the same polarity as the first to third inner surfaces 121*a*, 122*a*, 123*a* of the first Halbach array 120. Similarly, the first to third outer surfaces 131*b*, 132*b*, 133*b* may be magnetized with the same polarity as the first to third outer surfaces 121*b*, 122*b*, 123*b* of the first Halbach array 120.

The relative polarity relationship of the first and second Halbach arrays 120, 130 may be expressed as geometrically symmetrical in the front-rear direction.

That is, the first and second Halbach arrays 120, 130 are magnetized to be line-symmetrical with respect to an imaginary straight line passing through each of the fixed contacts 22*a*, 22*b*.

Hereinafter, the arc path (A.P) formed by the arc path generation unit 100 according to the present exemplary embodiment will be described in detail with reference to FIG. 29.

Figure 29:
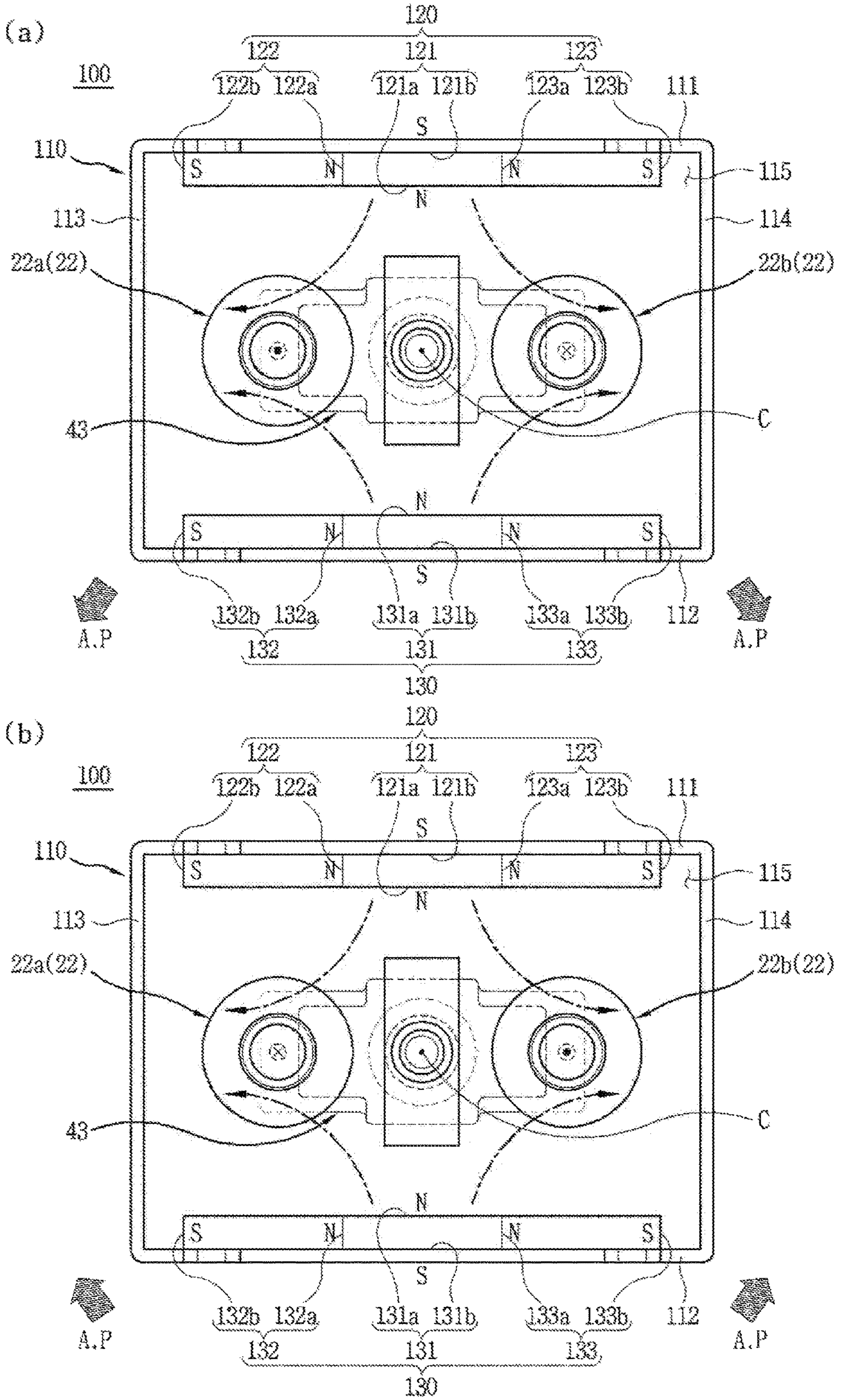
FIG. 29 is a conceptual diagram illustrating the paths of a magnetic field and an arc formed by the arc path generation unit according to the exemplary embodiment of FIG. 28.

Referring to FIG. 29, the first to third inner surfaces 121*a*, 122*a*, 123*a* of the first Halbach array 120 are magnetized to the N pole. In addition, the first to third inner surfaces 131*a*, 132*a*, 133*a* of the second Halbach array 130 are also magnetized to the N pole.

In addition, according to the predetermined rule, each of the first to third outer surfaces 121*b*, 131*b*, 122*b*, 132*b*, 123*b*, 133*b* of the first to second Halbach arrays 120, 130 is magnetized to the S pole.

Accordingly, a magnetic field is formed between the first and second Halbach arrays 120, 130 in a direction to repel each other.

In the exemplary embodiment illustrated in (a) of FIG. 29, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 29, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 120, 130 is changed, the directions of the magnetic fields formed in each of the Halbach arrays 120, 130 become reversed. Accordingly, the path (A.P) of the generated electromagnetic force and arc is also formed to be reversed in the front-rear direction.

That is, in the energized situation as shown in (a) of FIG. 29, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 29, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first and second Halbach arrays 120, 130 or the direction of the current flowing through the DC relay 1, the arc path generation unit 100 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(2) Description of the Arc Path Generation Unit 200 According to Another Exemplary Embodiment of the Present Disclosure Hereinafter, the arc path generation unit 200 according to another exemplary embodiment of the present disclosure will be described in detail with reference to FIGS. 30 to 32.

Figure 30:
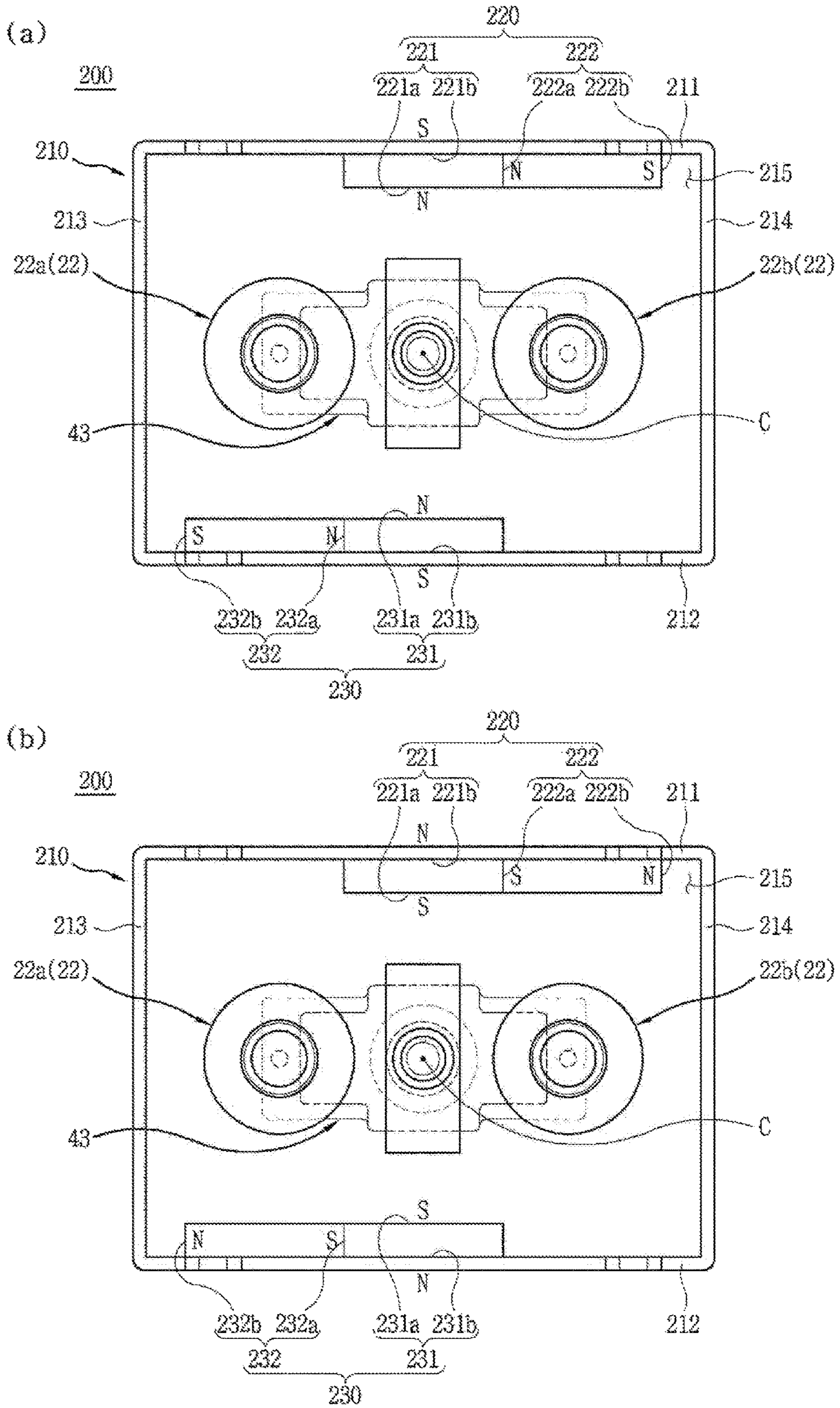
FIGS. 30 and 31 are conceptual diagrams illustrating the arc path generation unit according to another exemplary embodiment of the present disclosure.
Figure 31:
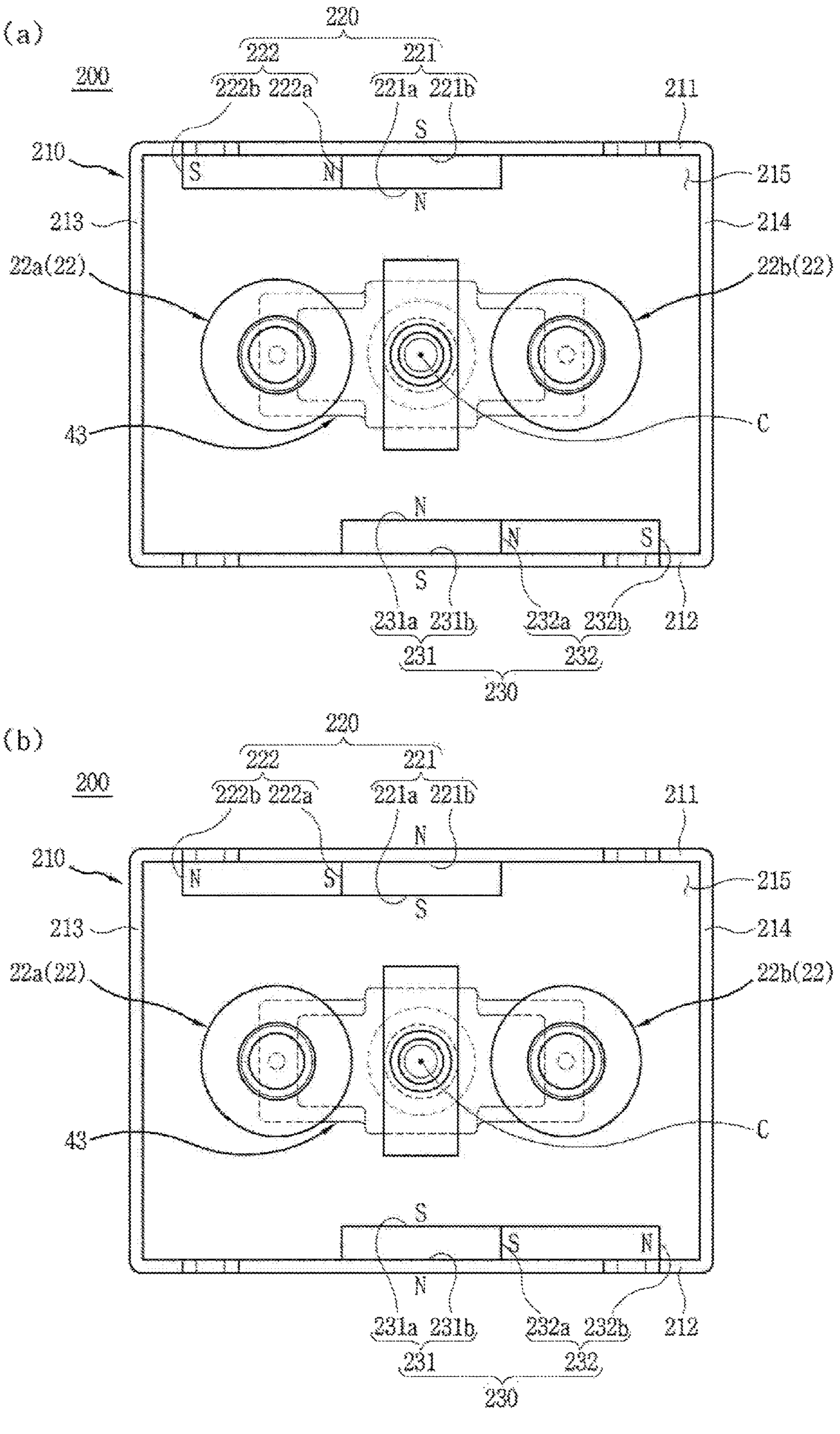

Referring to FIGS. 30 and 31, the arc path generation unit 200 according to the illustrated exemplary embodiment includes a magnetic frame 210, a first Halbach array 220 and a second Halbach array 230.

The magnetic frame 210 according to the present exemplary embodiment has the same structure and function as the magnetic frame 110 according to the above-described exemplary embodiment. However, there is a difference in the arrangement method of the first Halbach array 220 and the second Halbach array 230 disposed on the magnetic frame 210 according to the present exemplary embodiment.

Accordingly, the description of the magnetic frame 210 will be replaced with the description of the magnetic frame 110 according to the above-described exemplary embodiment.

In the illustrated exemplary embodiment, a plurality of magnetic materials constituting the first Halbach array 220 are sequentially arranged side by side from left to right. That is, in the illustrated exemplary embodiment, the first Halbach array 220 is formed to extend in the left-right direction.

The first Halbach array 220 may form a magnetic field together with other magnetic materials. In the illustrated exemplary embodiment, the first Halbach array 220 may form a magnetic field together with the second Halbach array 230.

The first Halbach array 220 may be positioned adjacent to any one surface of the first and second surfaces 211, 212. In an exemplary embodiment, the first Halbach array 220 may be coupled to the inner side of the any one surface (i.e., a direction toward the space part 215).

In the illustrated exemplary embodiment, the first Halbach array 220 is disposed on the inner side of the first surface 211, adjacent to the first surface 211, so as to face the second Halbach array 230 which is disposed on the inner side of the second surface 212.

Between the first Halbach array 220 and the second Halbach array 230, the space part 215 and the fixed contact 22 and the movable contact 43 accommodated in the space part 215 are positioned.

The first Halbach array 220 is positioned to be biased toward any one of the third surface 213 and the fourth surface 214. In the exemplary embodiment illustrated in FIG. 30, the first Halbach array 220 is positioned to be biased toward the fourth surface 214. In the exemplary embodiment shown in FIG. 31, the second Halbach array 230 is positioned to be biased toward the third surface 213.

The first Halbach array 220 may enhance the strength of the magnetic field formed by itself and the magnetic field formed with the second Halbach array 230. Since the direction of the magnetic field formed by the first Halbach array 220 and the process of strengthening the magnetic field are well-known techniques, the detailed description thereof will be omitted.

In the illustrated exemplary embodiment, the first Halbach array 220 includes a first block 221 and a second block 222. It will be understood that the plurality of magnetic materials constituting the first Halbach array 220 are each named blocks 221, 222, respectively.

The first and second blocks 221, 222 may be formed of a magnetic material. In an exemplary embodiment, the first and second blocks 221, 222 may be provided as permanent magnets or electromagnets.

The first and second blocks 221, 222 may be arranged side by side in one direction. In the illustrated exemplary embodiment, the first and second blocks 221, 222 are arranged side by side in the extending direction of the first surface 211, that is, in the left-right direction.

In the exemplary embodiment illustrated in FIG. 30, the first block 221 is positioned in the central portion, and the second block 222 is positioned on the right side of the first block 221. In the exemplary embodiment illustrated in FIG. 31, the first block 221 is positioned in the central portion, and the second block 222 is positioned on the left side of the first block 221.

In an exemplary embodiment, the first block 221 and the second block 222 may contact each other.

The first block 221 may be disposed to overlap the first block 231 of the second Halbach array 230 in a direction toward the second Halbach array 230, which is the front-rear direction in the illustrated exemplary embodiment, respectively.

In this case, the second block 222 may be disposed to overlap any one of the first fixed contact 22*a* and the second fixed contact 22*b* in a direction toward the second surface 212, which is the front-rear direction in the illustrated exemplary embodiment. can In the exemplary embodiment illustrated in FIG. 30, the second block 222 overlaps the second fixed contact 22*b* in the front-rear direction. In the exemplary embodiment illustrated in FIG. 31, the second block 222 overlaps the first fixed contact 22*a* in the front-rear direction.

Each of the blocks 221, 222 includes a plurality of surfaces.

Specifically, the first block 221 includes a first inner surface 221*a* facing the space part 215 or the second Halbach array 230 and a first outer surface 221*b* opposite to the space part 215 or the second Halbach array 230.

The second block 222 includes a second inner surface 222*a* facing the first block 221 and a second outer surface 222*b* opposite to the first block 221.

The plurality of surfaces of each of the blocks 221, 222 may be magnetized according to a predetermined rule to constitute a Halbach array.

Specifically, the first and second inner surfaces 221*a*, 222*a* may be magnetized with the same polarity. Similarly, the first and second outer surfaces 221*b*, 222*b* may be magnetized with the same polarity.

In this case, the first and second inner surfaces 221*a*, 222*a* may be magnetized with the same polarity as the first and second inner surfaces 231*a*, 232*a* of the second Halbach array 230. Similarly, the first and second outer surfaces 221*b*, 222*b* may be magnetized with the same polarity as the first and second outer surfaces 231*b*, 232*b* of the second Halbach array 230.

In the illustrated exemplary embodiment, a plurality of magnetic materials constituting the second Halbach array 230 are sequentially arranged side by side from left to right. That is, in the illustrated exemplary embodiment, the second Halbach array 230 is formed to extend in the left-right direction.

The second Halbach array 230 may form a magnetic field together with other magnetic materials. In the illustrated exemplary embodiment, the second Halbach array 230 may form a magnetic field together with the first Halbach array 220.

The second Halbach array 230 may be positioned adjacent to the other one surface of the first and second surfaces 211, 212. In an exemplary embodiment, the second Halbach array 230 may be coupled to the inner side of the other one surface (i.e., a direction toward the space part 215).

In the illustrated exemplary embodiment, the second Halbach array 230 is disposed on the inner side of the second surface 212, adjacent to the second surface 212, so as to face the first Halbach array 220 which is disposed on the inner side of the first surface 211.

The second Halbach array 230 is positioned to be biased toward the other one surface of the third surface 213 and the fourth surface 214. In the exemplary embodiment illustrated in FIG. 30, the second Halbach array 230 is positioned to be biased toward the third surface 213. In the exemplary embodiment illustrated in FIG. 31, the second Halbach array 230 is positioned to be biased toward the fourth surface 214.

Between the second Halbach array 230 and the first Halbach array 220, the space part 215 and the fixed contact 22 and the movable contact 43 accommodated in the space part 215 are positioned.

The second Halbach array 230 may enhance the strength of the magnetic field formed by itself and the magnetic field formed with the first Halbach array 220. Since the direction of the magnetic field formed by the second Halbach array 230 and the process of strengthening the magnetic field are well-known techniques, the detailed description thereof will be omitted.

In the illustrated exemplary embodiment, the second Halbach array 230 includes a first block 231 and a second block 232. It will be understood that a plurality of magnetic materials constituting the second Halbach array 230 are each named blocks 231, 232, respectively.

The first and second blocks 231, 232 may be formed of a magnetic material. In an exemplary embodiment, the first and second blocks 231, 232 may be provided as permanent magnets or electromagnets.

The first and second blocks 231, 232 may be disposed side by side in one direction. In the illustrated exemplary embodiment, the first and second blocks 231, 232 are arranged side by side in the extending direction of the second surface 212, that is, in the left-right direction.

In the exemplary embodiment illustrated in FIG. 30, the first block 231 is positioned in the central portion, and the second block 232 is positioned on the left side of the first block 231. In the exemplary embodiment illustrated in FIG. 31, the first block 231 is positioned in the central portion, and the second block 232 is positioned on the right side of the first block 231.

In an exemplary embodiment, each of the blocks 231, 232 disposed adjacent to each other may contact each other.

The first block 231 may be disposed to overlap the first block 221 of the first Halbach array 220 in a direction toward the first Halbach array 220, which is the front-rear direction in the illustrated exemplary embodiment, respectively.

In this case, the second block 222 may be disposed to overlap any one of the first fixed contact 22*a* and the second fixed contact 22*b* in a direction toward the second surface 212, which is the front-rear direction in the illustrated exemplary embodiment.

In the exemplary embodiment illustrated in FIG. 30, the second block 222 overlaps the first fixed contact 22*a* in the front-rear direction. In the exemplary embodiment illustrated in FIG. 31, the second block 222 overlaps the second fixed contact 22*b* in the front-rear direction.

Each of the blocks 231, 232 includes a plurality of surfaces.

Specifically, the first block 231 includes a first inner surface 231*a* facing the space part 215 or the first Halbach array 220 and a first outer surface 231*b* opposite to the space part 215 or the first Halbach array 220.

The second block 232 includes a second inner surface 232*a* facing the first block 231 and a second outer surface 232*b* opposite to the first block 231.

The plurality of surfaces of each of the blocks 231, 232 may be magnetized according to a predetermined rule to constitute a Halbach array.

Specifically, the first and second inner surfaces 231*a*, 232*a* may be magnetized with the same polarity. Similarly, the first and second outer surfaces 231*b*, 232*b* may be magnetized with the same polarity.

In this case, the first and second inner surfaces 231*a*, 232*a* may be magnetized with the same polarity as the first and second inner surfaces 221*a*, 222*a* of the first Halbach array 220. Similarly, the first and second outer surfaces 231*b*, 232*b* may be magnetized with the same polarity as the first and second outer surfaces 221*b*, 222*b* of the first Halbach array 220.

The relative polarity relationship of the first and second Halbach arrays 220, 230 may be expressed as geometrically symmetrical in the front-rear direction.

That is, the first and second Halbach arrays 220, 230 are magnetized to be line-symmetrical with respect to an imaginary straight line passing through each of the fixed contacts 22*a*, 22*b*.

Hereinafter, the arc path (A.P) formed by the arc path generation unit 200 according to the present exemplary embodiment will be described in detail with reference to FIG. 32.

Figure 32:
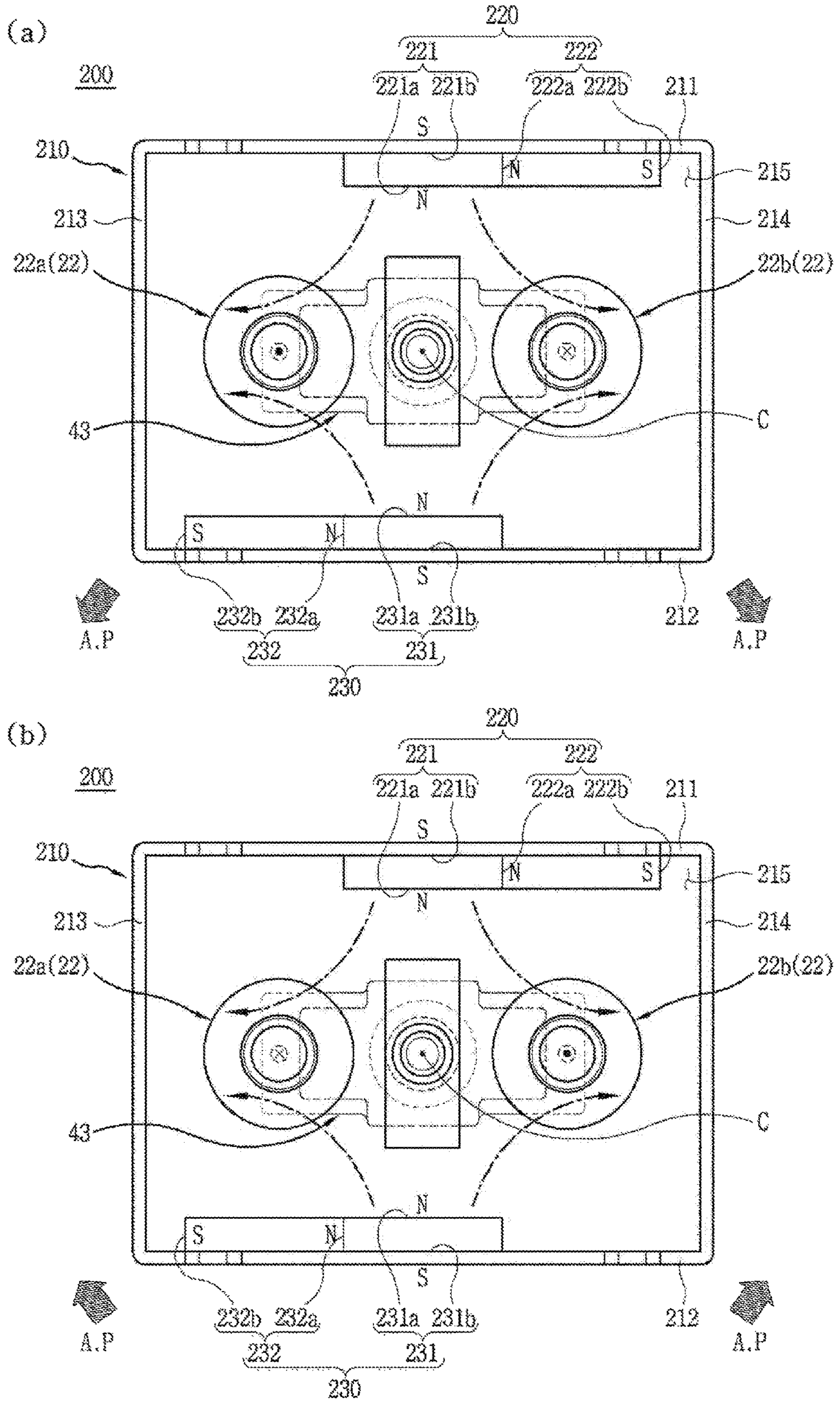
FIG. 32 is a conceptual diagram illustrating the paths of a magnetic field and an arc formed by the arc path generation unit according to the exemplary embodiments of FIGS. 30 and 31.

Referring to FIG. 32, the first and second inner surfaces 221*a*, 222*a* of the first Halbach array 220 are magnetized to the N pole. In addition, the first and second inner surfaces 231*a*, 232*a* of the second Halbach array 230 are also magnetized to the N pole.

In addition, according to the predetermined rule, the first and third outer surfaces 221*b*, 231*b*, 222*b*, 232*b* of the first and second Halbach arrays 220, 230 are magnetized to the S pole.

Accordingly, a magnetic field in a direction to repel each other is formed between the first and second Halbach arrays 220, 230.

In this case, the second blocks 222, 232 of the first and second Halbach arrays 220, 230 are formed to strengthen the magnetic field.

In the exemplary embodiment illustrated in (a) of FIG. 32, the direction of the current is a direction from the second fixed contact 22*b* through the movable contact 43 out to to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22$b$ is also formed toward the front right side.

In the exemplary embodiment illustrated in (b) of FIG. 32, the direction of the current is a direction from the first fixed contact 22$a$ through the movable contact 43 out to the second fixed contact 22$b$.

When Fleming's Left-Hand Rule is applied to the first fixed contact 22$a$, the electromagnetic force generated in the vicinity of the first fixed contact 22$a$ is formed toward the rear left side.

Accordingly, the arc path (A.P) in the vicinity of the first fixed contact 22$a$ is also formed toward the rear left side.

Similarly, when Fleming's Left-Hand Rule is applied to the second fixed contact 22$b$, the electromagnetic force generated in the vicinity of the second fixed contact 22$b$ is formed toward the rear right side.

Accordingly, the arc path (A.P) in the vicinity of the second fixed contact 22$b$ is also formed toward the rear right side.

Although not illustrated, when the polarity of each surface of the first and second Halbach arrays 220, 230 is changed, the directions of the magnetic fields formed by each of the Halbach arrays 220, 230 become reversed. Accordingly, the path (A.P) of the generated electromagnetic force and arc is also formed to be reversed in the front-rear direction.

That is, in the energized situation as shown in (a) of FIG. 32, the path (A.P) of the electromagnetic force and arc in the vicinity of the first fixed contact 22$a$ is formed toward the rear left side. In addition, the path (A.P) of the electromagnetic force and arc in the vicinity of the second fixed contact 22$b$ is formed toward the rear right side.

Similarly, in the energized situation as shown in (b) of FIG. 32, the path (A.P) of the electromagnetic force and arc in the vicinity of the first fixed contact 22$a$ is formed toward the front left side. In addition, the path (A.P) of the electromagnetic force and arc in the vicinity of the second fixed contact 22$b$ is formed toward the front right side.

Therefore, regardless of the polarity of the first and second Halbach arrays 220, 230 or the direction of the current flowing through the DC relay 1, the arc path generation unit 200 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(3) Description of the Arc Path Generation Unit 300 According to Another Exemplary Embodiment of the Present Disclosure Hereinafter, the arc path generation unit 300 according to another exemplary embodiment of the present disclosure will be described in detail with reference to FIGS. 33 and 33.

Figure 33:
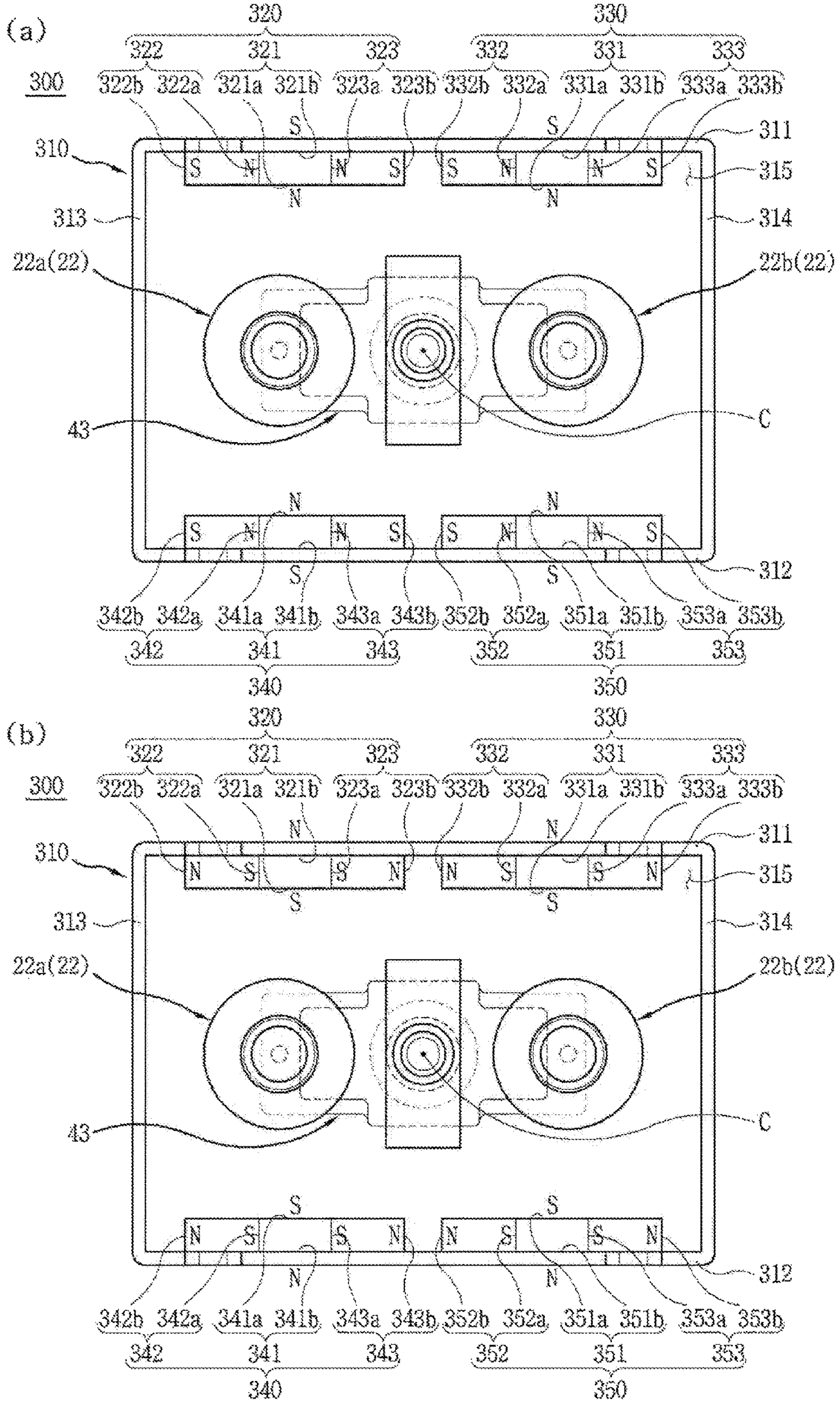
FIG. 33 is a conceptual diagram illustrating the arc path generation unit according to still another exemplary embodiment of the present disclosure.

Referring to FIG. 33, the arc path generation unit 300 according to the illustrated exemplary embodiment includes a magnetic frame 310, a first Halbach array 320, a second Halbach array 330, and a third Halbach array 340 and a fourth Halbach array 350.

The magnetic frame 310 according to the present exemplary embodiment has the same structure and function as the magnetic frame 110 according to the above-described exemplary embodiment. However, there is a difference in the arrangement method of the first Halbach array 320, the second Halbach array 330, the third Halbach array 340 and the fourth Halbach array 350 disposed on the magnetic frame 310 according to the present exemplary embodiment.

Accordingly, the description of the magnetic frame 310 will be replaced with the description of the magnetic frame 110 according to the above-described exemplary embodiment.

In the illustrated exemplary embodiment, a plurality of magnetic materials constituting the first Halbach array 320 are sequentially arranged side by side from left to right. That is, in the illustrated exemplary embodiment, the first Halbach array 320 is formed to extend in the left-right direction.

The first Halbach array 320 may form a magnetic field together with other magnetic materials. In the illustrated exemplary embodiment, the first Halbach array 320 may form a magnetic field together with the third Halbach array 340.

The first Halbach array 320 may be positioned adjacent to any one surface of the first and second surfaces 311 and 312. In an exemplary embodiment, the first Halbach array 320 may be coupled to the inner side of the any one surface (i.e., a direction toward the space part 315).

In the illustrated exemplary embodiment, the first Halbach array 320 is disposed on the inner side of the first surface 311, adjacent to the first surface 311, so as to face the third Halbach array 340 or the fourth Halbach array 350 which is disposed on the inner side of the second surface 312.

The first Halbach array 320 is arranged side by side with the second Halbach array 330 in the extending direction thereof. The first Halbach array 320 is disposed adjacent to the second Halbach array 330. In an exemplary embodiment, the first Halbach array 320 and the second Halbach array 330 may be in contact with each other.

Between the first Halbach array 320 and the third Halbach array 340 or the fourth Halbach array 350, the space part 315 and the fixed contact 22 and the movable contact 43 accommodated in the space part 315 are positioned.

The first Halbach array 320 is positioned to be biased toward any one of the third surface 313 and the fourth surface 314. In the illustrated exemplary embodiment, the first Halbach array 320 is positioned to be biased toward the third surface 313.

The first Halbach array 320 may enhance the strength of the magnetic field formed by itself and the magnetic fields formed with the second to fourth Halbach arrays 330, 340, 350. Since the direction of the magnetic field formed by the first Halbach array 320 and the process of strengthening the magnetic field are well-known techniques, the detailed description thereof will be omitted.

In the illustrated exemplary embodiment, the first Halbach array 320 includes a first block 321, a second block 322 and a third block 323. It will be understood that the plurality of magnetic materials constituting the first Halbach array 320 are each named blocks 321, 322, 323, respectively.

The first to third blocks 321, 322, 323 may be formed of a magnetic material. In an exemplary embodiment, the first to third blocks 321, 322, 323 may be provided as permanent magnets or electromagnets.

The first to third blocks 321, 322, 323 may be arranged side by side in one direction. In the illustrated exemplary embodiment, the first to third blocks 321, 322, 323 are arranged side by side in the extending direction of the first surface 311, that is, in the left-right direction.

The first block 321 is located in the central portion of the first Halbach array 320. The second block 322 is positioned on the left side of the first block 321, and the third block 323 is positioned on the right side of the first block 321, respectively. In an exemplary embodiment, each of the blocks 321, 322, 323 adjacent to each other may contact each other.

The first block 321 may be disposed to overlap the first block 341 of the third Halbach array 340 in a direction toward the third Halbach array 340, which is the front-rear direction in the illustrated exemplary embodiment.

In addition, the first block 321 may be disposed to overlap any one of the first fixed contact 22*a* and the second fixed contact 22*b* in a direction toward the third Halbach array 340, which is the front-rear direction in the illustrated exemplary embodiment.

Each of the blocks 321, 322, 323 includes a plurality of surfaces.

Specifically, the first block 321 includes a first inner surface 321 facing the space part 315 or the third Halbach array 340 and a first outer surface 321*b* opposite to the space part 315 or the third Halbach array 340.

The second block 322 includes a second inner surface 322*a* facing the first block 321 and a second outer surface 322*b* opposite to the first block 321.

The third block 323 includes a third inner surface 323*a* facing the first block 321 and a third outer surface 323*b* opposite to the first block 321.

The plurality of surfaces of each of the blocks 321, 322, 323 may be magnetized according to a predetermined rule to constitute a Halbach array.

Specifically, the first to third inner surfaces 321*a*, 322*a*, 323*a* may be magnetized with the same polarity. Similarly, the first to third outer surfaces 321*b*, 322*b*, 323*b* may be magnetized with the same polarity.

In this case, the first to third inner surfaces 321*a*, 322*a*, 323*a* may be magnetized with the same polarity as the first to third inner surfaces 331*a*, 332*a*, 333*a* of the second Halbach array 330. Similarly, the first to third outer surfaces 321*b*, 322*b*, 323*b* may be magnetized with the same polarity as the first to third outer surfaces 331*b*, 332*b*, 333*b* of the second Halbach array 330.

The first to third inner surfaces 321*a*, 322*a*, 323*a* may be magnetized with the same polarity as the first to third inner surfaces 341*a*, 342*a*, 343*a* of the third Halbach array 340. Similarly, the first to third outer surfaces 321*b*, 322*b*, 323*b* may be magnetized with the same polarity as the first to third outer surfaces 341*b*, 342*b*, 343*b* of the third Halbach array 340.

The first to third inner surfaces 321*a*, 322*a*, 323*a* may be magnetized with the same polarity as the first to third inner surfaces 351*a*, 352*a*, 353*a* of the fourth Halbach array 350. Similarly, the first to third outer surfaces 321*b*, 322*b*, 323*b* may be magnetized with the same polarity as the first to third outer surfaces 351*b*, 352*b*, 353*b* of the fourth Halbach array 350.

In the illustrated exemplary embodiment, a plurality of magnetic materials constituting the second Halbach array 330 are sequentially arranged side by side from left to right. That is, in the illustrated exemplary embodiment, the second Halbach array 330 is formed to extend in the left-right direction.

The second Halbach array 330 may form a magnetic field together with other magnetic materials. In the illustrated exemplary embodiment, the second Halbach array 330 may form a magnetic field together with the fourth Halbach array 350.

The second Halbach array 330 may be positioned adjacent to any one surface of the first and second surfaces 311, 312. In an exemplary embodiment, the second Halbach array 330 may be coupled to the inner side of the any one surface (i.e., a direction toward the space part 315).

In the illustrated exemplary embodiment, the second Halbach array 330 is disposed on the inner side of the first surface 311, adjacent to the first surface 311, so as to face the third Halbach array 330 or the fourth Halbach array 350 which is disposed on the inner side of the second surface 312.

The second Halbach array 330 is arranged side by side with the first Halbach array 320 in the extending direction thereof. The second Halbach array 330 is disposed adjacent to the first Halbach array 320. In an exemplary embodiment, the second Halbach array 330 and the first Halbach array 320 may be in contact with each other.

Between the second Halbach array 330 and the third Halbach array 340 or the fourth Halbach array 350, the space part 315 and the fixed contact 22 and the movable contact 43 accommodated in the space part 315 are positioned.

The second Halbach array 330 is positioned to be biased toward the other of the third surface 313 and the fourth surface 314. In the illustrated exemplary embodiment, the second Halbach array 330 is positioned to be biased toward the fourth surface 314.

The second Halbach array 330 may enhance the strength of the magnetic field formed by itself and the magnetic fields formed with the first, third and fourth Halbach arrays 320, 340, 350. Since the direction of the magnetic field formed by the second Halbach array 330 and the process of strengthening the magnetic field are well-known techniques, the detailed description thereof will be omitted.

In the illustrated exemplary embodiment, the second Halbach array 330 includes a first block 331, a second block 332 and a third block 333. It will be understood that the plurality of magnetic materials constituting the second Halbach array 330 are each named blocks 331, 332, 333, respectively.

The first to third blocks 331, 332, 333 may be formed of a magnetic material. In an exemplary embodiment, the first to third blocks 331, 332, 333 may be provided as permanent magnets or electromagnets.

The first to third blocks 331, 332, 333 may be arranged side by side in one direction. In the illustrated exemplary embodiment, the first to third blocks 331, 332, 333 are arranged side by side in the extending direction of the first surface 311, that is, in the left-right direction.

The first block 331 is located in the central portion of the second Halbach array 330. The second block 332 is positioned on the left side of the first block 331, and the third block 333 is positioned on the right side of the first block 331, respectively. In an exemplary embodiment, the blocks 331, 332, 333 adjacent to each other may contact each other.

The first block 331 may be disposed to overlap the first block 351 of the fourth Halbach array 350 in a direction toward the fourth Halbach array 350, which is the front-rear direction in the illustrated exemplary embodiment.

In addition, the first block 331 may be disposed to overlap any one of the first fixed contact 22*a* and the second fixed contact 22*b* in a direction toward the fourth Halbach array 350, which is the front-rear direction in the illustrated exemplary embodiment.

Each of the blocks 331, 332, 333 includes a plurality of surfaces.

Specifically, the first block 331 includes a first inner surface 331*a* facing the space part 315 or the fourth Halbach array 350 and a first outer surface 331*b* opposite to the space part 315 or the fourth Halbach array 350.

The second block 332 includes a second inner surface 332*a* facing the first block 331 and a second outer surface 332*b* opposite to the first block 331.

The third block 333 includes a third inner surface 333*a* facing the first block 331 and a third outer surface 333*b* opposite to the first block 331.

The plurality of surfaces of each of the blocks 331, 332, 333 may be magnetized according to a predetermined rule to constitute a Halbach array.

Specifically, the first to third inner surfaces 331*a*, 332*a*, 333*a* may be magnetized with the same polarity. Similarly, the first to third outer surfaces 331*b*, 332*b*, 333*b* may be magnetized with the same polarity.

In this case, the first to third inner surfaces 331*a*, 332*a*, 333*a* may be magnetized with the same polarity as the first to third inner surfaces 321*a*, 323*a*, 323*a* of the first Halbach array 320. Similarly, the first to third outer surfaces 331*b*, 332*b*, 333*b* may be magnetized with the same polarity as the first to third outer surfaces 321*b*, 322*b*, 323*b* of the first Halbach array 320.

The first to third inner surfaces 331*a*, 332*a*, 333*a* may be magnetized with the same polarity as the first to third inner surfaces 341*a*, 342*a*, 343*a* of the third Halbach array 340. Similarly, the first to third outer surfaces 331*b*, 332*b*, 333*b* may be magnetized with the same polarity as the first to third outer surfaces 341*b*, 342*b*, 343*b* of the third Halbach array 340.

The first to third inner surfaces 331*a*, 332*a*, 333*a* may be magnetized with the same polarity as the first to third inner surfaces 351*a*, 352*a*, 353*a* of the fourth Halbach array 350. Similarly, the first to third outer surfaces 331*b*, 332*b*, 333*b* may be magnetized with the same polarity as the first to third outer surfaces 351*b*, 352*b*, 353*b* of the fourth Halbach array 350.

In the illustrated exemplary embodiment, a plurality of magnetic materials constituting the third Halbach array 340 are sequentially arranged side by side from left to right. That is, in the illustrated exemplary embodiment, the third Halbach array 340 is formed to extend in the left-right direction.

The third Halbach array 340 may form a magnetic field together with other magnetic materials. In the illustrated exemplary embodiment, the third Halbach array 340 may form a magnetic field together with the first Halbach array 320.

The third Halbach array 340 may be positioned adjacent to the other one surface of the first and second surfaces 311, 312. In an exemplary embodiment, the third Halbach array 340 may be coupled to the inner side of the other one surface (i.e., a direction toward the space part 315).

In the illustrated exemplary embodiment, the third Halbach array 340 is disposed on the inner side of the second surface 312, adjacent to the second surface 312, so as to face the first Halbach array 320 or the second Halbach array 330 which is disposed on the inner side of the first surface 311.

The third Halbach array 340 is arranged side by side with the fourth Halbach array 350 in the extending direction thereof. The third Halbach array 340 is disposed adjacent to the fourth Halbach array 350. In an exemplary embodiment, the third Halbach array 340 and the fourth Halbach array 350 may be in contact with each other.

Between the third Halbach array 340 and the first Halbach array 320 or the second Halbach array 330, the space part 315 and the fixed contact 22 and the movable contact 43 accommodated in the space part 315 are positioned.

The third Halbach array 340 is positioned to be biased toward any one of the third surface 313 and the fourth surface 314. In the illustrated exemplary embodiment, the third Halbach array 340 is positioned to be biased toward the third surface 313.

The third Halbach array 340 may enhance the strength of the magnetic field formed by itself and the magnetic field formed with the first, second and fourth Halbach arrays 320, 330, 350. Since the direction of the magnetic field formed by the third Halbach array 340 and the process of strengthening the magnetic field are well-known techniques, the detailed description thereof will be omitted.

In the illustrated exemplary embodiment, the third Halbach array 340 includes a first block 341, a second block 342 and a third block 343. It will be understood that a plurality of magnetic materials constituting the third Halbach array 340 are each named blocks 341, 342, 343, respectively.

The first to third blocks 341, 342, 343 may be formed of a magnetic material. In an exemplary embodiment, the first to third blocks 341, 342, 343 may be provided as permanent magnets or electromagnets.

The first to third blocks 341, 342, 343 may be arranged side by side in one direction. In the illustrated exemplary embodiment, the first to third blocks 341, 342, 343 are arranged side by side in the extending direction of the second surface 312, that is, in the left-right direction.

The first block 341 is located in the central portion of the third Halbach array 340. The second block 342 is positioned on the left side of the first block 341, and the third block 343 is positioned on the right side of the first block 341, respectively. In an exemplary embodiment, each of the blocks 341, 342, 343 adjacent to each other may contact each other.

The first block 341 may be disposed to overlap the first block 321 of the first Halbach array 320 in a direction toward the first Halbach array 320, which is the front-rear direction in the illustrated exemplary embodiment.

In addition, the first block 341 may be disposed to overlap any one of the first fixed contact 22*a* and the second fixed contact 22*b* in a direction toward the first Halbach array 320, which is the front-rear direction in the illustrated exemplary embodiment.

Each of the blocks 341, 342, 343 includes a plurality of surfaces.

Specifically, the first block 341 includes a first inner surface 341*a* facing the space part 315 or the first Halbach array 320 and a first outer surface 341*b* opposite to the space part 315 or the first Halbach array 320.

The second block 342 includes a second inner surface 342*a* facing the first block 341 and a second outer surface 342*b* opposite to the first block 341.

The third block 343 includes a third inner surface 343*a* facing the first block 341 and a third outer surface 343*b* opposite to the first block 341.

The plurality of surfaces of each of the blocks 341, 342, 343 may be magnetized according to a predetermined rule to constitute a Halbach array.

Specifically, the first to third inner surfaces 341*a*, 342*a*, 343*a* may be magnetized with the same polarity. Similarly, the first to third outer surfaces 341*b*, 342*b*, 343*b* may be magnetized with the same polarity.

In this case, the first to third inner surfaces 341*a*, 342*a*, 343*a* may be magnetized with the same polarity as the first to third inner surfaces 321*a*, 323*a*, 323*a* of the first Halbach array 320. Similarly, the first to third outer surfaces 341*b*, 342*b*, 343*b* may be magnetized with the same polarity as the first to third outer surfaces 321*b*, 323*b*, 323*b* of the first Halbach array 320.

The first to third inner surfaces 341*a*, 342*a*, 343*a* may be magnetized with the same polarity as the first to third inner surfaces 331*a*, 332*a*, 333*a* of the second Halbach array 330. Similarly, the first to third outer surfaces 341*b*, 342*b*, 343*b* may be magnetized with the same polarity as the first to third outer surfaces 331*b*, 332*b*, 333*b* of the second Halbach array 330.

The first to third inner surfaces 341*a*, 342*a*, 343*a* may be magnetized with the same polarity as the first to third inner surfaces 351*a*, 352*a*, 353*a* of the fourth Halbach array 350. Similarly, the first to third outer surfaces 341*b*, 342*b*, 343*b* may be magnetized with the same polarity as the first to third outer surfaces 351*b*, 352*b*, 353*b* of the fourth Halbach array 350.

In the illustrated exemplary embodiment, a plurality of magnetic materials constituting the fourth Halbach array 350 are sequentially arranged side by side from left to right. That is, in the illustrated exemplary embodiment, the fourth Halbach array 350 is formed to extend in the left-right direction.

The fourth Halbach array 350 may form a magnetic field together with other magnetic materials. In the illustrated exemplary embodiment, the fourth Halbach array 350 may form a magnetic field together with the second Halbach array 330.

The fourth Halbach array 350 may be positioned adjacent to the other one surface of the first and second surfaces 311, 312. In an exemplary embodiment, the fourth Halbach array 350 may be coupled to the inner side of the other one surface (i.e., a direction toward the space part 315).

In the illustrated exemplary embodiment, the fourth Halbach array 350 is disposed on the inner side of the second surface 312, adjacent to the second surface 312, so as to face the first Halbach array 320 or the second Halbach array 330 which is disposed on the inner side of the first surface 311.

The fourth Halbach array 350 is arranged side by side with the third Halbach array 340 in the extending direction thereof. The fourth Halbach array 350 is disposed adjacent to the third Halbach array 340. In an exemplary embodiment, the third Halbach array 340 and the fourth Halbach array 350 may be in contact with each other.

Between the fourth Halbach array 350 and the first Halbach array 320 or the second Halbach array 330, the space part 315 and the fixed contact 22 and the movable contact 43 accommodated in the space part 315 are positioned.

The fourth Halbach array 350 is positioned to be biased toward the other of the third surface 313 and the fourth surface 314. In the illustrated exemplary embodiment, the fourth Halbach array 350 is positioned to be biased toward the fourth surface 314.

The fourth Halbach array 350 may enhance the strength of the magnetic field formed by itself and the magnetic field formed with the first to third Halbach arrays 320, 330, 340. Since the direction of the magnetic field formed by the fourth Halbach array 350 and the process of strengthening the magnetic field are well-known techniques, the detailed description thereof will be omitted.

In the illustrated exemplary embodiment, the fourth Halbach array 350 includes a first block 351, a second block 352 and a third block 353. It will be understood that a plurality of magnetic materials constituting the fourth Halbach array 350 are each named blocks 351, 352, 353, respectively.

The first to third blocks 351, 352, 353 may be formed of a magnetic material. In an exemplary embodiment, the first to third blocks 351, 352, 353 may be provided as permanent magnets or electromagnets.

The first to third blocks 351, 352, 353 may be arranged side by side in one direction. In the illustrated exemplary embodiment, the first to third blocks 351, 352, 353 are arranged side by side in the extending direction of the second surface 312, that is, in the left-right direction.

The first block 351 is positioned in the central portion of the fourth Halbach array 350. The second block 352 is positioned on the left side of the first block 351, and the third block 353 is positioned on the right side of the first block 351, respectively. In an exemplary embodiment, each of the blocks 351, 352, 353 adjacent to each other may contact each other.

The first block 351 may be disposed to overlap the first block 321 of the second Halbach array 330 in a direction toward the second Halbach array 330, which is the front-rear direction in the illustrated exemplary embodiment.

In addition, the first block 351 may be disposed to overlap any one of the first fixed contact 22*a* and the second fixed contact 22*b* in a direction toward the second Halbach array 330, which is the front-rear direction in the illustrated exemplary embodiment.

Each of the block 351, 352, 353 includes a plurality of surfaces.

Specifically, the first block 351 includes a first inner surface 351 facing the space part 315 or the second Halbach array 330 and a first outer surface 351*b* opposite to the space part 315 or the second Halbach array 330.

The second block 352 includes a second inner surface 352*a* facing the first block 351 and a second outer surface 352*b* opposite to the first block 351.

The third block 353 includes a third inner surface 353*a* facing the first block 351 and a third outer surface 353*b* opposite to the first block 351.

The plurality of surfaces of each of the blocks 351, 352, 353 may be magnetized according to a predetermined rule to constitute a Halbach array.

Specifically, the first to third inner surfaces 351*a*, 352*a*, 353*a* may be magnetized with the same polarity. Similarly, the first to third outer surfaces 351*b*, 352*b*, 353*b* may be magnetized with the same polarity.

In this case, the first to third inner surfaces 351*a*, 352*a*, 353*a* may be magnetized with the same polarity as the first to third inner surfaces 321*a*, 323*a*, 323*a* of the first Halbach array 320. Similarly, the first to third outer surfaces 351*b*, 352*b*, 353*b* may be magnetized with the same polarity as the first to third outer surfaces 321*b*, 323*b*, 323*b* of the first Halbach array 320.

The first to third inner surfaces 351*a*, 352*a*, 353*a* may be magnetized with the same polarity as the first to third inner surfaces 331*a*, 332*a*, 333*a* of the second Halbach array 330. Similarly, the first to third outer surfaces 351*b*, 352*b*, 353*b* may be magnetized with the same polarity as the first to third outer surfaces 331*b*, 332*b*, 333*b* of the second Halbach array 330.

The first to third inner surfaces 351*a*, 352*a*, 353*a* may be magnetized with the same polarity as the first to third inner surfaces 331*a*, 332*a*, 333*a* of the third Halbach array 340. Similarly, the first to third outer surfaces 351*b*, 352*b*, 353*b* may be magnetized with the same polarity as the first to third outer surfaces 341*b*, 342*b*, 343*b* of the third Halbach array 340.

Hereinafter, the arc path (A.P) formed by the arc path generation unit 300 according to the present exemplary embodiment will be described in detail with reference to FIG. 34.

Figure 34:
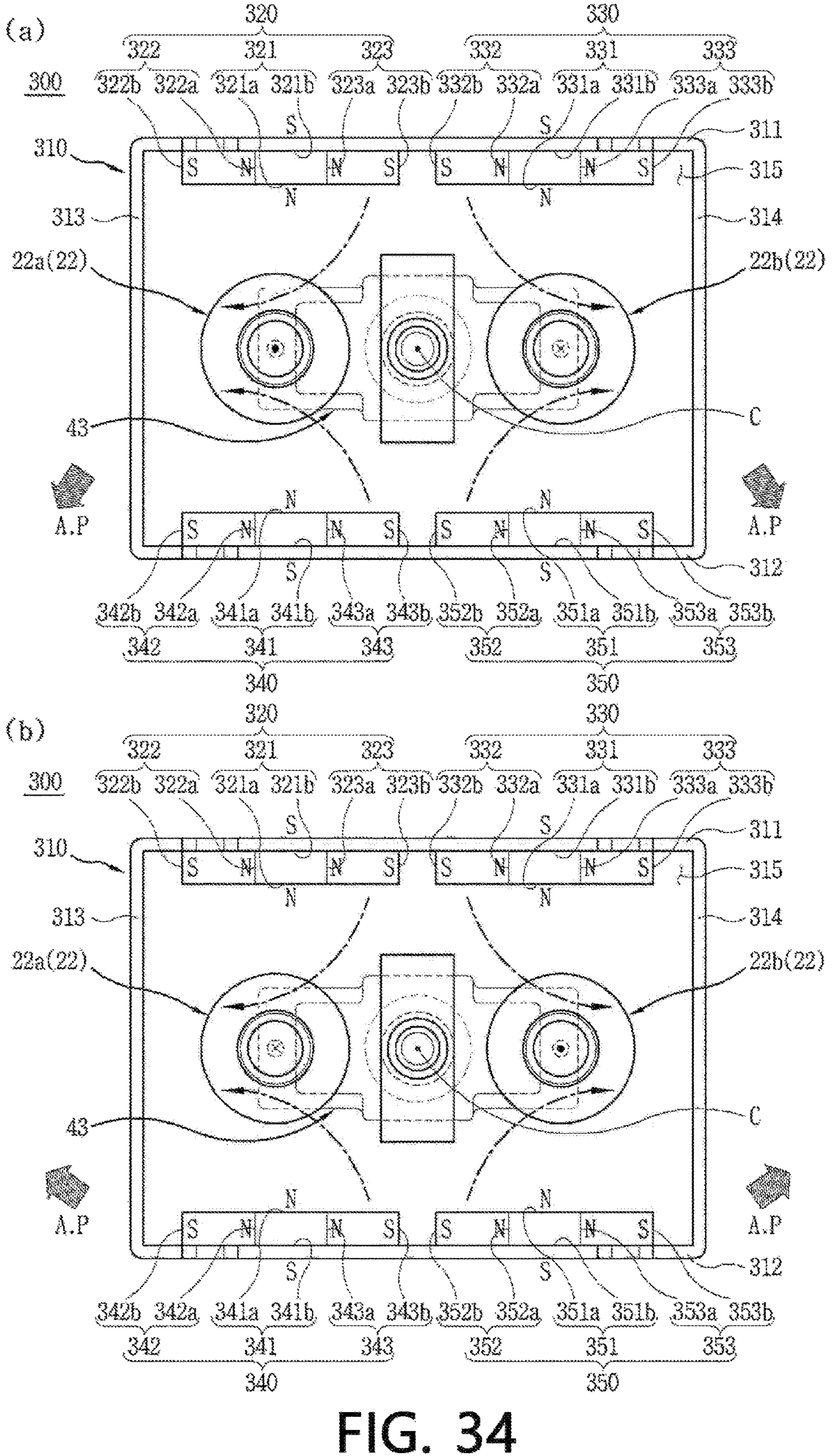
FIG. 34 is a conceptual diagram illustrating the paths of a magnetic field and an arc formed by the arc path generation unit according to the exemplary embodiment of FIG. 33.

Referring to FIG. 34, each of the inner surfaces 321*a*, 322*a*, 323*a* of the first Halbach array 320, each of the inner surfaces 331*a*, 332*a*, 333*a* of the second Halbach array 330, each of the inner surfaces 341*a*, 342*a*, 343*a* of the third Halbach array 340 and each of the inner surfaces 351*a*, 352*a*, 353*a* of the fourth Halbach array 350 are magnetized to the N pole.

Accordingly, a magnetic field in a direction to repel each other is formed between the first Halbach array 320 and the third Halbach array 340. In addition, a magnetic field in a direction to repel each other is also formed between the second Halbach array 330 and the fourth Halbach array 350.

In the exemplary embodiment illustrated in (a) of FIG. 34, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 34, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 320, 330 is changed, the directions of the magnetic fields formed by each of the Halbach arrays 320, 330 become reversed. Accordingly, the path (A.P) of the generated electromagnetic force and arc is also formed to be reversed in the front-rear direction.

That is, in the energized situation as shown in (a) of FIG. 34, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 34, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first and second Halbach arrays 320, 330 or the direction of the current flowing through the DC relay 1, the arc path generation unit 300 according to the present exemplary embodiment may form the path (A.) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(4) Description of the Arc Path Generation Unit 400 According to Another Exemplary Embodiment of the Present Disclosure Hereinafter, the arc path generation unit 400 according to another exemplary embodiment of the present disclosure will be described in detail with reference to FIGS. 35 to 39.

Referring to FIGS. 35 to 38, the arc path generation unit 400 according to the illustrated exemplary embodiment includes a magnetic frame 410, a first Halbach array 420, a second Halbach array 430 and a third Halbach array 440.

The magnetic frame 410 according to the present exemplary embodiment has the same structure and function as the magnetic frame 110 according to the above-described exemplary embodiment. However, there is a difference in the arrangement method of the first Halbach array 420, the second Halbach array 430 and the third Halbach array 440 disposed on the magnetic frame 410 according to the present exemplary embodiment.

Accordingly, the description of the magnetic frame 410 will be replaced with the description of the magnetic frame 110 according to the above-described exemplary embodiment.

In the illustrated exemplary embodiment, a plurality of magnetic materials constituting the first Halbach array 420 are sequentially arranged side by side from left to right. That is, in the illustrated exemplary embodiment, the first Halbach array 420 is formed to extend in the left-right direction.

The first Halbach array 420 may form a magnetic field together with other magnetic materials. In the illustrated exemplary embodiment, the first Halbach array 420 may form a magnetic field together with the second Halbach array 430 or the third Halbach array 440.

The first Halbach array 420 may be positioned adjacent to any one surface of the first and second surfaces 411, 212. In an exemplary embodiment, the first Halbach array 420 may be coupled to the inner side of the any one surface of the surfaces (i.e., a direction toward the space part 415).

Figure 35:
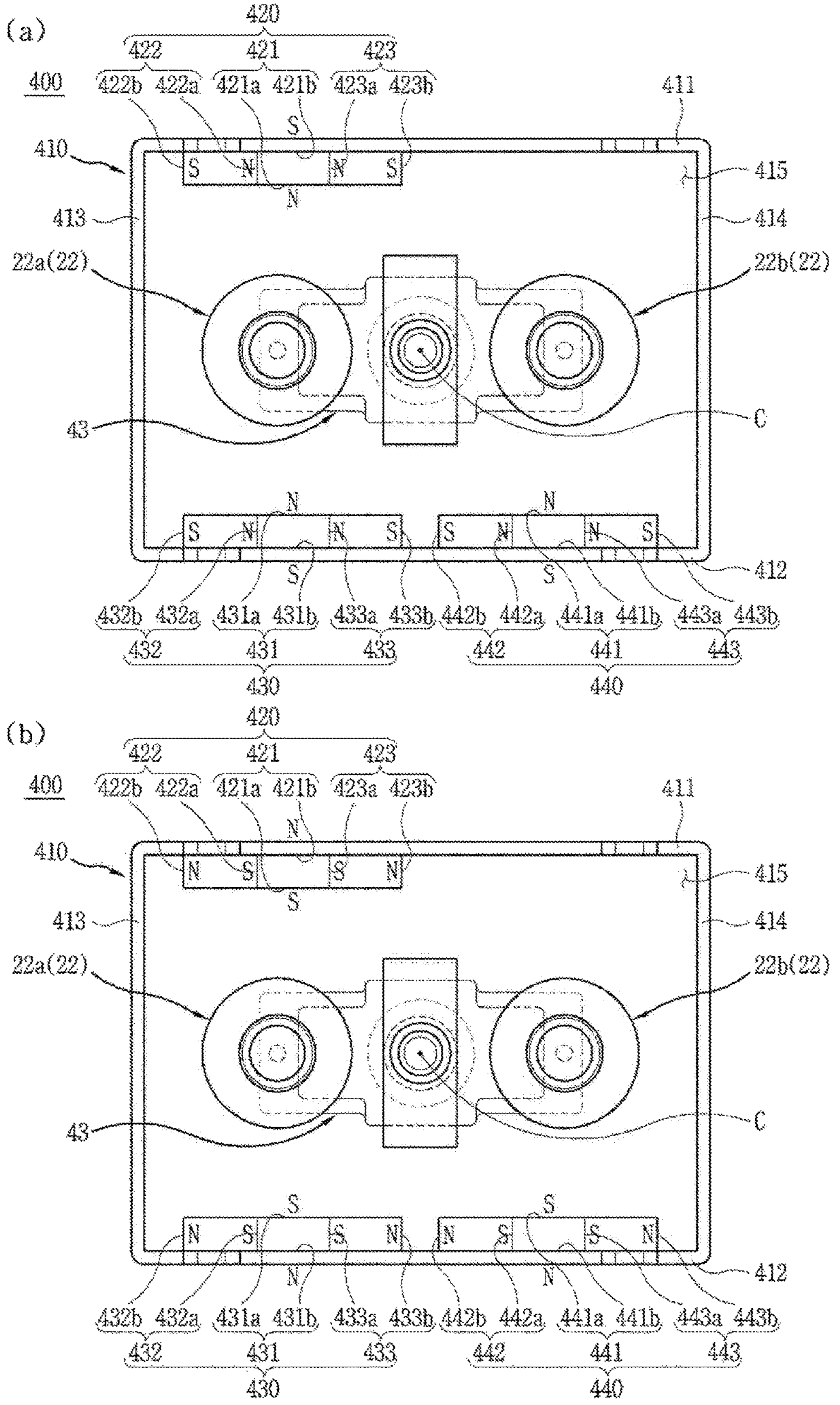
FIGS. 35 to 38 are conceptual diagrams illustrating the arc path generation unit according to still another exemplary embodiment of the present disclosure.
Figure 36:
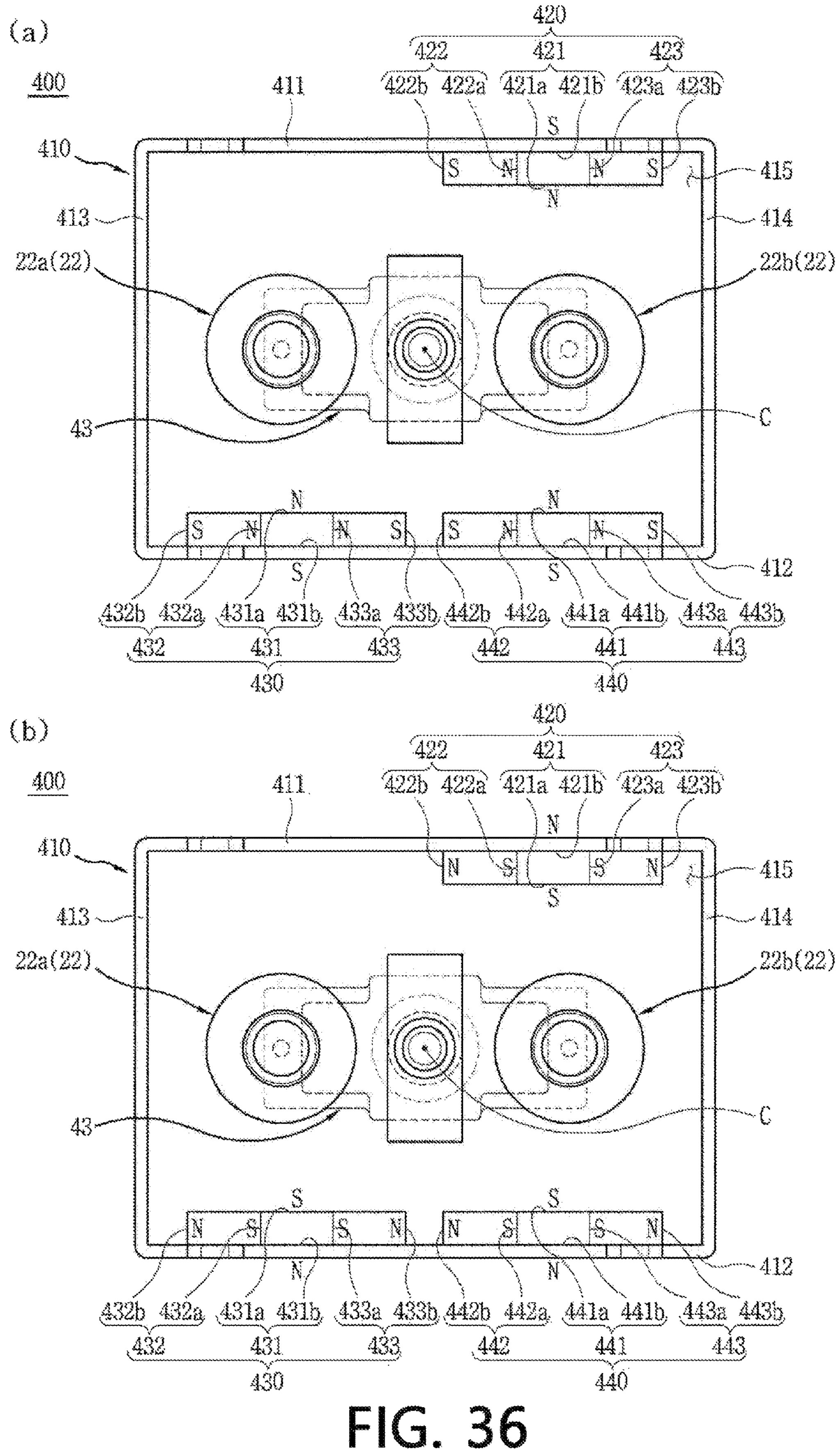

In the exemplary embodiment illustrated in FIGS. 35 and 36, the first Halbach array 420 is disposed on the inner side of the first surface 411, adjacent to the first surface 411, so as to face the second Halbach array 430 or the third Halbach array 440 which is disposed on the inner side of the second surface 412.

Figure 37:
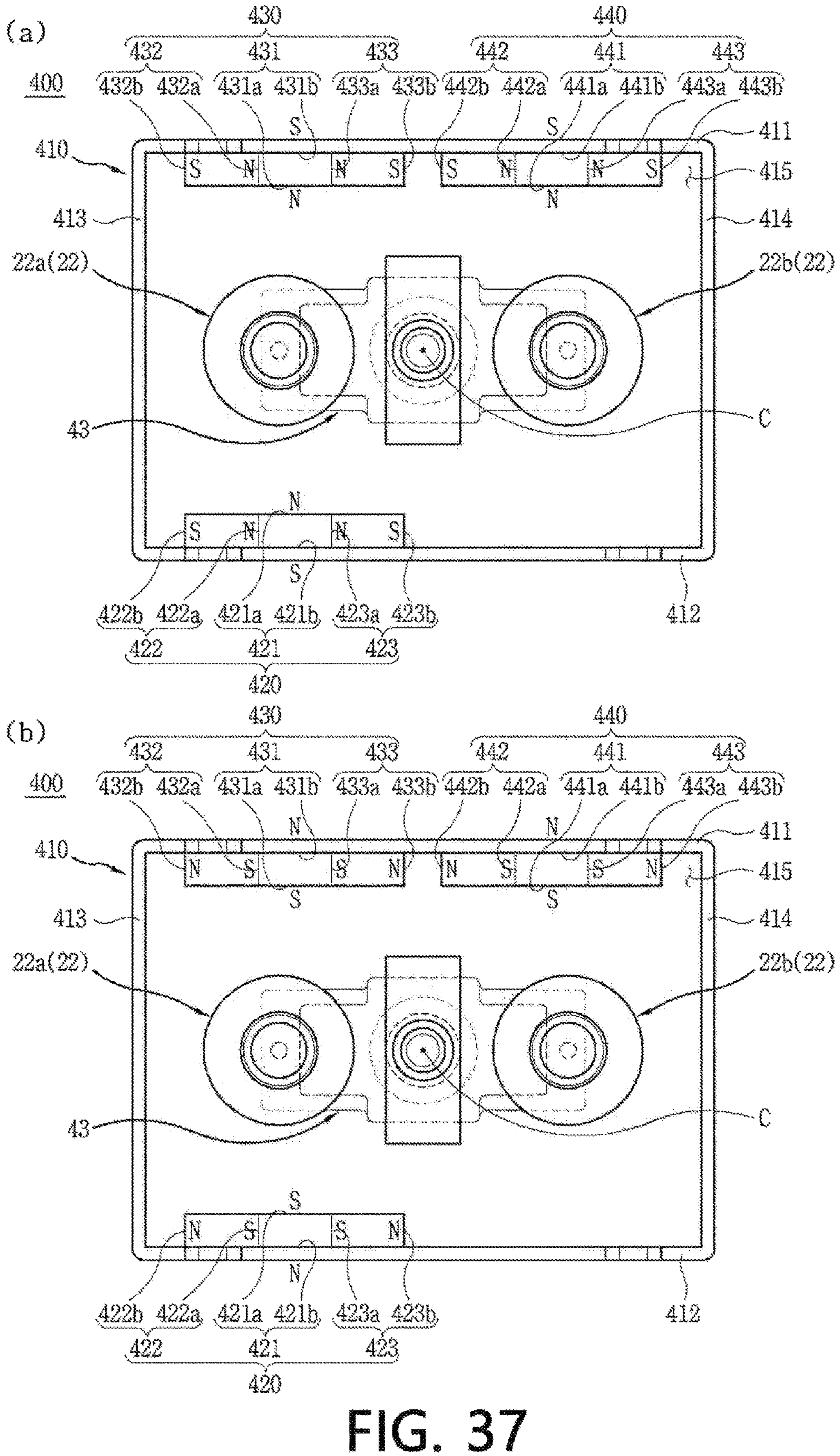
Figure 38:
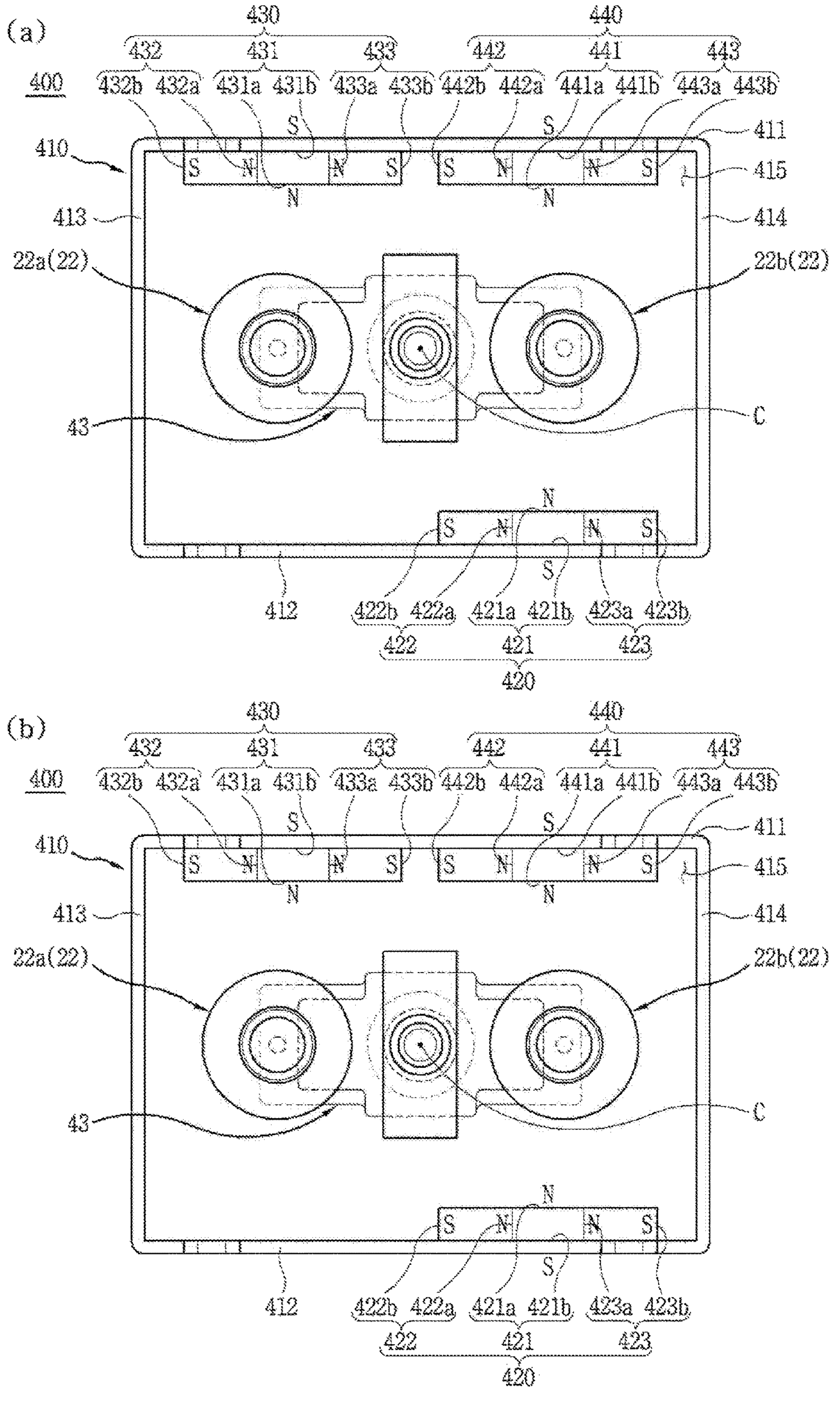

In the exemplary embodiment illustrated in FIGS. 37 and 38, the first Halbach array 420 is disposed on the inner side of the second surface 412, adjacent to the second surface 412, so as to face the second Halbach array 430 or the third Halbach array 440 which is disposed on the inner side of the first surface 411.

Between the first Halbach array 420 and the second Halbach array 430 or the third Halbach array 440, the space part 415 and the fixed contact 22 and the movable contact 43 accommodated in the space part 415 are positioned.

The first Halbach array 420 is positioned to be biased toward any one of the third surface 413 and the fourth surface 414.

In the exemplary embodiment illustrated in FIGS. 35 and 37, the first Halbach array 420 is positioned to be biased toward the third surface 413. In the exemplary embodiment illustrated in FIGS. 36 and 38, the first Halbach array 420 is positioned to be biased toward the fourth surface 414.

The first Halbach array 420 may enhance the strength of the magnetic field formed by itself and the magnetic field formed with the second and third Halbach arrays 430, 440. Since the direction of the magnetic field formed by the first Halbach array 420 and the process of strengthening the magnetic field are well-known techniques, the detailed description thereof will be omitted.

In the illustrated exemplary embodiment, the first Halbach array 420 includes a first block 421, a second block 422 and a third block 423. It will be understood that a plurality of magnetic materials constituting the first Halbach array 420 are each named blocks 421, 422, 423, respectively.

The first to third blocks 421, 422, 423 may be formed of a magnetic material. In an exemplary embodiment, the first to third blocks 421, 422, 423 may be provided as permanent magnets or electromagnets.

The first to third blocks 421, 422, 423 may be arranged side by side in one direction. In the illustrated exemplary embodiment, the first to third blocks 421, 422, 423 are arranged side by side in the extending direction of the first surface 411, that is, in the left-right direction.

The first block 421 is positioned in the central portion of the first Halbach array 420. The second block 422 is positioned on the left side of the first block 421, and the third block 423 is positioned on the right side of the first block 421, respectively. In an exemplary embodiment, each of the blocks 421, 422, 423 adjacent to each other may contact each other.

The first block 421 may be disposed to overlap the first block 431 of the second Halbach array 430 or the first block 441 of the third Halbach array 440 in a direction toward the second Halbach array 430 or the third Halbach array 440, which is the front-rear direction in the illustrated exemplary embodiment.

In addition, the first block 421 may be disposed to overlap any one of the first fixed contact 22*a* and the second fixed contact 22*b* in a direction toward the second Halbach array 430 or the third Halbach array 440, which is the front-rear direction in the illustrated exemplary embodiment.

Each of the blocks 421, 422, 423 includes a plurality of surfaces.

Specifically, the first block 421 includes a first inner surface 421 facing the space part 415, a second Halbach array 430 or a third Halbach array 440, and a first outer surface 421*b* opposite to the space part 415 or the second Halbach array 430.

The second block 422 includes a second inner surface 422*a* facing the first block 421 and a second outer surface 422*b* opposite to the first block 421.

The third block 423 includes a third inner surface 423*a* facing the first block 421 and a third outer surface 423*b* opposite to the first block 421.

The plurality of surfaces of each of the blocks 421, 422, 423 may be magnetized according to a predetermined rule to constitute a Halbach array.

Specifically, the first to third inner surfaces 421*a*, 422*a*, 423*a* may be magnetized with the same polarity. Similarly, the first to third outer surfaces 421*b*, 422*b*, 423*b* may be magnetized with the same polarity.

In this case, the first to third inner surfaces 421*a*, 422*a*, 423*a* may be magnetized with the same polarity as the first to third inner surfaces 431*a*, 432*a*, 433*a* of the second Halbach array 430. Similarly, the first to third outer surfaces 421*b*, 422*b*, 423*b* may be magnetized with the same polarity as the first to third outer surfaces 431*b*, 432*b*, 433*b* of the second Halbach array 430.

The first to third inner surfaces 421*a*, 422*a*, 423*a* may be magnetized with the same polarity as the first to third inner surfaces 441*a*, 442*a*, 443*a* of the third Halbach array 440. Similarly, the first to third outer surfaces 421*b*, 422*b*, 423*b* may be magnetized with the same polarity as the first to third outer surfaces 441*b*, 442*b*, 443*b* of the third Halbach array 440.

In the illustrated exemplary embodiment, a plurality of magnetic materials constituting the second Halbach array 430 are sequentially arranged side by side from left to right. That is, in the illustrated exemplary embodiment, the second Halbach array 430 is formed to extend in the left-right direction.

The second Halbach array 430 may form a magnetic field together with other magnetic materials. In the illustrated exemplary embodiment, the second Halbach array 430 may form a magnetic field together with the first Halbach array 420.

The second Halbach array 430 may be positioned adjacent to the other one surface of the first and second surfaces 411, 412. In an exemplary embodiment, the second Halbach array 430 may be coupled to the inner side of the other one surface (i.e., a direction toward the space part 415).

In the illustrated exemplary embodiment, the second Halbach array 430 is disposed on the inner side of the second surface 412, adjacent to the second surface 412, so as to face the first Halbach array 420 which is disposed on the inner side of the first surface 411.

The second Halbach array 430 is arranged side by side with the third Halbach array 440 in the extending direction thereof. The second Halbach array 430 is disposed adjacent to the third Halbach array 440. In an exemplary embodiment, the second Halbach array 430 and the third Halbach array 440 may be in contact with each other.

Between the second Halbach array 430 and the first Halbach array 420, the space part 415 and the fixed contact 22 and the movable contact 43 accommodated in the space part 415 are positioned.

The second Halbach array 430 is positioned to be biased toward any one of the third surface 413 and the fourth surface 414. In the illustrated exemplary embodiment, the second Halbach array 430 is positioned to be biased toward the third surface 413.

The second Halbach array 430 may enhance the strength of the magnetic field formed by itself and the magnetic field formed with the first and third Halbach arrays 420, 440. Since the direction of the magnetic field formed by the second Halbach array 430 and the process of strengthening the magnetic field are well-known techniques, the detailed description thereof will be omitted.

In the illustrated exemplary embodiment, the second Halbach array 430 includes a first block 431, a second block 432 and a third block 433. It will be understood that a plurality of magnetic materials constituting the second Halbach array 430 are each named blocks 431, 432, 433, respectively.

The first to third blocks 431, 432, 433 may be formed of a magnetic material. In an exemplary embodiment, the first to third blocks 431, 432, 433 may be provided as permanent magnets or electromagnets.

The first to third blocks 431, 432, 433 may be arranged side by side in one direction. In the illustrated exemplary embodiment, the first to third blocks 431, 432, 433 are arranged side by side in the extending direction of the second surface 412, that is, in the left-right direction.

The first block 431 is located in the central portion of the second Halbach array 430. The second block 432 is positioned on the left side of the first block 431, and the third block 433 is positioned on the right side of the first block 431, respectively. In an exemplary embodiment, each of the blocks 431, 432, 433 adjacent to each other may contact each other.

The first block 431 may be disposed to overlap the first block 421 of the first Halbach array 420 in a direction toward the first Halbach array 420, which is the front-rear direction in the illustrated exemplary embodiment.

In addition, the first block 431 may be disposed to overlap the first fixed contact 22*a* in a direction toward the first Halbach array 420, which is the front-rear direction in the illustrated exemplary embodiment.

Each of the blocks 431, 432, 433 includes a plurality of surfaces.

Specifically, the first block 431 includes a first inner surface 421*a* facing the space part 415 or the first Halbach array 420 and a first outer surface 431*b* opposite to the space part 415 or the first Halbach array 420.

The second block 432 includes a second inner surface 432*a* facing the first block 431 and a second outer surface 432*b* opposite to the first block 431.

The third block 433 includes a third inner surface 433*a* facing the first block 431 and a third outer surface 433*b* opposite to the first block 431.

The plurality of surfaces of each of the blocks 431, 432, 433 may be magnetized according to a predetermined rule to constitute a Halbach array.

Specifically, the first to third inner surfaces 431*a*, 432*a*, 433*a* may be magnetized with the same polarity. Similarly, the first to third outer surfaces 431*b*, 432*b*, 433*b* may be magnetized with the same polarity.

In this case, the first to third inner surfaces 431*a*, 432*a*, 433*a* may be magnetized with the same polarity as the first to third inner surfaces 421*a*, 422*a*, 423*a* of the first Halbach array 420. Similarly, the first to third outer surfaces 431*b*, 432*b*, 433*b* may be magnetized with the same polarity as the first to third outer surfaces 421*b*, 422*b*, 423*b* of the first Halbach array 420.

The first to third inner surfaces 431*a*, 432*a*, 433*a* may be magnetized with the same polarity as the first to third inner surfaces 441*a*, 442*a*, 443*a* of the third Halbach array 440. Similarly, the first to third outer surfaces 431*b*, 432*b*, 433*b* may be magnetized with the same polarity as the first to third outer surfaces 441*b*, 442*b*, 443*b* of the third Halbach array 440.

In the illustrated exemplary embodiment, a plurality of magnetic materials constituting the third Halbach array 440 are sequentially arranged side by side from left to right. That is, in the illustrated exemplary embodiment, the third Halbach array 440 is formed to extend in the left-right direction.

The third Halbach array 440 may itself form a magnetic field. That is, the plurality of magnetic materials included in the third Halbach array 440 may form a magnetic field between each other.

In addition, the third Halbach array 440 may form a magnetic field together with other magnetic materials. In the illustrated exemplary embodiment, the third Halbach array 440 may form a magnetic field together with the first Halbach array 420.

The third Halbach array 440 may be positioned adjacent to the other one surface of the first and second surfaces 411, 312. In an exemplary embodiment, the third Halbach array 440 may be coupled to the inner side of the other one surface (i.e., a direction toward the space part 415).

In the illustrated exemplary embodiment, the third Halbach array 440 is disposed on the inner side of the second surface 412, adjacent to the second surface 412, so as to face the first Halbach array 420 which is disposed on the inner side of the first surface 411.

The third Halbach array 440 is arranged side by side with the second Halbach array 430 in the extending direction thereof. The third Halbach array 440 is disposed adjacent to the second Halbach array 430. In an exemplary embodiment, the third Halbach array 440 and the third Halbach array 440 may be in contact with each other.

Between the third Halbach array 440 and the first Halbach array 420, the space part 415 and the fixed contact 22 and the movable contact 43 accommodated in the space part 415 are positioned.

The third Halbach array 440 is positioned to be biased toward the other of the third surface 413 and the fourth surface 414. In the illustrated exemplary embodiment, the third Halbach array 440 is positioned to be biased toward the fourth surface 414.

The third Halbach array 440 may enhance the strength of the magnetic field formed by itself and the magnetic field formed with the first and second Halbach arrays 420, 430. Since the direction of the magnetic field formed by the third Halbach array 440 and the process of strengthening the magnetic field are well-known techniques, the detailed description thereof will be omitted.

In the illustrated exemplary embodiment, the third Halbach array 440 includes a first block 441, a second block 442 and a third block 443. It will be understood that a plurality of magnetic materials constituting the third Halbach array 440 are each named blocks 441, 442, 443, respectively.

The first to third blocks 441, 442, 443 may be formed of a magnetic material. In an exemplary embodiment, the first to third blocks 441, 442, 443 may be provided as permanent magnets or electromagnets.

The first to third blocks 441, 442, 443 may be arranged side by side in one direction. In the illustrated exemplary embodiment, the first to third blocks 441, 442, 443 are arranged side by side in the extending direction of the second surface 412, that is, in the left-right direction.

The first block 441 is positioned in the central portion of the third Halbach array 440. The second block 442 is positioned on the left side of the first block 441, and the third block 443 is positioned on the right side of the first block 441, respectively. In an exemplary embodiment, each of the blocks 441, 442, 443 adjacent to each other may contact each other.

The first block 441 may be disposed to overlap the first block 421 of the first Halbach array 420 in a direction toward the first Halbach array 420, which is the front-rear direction in the illustrated exemplary embodiment.

In addition, the first block 441 may be disposed to overlap the other one of the first fixed contact 22*a* and the second fixed contact 22*b* in a direction toward the first Halbach array 420, which is the front-rear direction in the illustrated exemplary embodiment.

Each of the blocks 441, 442, 443 includes a plurality of surfaces.

Specifically, the first block 441 includes a first inner surface 441*a* facing the space part 415 or the first Halbach array 420 and a first outer surface 441*b* opposite to the space part 415 or the first Halbach array 420.

The second block 442 includes a second inner surface 442*a* facing the first block 441 and a second outer surface 442*b* opposite to the first block 441.

The third block 443 includes a third inner surface 443*a* facing the first block 441 and a third outer surface 443*b* opposite to the first block 441.

The plurality of surfaces of each of the blocks 441, 442, 443 may be magnetized according to a predetermined rule to constitute a Halbach array.

Specifically, the first to third inner surfaces 441*a*, 442*a*, 443*a* may be magnetized with the same polarity. Similarly, the first to third outer surfaces 441*b*, 442*b*, 443*b* may be magnetized with the same polarity.

In this case, the first to third inner surfaces 441*a*, 442*a*, 443*a* may be magnetized with the same polarity as the first to third inner surfaces 421*a*, 422*a*, 423*a* of the first Halbach array 420. Similarly, the first to third outer surfaces 441*b*, 442*b*, 443*b* may be magnetized with the same polarity as the first to third outer surfaces 421*b*, 423*b*, 423*b* of the first Halbach array 420.

The first to third inner surfaces 441*a*, 442*a*, 443*a* may be magnetized with the same polarity as the first to third inner surfaces 431*a*, 432*a*, 433*a* of the second Halbach array 430. Similarly, the first to third outer surfaces 441*b*, 442*b*, 443*b* may be magnetized with the same polarity as the first to third outer surfaces 431*b*, 432*b*, 433*b* of the second Halbach array 430.

Hereinafter, the arc path (A.P) formed by the arc path generation unit 400 according to the present exemplary embodiment will be described in detail with reference to FIG. 39.

Figure 39:
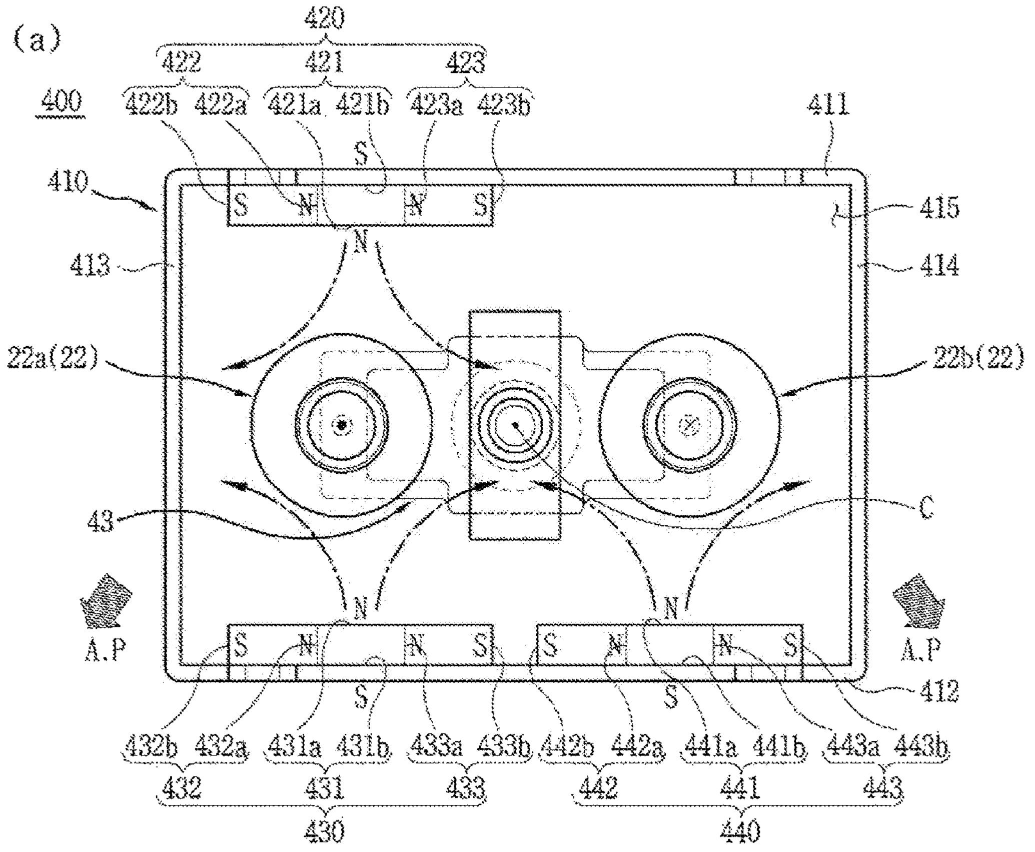
FIG. 39 is a conceptual diagram illustrating the paths of a magnetic field and an arc formed by the arc path generation unit according to the exemplary embodiment of FIGS. 35 to 38.
Figure 39:
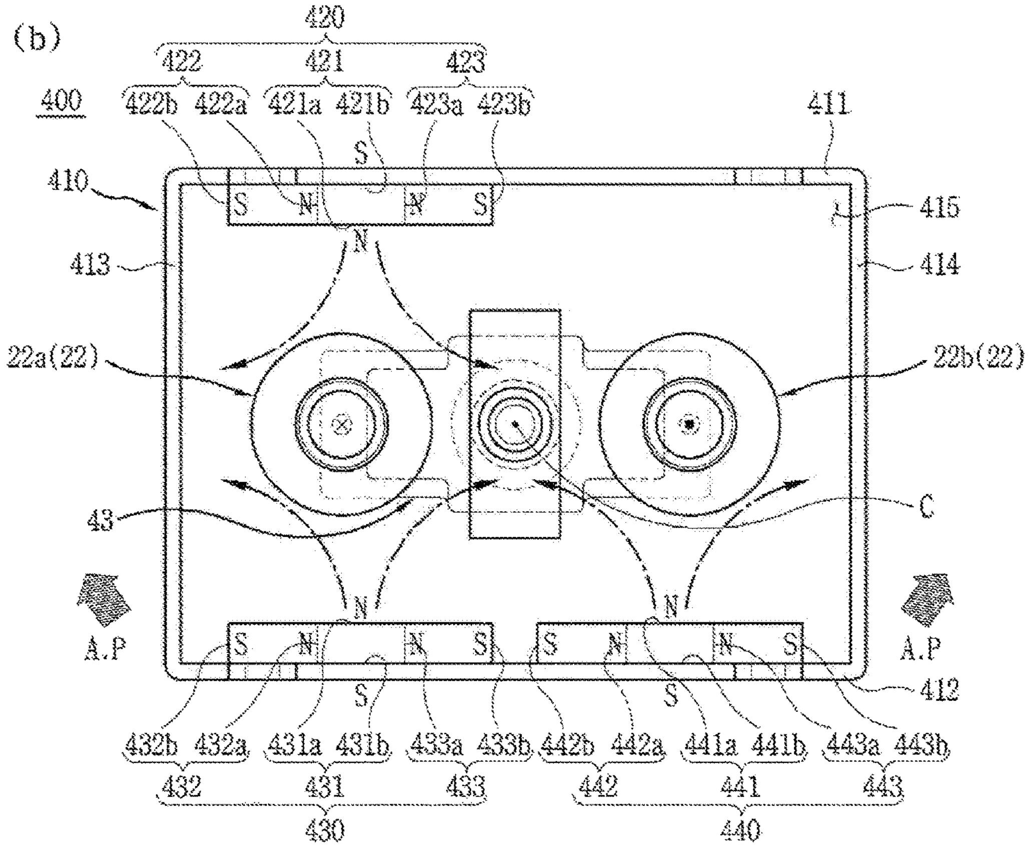

Referring to FIG. 39, each of the inner surfaces 421*a*, 422*a*, 423*a* of the first Halbach array 420, each of the inner surfaces 431*a*, 432*a*, 433*a* of the second Halbach array 430 and each of the inner surfaces 441*a*, 442*a*, 443*a* of the third Halbach array 440 are magnetized to the N pole.

Accordingly, a magnetic field in a direction to repel each other is formed between the first Halbach array 420 and the third Halbach array 440.

Although not illustrated, in an exemplary embodiment where the first Halbach array 420 is positioned to be biased toward the fourth surface 414 to face the third Halbach array 440, it will be understood that a magnetic field in a direction to repel each other is formed between the first Halbach array 420 and the third Halbach array 440.

In the exemplary embodiment illustrated in (a) of FIG. 39, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 39, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first to third Halbach arrays 420, 430, 440 is changed, the directions of the magnetic fields formed by each of the Halbach arrays 420, 430 become reversed. Accordingly, the path (A.P) of the generated electromagnetic force and arc is also formed in the reverse direction of the front-rear direction.

That is, in the energized situation as shown in (a) of FIG. 39, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 39, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first to third Halbach arrays 420, 430, 440 or the direction of the current flowing through the DC relay 1, the arc path generation unit 400 according to the present exemplary embodiment may form the path of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(5) Description of the Arc Path Generation Unit 500 According to Another Exemplary Embodiment of the Present Disclosure Hereinafter, the arc path generation unit 500 according to another exemplary embodiment of the present disclosure will be described in detail with reference to FIGS. 40 to 42.

Figure 40:
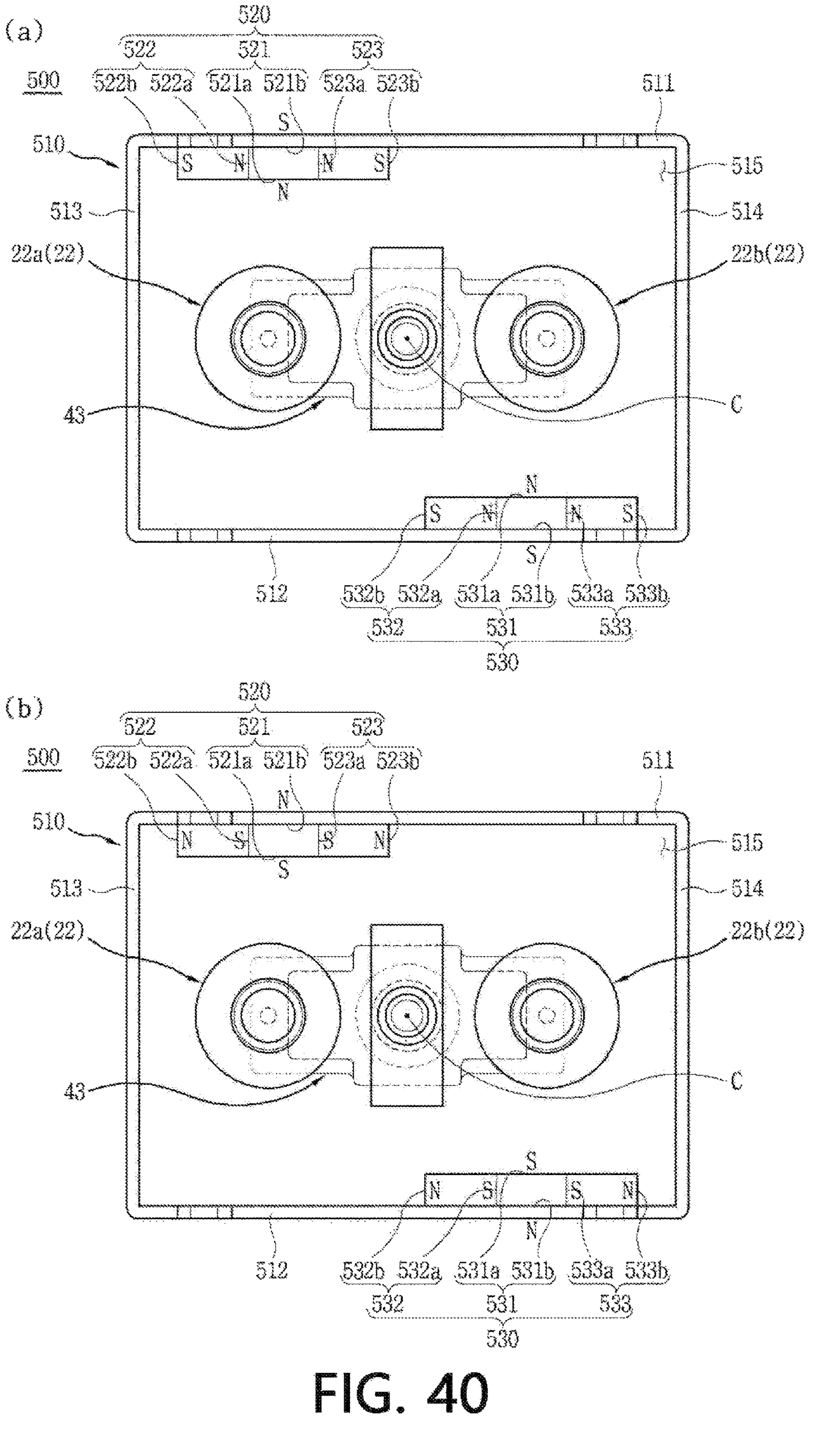
FIGS. 40 and 41 are conceptual diagrams illustrating the arc path generation unit according to still another exemplary embodiment of the present disclosure.
Figure 41:
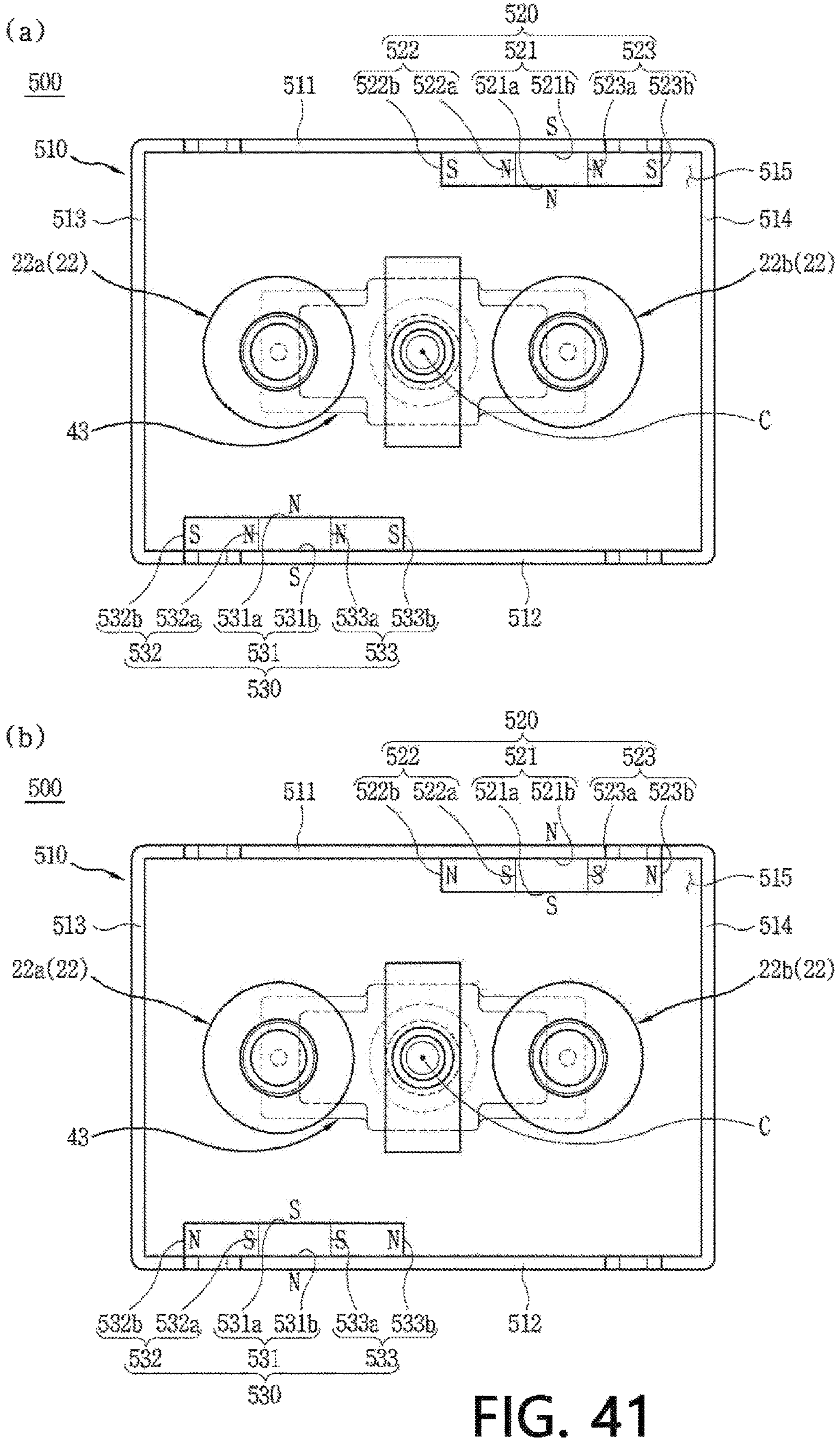

Referring to FIGS. 40 and 41, the arc path generation unit 500 according to the illustrated exemplary embodiment includes a magnetic frame 510, a first Halbach array 520 and a second Halbach array 530.

The magnetic frame 510 according to the present exemplary embodiment has the same structure and function as the magnetic frame 110 according to the above-described exemplary embodiment. However, there is a difference in the arrangement method of the first Halbach array 520 and the second Halbach array 530 disposed on the magnetic frame 510 according to the present exemplary embodiment.

Accordingly, the description of the magnetic frame 510 will be replaced with the description of the magnetic frame 110 according to the above-described exemplary embodiment.

In the illustrated exemplary embodiment, a plurality of magnetic materials constituting the first Halbach array 520 are sequentially arranged side by side from left to right. That is, in the illustrated exemplary embodiment, the first Halbach array 520 is formed to extend in the left-right direction.

The first Halbach array 520 may form a magnetic field together with other magnetic materials. In the illustrated exemplary embodiment, the first Halbach array 520 may form a magnetic field together with the second Halbach array 530.

The first Halbach array 520 may be positioned adjacent to any one surface of the first and second surfaces 511, 512. In an exemplary embodiment, the first Halbach array 520 may be coupled to the inner side of the any one surface (i.e., a direction toward the space part 515).

In the illustrated exemplary embodiment, the first Halbach array 520 is disposed on the inner side of the first surface 511, adjacent to the first surface 511, so as to face the second Halbach array 530, which is disposed on the inner side of the second surface 521, in a diagonal direction.

Between the first Halbach array 520 and the second Halbach array 530, the space part 515 and the fixed contact 22 and the movable contact 43 accommodated in the space part 515 are positioned. In an exemplary embodiment, the center (C) may be positioned on an imaginary straight line connecting the first Halbach array 520 and the second Halbach array 530.

The first Halbach array 520 is positioned to be biased toward any one of the third surface 513 and the fourth surface 514. In the exemplary embodiment illustrated in FIG. 40, the first Halbach array 520 is positioned to be biased toward the third surface 513. In the exemplary embodiment illustrated in FIG. 41, the first Halbach array 520 is positioned to be biased toward the fourth surface 514.

The first Halbach array 520 may enhance the strength of the magnetic field formed by itself and the magnetic field formed with the second Halbach array 530. Since the direction of the magnetic field formed by the first Halbach array 520 and the process of strengthening the magnetic field are well-known techniques, the detailed description thereof will be omitted.

In the illustrated exemplary embodiment, the first Halbach array 520 includes a first block 521, a second block 522 and a third block 523. It will be understood that a plurality of magnetic materials constituting the first Halbach array 520 are each named as blocks 521, 522, 523, respectively.

The first to third blocks 521, 522, 523 may be formed of a magnetic material. In an exemplary embodiment, the first to third blocks 521, 522, 523 may be provided as permanent magnets or electromagnets.

The first to third blocks 521, 522, 523 may be arranged side by side in one direction. In the illustrated exemplary embodiment, the first to third blocks 521, 522, 523 are arranged side by side in the extending direction of the first surface 511, that is, in the left-right direction. The first block 521 is positioned in the central portion of the first Halbach array 520.

The second block 522 is positioned on the left side of the first block 521, and the third block 523 is positioned on the right side of the first block 521, respectively. In an exemplary embodiment, each of the blocks 521, 522, 523 adjacent to each other may contact each other.

In addition, the first block 521 may be disposed to overlap any one of the first fixed contact 22*a* and the second fixed contact 22*b* in a direction toward the second Halbach array 530 or the second surface 512, which is the front-rear direction in the illustrated exemplary embodiment.

In the exemplary embodiment illustrated in FIG. 40, the first Halbach array 520 overlaps the first fixed contact 22*a*.

In the exemplary embodiment illustrated in FIG. 41, the second Halbach array 530 overlaps the second fixed contact 22*b*.

Each of the blocks 521, 522, 523 includes a plurality of surfaces.

Specifically, the first block 521 includes a first inner surface 521*a* facing the space part 515, the second Halbach array 530 or the second surface 512, and a first outer surface 521 opposite to the space part 515 or the second Halbach array 530.

The second block 522 includes a second inner surface 522*a* facing the first block 521 and a second outer surface 522*b* opposite to the first block 521.

The third block 523 includes a third inner surface 523*a* facing the first block 521 and a third outer surface 523*b* opposite to the first block 521.

The plurality of surfaces of each of the blocks 521, 522, 523 may be magnetized according to a predetermined rule to constitute a Halbach array.

Specifically, the first to third inner surfaces 521*a*, 522*a*, 523*a* may be magnetized with the same polarity. Similarly, the first to third outer surfaces 521*b*, 522*b*, 523*b* may be magnetized with the same polarity.

In this case, the first to third inner surfaces 521*a*, 522*a*, 523*a* may be magnetized with the same polarity as the first to third inner surfaces 531*a*, 532*a*, 533*a* of the second Halbach array 530. Similarly, the first to third outer surfaces 521*b*, 522*b*, 523*b* may be magnetized with the same polarity as the first to third outer surfaces 531*b*, 532*b*, 533*b* of the second Halbach array 530.

In the illustrated exemplary embodiment, a plurality of magnetic materials constituting the second Halbach array 530 are sequentially arranged side by side from left to right. That is, in the illustrated exemplary embodiment, the second Halbach array 530 is formed to extend in the left-right direction.

The second Halbach array 530 may form a magnetic field together with other magnetic materials. In the illustrated exemplary embodiment, the second Halbach array 530 may form a magnetic field together with the first Halbach array 520.

The second Halbach array 530 may be positioned adjacent to the other one surface of the first and second surfaces 511, 512. In an exemplary embodiment, the second Halbach array 530 may be coupled to the inner side of the any one surface (i.e., a direction toward the space part 515).

In the illustrated exemplary embodiment, the second Halbach array 530 is disposed on the inner side of the second surface 512, adjacent to the second surface 512, so as to face the first Halbach array 520, which is disposed on the inner side of the first surface 511, in a diagonal direction.

Between the second Halbach array 530 and the first Halbach array 520, the space part 515 and the fixed contact 22 and the movable contact 43 accommodated in the space part 515 are positioned.

The second Halbach array 530 is positioned to be biased toward the other of the third surface 513 and the fourth surface 514. In the exemplary embodiment illustrated in FIG. 40, the second Halbach array 530 is positioned to be biased toward the fourth surface 514. In the exemplary embodiment illustrated in FIG. 41, the second Halbach array 530 is positioned to be biased toward the third surface 513.

The second Halbach array 530 may enhance the strength of the magnetic field formed by itself and the magnetic field formed with the first Halbach array 520. Since the direction of the magnetic field formed by the second Halbach array

530 and the process of strengthening the magnetic field are well-known techniques, the detailed description thereof will be omitted.

In the illustrated exemplary embodiment, the second Halbach array 530 includes a first block 531, a second block 532 and a third block 533. It will be understood that a plurality of magnetic materials constituting the second Halbach array 530 are each named blocks 531, 532, 533, respectively.

The first to third blocks 531, 532, 533 may be formed of a magnetic material. In an exemplary embodiment, the first to third blocks 531, 532, 533 may be provided as permanent magnets or electromagnets.

The first to third blocks 531, 532, 533 may be arranged side by side in one direction. In the illustrated exemplary embodiment, the first to third blocks 531, 532, 533 are arranged side by side in the extending direction of the second surface 512, that is, in the left-right direction.

The first block 531 is positioned in the central portion of the second Halbach array 530. The second block 532 is positioned on the left side of the first block 531, and the third block 533 is positioned on the right side of the first block 531, respectively. In an exemplary embodiment, each of the blocks 531, 532, 533 adjacent to each other may contact each other.

The first block 531 may be disposed to overlap the other one of the first fixed contact 22*a* and the second fixed contact 22*b* in a direction toward the first Halbach array 520, which is the front-rear direction in the illustrated exemplary embodiment.

In the exemplary embodiment illustrated in FIG. 40, the first block 531 is disposed to overlap the second fixed contact 22*b* in the front-rear direction. In the exemplary embodiment illustrated in FIG. 41, the second block 532 is disposed to overlap the first fixed contact 22*a* in the front-rear direction.

Each of the blocks 531, 532, 533 includes a plurality of surfaces.

Specifically, the first block 531 includes a first inner surface 531*a* facing the space part 515 or the first Halbach array 520 and a first outer surface 531*b* opposite to the space part 515 or the first Halbach array 520.

The second block 532 includes a second inner surface 532*a* facing the first block 531 and a second outer surface 532*b* opposite to the first block 531.

The third block 533 includes a third inner surface 533*a* facing the first block 531 and a third outer surface 533*b* opposite to the first block 531.

The plurality of surfaces of each of the blocks 531, 532, 533 may be magnetized according to a predetermined rule to constitute a Halbach array.

Specifically, the first to third inner surfaces 531*a*, 532*a*, 533*a* may be magnetized with the same polarity. Similarly, the first to third outer surfaces 531*b*, 532*b*, 533*b* may be magnetized with the same polarity.

In this case, the first to third inner surfaces 531*a*, 532*a*, 533*a* may be magnetized with the same polarity as the first to third inner surfaces 521*a*, 522*a*, 523*a* of the first Halbach array 520. Similarly, the first to third outer surfaces 531*b*, 532*b*, 533*b* may be magnetized with the same polarity as the first to third outer surfaces 521*b*, 522*b*, 523*b* of the first Halbach array 520.

Hereinafter, the arc path (A.P) formed by the arc path generation unit 500 according to the present exemplary embodiment will be described in detail with reference to FIG. 42.

Figure 42:
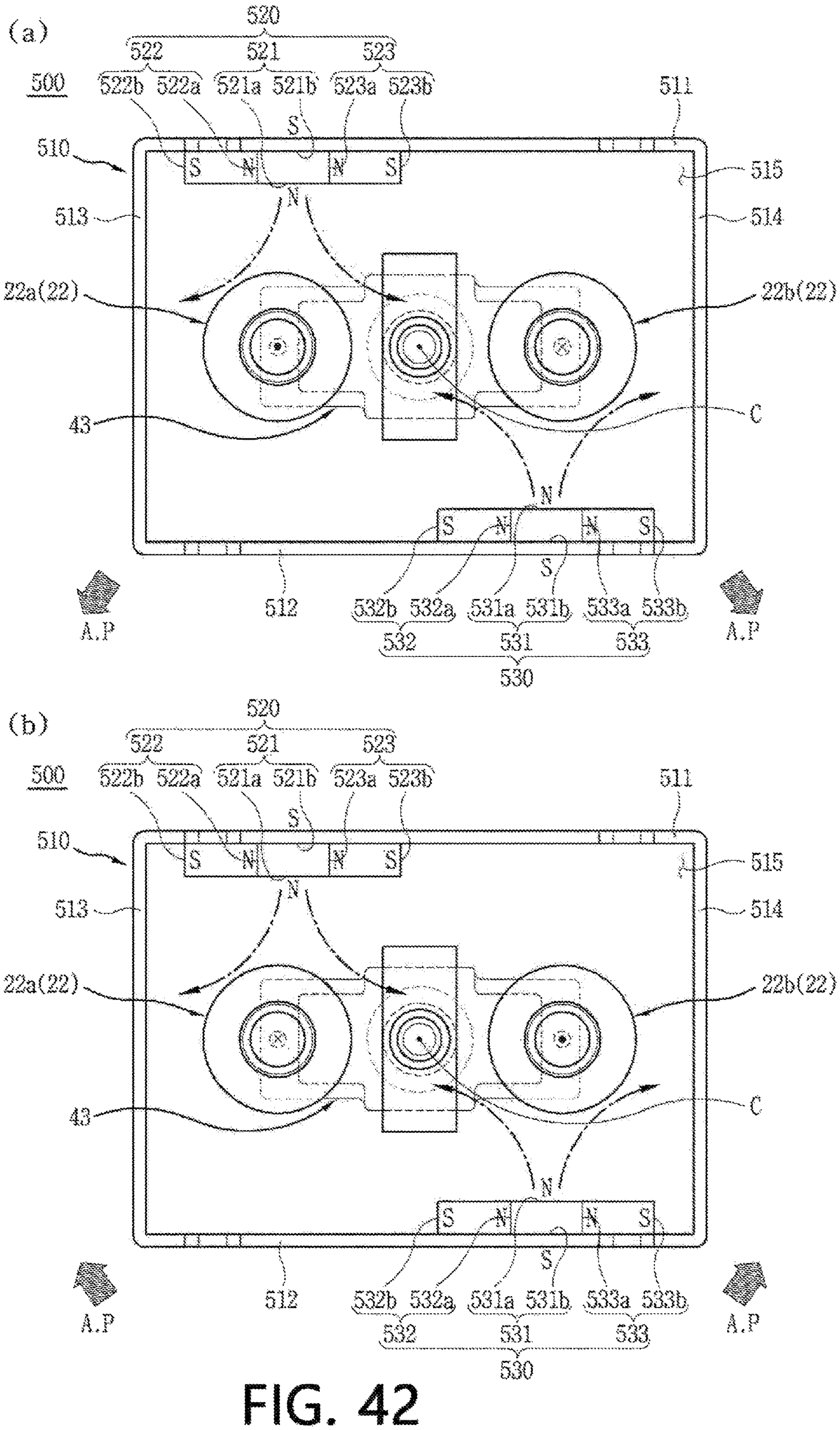
FIG. 42 is a conceptual diagram illustrating the paths of a magnetic field and an arc formed by the arc path generation unit according to the exemplary embodiment of FIGS. 40 and 41.

Referring to FIG. 42, each of the inner surfaces 521*a*, 522*a*, 523*a* of the first Halbach array 520 and each of the inner surfaces 531*a*, 532*a*, 533*a* of the second Halbach array 530 are magnetized to the N pole.

Accordingly, a magnetic field in a direction to repel each other is formed between the first Halbach array 520 and the second Halbach array 530.

In the exemplary embodiment illustrated in (a) of FIG. 42, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 42, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 520, 530 is changed, the directions of the magnetic fields formed by each of the Halbach arrays 520, 530 become reversed. Accordingly, the path (A.P) of the generated electromagnetic force and arc is also formed to be reversed in the front-rear direction.

That is, in the energized situation as shown in (a) of FIG. 42, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 42, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first and second Halbach arrays 520, 530 or the direction of the current flowing through the DC relay 1, the arc path generation unit 500 according to the present exemplary embodiment may form the path of the electromagnetic force and arc in a direction away from the center (C).

Accordingly, damage to each component of the DC relay 1 disposed adjacent to the center (C) may be prevented.

Furthermore, the generated arc may be quickly discharged to the outside such that the operation reliability of the DC relay 1 can be improved.

(6) Description of the Arc Path Generation Unit 600 According to Another Exemplary Embodiment of the Present Disclosure Hereinafter, the arc path generation unit 600 according to another exemplary embodiment of the present disclosure will be described in detail with reference to FIGS. 43 to 45. The arc path generation unit 600 forms a magnetic field inside the arc chamber 21. An electromagnetic force is formed inside the arc chamber 21 by the current flowing through the DC relay 1 and the formed magnetic field.

Figure 43:
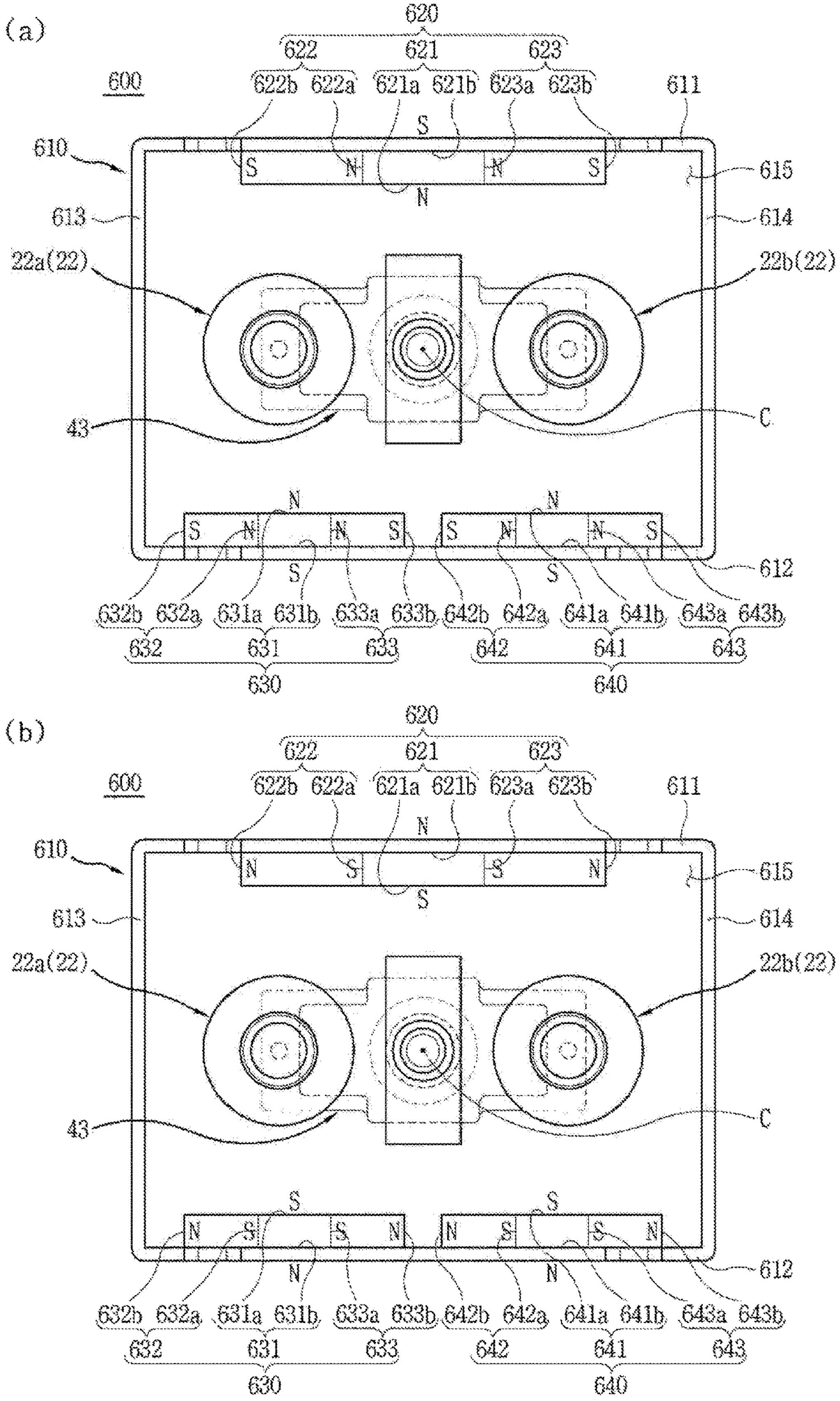
FIGS. 43 and 44 are conceptual diagrams illustrating the arc path generation unit according to still another exemplary embodiment of the present disclosure.
Figure 44:
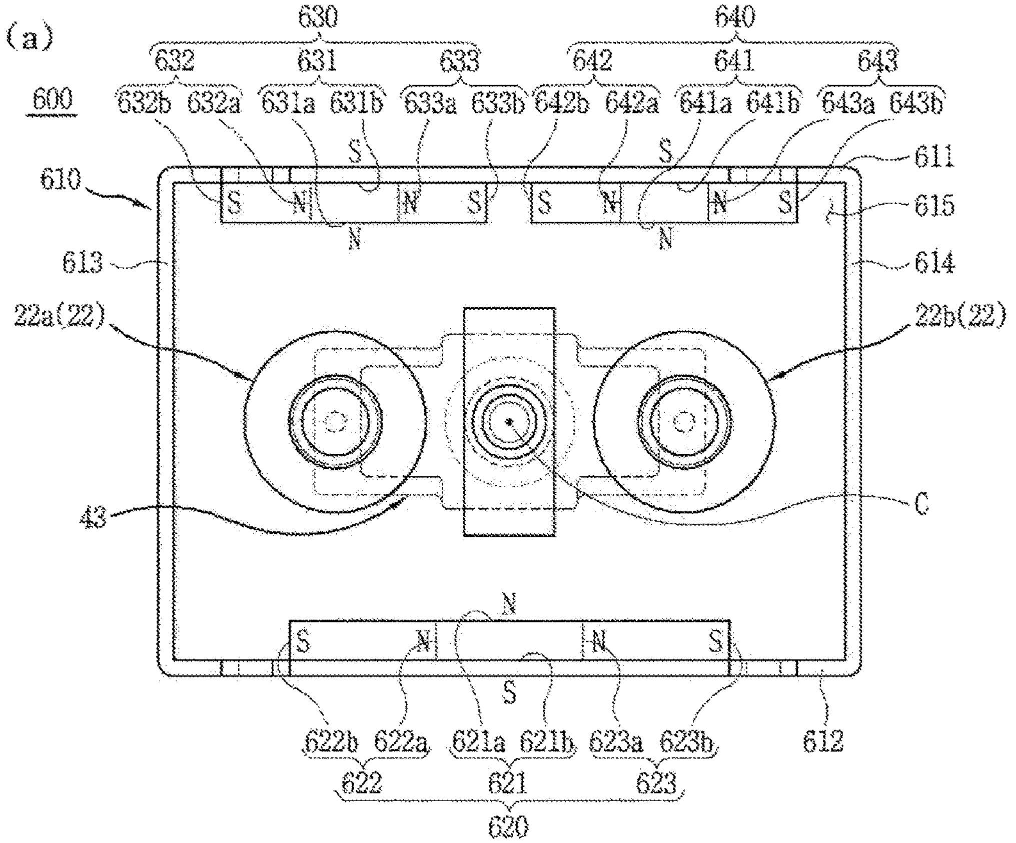
Figure 44:
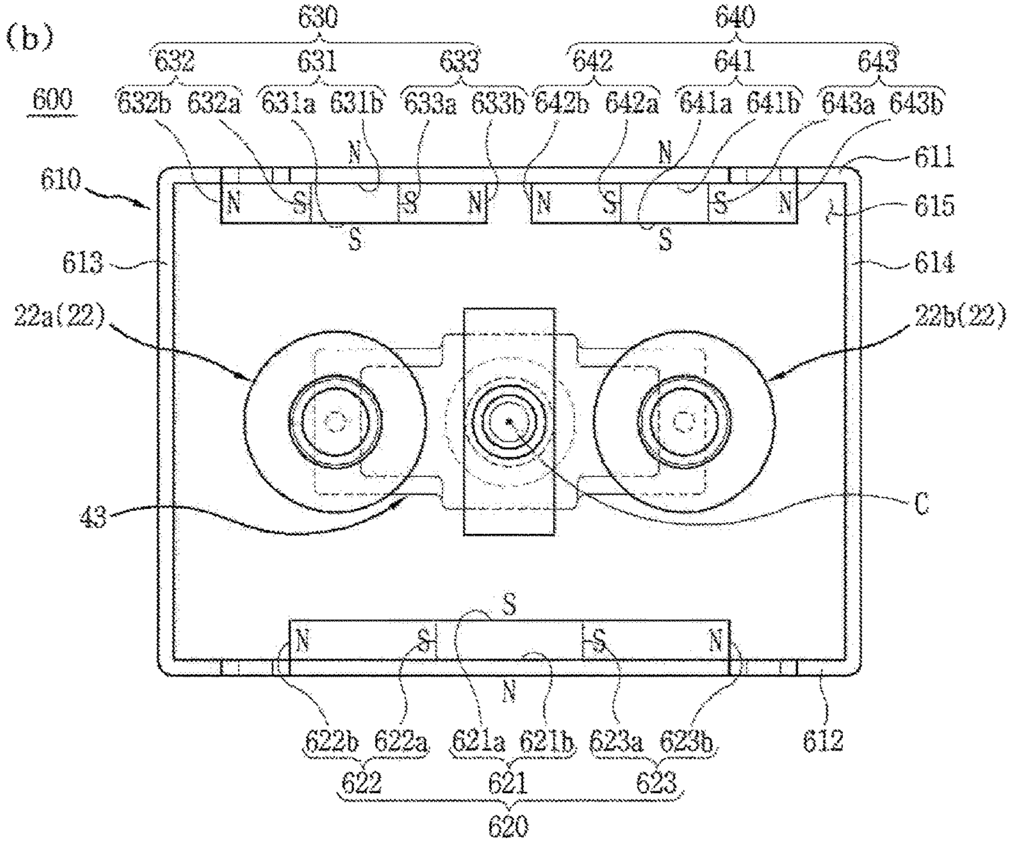
Figure 45:
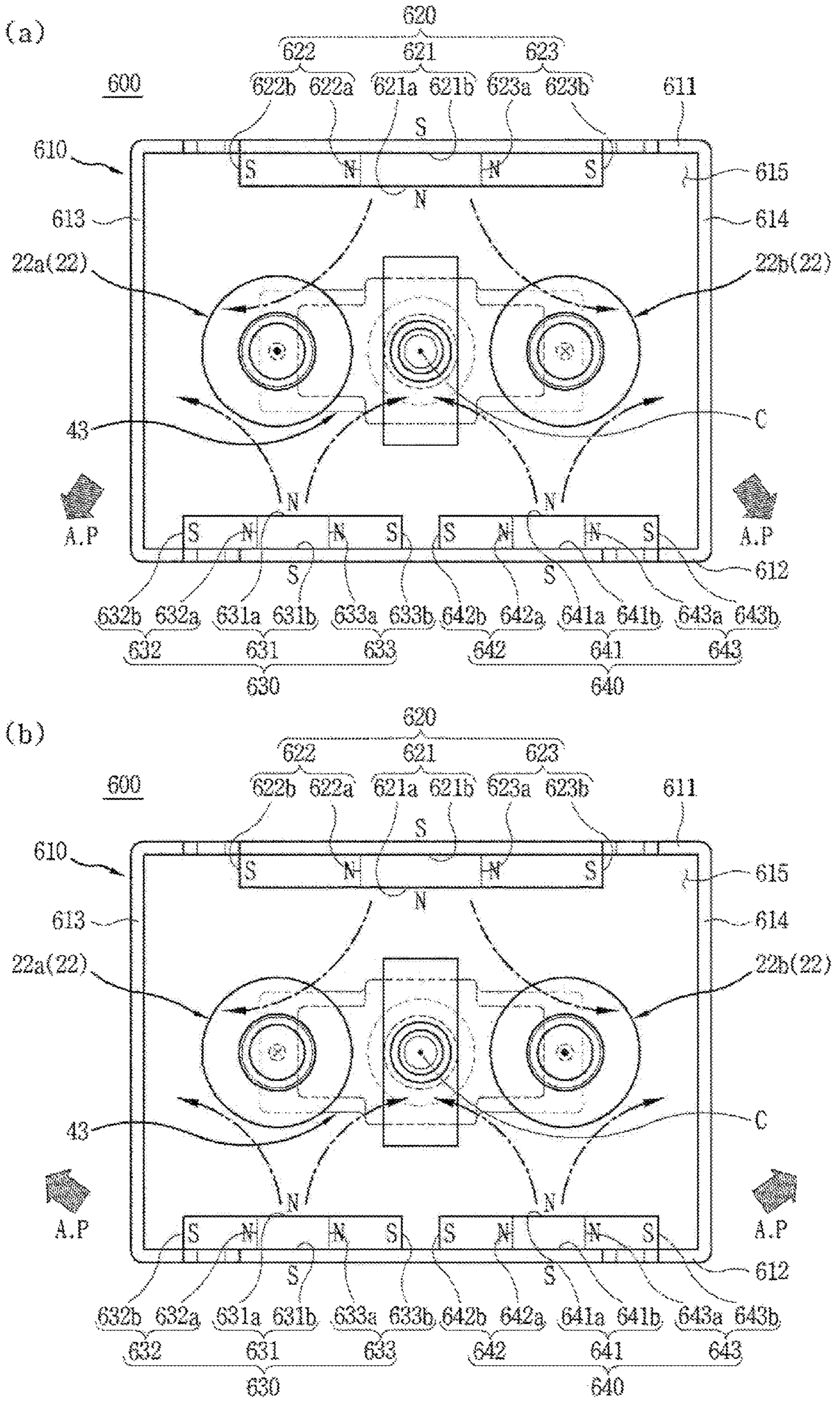
FIG. 45 is a conceptual diagram illustrating the paths of a magnetic field and an arc formed by the arc path generation unit according to the exemplary embodiment of FIGS. 43 and 44.

Referring to FIGS. 43 to 45, the arc path generation unit 600 according to the illustrated exemplary embodiment includes a magnetic frame 610, a first Halbach array 620, a second Halbach array 630 and a third Halbach array 640.

The magnetic frame 610 according to the present exemplary embodiment has the same structure and function as the magnetic frame 110 according to the above-described exemplary embodiment. However, there is a difference in the arrangement method of the first Halbach array 620, the second Halbach array 630 and the third Halbach array 640 disposed on the magnetic frame 610 according to the present exemplary embodiment.

Accordingly, the description of the magnetic frame 610 will be replaced with the description of the magnetic frame 110 according to the above-described exemplary embodiment.

In the illustrated exemplary embodiment, a plurality of magnetic materials constituting the first Halbach array 620 are sequentially arranged side by side from left to right. That is, in the illustrated exemplary embodiment, the first Halbach array 620 is formed to extend in the left-right direction.

The first Halbach array 620 may form a magnetic field together with other magnetic materials. In the illustrated exemplary embodiment, the first Halbach array 620 may form a magnetic field together with the second Halbach array 630 or the third Halbach array 640.

The first Halbach array 620 may be positioned adjacent to any one surface of the first and second surfaces 611, 212. In an exemplary embodiment, the first Halbach array 620 may be coupled to the inner side of the any one surface (i.e., a direction toward the space part 615).

In the exemplary embodiment illustrated in FIG. 43, the first Halbach array 620 is disposed on the inner side of the first surface 611, adjacent to the first surface 611, so as to face the second Halbach array 630 or the third Halbach array 640 which is disposed on the inner side of the second surface 612.

In the exemplary embodiment illustrated in FIG. 44, the first Halbach array 620 is disposed on the inner side of the second surface 612, adjacent to the second surface 612, so as to face the second Halbach array 630 or the third Halbach array 640 which is disposed on the inner side of the first surface 611.

Between the first Halbach array 620 and the second Halbach array 630 or the third Halbach array 640, the space part 615 and the fixed contact 22 and the movable contact 43 accommodated in the space part 615 are positioned.

The first Halbach array 620 may be positioned at the central portion in the extending direction of the first surface 611 or the second surface 612. That is, the first Halbach array 620 may be positioned such that the shortest distance to the third surface 613 and the shortest distance to the fourth surface 614 are the same.

The first Halbach array 620 may enhance the strength of the magnetic field formed by itself and the magnetic field formed with the second and third Halbach arrays 630, 640. Since the direction of the magnetic field formed by the first Halbach array 620 and the process of strengthening the magnetic field are well-known techniques, the detailed description thereof will be omitted.

In the illustrated exemplary embodiment, the first Halbach array 620 includes a first block 621, a second block 622 and a third block 623. It will be understood that a plurality of magnetic materials constituting the first Halbach array 620 are each named blocks 621, 622, 623, respectively.

The first to third blocks 621, 622, 623 may be formed of a magnetic material. In an exemplary embodiment, the first to third blocks 621, 622, 623 may be provided as permanent magnets or electromagnets.

The first to third blocks 621, 622, 623 may be arranged side by side in one direction. In the illustrated exemplary embodiment, the first to third blocks 621, 622, 623 are arranged side by side in the extending direction of the first surface 611, that is, in the left-right direction.

The first block 621 is positioned in the central portion of the first Halbach array 620. The second block 622 is positioned on the left side of the first block 621, and the third block 623 is positioned on the right side of the first block 621, respectively. In an exemplary embodiment, each of the blocks 621, 622, 623 adjacent to each other may contact each other.

The first block 621 may be disposed to overlap the central portion of the movable contact 43 in a direction toward the second Halbach array 630 or the third Halbach array 640, which is the front-rear direction in the illustrated exemplary embodiment. In an exemplary embodiment, the first block 621 may be disposed to overlap the center (C) in the front-rear direction.

In addition, the second block 622 and the third block 623 may be disposed to overlap any one of the first fixed contacts **22*a* and the second fixed contact 22*b* in a direction toward the second Halbach array 630 or the third Halbach array 640**, which is the front-rear direction in the illustrated exemplary embodiment.

Each of the blocks 621, 622, 623 includes a plurality of surfaces.

Specifically, the first block 621 includes a first inner surface **621*a* facing the space part 615, the second Halbach array 630 or the third Halbach array 640, and a first outer surface 621*b* opposite to the space part 615 or the second Halbach array 630**.

The second block 622 includes a second inner surface **622*a* facing the first block 621 and a second outer surface 622*b* opposite to the first block 621**.

The third block 623 includes a third inner surface **623*a* facing the first block 621 and a third outer surface 623*b* opposite to the first block 621**.

The plurality of surfaces of each of the blocks 621, 622, 623 may be magnetized according to a predetermined rule to constitute a Halbach array.

Specifically, the first to third inner surfaces **621*a*, 622*a*, 623*a* may be magnetized with the same polarity. Similarly, the first to third outer surfaces 621*b*, 622*b*, 623*b*** may be magnetized with the same polarity.

In this case, the first to third inner surfaces **621*a*, 622*a*, 623*a* may be magnetized with the same polarity as the first to third inner surfaces 631*a*, 632*a*, 633*a* of the second Halbach array 630**. Similarly, the first to third outer surfaces

621*b*, 622*b*, 623*b* may be magnetized with the same polarity as the first to third outer surfaces 631*b*, 632*b*, 633*b* of the second Halbach array 630.

The first to third inner surfaces 621*a*, 622*a*, 623*a* may be magnetized with the same polarity as the first to third inner surfaces 641*a*, 642*a*, 643*a* of the third Halbach array 640. Similarly, the first to third outer surfaces 621*b*, 622*b*, 623*b* may be magnetized with the same polarity as the first to third outer surfaces 641*b*, 642*b*, 643*b* of the third Halbach array 640.

In the illustrated exemplary embodiment, a plurality of magnetic materials constituting the second Halbach array 630 are sequentially arranged side by side from left to right. That is, in the illustrated exemplary embodiment, the second Halbach array 630 is formed to extend in the left-right direction.

The second Halbach array 630 may form a magnetic field together with other magnetic materials. In the illustrated exemplary embodiment, the second Halbach array 630 may form a magnetic field together with the first Halbach array 620.

The second Halbach array 630 may be positioned adjacent to the other one surface of the first and second surfaces 611, 612. In an exemplary embodiment, the second Halbach array 630 may be coupled to the inner side of the other one surface (i.e., a direction toward the space part 615).

In the exemplary embodiment illustrated in FIG. 43, the second Halbach array 630 is disposed on the inner side of the second surface 612, adjacent to the second surface 612, so as to face the first Halbach array 620 which is disposed on the inner side of the first surface 611.

In the exemplary embodiment illustrated in FIG. 44, the second Halbach array 630 is disposed on the inner side of the first surface 611, adjacent to the first surface 611, so as to face the first Halbach array 620 which is disposed on the inner side of the second surface 612.

The second Halbach array 630 is arranged side by side with the third Halbach array 640 in the extending direction thereof. The second Halbach array 630 is disposed adjacent to the third Halbach array 640. In an exemplary embodiment, the second Halbach array 630 and the third Halbach array 640 may be in contact with each other.

Between the second Halbach array 630 and the first Halbach array 620, the space part 615 and the fixed contact 22 and the movable contact 43 accommodated in the space part 615 are positioned.

The second Halbach array 630 is positioned to be biased toward any one of the third surface 613 and the fourth surface 614. In the illustrated exemplary embodiment, the second Halbach array 630 is positioned to be biased toward the third surface 613.

The second Halbach array 630 may enhance the strength of the magnetic field formed by itself and the magnetic field formed with the first and third Halbach arrays 620, 640. Since the direction of the magnetic field formed by the second Halbach array 630 and the process of strengthening the magnetic field are well-known techniques, the detailed description thereof will be omitted.

In the illustrated exemplary embodiment, the second Halbach array 630 includes a first block 631, a second block 632 and a third block 633. It will be understood that a plurality of magnetic materials constituting the second Halbach array 630 are each named blocks 631, 632, 633, respectively.

The first to third blocks 631, 632, 633 may be formed of a magnetic material. In an exemplary embodiment, the first to third blocks 631, 632, 633 may be provided as permanent magnets or electromagnets.

The first to third blocks 631, 632, 633 may be arranged side by side in one direction. In the illustrated exemplary embodiment, the first to third blocks 631, 632, 633 are arranged side by side in the extending direction of the second surface 612, that is, in the left-right direction.

The first block 631 is positioned in the central portion of the second Halbach array 630. The second block 632 is positioned on the left side of the first block 631, and the third block 633 is positioned on the right side of the first block 631, respectively. In an exemplary embodiment, each of the blocks 631, 632, 633 adjacent to each other may contact each other.

The first block 631 may be disposed to overlap the second block 622 of the first Halbach array 620 in a direction toward the first Halbach array 620, which is the front-rear direction in the illustrated exemplary embodiment.

In addition, the first block 631 may be disposed to overlap the first fixed contact 22*a* in a direction toward the first Halbach array 620, which is the front-rear direction in the illustrated exemplary embodiment.

Each of the blocks 631, 632, 633 includes a plurality of surfaces.

Specifically, the first block 631 includes a first inner surface 631*a* facing the space part 615 or the first Halbach array 620 and a first outer surface 631*b* opposite to the space part 615 or the first Halbach array 620.

The second block 632 includes a second inner surface 632*a* facing the first block 631 and a second outer surface 632*b* opposite to the first block 631.

The third block 633 includes a third inner surface 633*a* facing the first block 631 and a third outer surface 633*b* opposite to the first block 631.

The plurality of surfaces of each of the blocks 631, 632, 633 may be magnetized according to a predetermined rule to constitute a Halbach array.

Specifically, the first to third inner surfaces 631*a*, 632*a*, 633*a* may be magnetized with the same polarity. Similarly, the first to third outer surfaces 631*b*, 632*b*, 633*b* may be magnetized with the same polarity.

In this case, the first to third inner surfaces 631*a*, 632*a*, 633*a* may be magnetized with the same polarity as the first to third inner surfaces 621*a*, 622*a*, 623*a* of the first Halbach array 620. Similarly, the first to third outer surfaces 631*b*, 632*b*, 633*b* may be magnetized with the same polarity as the first to third outer surfaces 621*b*, 622*b*, 623*b* of the first Halbach array 620.

The first to third inner surfaces 631*a*, 632*a*, 633*a* may be magnetized with the same polarity as the first to third inner surfaces 641*a*, 642*a*, 643*a* of the third Halbach array 640. Similarly, the first to third outer surfaces 631*b*, 632*b*, 633*b* may be magnetized with the same polarity as the first to third outer surfaces 641*b*, 642*b*, 643*b* of the third Halbach array 640.

In the illustrated exemplary embodiment, a plurality of magnetic materials constituting the third Halbach array 640 are sequentially arranged side by side from left to right. That is, in the illustrated exemplary embodiment, the third Halbach array 640 is formed to extend in the left-right direction.

The third Halbach array 640 may form a magnetic field together with other magnetic materials. In the illustrated exemplary embodiment, the third Halbach array 640 may form a magnetic field together with the first Halbach array 620.

The third Halbach array 640 may be positioned adjacent to the other one surface of the first and second faces 611, 312. In an exemplary embodiment, the third Halbach array 640 may be coupled to the inner side of the other one surface (i.e., a direction toward the space part 615).

In the exemplary embodiment illustrated in FIG. 43, the third Halbach array 640 is disposed on the inner side of the second surface 612, adjacent to the second surface 612, so as to face the first Halbach array 620 which is disposed on the inner side of the first surface 611.

In the exemplary embodiment illustrated in FIG. 44, the second Halbach array 630 is disposed on the inner side of the first surface 611, adjacent to the first surface 611, so as to face the first Halbach array 620 which is disposed on the inner side of the second surface 612.

The third Halbach array 640 is arranged side by side with the second Halbach array 630 in the extending direction thereof. The third Halbach array 640 is disposed adjacent to the second Halbach array 630. In an exemplary embodiment, the third Halbach array 640 and the second Halbach array 630 may be in contact with each other.

Between the third Halbach array 640 and the first Halbach array 620, the space part 615 and the fixed contact 22 and the movable contact 43 accommodated in the space part 615 are positioned.

The third Halbach array 640 is positioned to be biased toward the other of the third surface 613 and the fourth surface 614. In the illustrated exemplary embodiment, the third Halbach array 640 is positioned to be biased toward the fourth surface 614.

The third Halbach array 640 may enhance the strength of the magnetic field formed by itself and the magnetic field formed with the first and second Halbach arrays 620, 630. Since the direction of the magnetic field formed by the third Halbach array 640 and the process of strengthening the magnetic field are well-known techniques, the detailed description thereof will be omitted.

In the illustrated exemplary embodiment, the third Halbach array 640 includes a first block 641, a second block 642 and a third block 643. It will be understood that a plurality of magnetic materials constituting the third Halbach array 640 each are named as blocks 641, 642, 643, respectively.

The first to third blocks 641, 642, 643 may be formed of a magnetic material. In an exemplary embodiment, the first to third blocks 641, 642, 643 may be provided as permanent magnets or electromagnets.

The first to third blocks 641, 642, 643 may be arranged side by side in one direction. In the illustrated exemplary embodiment, the first to third blocks 641, 642, 643 are arranged side by side in the extending direction of the second surface 612 extends, that is, in the left-right direction.

The first block 641 is positioned in the central portion of the third Halbach array 640. The second block 642 is positioned on the left side of the first block 641, and the third block 643 is positioned on the right side of the first block 641, respectively. In an exemplary embodiment, each of the blocks 641, 642, 643 adjacent to each other may contact each other.

The first block 641 may be disposed to overlap the third block 623 of the first Halbach array 620 in a direction toward the first Halbach array 620, which is the front-rear direction in the illustrated exemplary embodiment.

In addition, the first block 641 may be disposed to overlap any one of the second fixed contacts 22*b* in a direction toward the first Halbach array 620, which is the front-rear direction in the illustrated exemplary embodiment.

Each of the blocks 641, 642, 643 includes a plurality of surfaces.

Specifically, the first block 641 includes a first inner surface 641*a* facing the space part 615 or the first Halbach array 620 and a first outer surface 641*b* opposite to the space part 615 or the first Halbach array 620.

The second block 642 includes a second inner surface 642*a* facing the first block 641 and a second outer surface 642*b* opposite to the first block 641.

The third block 643 includes a third inner surface 643*a* facing the first block 641 and a third outer surface 643*b* opposite to the first block 641.

The plurality of surfaces of each of the blocks 641, 642, 643 may be magnetized according to a predetermined rule to constitute a Halbach array.

Specifically, the first to third inner surfaces 641*a*, 642*a*, 643*a* may be magnetized with the same polarity. Similarly, the first to third outer surfaces 641*b*, 642*b*, 643*b* may be magnetized with the same polarity.

In this case, the first to third inner surfaces 641*a*, 642*a*, 643*a* may be magnetized with the same polarity as the first to third inner surfaces 621*a*, 622*a*, 623*a* of the first Halbach array 620. Similarly, the first to third outer surfaces 641*b*, 642*b*, 643*b* may be magnetized with the same polarity as the first to third outer surfaces 621*b*, 622*b*, 623*b* of the first Halbach array 620.

The first to third inner surfaces 641*a*, 642*a*, 643*a* may be magnetized with the same polarity as the first to third inner surfaces 631*a*, 632*a*, 633*a* of the second Halbach array 630. Similarly, the first to third outer surfaces 641*b*, 642*b*, 643*b* may be magnetized with the same polarity as the first to third outer surfaces 631*b*, 632*b*, 633*b* of the second Halbach array 630.

Hereinafter, the arc path (A.P) formed by the arc path generation unit 600 according to the present exemplary embodiment will be described in detail with reference to FIG. 45.

Referring to FIG. 45, each of the inner surfaces 621*a*, 622*a*, 623*a* of the first Halbach array 620, each of the inner surfaces 631*a*, 632*a*, 633*a* of the second Halbach array 630 and each of the inner surfaces 641*a*, 642*a*, 643*a* of the third Halbach array 640 are magnetized to the N pole.

Accordingly, a magnetic field in a direction to repel each other is formed between the first Halbach array 620 and the second and third Halbach arrays 630, 640.

In the exemplary embodiment illustrated in (a) of FIG. 45, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 45, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first to third Halbach arrays 620, 630, 640 is changed, the directions of the magnetic fields formed by each of the Halbach arrays 620, 630, 640 become reversed. Accordingly, the path (A.P) of the generated electromagnetic force and arc is also formed to be reversed in the front-rear direction.

That is, in the energized situation as shown in (a) of FIG. 45, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 45, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first to third Halbach arrays 620, 630, 640 or the direction of the current flowing through the DC relay 1, the arc path generation unit 600 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(7) Description of the Arc Path Generation Unit 700 According to Another Exemplary Embodiment of the Present Disclosure Hereinafter, the arc path generation unit 700 according to another exemplary embodiment of the present disclosure will be described in detail with reference to FIGS. 46 and 47.

Figure 46:
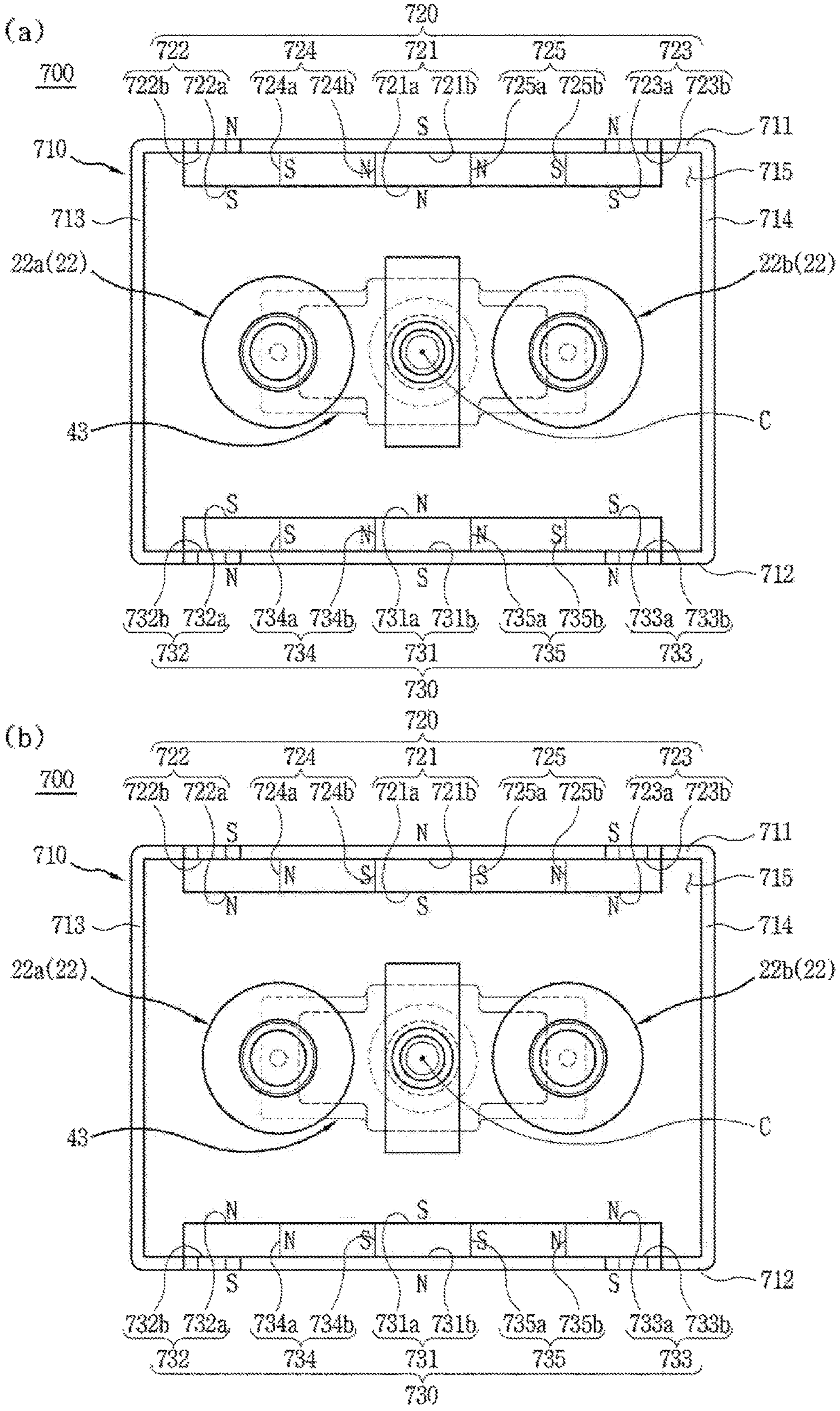
FIG. 46 is a conceptual diagram illustrating the arc path generation unit according to still another exemplary embodiment of the present disclosure.

Referring to FIG. 46, the arc path generation unit 700 according to the illustrated exemplary embodiment includes a magnetic frame 710, a first Halbach array 720 and a second Halbach array 730.

The magnetic frame 710 according to the present exemplary embodiment has the same structure and function as the magnetic frame 110 according to the above-described exemplary embodiment. However, there is a difference in the arrangement method of the first Halbach array 720 and the second Halbach array 730 disposed on the magnetic frame 710 according to the present exemplary embodiment.

Accordingly, the description of the magnetic frame 710 will be replaced with the description of the magnetic frame 110 according to the above-described exemplary embodiment.

In the illustrated exemplary embodiment, a plurality of magnetic materials constituting the first Halbach array 720 are sequentially arranged side by side from left to right. That is, in the illustrated exemplary embodiment, the first Halbach array 720 is formed to extend in the left-right direction.

The first Halbach array 720 may form a magnetic field together with other magnetic materials. In the illustrated exemplary embodiment, the first Halbach array 720 may form a magnetic field together with the second Halbach array 730.

The first Halbach array 720 may be positioned adjacent to any one surface of the first and second surfaces 711 and 712. In an exemplary embodiment, the first Halbach array 720 may be coupled to the inner side of the any one surface (i.e., a direction toward the space part 715).

In the illustrated exemplary embodiment, the first Halbach array 720 is disposed on the inner side of the first surface 711, adjacent to the first surface 711, so as to face the second Halbach array 730 which is disposed on the inner side of the second surface 712.

Between the first Halbach array 720 and the second Halbach array 730, the space part 715 and the fixed contact 22 and the movable contact 43 accommodated in the space part 715 are positioned. In an exemplary embodiment, the center (C) may be positioned on an imaginary straight line connecting the first Halbach array 720 and the second Halbach array 730.

The first Halbach array 720 may be positioned in the central portion of the first surface 711. In other words, the shortest distance between the first Halbach array 720 and the third surface 713 and the shortest distance between the first Halbach array 720 and the fourth surface 714 may be the same.

The first Halbach array 720 may enhance the strength of the magnetic field formed by itself and the magnetic field formed with the second Halbach array 730. Since the direction of the magnetic field formed by the first Halbach array 720 and the process of strengthening the magnetic field are well-known techniques, the detailed description thereof will be omitted.

In the illustrated exemplary embodiment, the first Halbach array 720 includes a first block 721, a second block 722, a third block 723, a fourth block 724 and a fifth block 725. It will be understood that the plurality of magnetic materials constituting the first Halbach array 720 are each named blocks 721, 722, 723, 724, 725, respectively.

The first to fifth blocks 721, 722, 723, 724, 725 may be formed of a magnetic material. In an exemplary embodiment, the first to fifth blocks 721, 722, 723, 724, 725 may be provided as permanent magnets or electromagnets.

The first to fifth blocks 721, 722, 723, 724, 725 may be arranged side by side in one direction. In the illustrated exemplary embodiment, the first to fifth blocks 721, 722, 723, 724, 725 are arranged side by side in the extending direction of the first surface 711, that is, in the left-right direction.

The first block 721 is positioned in the central portion of the first Halbach array 720.

The second block 722 is positioned on the leftmost side of the first Halbach array 720. That is, the second block 722 is positioned adjacent to the third surface 713. The third block 723 is positioned on the rightmost side of the first Halbach array 720. That is, the third block 723 is positioned adjacent to the fourth surface 714.

The fourth block 724 is positioned between the first block 721 and the second block 722. In addition, the fifth block 725 is positioned between the first block 721 and the third block 723.

In an exemplary embodiment, each of the blocks 721, 722, 723, 724, 725 adjacent to each other may contact each other.

In addition, the first block 721 may be disposed to overlap the first block 731 of the second Halbach array 730 and the center (C) in a direction toward the second Halbach array 730 or the second surface 712, which is the front-rear direction in the illustrated exemplary embodiment.

In addition, the second block 722 and the third block 723 may be disposed to overlap any one of the first fixed contact 22*a* and the second fixed contact 22*b*, respectively. In the illustrated exemplary embodiment, the second block 722 is disposed to overlap the first fixed contact 22*a*, and the third block is disposed to overlap the second fixed contact 22*b*, respectively.

Each of the blocks 721, 722, 723, 724, 725 includes a plurality of surfaces.

Specifically, the first block 721 includes a first inner surface 721*a* facing the space part 715 or the second Halbach array 730 and a first outer surface 721*b* opposite to the space part 715 or the second Halbach array 730.

The second block 722 includes a second inner surface 722*a* facing the space part 715 or second Halbach array 730 and a second outer surface 722*b* opposite to the space part 715 or second Halbach array 730.

The third block 723 includes a third inner surface 723*a* facing the space part 715 or the second Halbach array 730 and a third outer surface 723*b* opposite to the space part 715 or the second Halbach array 730.

The fourth block 724 includes a fourth inner surface 724*a* facing the second block 722 and a fourth outer surface 724*b* facing the first block 721. It will be understood that the fourth inner surface 724*a* and the fourth outer surface 724*b* are positioned opposite to each other.

The fifth block 725 includes a fifth inner surface 725*a* facing the first block 721 and a fifth outer surface 725*b* facing the third block 723. It will be understood that the fifth inner surface 725*a* and the fifth outer surface 725*b* are positioned opposite to each other.

The plurality of surfaces of each of the blocks 721, 722, 723, 724, 725 may be magnetized according to a predetermined rule to constitute a Halbach array.

Specifically, the first and fifth inner surfaces 721*a* 725*a* may be magnetized with the same polarity. In addition, the second to fourth inner surfaces 722*a*, 723*a*, 724*a* may be magnetized with a polarity different from the polarity.

In this case, the first and fifth inner surfaces 721*a*, 725*a* may be magnetized with the same polarity as the first and fifth inner surfaces 731*a*, 735*a* of the second Halbach array 730. In addition, the second to fourth inner surfaces 722*a*, 723*a*, 724*a* may be magnetized with the same polarity as the second to fourth inner surfaces 732*a*, 733*a*, 734*a* of the second Halbach array 730.

In the illustrated exemplary embodiment, a plurality of magnetic materials constituting the second Halbach array 730 are sequentially arranged side by side from left to right. That is, in the illustrated exemplary embodiment, the second Halbach array 730 is formed to extend in the left-right direction.

The second Halbach array 730 may form a magnetic field together with other magnetic materials. In the illustrated exemplary embodiment, the second Halbach array 730 may form a magnetic field together with the first Halbach array 720.

The second Halbach array 730 may be positioned adjacent to the other one surface of the first and second surfaces 711 and 712. In an exemplary embodiment, the second Halbach array 730 may be coupled to the inner side of the other one surface (i.e., a direction toward the space part 715).

In the illustrated exemplary embodiment, the second Halbach array 730 is disposed on the inner side of the second surface 712, adjacent to the second surface 712, so as to face the first Halbach array 720 which is disposed on the inner side of the first surface 711.

Between the second Halbach array 730 and the first Halbach array 720, the space part 715 and the fixed contact 22 and the movable contact 43 accommodated in the space part 715 are positioned.

The second Halbach array 730 may be positioned in the central portion of the first surface 711. In other words, the shortest distance between the second Halbach array 730 and the third surface 713 and the shortest distance between the second Halbach array 730 and the fourth surface 714 may be the same.

The second Halbach array 730 may enhance the strength of the magnetic field formed by itself and the magnetic field formed with the first Halbach array 720. Since the direction of the magnetic field formed by the second Halbach array 730 and the process of strengthening the magnetic field are well-known techniques, the detailed description thereof will be omitted.

In the illustrated exemplary embodiment, the second Halbach array 730 includes a first block 731, a second block 732, a third block 733, a fourth block 734 and a fifth block 735. It will be understood that a plurality of magnetic materials constituting the second Halbach array 730 are each named blocks 731, 732, 733, 734, 735, respectively.

The first to fifth blocks 731, 732, 733, 734, 735 may be formed of a magnetic material. In an exemplary embodiment, the first to fifth blocks 731, 732, 733, 734, 735 may be provided as permanent magnets or electromagnets.

The first to fifth blocks 731, 732, 733, 734, 735 may be arranged side by side in one direction. In the illustrated exemplary embodiment, the first to fifth blocks 731, 732, 733, 734, 735 are arranged side by side in the extending direction of the second surface 712, that is, in the left-right direction.

The first block 731 is positioned in the central portion of the second Halbach array 730.

The second block 732 is positioned on the leftmost side of the second Halbach array 730. That is, the second block 732 is positioned adjacent to the third surface 713. The third block 733 is positioned on the rightmost side of the second Halbach array 730. That is, the third block 733 is positioned adjacent to the fourth surface 714.

The fourth block 734 is positioned between the first block 731 and the second block 732. In addition, the fifth block 735 is positioned between the first block 731 and the third block 733.

In an exemplary embodiment, each of the blocks 731, 732, 733, 734, 735 adjacent to each other may contact each other.

In addition, the first block 731 may be disposed to overlap the first block 731 of the second Halbach array 730 and the center (C) in a direction toward the second Halbach array 730 or the second surface 712, which is the front-rear direction in the illustrated exemplary embodiment.

In addition, the second block 732 and the third block 733 may be disposed to overlap any one of the first fixed contact 22*a* and the second fixed contact 22*b*, respectively. In the illustrated exemplary embodiment, the second block 732 is disposed to overlap the first fixed contact 22*a*, and the third block 733 is disposed to overlap the second fixed contact 22*b*, respectively.

Each of the blocks 731, 732, 733, 734, 735 includes a plurality of surfaces.

Specifically, the first block 731 includes a first inner surface 731*a* facing the space part 715 or the first Halbach array 720 and a first outer surface 731*b* opposite to the space part 715 or the first Halbach array 720.

The second block 732 includes a second inner surface 732*a* facing the space part 715 or first Halbach array 720 and a second outer surface 732*b* opposite to the space part 715 or first Halbach array 720.

The third block 733 includes a third inner surface 733*a* facing the space part 715 or the first Halbach array 720 and a third outer surface 733*b* opposite to the space part 715 or the first Halbach array 720.

The fourth block 734 includes a fourth inner surface 734*a* facing the second block 732 and a fourth outer surface 734*b* facing the first block 731. It will be understood that the fourth inner surface 734*a* and the fourth outer surface 734*b* are positioned opposite to each other.

The fifth block 735 includes a fifth inner surface 735*a* facing the first block 731 and a fifth outer surface 735*b* facing the third block 733. It will be understood that the fifth inner surface 735*a* and the fifth outer surface 735*b* are positioned opposite to each other.

The plurality of surfaces of each of the blocks 731, 732, 733, 734, 735 may be magnetized according to a predetermined rule to constitute a Halbach array.

Specifically, the first and fifth inner surfaces 731*a* 735*a* may be magnetized with the same polarity. In addition, the second to fourth inner surfaces 732*a*, 733*a*, 734*a* may be magnetized with a polarity different from the polarity.

In this case, the first and fifth inner surfaces 731*a*, 735*a* may be magnetized with the same polarity as the first and fifth inner surfaces 721*a*, 725*a* of the first Halbach array 720. In addition, the second to fourth inner surfaces 732*a*, 733*a*, 734*a* may be magnetized with the same polarity as the second to fourth inner surfaces 722*a*, 723*a*, 724*a* of the first Halbach array 720.

Hereinafter, the arc path (A.P) formed by the arc path generation unit 700 according to the present exemplary embodiment will be described in detail with reference to FIG. 47.

Figure 47:
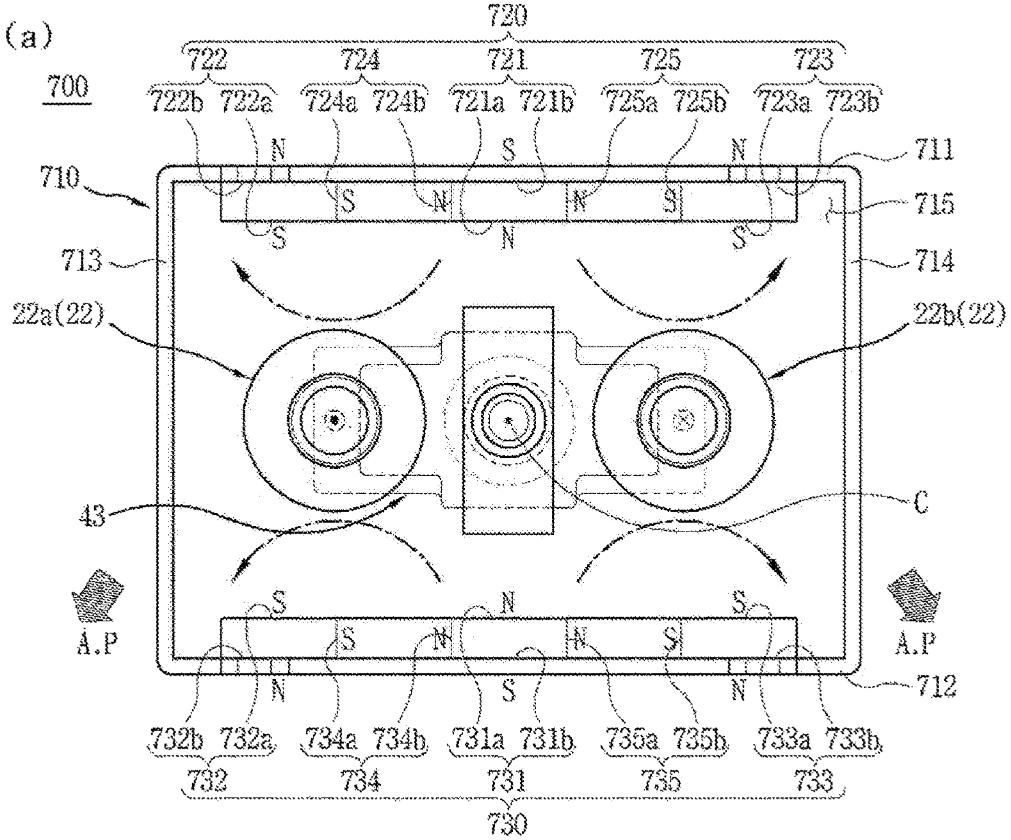
FIG. 47 is a conceptual diagram illustrating the paths of a magnetic field and an arc formed by the arc path generation unit according to the exemplary embodiment of FIG. 46.
Figure 47:
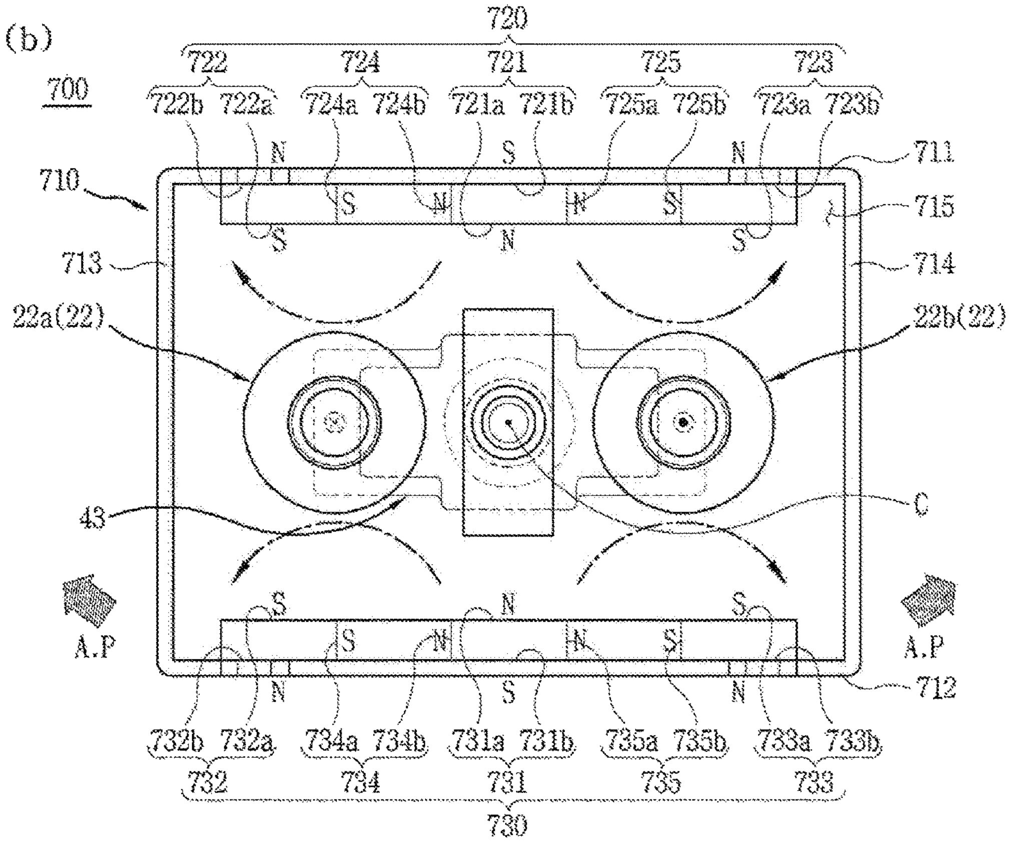

Referring to FIG. 47, the first inner surface 721*a* of the first Halbach array 720 is magnetized to the N pole. In this case, the second and third inner surfaces 722*a*, 723*a* of the first Halbach array 720 are magnetized to the S pole.

Accordingly, in the first Halbach array 720, a magnetic field in a direction from the first inner surface 721*a* to the second and third inner surfaces 722*a*, 723*a* is formed.

In addition, the first inner surface 731*a* of the second Halbach array 730 is also magnetized to the N pole. In this case, the second and third inner surfaces 732*a*. 733*a* of the second Halbach array 9730 are magnetized to the S pole.

Accordingly, in the second Halbach array 730, a magnetic field in a direction from the first inner surface 731*a* toward the second and third inner surfaces 732*a*, 733*a* is formed.

As a result, a magnetic field in a direction to repel each other between the first Halbach array 720 and the second Halbach array 730 is formed near each of the fixed contacts 22*a*, 22*b*.

In the exemplary embodiment illustrated in (a) of FIG. 47, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 47, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 720, 730 is changed, the directions of the magnetic fields formed by each of the Halbach arrays 720, 730 become reversed. Accordingly, the path (A.P) of the generated electromagnetic force and arc is also formed to be reversed in the front-rear direction.

That is, in the energized situation as shown in (a) of FIG. 47, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 47, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first and second Halbach arrays 720, 730 or the direction of the current flowing through the DC relay 1, the arc path generation unit 700 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(8) Description of the Arc Path Generation Unit 800 According to Another Exemplary Embodiment of the Present Disclosure Hereinafter, the arc path generation unit 800 according to another exemplary embodiment of the present disclosure will be described in detail with reference to FIGS. 48 to 52.

Referring to FIGS. 48 to 51, the arc path generation unit 800 according to the illustrated exemplary embodiment includes a magnetic frame 810, a first Halbach array 820 and a second Halbach array 830.

The magnetic frame 810 according to the present exemplary embodiment has the same structure and function as the magnetic frame 110 according to the above-described exemplary embodiment. However, there is a difference in the arrangement method of the first Halbach array 820 and the second Halbach array 830 disposed on the magnetic frame 810 according to the present exemplary embodiment.

Accordingly, the description of the magnetic frame 810 will be replaced with the description of the magnetic frame 110 according to the above-described exemplary embodiment.

In the illustrated exemplary embodiment, a plurality of magnetic materials constituting the first Halbach array 820 are sequentially arranged side by side from left to right. That is, in the illustrated exemplary embodiment, the first Halbach array 820 is formed to extend in the left-right direction.

The first Halbach array 820 may form a magnetic field together with other magnetic materials. In the illustrated exemplary embodiment, the first Halbach array 820 may form a magnetic field together with the second Halbach array 830.

The first Halbach array 820 may be positioned adjacent to any one surface of the first and second surfaces 811 and 812. In an exemplary embodiment, the first Halbach array 820 may be coupled to the inner side of the any one surface (i.e., a direction toward the space part 815).

Figure 48:
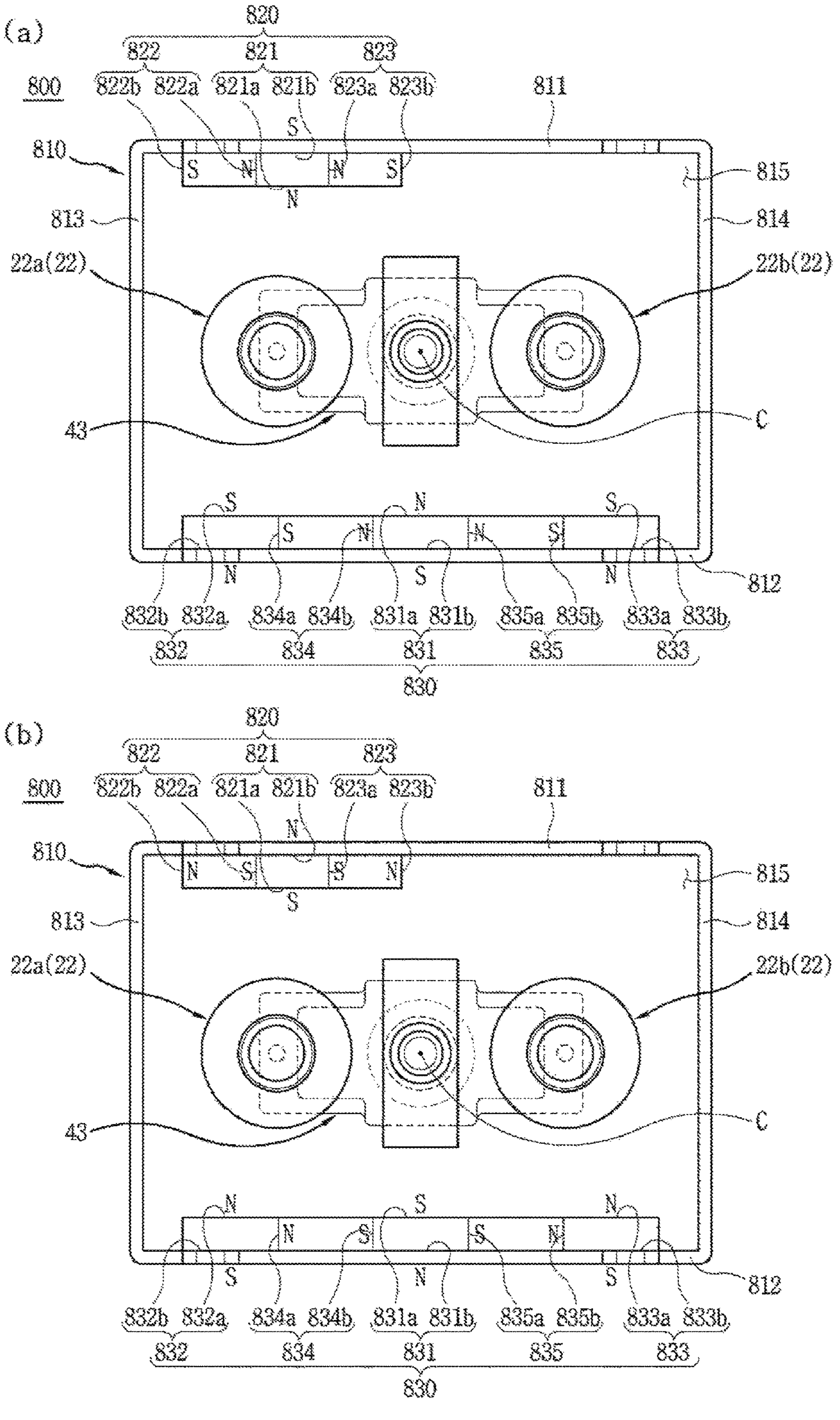
FIGS. 48 to 51 are conceptual diagrams illustrating the arc path generation unit according to still another exemplary embodiment of the present disclosure.
Figure 49:
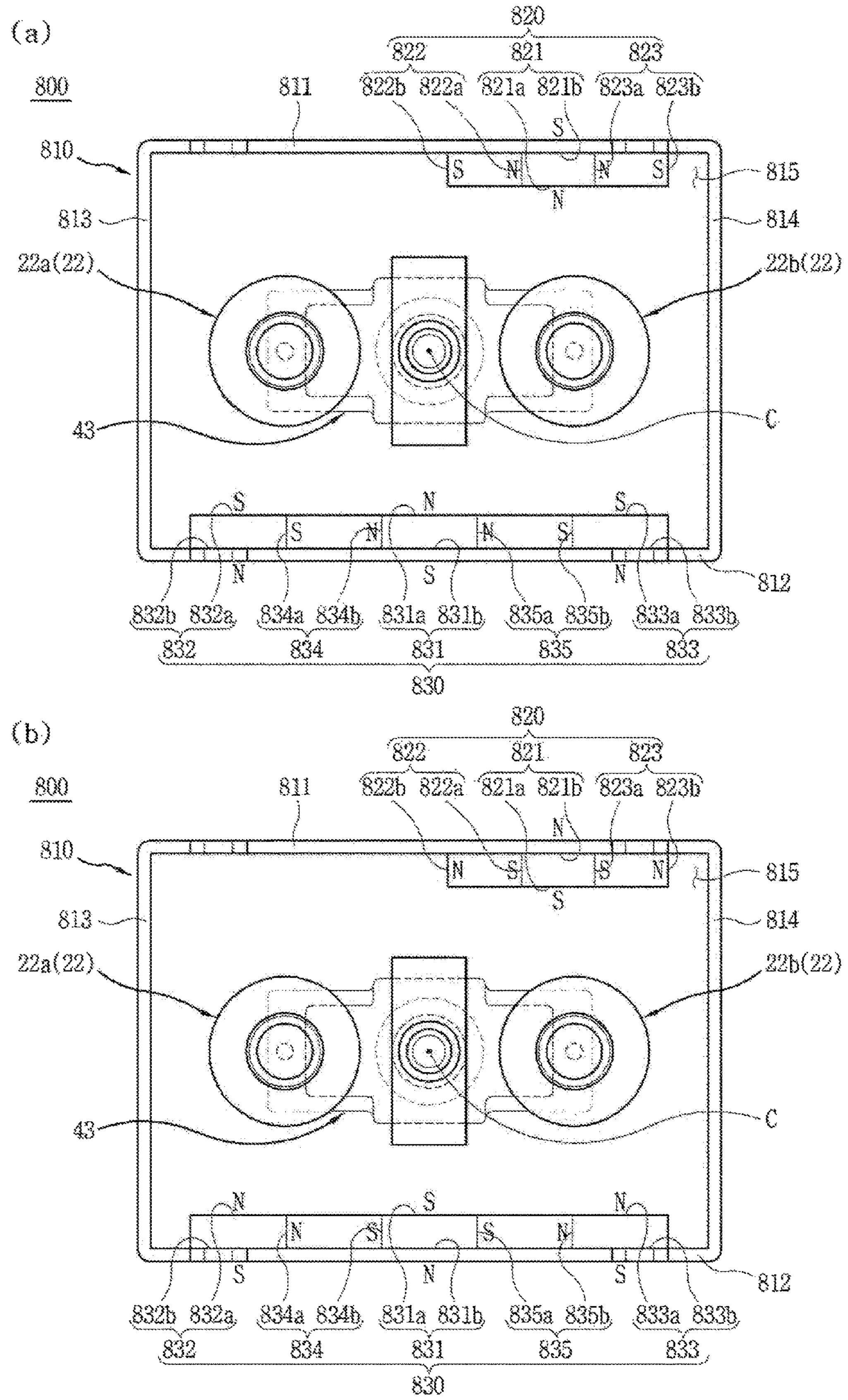

In the exemplary embodiment illustrated in FIGS. 48 and 49, the first Halbach array 820 is disposed on the inner side of the first surface 811, adjacent to the first surface 811, so as to face the second Halbach array 830 which is disposed on the inner side of the second surface 812.

Figure 50:
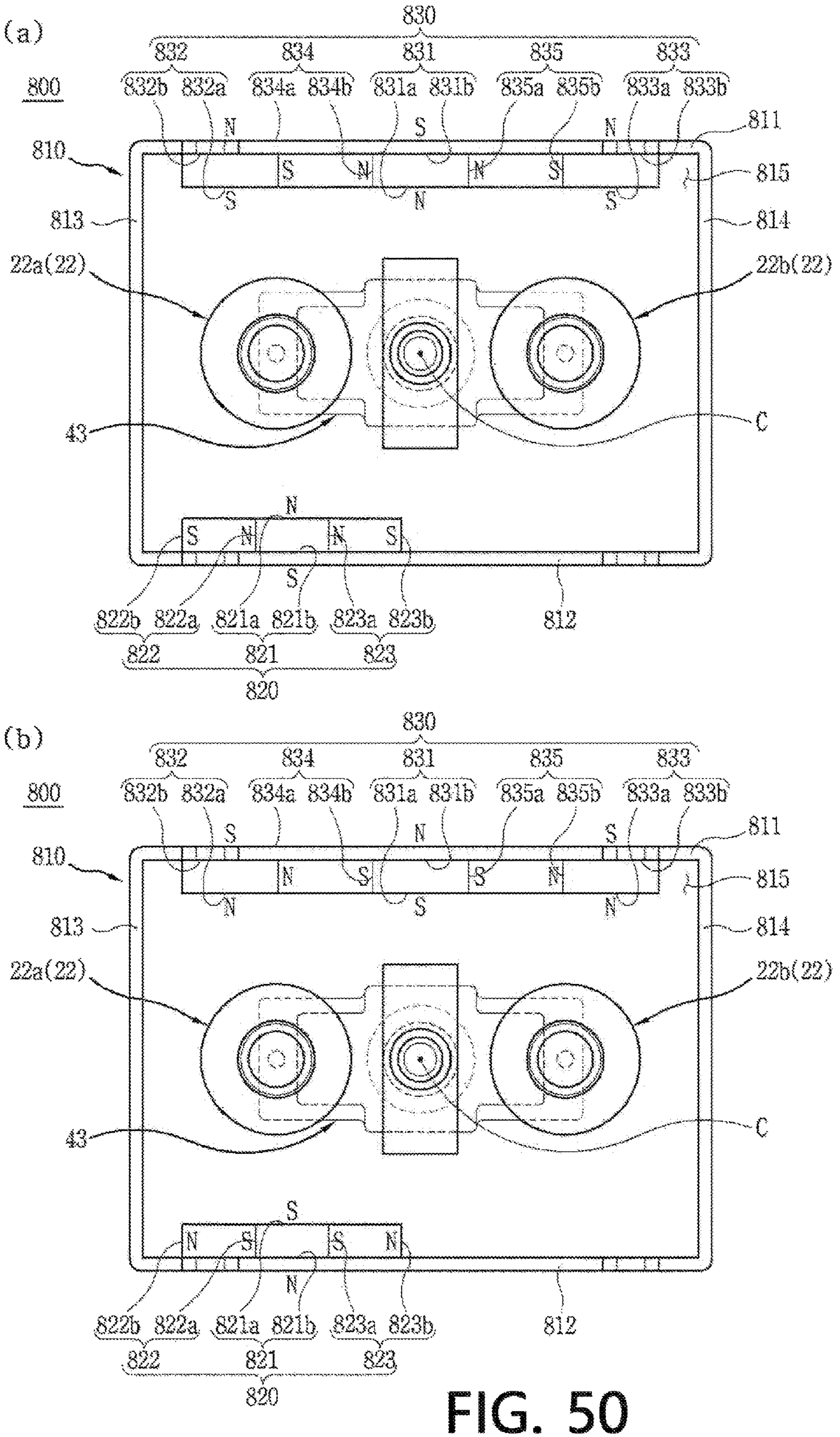
Figure 51:
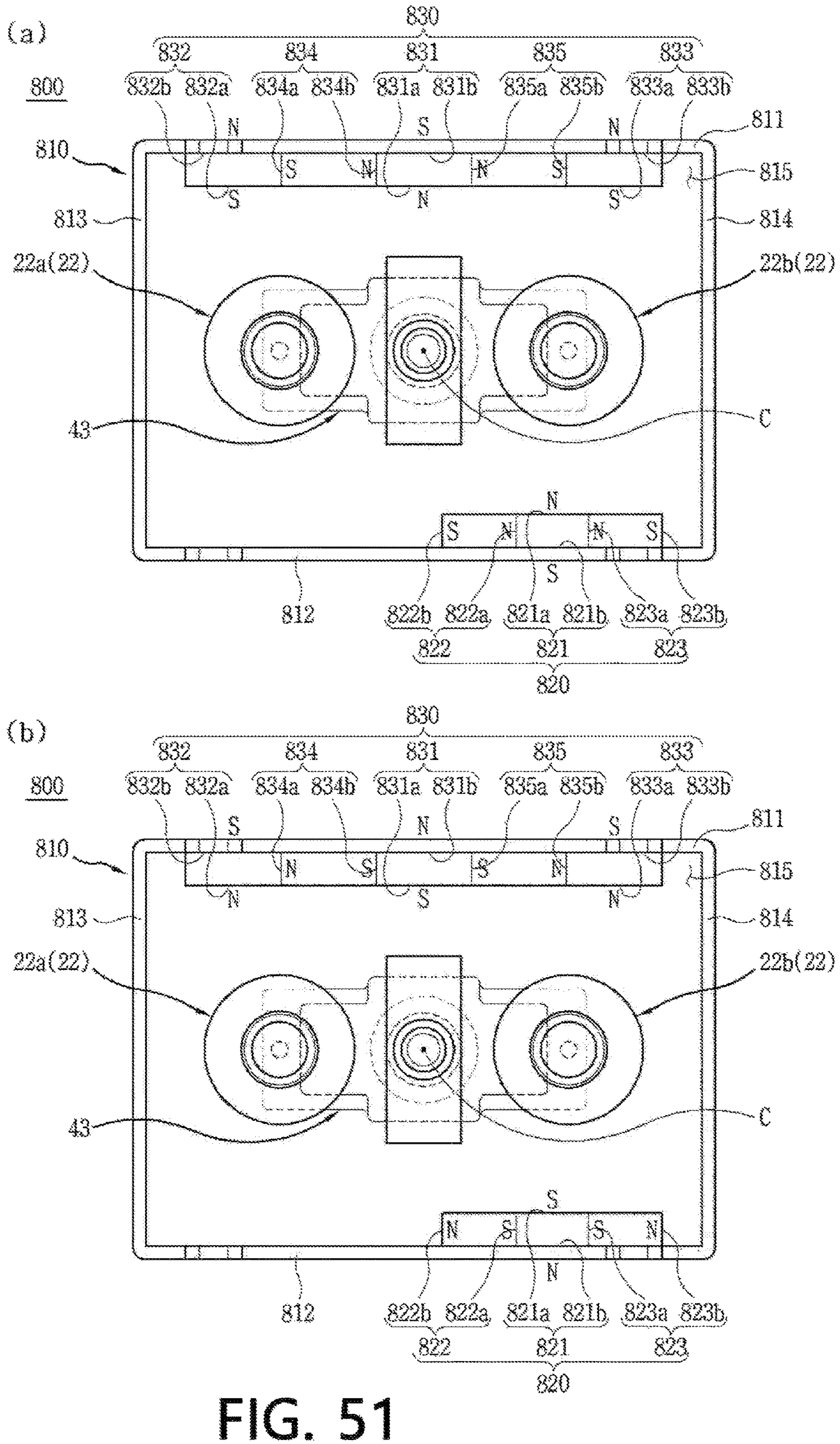

In the exemplary embodiment illustrated in FIGS. 50 and 51, the first Halbach array 820 is disposed on the inner side of the second surface 812, adjacent to the second surface 812, so as to face the second Halbach array 830 which is disposed on the inner side of the first surface 811.

Between the first Halbach array 820 and the second Halbach array 830, the space part 815 and the fixed contact 22 and the movable contact 43 accommodated in the space part 815 are positioned.

The first Halbach array 820 may be positioned to be biased toward any one of the third surface 813 and the fourth surface 814. In the exemplary embodiment illustrated in FIGS. 48 and 50, the first Halbach array 820 is positioned to be biased toward the third surface 813. In the exemplary embodiment illustrated in FIGS. 49 and 51, the first Halbach array 820 is positioned to be biased toward the fourth surface 814.

The first Halbach array 820 may be disposed to overlap the second Halbach array 830 in a direction toward the space part 815 or the second Halbach array 830, which is the front-rear direction in the illustrated exemplary embodiment.

The first Halbach array 820 may be disposed to overlap any one of the first fixed contact **22*a* and the second fixed contact 22*b* in a direction toward the space part 815 or the second Halbach array 830**, which is the front-rear direction in the illustrated exemplary embodiment.

In the exemplary embodiment illustrated in FIGS. 48 and 50, the first Halbach array 820 overlaps the first fixed contact **22*a* in the front-rear direction. Further, in the exemplary embodiment illustrated in FIGS. 49 and 51, the first Halbach array 820 overlaps the second fixed contact 22*b*** in the front-rear direction.

The first Halbach array 820 may enhance the strength of the magnetic field formed by itself and the magnetic field formed with the second Halbach array 830. Since the direction of the magnetic field formed by the first Halbach array 820 and the process of strengthening the magnetic field are well-known techniques, the detailed description thereof will be omitted.

In the illustrated exemplary embodiment, the first Halbach array 820 includes a first block 821, a second block 822 and a third block 823. It will be understood that a plurality of magnetic materials constituting the first Halbach array 820 are each named blocks 821, 822, 823, respectively.

The first to third blocks 821, 822, 823 may be formed of a magnetic material. In an exemplary embodiment, the first to third blocks 821, 822, 823 may be provided as permanent magnets or electromagnets.

The first to third blocks 821, 822, 823 may be arranged side by side in one direction. In the illustrated exemplary embodiment, the first to third blocks 821, 822, 823 are arranged side by side in the extending direction of the first surface 811, that is, in the left-right direction.

The first block 821 is positioned in the central portion of the first Halbach array 820. The second block 822 is positioned on the left side of the first block 821. In addition, the third block 823 is positioned on the right side of the first block 821.

In an exemplary embodiment, each of the blocks 821, 822, 823 adjacent to each other may contact each other.

Each of the blocks 821, 822, 823 includes a plurality of surfaces.

Specifically, the first block 821 includes a first inner surface **821*a* facing the space part 815 or the second Halbach array 830 and a first outer surface 821*b* opposite to the space part 815 or the second Halbach array 830**.

The second block 822 includes a second inner surface **822*a* facing the first block 821 and a second outer surface 822*b* opposite to the first block 821**.

The third block 823 includes a third inner surface **823*a* facing the first block 821 and a third outer surface 823*b* opposite to the first block 821**.

The plurality of surfaces of each of the blocks 821, 822, 823 may be magnetized according to a predetermined rule to constitute a Halbach array.

Specifically, the first to third inner surfaces **821*a*, 822*a*, 823*a* may be magnetized with the same polarity. In addition, the first to third outer surfaces 821*b*, 822*b*, 823*b*** may be magnetized with a polarity different from the polarity.

In this case, the first to third inner surfaces **821*a*, 822*a*, 823*a* may be magnetized with the same polarity as the first inner surface 831*a* of the second Halbach array 830. In addition, the first to third inner surfaces 821*a*, 822*a*, 823*a* may be magnetized with the same polarity as the second and third inner surfaces 832*a*, 833*a* of the second Halbach array 830**.

In the illustrated exemplary embodiment, a plurality of magnetic materials constituting the second Halbach array 830 are sequentially arranged side by side from left to right. That is, in the illustrated exemplary embodiment, the second Halbach array 830 is formed to extend in the left-right direction.

The second Halbach array 830 may form a magnetic field together with other magnetic materials. In the illustrated exemplary embodiment, the second Halbach array 830 may form a magnetic field together with the first Halbach array 820.

The second Halbach array 830 may be positioned adjacent to the other one surface of the first and second faces 811 and 812. In an exemplary embodiment, the second Halbach array 830 may be coupled to the inner side of the other one surface (i.e., a direction toward the space part 815).

In the exemplary embodiment illustrated in FIGS. 48 and 49, the second Halbach array 830 is disposed on the inner side of the second surface 812, adjacent the second surface 812, so as to face the first Halbach array 820 which is disposed on the inner side of the first surface 811.

In the exemplary embodiment illustrated in FIGS. 50 and 51, the second Halbach array 830 is disposed on the inner side of the first surface 811, adjacent to the first surface 811, so as to face the first Halbach array 820 which is disposed on the inner side of the second surface 812.

Between the second Halbach array 830 and the first Halbach array 820, the space part 815 and the fixed contact 22 and the movable contact 43 accommodated in the space part 815 are positioned.

The second Halbach array 830 may be positioned in the central portion of the first surface 811. In other words, the shortest distance between the second Halbach array 830 and the third surface 813 and the shortest distance between the second Halbach array 830 and the fourth surface 814 may be the same.

The second Halbach array 830 may enhance the strength of the magnetic field formed by itself and the magnetic field formed with the first Halbach array 820. Since the direction of the magnetic field formed by the second Halbach array 830 and the process of strengthening the magnetic field are well-known techniques, the detailed description thereof will be omitted.

In the illustrated exemplary embodiment, the second Halbach array 830 includes a first block 831, a second block 832, a third block 833, a fourth block 834 and a fifth block 835. It will be understood that a plurality of magnetic materials constituting the second Halbach array 830 are each named blocks 831, 832, 833, 834, 835, respectively.

The first to fifth blocks 831, 832, 833, 834, 835 may be formed of a magnetic material. In an exemplary embodiment, the first to fifth blocks 831, 832, 833, 834, 835 may be provided as permanent magnets or electromagnets.

The first to fifth blocks 831, 832, 833, 834, 835 may be arranged side by side in one direction. In the illustrated exemplary embodiment, the first to fifth blocks 831, 832, 833, 834, 835 are arranged side by side in the extending direction of the second surface 812, that is, in the left-right direction.

The first block 831 is positioned in the central portion of the second Halbach array 830.

The second block 832 is positioned on the leftmost side of the second Halbach array 830. That is, the second block 832 is positioned adjacent to the third surface 813. The third block 833 is positioned on the rightmost side of the second Halbach array 830. That is, the third block 833 is positioned adjacent to the fourth surface 814.

The fourth block 834 is positioned between the first block 831 and the second block 832. In addition, the fifth block 835 is positioned between the first block 831 and the third block 833.

In an exemplary embodiment, each of the blocks 831, 832, 833, 834, 835 adjacent to each other may contact each other.

In addition, the first block 831 may be disposed to overlap the first block 831 of the second Halbach array 830 and the center (C) in a direction toward the second Halbach array 830 or the space part 815, which is the front-rear direction in the illustrated exemplary embodiment.

In addition, the second block 832 and the third block 833 may be disposed to overlap any one of the first fixed contact 22*a* and the second fixed contact 22*b*, respectively. In the illustrated exemplary embodiment, the second block 832 is disposed to overlap the first fixed contact 22*a*, and the third block 833 is disposed to overlap the second fixed contact 22*b*, respectively.

Each of the blocks 831, 832, 833, 834, 835 includes a plurality of surfaces.

Specifically, the first block 831 includes a first inner surface 831*a* facing the space part 815 or the first Halbach array 820 and a first outer surface 831*b* opposite to the space part 815 or the first Halbach array 820.

The second block 832 includes a second inner surface 832*a* facing the space part 815 or the first Halbach array 820 and a second outer surface 832*b* opposite to the space part 815 or the first Halbach array 820.

The third block 833 includes a third inner surface 833*a* facing the space part 815 or the first Halbach array 820 and a third outer surface 833*b* opposite to the space part 815 or the first Halbach array 820.

The fourth block 834 includes a fourth inner surface 834*a* facing the second block 832 and a fourth outer surface 834*b* facing the first block 831. It will be understood that the fourth inner surface 834*a* and the fourth outer surface 834*b* are positioned opposite to each other.

The fifth block 835 includes a fifth inner surface 835*a* facing the first block 831 and a fifth outer surface 835*b* facing the third block 833. It will be understood that the fifth inner surface 835*a* and the fifth outer surface 835*b* are positioned opposite to each other.

The plurality of surfaces of each of the blocks 831, 832, 833, 834, 835 may be magnetized according to a predetermined rule to constitute a Halbach array.

Specifically, the first and fifth inner surfaces 831*a*, 835*a* may be magnetized with the same polarity. In addition, the second to fourth inner surfaces 832*a*, 833*a*, 834*a* may be magnetized with a polarity different from the polarity.

In this case, the first and fifth inner surfaces 831*a*, 835*a* may be magnetized with the same polarity as the first to third inner surfaces 821*a*, 822*a*, 823*a* of the first Halbach array 820. In addition, the second to fourth inner surfaces 832*a*, 833*a*, 834*a* may be magnetized with the same polarity as the first to third outer surfaces 821*b*, 822*b*, 823*b* of the first Halbach array 820.

Hereinafter, the arc path (A.P) formed by the arc path generation unit 800 according to the present exemplary embodiment will be described in detail with reference to FIG. 52.

Figure 52:
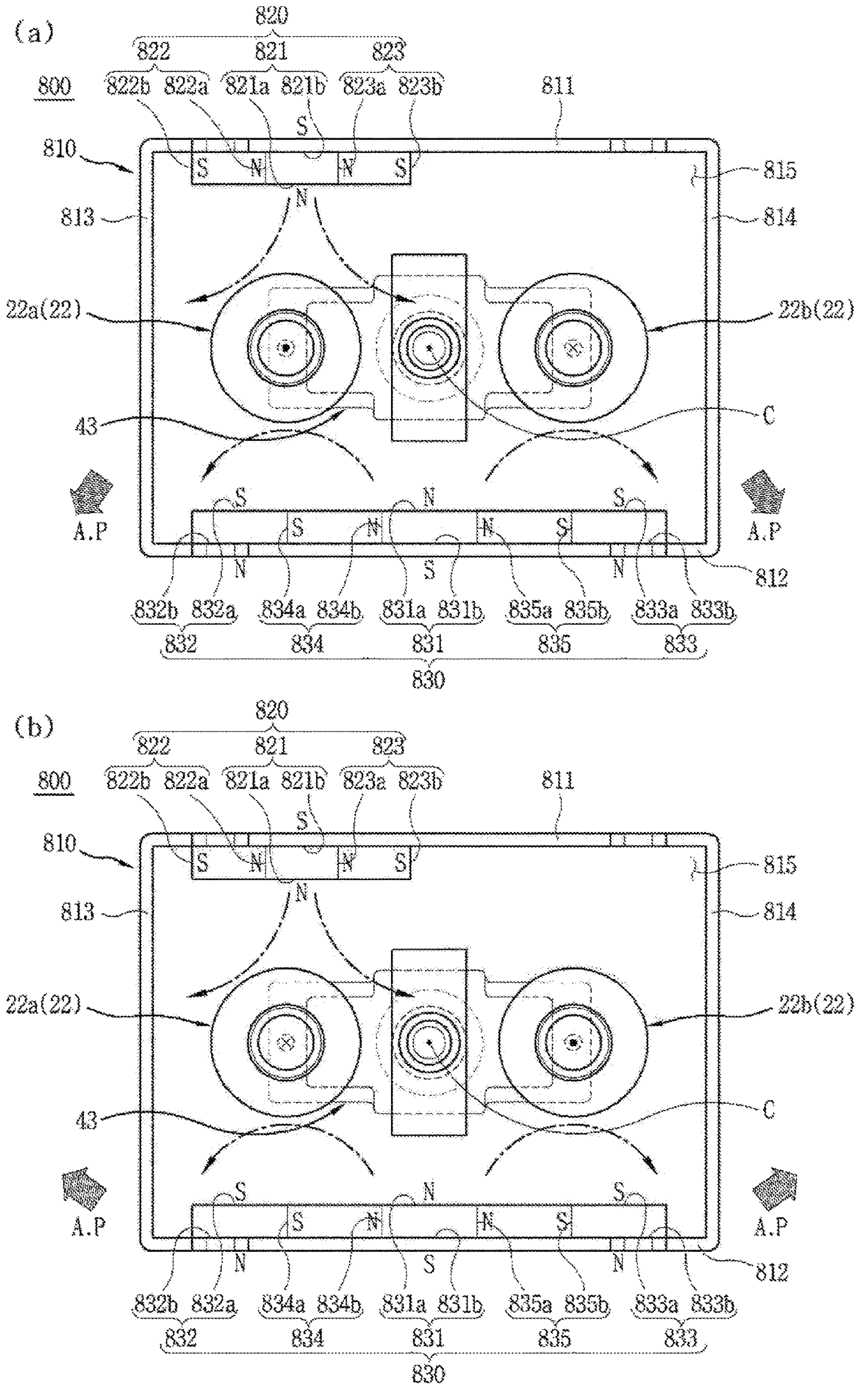
FIG. 52 is a conceptual diagram illustrating the paths of a magnetic field and an arc formed by the arc path generation unit according to the exemplary embodiment of FIGS. 48 to 51.
Figure 53:
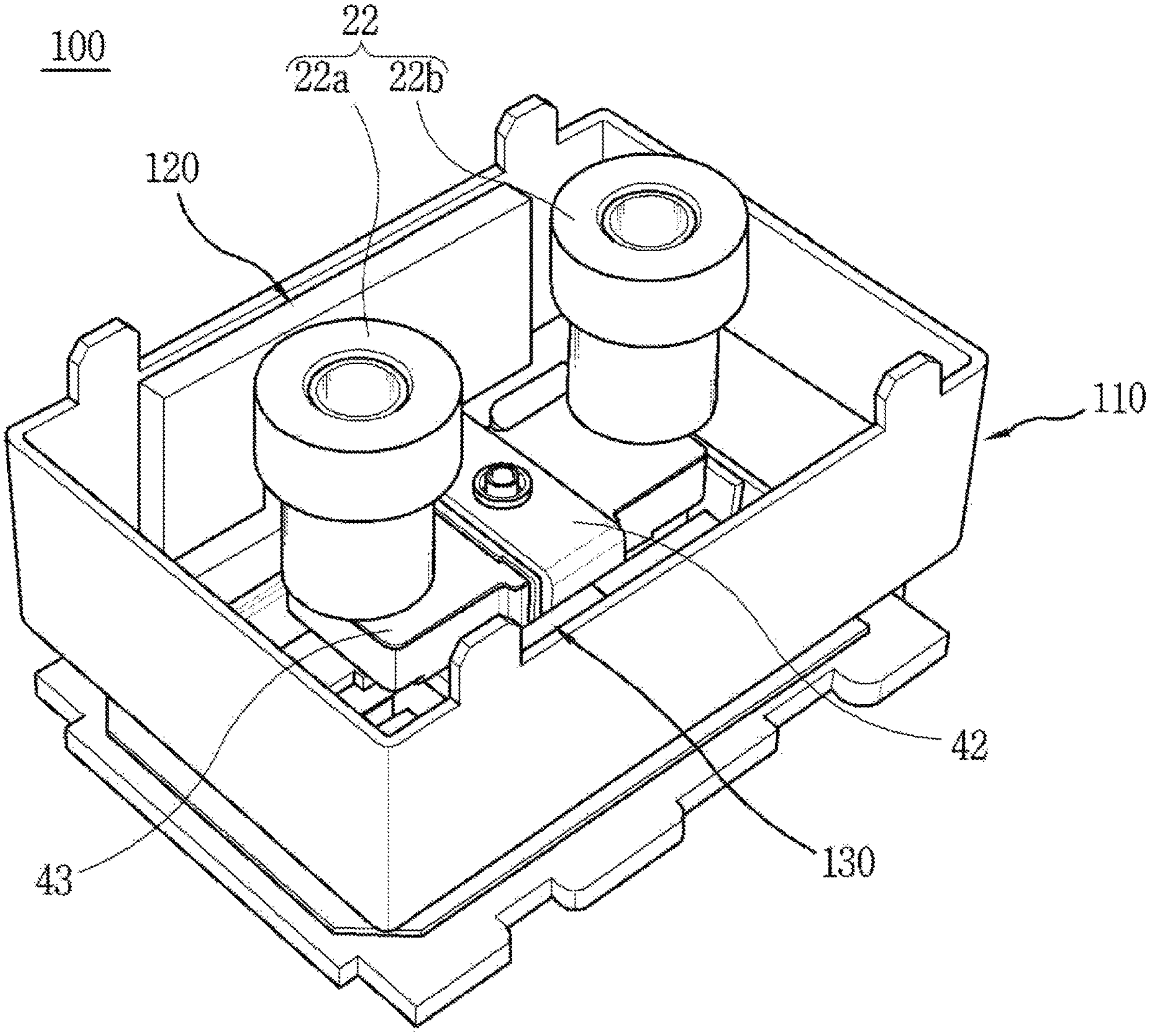
FIG. 53 is an open perspective view illustrating the third example of an arc path generation unit provided in the DC relay of FIG. 2.

Referring to FIG. 52, the first to third inner surfaces 821*a*, 822*a*, 823*a* of the first Halbach array 820 are magnetized to the N pole. In this case, the first to third outer surfaces 821*b*, 822*b*, 823*b* of the first Halbach array 820 are magnetized to the S pole.

Accordingly, in the first Halbach array 820, a magnetic field in a direction from the first inner surface 821*a* toward the second and third inner surfaces 822*a*, 823*a* is formed.

In addition, the first inner surface 831*a* of the second Halbach array 830 is also magnetized to the N pole. In this case, the second and third inner surfaces 832*a*, 833*a* of the second Halbach array 730 are magnetized to the S pole.

Accordingly, in the second Halbach array 830, a magnetic field in a direction from the first inner surface 831*a* toward the second and third inner surfaces 832*a*, 833*a* is formed.

In addition, between the first Halbach array 820 and the second Halbach array 830, a magnetic field in a direction from the first inner surface 821*a* toward the second inner surface 832*a* and the third inner surface 833*a* is formed.

As a result, a magnetic field in a direction to repel each other between the first Halbach array 820 and the second Halbach array 830 is formed near each of the fixed contacts 22*a*, 22*b*.

In the exemplary embodiment illustrated in (a) of FIG. 52, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 52, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 820, 830 is changed, the directions of the magnetic fields formed by each of the Halbach arrays 820, 830 become reversed. Accordingly, the path (A.P) of the generated electromagnetic force and arc is also formed to be reversed in the front-rear direction.

That is, in the energized situation as shown in (a) of FIG. 52, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 52, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first and second Halbach arrays 820, 830 or the direction of the current flowing through the DC relay 1, the arc path generation unit 800 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

5. Description of the Arc Path Generation Unit According to the Third Example of the Present Disclosure Referring to FIGS. 53 to 86, the arc path generation units 100, 200, 300, 400, 500, 600, 700, 800 and 900 according to various exemplary embodiments of the present disclosure are illustrated. Each of the arc path generation units 100, 200, 300, 400, 500, 600, 700, 800 and 900 forms a magnetic field inside the arc chamber 21. An electromagnetic force is formed inside the arc chamber 21 by the current flowing through the DC relay 1 and the formed magnetic field.

The arc generated as the fixed contact 22 and the movable contact 43 are spaced apart is moved to the outside of the arc chamber 21 by the formed electromagnetic force. Specifically, the generated arc is moved along the above direction of the formed electromagnetic force. Accordingly, it may be said that the arc path generation units 100, 200, 300, 400, 500, 600, 700, 800, 900 form the arc path (A.P), which is a path through which the generated arc flows.

The arc path generation units 100, 200, 300, 400, 500, 600, 700, 800 and 900 are positioned in a space formed inside the upper frame 11. The arc path generation units 100, 200, 300, 400, 500, 600, 700, 800 and 900 are disposed to surround the arc chamber 21. In other words, the arc chamber 21 is positioned inside the arc path generation units 100, 200, 300, 400, 500, 600, 700, 800, 900.

A fixed contact 22 and a movable contact 43 are positioned inside the arc path generation units 100, 200, 300, 400, 500, 600, 700, 800 and 900. The arc generated by the fixed contact 22 and the movable contact 43 being spaced apart may be induced by the electromagnetic force formed by the arc path generation units 100, 200, 300, 400, 500, 600, 700, 800, 900.

The arc path generation units 100, 200, 300, 400, 500, 600, 700, 800, 900 according to various exemplary embodiments of the present disclosure includes a Halbach array or a magnet part. The Halbach array or magnet part forms a magnetic field inside the arc path generation unit 100 in which the fixed contact 22 and the movable contact 43 are accommodated. In this case, the Halbach array or the magnet part may form a magnetic field by itself and between each other.

The magnetic field formed by the Halbach array and the magnet part forms an electromagnetic force together with the current passed through the fixed contact 22 and the movable contact 43. The formed electromagnetic force induces an arc generated when the fixed contact 22 and the movable contact 43 are spaced apart.

In this case, the arc path generation units 100, 200, 300, 400, 500, 600, 700, 800, 900 form an electromagnetic force in a direction away from the center (C) of the space part 115. Accordingly, the arc path (A.P) is also formed in a direction away from the center (C) of the space part.

As a result, each component provided in the DC relay 1 is not damaged by the generated arc. Furthermore, the generated arc may be rapidly discharged to the outside of the arc chamber 21.

Hereinafter, with reference to the accompanying drawings, the configuration of each of the arc path generation units 100, 200, 300, 400, 500, 600, 700, 800, 900 and the arc path (A.P) generated by each of the arc path generation units 100, 200, 300, 400, 500, 600, 700, 800, 900 will be described in detail.

The arc path generation units 100, 200, 300, 400, 500, 600, 700, 800, 900 according to various exemplary embodiments to be described below may have a Halbach array located on any one of the front side and the rear side.

In addition, the arc path generation units 100, 200, 300, 400, 500, 600, 700, 800, 900 may include a magnet part having a polarity in the width direction, which is located on the other one of the front side and the rear side.

As will be described below, the rear side may be defined as a direction adjacent to first surfaces 111, 211, 311, 411, 511, 611, 711, 811, 911, and the front side may be defined as a direction adjacent to second surfaces 112, 212, 312, 412, 512, 612, 712, 812, 912.

In addition, the left side may be defined as a direction adjacent to third surface 113, 213, 313, 413, 513, 613, 713, 813, 913, and the right side may be defined as a direction adjacent to fourth surface 114, 214, 314, 414, 514, 614, 714, 814, 914.

(1) Description of the Arc Path Generation Unit 100 According to an Exemplary Embodiment of the Present Disclosure Hereinafter, the arc path generation unit 100 according to an exemplary embodiment of the present disclosure will be described in detail with reference to FIGS. 54 to 58.

Referring to FIGS. 54 to 57, the arc path generation unit 100 according to the illustrated exemplary embodiment includes a magnetic frame 110, a Halbach array 120 and a magnet part 130.

The magnetic frame 110 forms a skeleton of the arc path generation unit 100. A Halbach array 120 and a magnet part 130 are disposed on the magnetic frame 110. In an exemplary embodiment, the Halbach array 120 and the magnet part 130 may be coupled to the magnetic frame 110.

The magnetic frame 110 has a rectangular cross-section extending in the longitudinal direction, which is the left-right direction in the illustrated exemplary embodiment. The shape of the magnetic frame 110 may be changed according to the shapes of the upper frame 11 and the arc chamber 21.

The magnetic frame 110 includes a first surface 111, a second surface 112, a third surface 113, a fourth surface 114 and a space part 115.

The first surface 111, the second surface 112, the third surface 113 and the fourth surface 114 form an outer peripheral surface of the magnetic frame 110. That is, the first surface 111, the second surface 112, the third surface 113 and the fourth surface 114 function as a wall of the magnetic frame 110.

Outside of the first surface 111, the second surface 112, the third surface 113 and the fourth surface 114 may be in contact with or fixedly coupled to the inner surface of the upper frame 11. In addition, the Halbach array 120 and the magnet part 130 may be positioned inside the first surface 111, the second surface 112, the third surface 113 and the fourth surface 114.

In the illustrated exemplary embodiment, the first surface 111 forms a rear side surface. The second surface 112 forms a front side surface and faces the first surface 111. In addition, the third surface 113 forms a left side surface. The fourth surface 114 forms a right side surface and faces the third surface 113.

That is, the first surface 111 and the second surface 112 face each other with the space part 115 interposed therebetween. In addition, the third surface 113 and the fourth surface 114 face each other with the space part 115 interposed therebetween.

The first surface 111 is continuous with the third surface 113 and the fourth surface 114. The first surface 111 may be coupled to the third surface 113 and the fourth surface 114 at a predetermined angle. In an exemplary embodiment, the predetermined angle may be a right angle.

The second surface 112 is continuous with the third surface 113 and the fourth surface 114. The second surface 112 may be coupled to the third surface 113 and the fourth surface 114 at a predetermined angle. In an exemplary embodiment, the predetermined angle may be a right angle.

Each edge at which the first surface 111 to the fourth surface 114 are connected to each other may be tapered.

A fastening member (not illustrated) may be provided for coupling each of the surfaces 111, 112, 113, 114 to the magnet part 130.

Although not illustrated, an arc discharge hole (not illustrated) may be formed through at least one of the first surface 111, the second surface 112, the third surface 113 and the fourth surface 114. The arc discharge hole (not illustrated) may function as a passage through which the arc generated in the space part 115 is discharged.

The space surrounded by the first surface 111 to the fourth surface 114 may be defined as the space part 115.

The fixed contact 22 and the movable contact 43 are accommodated in the space part 115. In addition, the arc chamber 21 is accommodated in the space part 115.

In the space part 115, the movable contact 43 may be moved in a direction toward the fixed contact 22 (i.e., a downward direction) or a direction away from the fixed contact 22 (i.e., an upward direction).

In addition, a path (A. P) of the arc generated in the arc chamber 21 is formed in the space part 115. This is achieved by the magnetic field formed by the Halbach array 120 and the magnet part 130.

A central portion of the space part 115 may be defined as a center (C). The straight line distances from each corner where the first to fourth surfaces 111, 112, 113, 114 are connected to each other to the center (C) may be formed to be the same.

The center (C) is positioned between the first fixed contact **22*a* and the second fixed contact 22*b*. In addition, the central portion of the movable contact portion 40 is positioned vertically below the center (C). That is, the central portions of the housing 41, the cover 42, the movable contact 43, the shaft 44 and the elastic part 45** are positioned vertically below the center (C).

Accordingly, when the generated arc is moved toward the center (C), the above components may be damaged. In order to prevent this, the arc path generation unit 100 according to the present exemplary embodiment includes the Halbach array 120 and the magnet part 130.

In the illustrated exemplary embodiment, a plurality of magnetic materials constituting the Halbach array 120 are sequentially arranged side by side from left to right. That is, in the illustrated exemplary embodiment, the Halbach array 120 is formed to extend in the left-right direction.

The Halbach array 120 may form a magnetic field together with other magnetic materials. In the illustrated exemplary embodiment, the Halbach array 120 may form a magnetic field together with the magnet part 130.

The Halbach array 120 may be positioned adjacent to any one surface of the first and second surfaces 111, 112. In an exemplary embodiment, the Halbach array 120 may be coupled to the inner side of the any one surface (i.e., a direction toward the space part 115).

Figure 54:
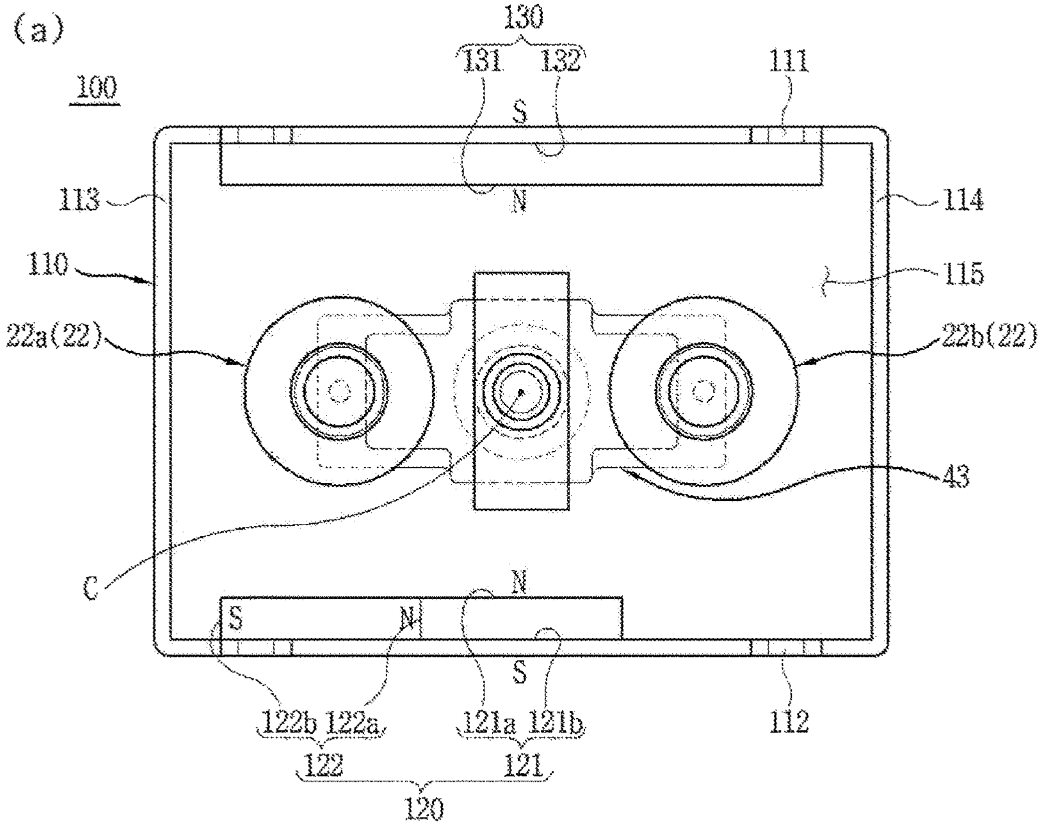
FIGS. 54 to 57 are conceptual diagrams illustrating the arc path generation unit according to an exemplary embodiment of the present disclosure.
Figure 54:
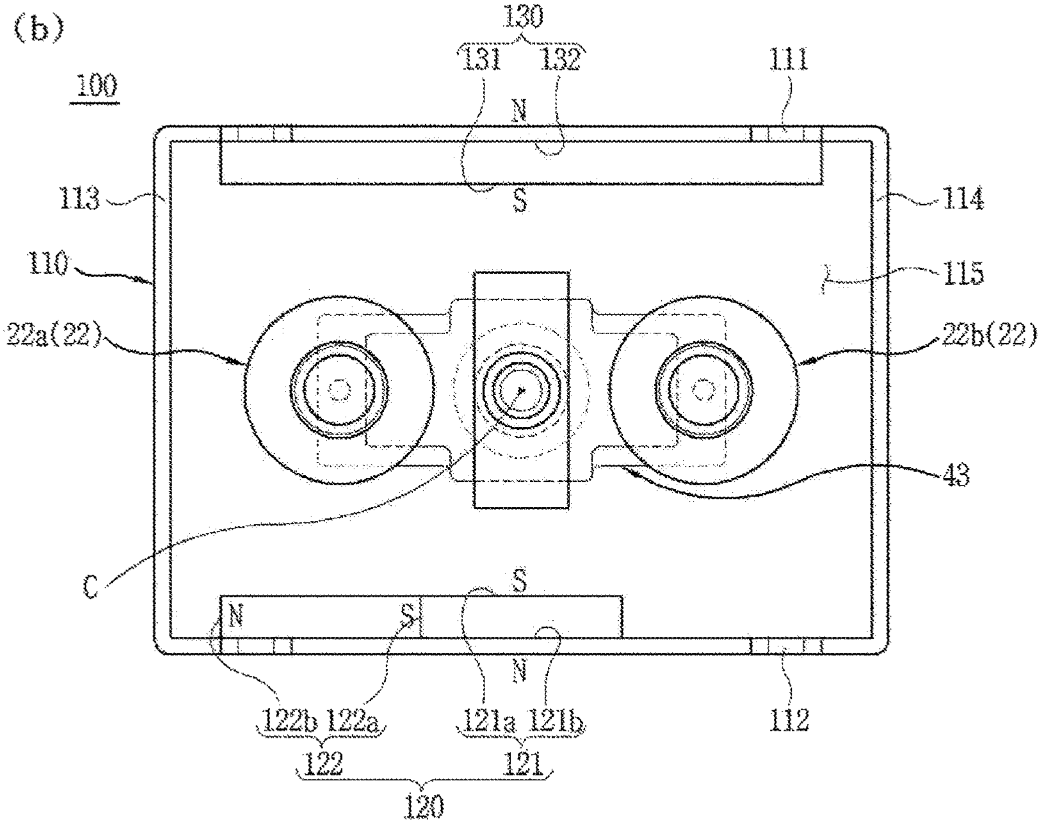
Figure 55:
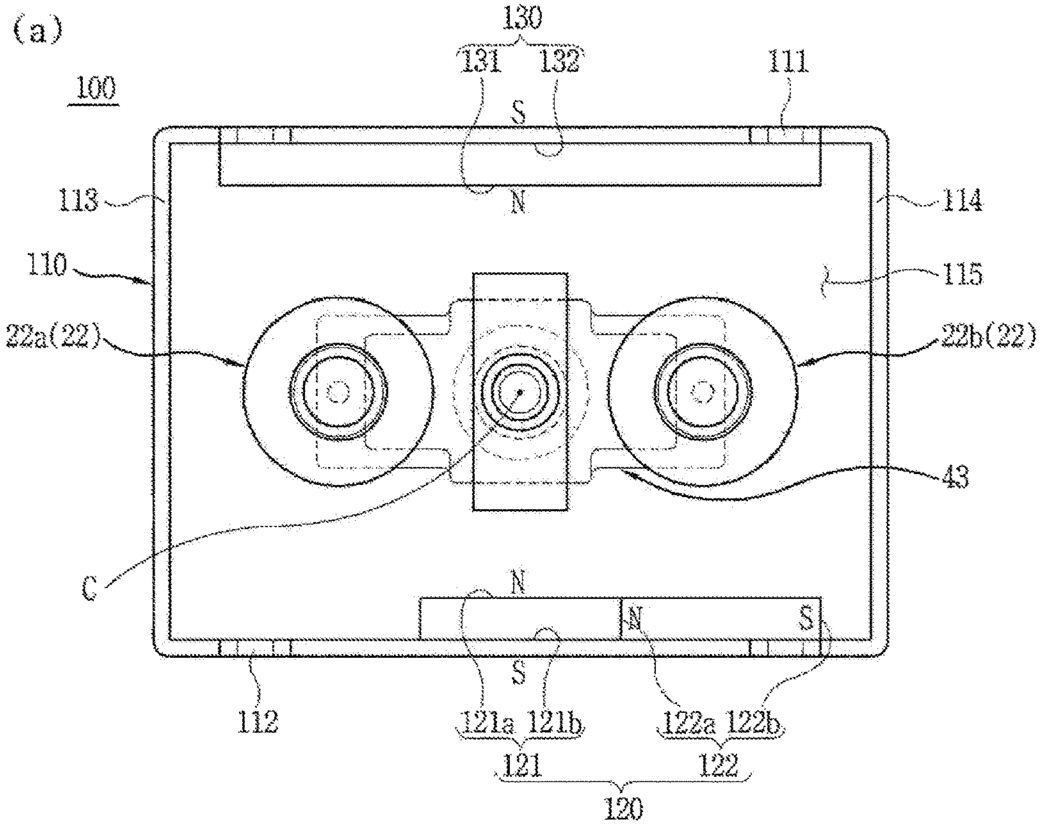
Figure 55:
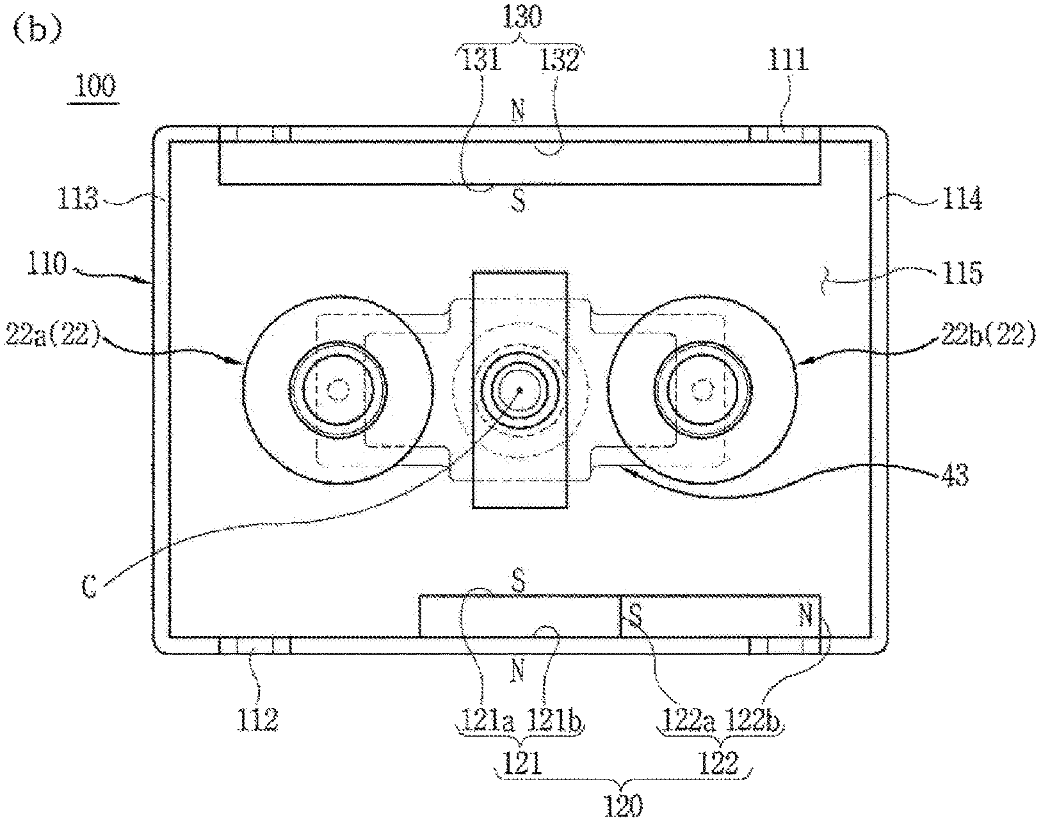

In the exemplary embodiment illustrated in FIGS. 54 and 55, the Halbach array 120 is disposed on the inner side of the second surface 112, adjacent to the second surface 112, so as to face the magnet part 130 which is disposed on the inner side of the first surface 111.

Figure 56:
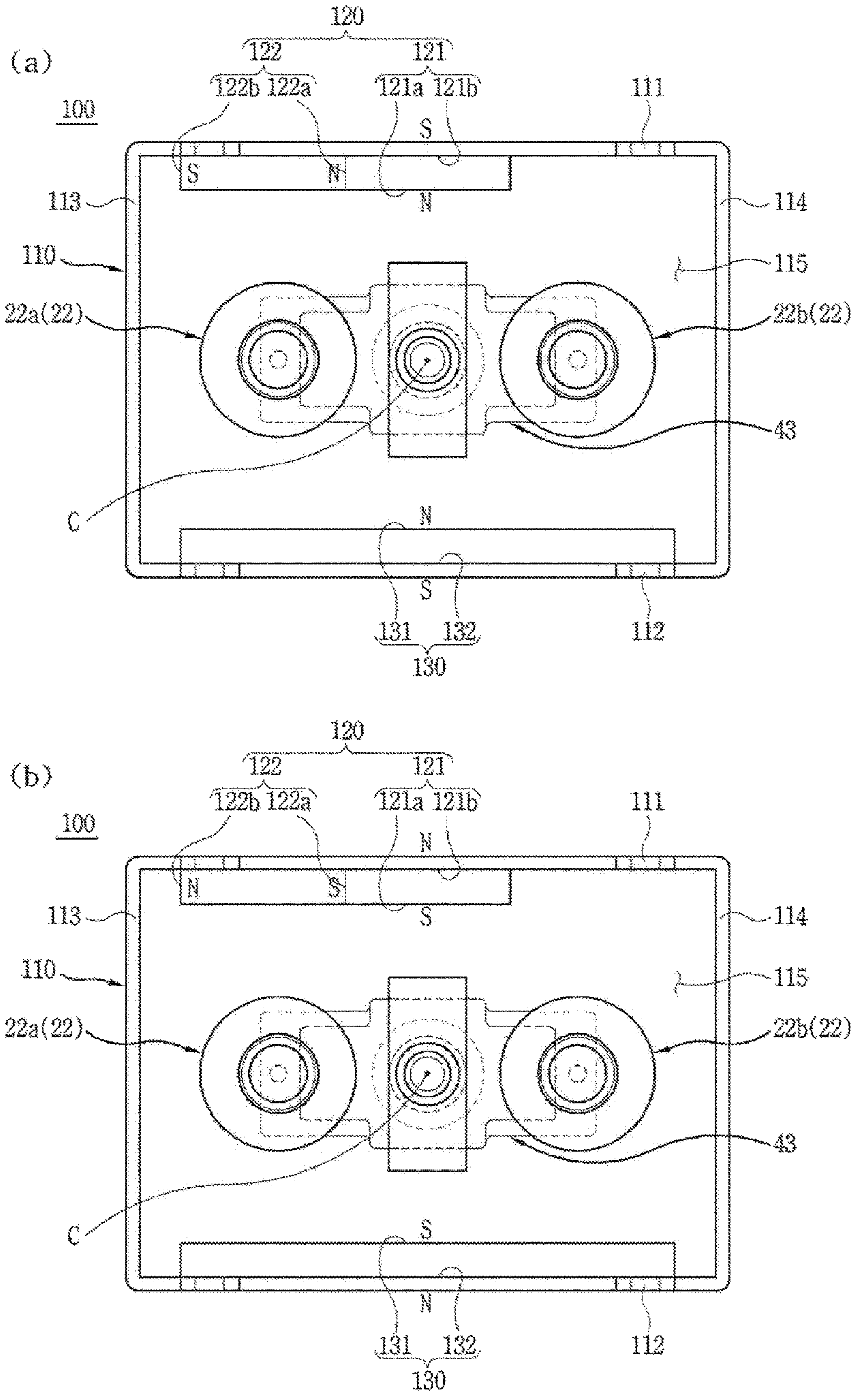
Figure 57:
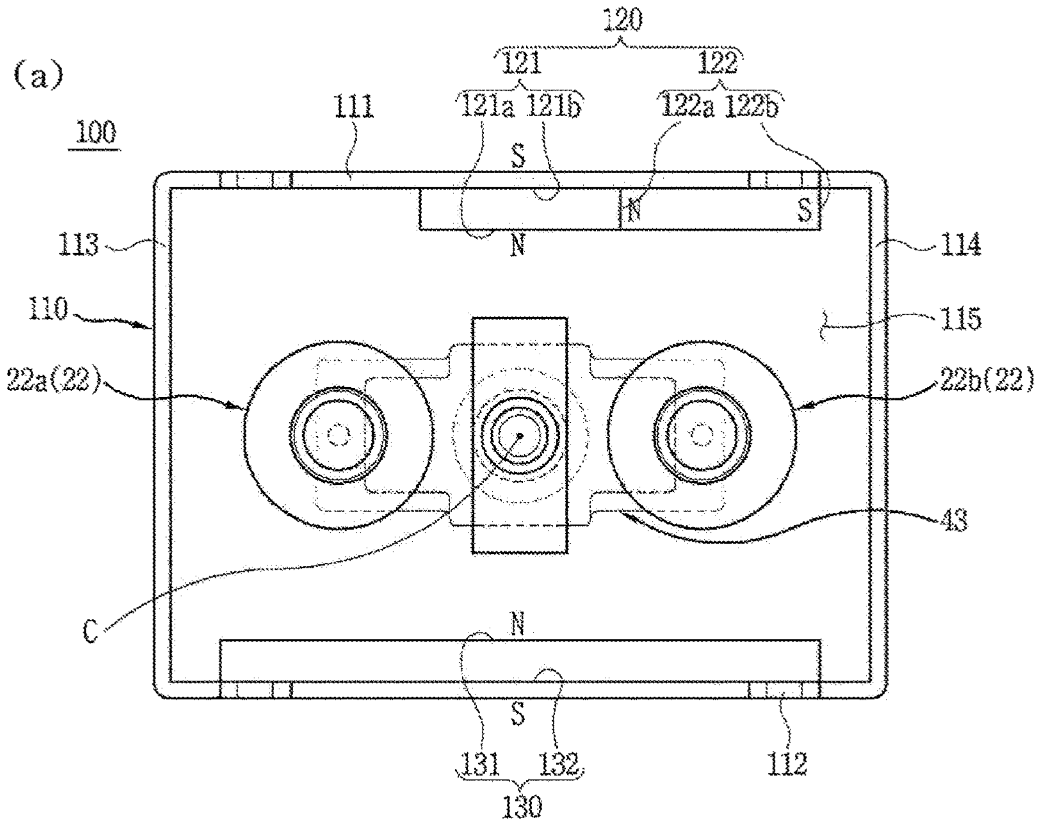
Figure 57:
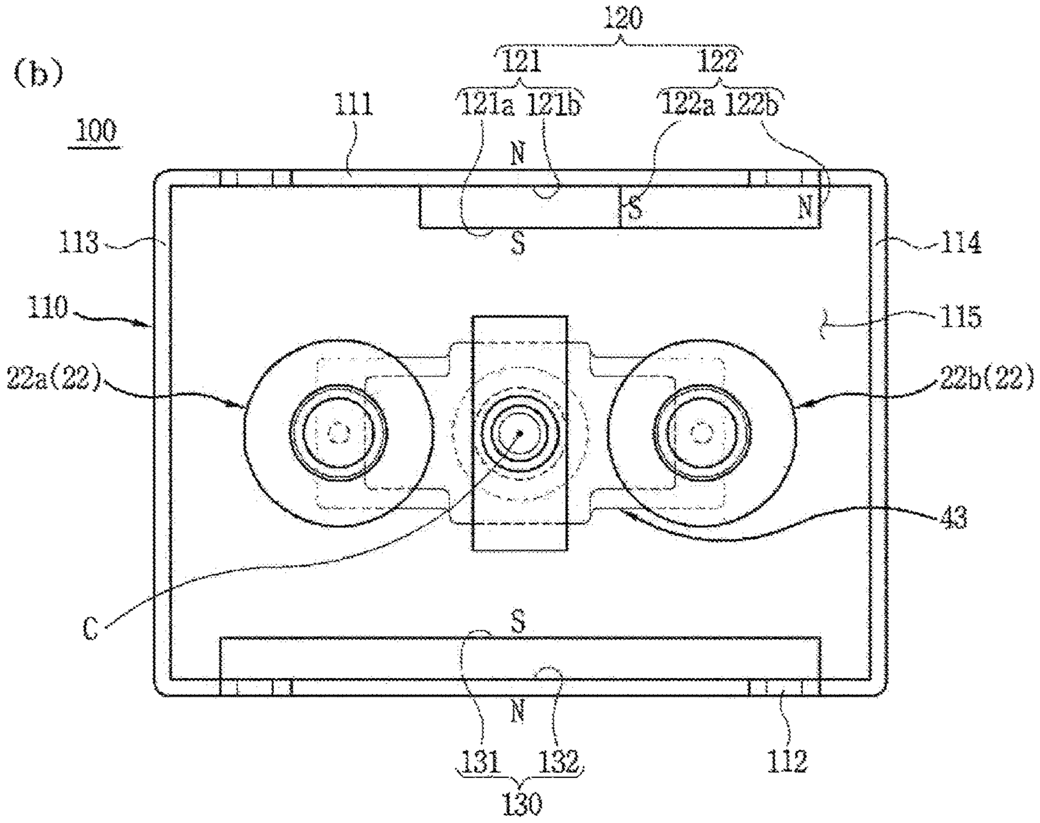

In the exemplary embodiment illustrated in FIGS. 56 and 57, the Halbach array 120 is disposed on the inner side of the first surface 111, adjacent to the first surface 111, so as to face the magnet part 130 which is disposed on the inner side of the second surface 112.

The Halbach array 120 may be positioned to be biased toward any one of the third surface 113 and the fourth surface 114. In the exemplary embodiment illustrated in FIGS. 54 and 56, the Halbach array 120 is positioned to be biased toward the third surface 113. In the exemplary embodiment illustrated in FIGS. 55 and 57, the Halbach array 120 is positioned to be biased toward the fourth surface 114.

Between the Halbach array 120 and the magnet part 130, the space part 115 and the fixed contact 22 and the movable contact 43 accommodated in the space part 115 are positioned.

The Halbach array 120 may enhance the strength of the magnetic field formed by itself and the magnetic field formed with the magnet part 130. Since the direction of the magnetic field formed by the Halbach array 120 and the process of strengthening the magnetic field are well-known techniques, the detailed description thereof will be omitted.

In the illustrated exemplary embodiment, the Halbach array 120 includes a first block 121 and a second block 122. It will be understood that a plurality of magnetic materials constituting the Halbach array 120 are each named blocks 121, 122, respectively.

The first and second blocks 121, 122 may be formed of a magnetic material. In an exemplary embodiment, the first and second blocks 121, 122 may be provided as permanent magnets or electromagnets.

The first and second blocks 121, 122 may be arranged side by side in one direction. In the illustrated exemplary embodiment, the first and second blocks 121, 122 are arranged side by side in the extending direction of the first surface 111 or the second surface 112, that is, in the left-right direction.

The first and second blocks 121, 122 are arranged side by side along the above direction. Specifically, in the first and second blocks 121, 122, the first block 121 is disposed in the central portion, and the second block 122 is disposed on the left or right side of the first block 121.

In the exemplary embodiment illustrated in FIGS. 54 and 56, the second block 122 is positioned on the left side of the first block 121. In the exemplary embodiment illustrated in FIGS. 55 and 57, the second block 122 is positioned on the right side of the first block 121.

In an exemplary embodiment, each of the blocks 121, 122 disposed adjacent to each other may contact each other.

The first and second blocks 121, 122 may be disposed to overlap the magnet part 130 in a direction toward the magnet part 130, which is the front-rear direction in the illustrated exemplary embodiment, respectively.

In this case, the second block 122 may be disposed to overlap the first fixed contact 22*a* or the second fixed contact 22*b* in a direction toward the magnet part 130, which is the front-rear direction in the illustrated exemplary embodiment.

In the exemplary embodiment illustrated in FIGS. 54 and 56, the second block 122 is disposed to overlap the first fixed contact 22*a* in the front-rear direction. In the exemplary embodiment illustrated in FIGS. 55 and 57, the second block 122 is disposed to overlap the second fixed contact 22*b*.

Each of the blocks 121, 122 includes a plurality of surfaces.

Specifically, the first block 121 includes a first inner surface 121*a* facing the space part 115 or the magnet part 130 and a first outer surface 121*b* opposite to the space part 115 or the magnet part 130.

The second block 122 includes a second inner surface 122*a* facing the first block 121 and a second outer surface 122*b* opposite to the first block 121.

The plurality of surfaces of each of the blocks 121, 122 may be magnetized according to a predetermined rule to constitute a Halbach array.

Specifically, the first and second inner surfaces 121*a*, 122*a* may be magnetized with the same polarity. Similarly, the first and second outer surfaces 121*b*, 122*b* may be magnetized with the same polarity.

In this case, the first and second inner surfaces 121*a*, 122*a* may be magnetized with the same polarity as the opposing surface 131 of the magnet part 130. Similarly, the first and second outer surfaces 121*b*, 122*b* may be magnetized with the same polarity as the opposite surface 132 of the magnet part 130.

The magnet part 130 forms a magnetic field on its own or with the Halbach array 120. An arc path (A.P) may be formed inside the arc chamber 21 by the magnetic field formed by the magnet part 130.

The magnet part 130 may be provided in any shape capable of forming a magnetic field by being magnetized. In an exemplary embodiment, the magnet part 130 may be provided as a permanent magnet or an electromagnet.

The magnet part 130 may be positioned adjacent to the other one surface of the first surface 111 and the second surface 112. In an exemplary embodiment, the magnet part 130 may be coupled to the inner side of the other one surface (i.e., a direction toward the space part 115).

In the exemplary embodiment illustrated in FIGS. 54 and 55, the magnet part 130 is disposed on the inner side of the first surface 111, adjacent to the first surface 111, so as to face the Halbach array 120 which is disposed on the inner side of the second surface 112.

In the exemplary embodiment illustrated in FIGS. 56 and 57, the magnet part 130 is disposed on the inner side of the second surface 112, adjacent to the second surface 112, so as to face the Halbach array 120 which is disposed on the inner side of the first surface 111.

Between the magnet part 130 and the Halbach array 120, the space part 115 and the fixed contact 22 and the movable contact 43 accommodated in the space part 115 are positioned.

The magnet part 130 extends in the extending direction of the first surface 111 or the second surface 112, which is the left-right direction in the illustrated exemplary embodiment. In an exemplary embodiment, the extended length of the magnet part 130 may be longer than the extended length of the Halbach array 120.

The magnet part 130 is disposed to overlap the Halbach array 120 in a direction toward the space part 115 or the fixed contacts 22*a*, 22*b*, which is the front-rear direction in the illustrated exemplary embodiment. In addition, the magnet part 130 is disposed to overlap the first fixed contact 22*a* and the second fixed contact 22*b* in the above direction, respectively.

The magnet part 130 includes a plurality of surfaces.

Specifically, the magnet part 130 includes an opposing surface 131 facing the space part 115 or the Halbach array 120 and an opposite surface 132 opposite to the space part 115 or the Halbach array 120.

The opposing surface 131 and the opposite surface 132 may be magnetized according to a predetermined rule.

Specifically, the opposing surface 131 may be magnetized with the same polarity as the first and second inner surfaces 121*a*, 122*a* of the Halbach array 120. In addition, the opposite surface 132 may be magnetized with the same polarity as the first and second outer surfaces 121*b*, 122*b* of the Halbach array 120.

Hereinafter, the arc path (A.P) formed by the arc path generation unit 100 according to the present exemplary embodiment will be described in detail with reference to FIG. 58.

Figure 58:
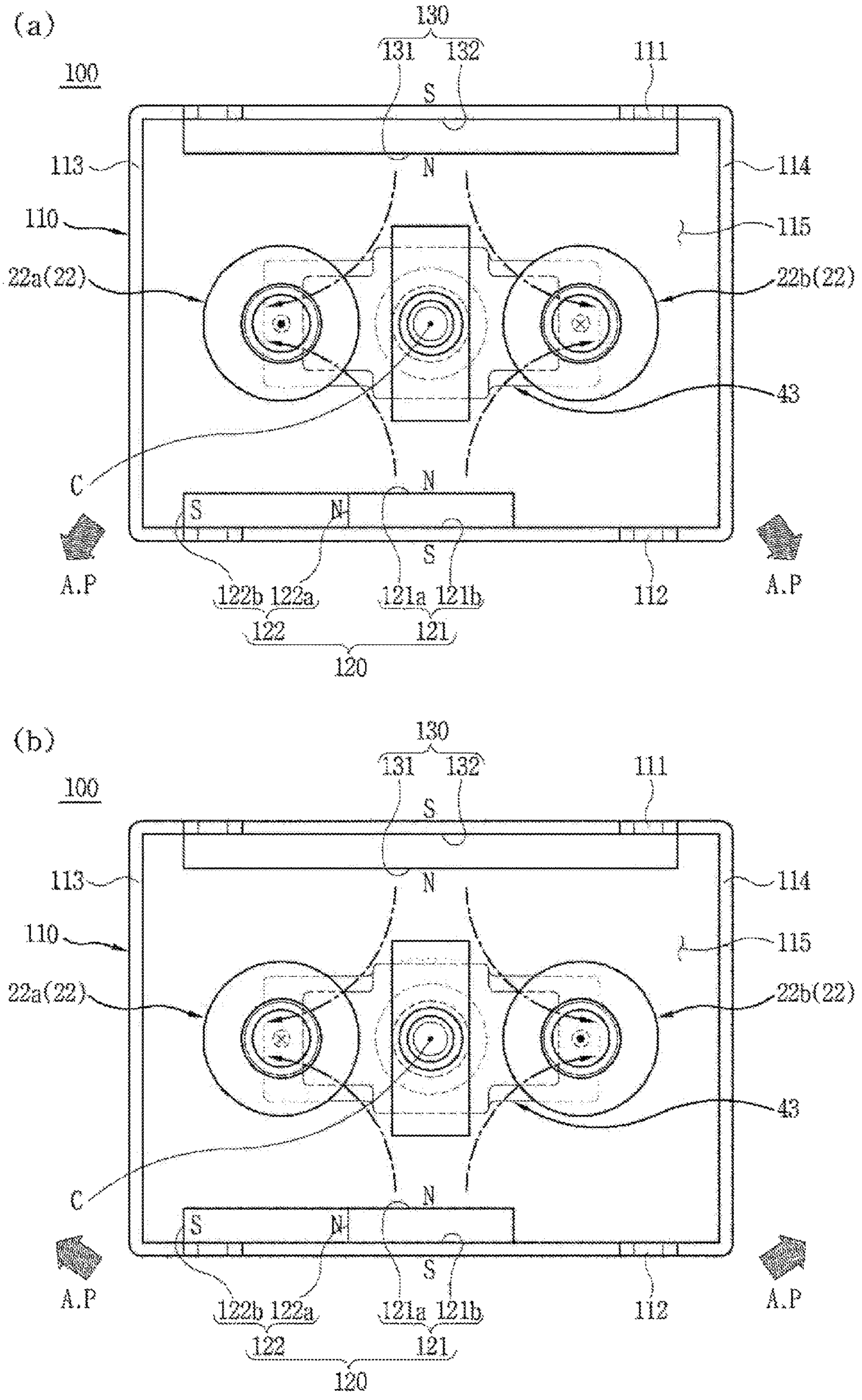
FIG. 58 is a conceptual diagram illustrating the paths of a magnetic field and an arc formed by the arc path generation unit according to the exemplary embodiment of FIGS. 54 to 57.

Referring to FIG. 58, the first and second inner surfaces 121*a*, 122*a* of the Halbach array 120 are magnetized to the N pole. In addition, the opposing surface 131 of the magnet part 130 is also magnetized to the N pole.

In addition, according to the predetermined rule, the first and second outer surfaces 121*b*, 122*b* of the Halbach array 120 are magnetized to the S pole. In addition, the opposite surface 132 of the magnet part 130 is also magnetized to the S pole.

Accordingly, a magnetic field in a direction to repel each other is formed between the Halbach array 120 and the magnet part 130.

In the exemplary embodiment illustrated in (a) of FIG. 58, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 58, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach array 120 and the magnet part 130 is changed, the directions of the magnetic fields formed by the Halbach array 120 and the magnet part 130 become reversed. Accordingly, the path (A.P) of the generated electromagnetic force and arc is also formed to be reversed in the front-rear direction.

That is, in the energized situation as shown in (a) of FIG. 58, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 58, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 120 and the magnet part 130 or the direction of the current flowing through the DC relay 1, the arc path generation unit 100 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(2) Description of the Arc Path Generation Unit 200 According to Another Exemplary Embodiment of the Present Disclosure Hereinafter, the arc path generation unit 200 according to another exemplary embodiment of the present disclosure will be described in detail with reference to FIGS. 59 to 63.

(1) Description of the Configuration of the Arc Path Generation Unit 200

Referring to FIGS. 59 to 62, the arc path generation unit 200 according to the illustrated exemplary embodiment includes a magnetic frame 210, a Halbach array 220, a first magnet part 230 and a second magnet part 240.

The magnetic frame 210 according to the present exemplary embodiment has the same structure and function as the magnetic frame 210 according to the above-described exemplary embodiment. However, there is a difference in the arrangement method of the Halbach array 220 and the first and second magnet parts 230, 240 disposed on the magnetic frame 210 according to the present exemplary embodiment.

Accordingly, the description of the magnetic frame 210 will be replaced with the description of the magnetic frame 210 according to the above-described exemplary embodiment.

In the illustrated exemplary embodiment, a plurality of magnetic materials constituting the Halbach array 220 are sequentially arranged side by side from left to right. That is, in the illustrated exemplary embodiment, the Halbach array 220 is formed to extend in the left-right direction.

The Halbach array 220 may form a magnetic field together with other magnetic materials. In the illustrated exemplary embodiment, the Halbach array 220 may form a magnetic field together with the first magnet part 230 and the second magnet part 240.

The Halbach array 220 may be positioned adjacent to any one surface of the first and second surfaces 211, 212. In an exemplary embodiment, the Halbach array 220 may be coupled to the inner side of the any one surface (i.e., a direction toward the space part 215).

Figure 59:
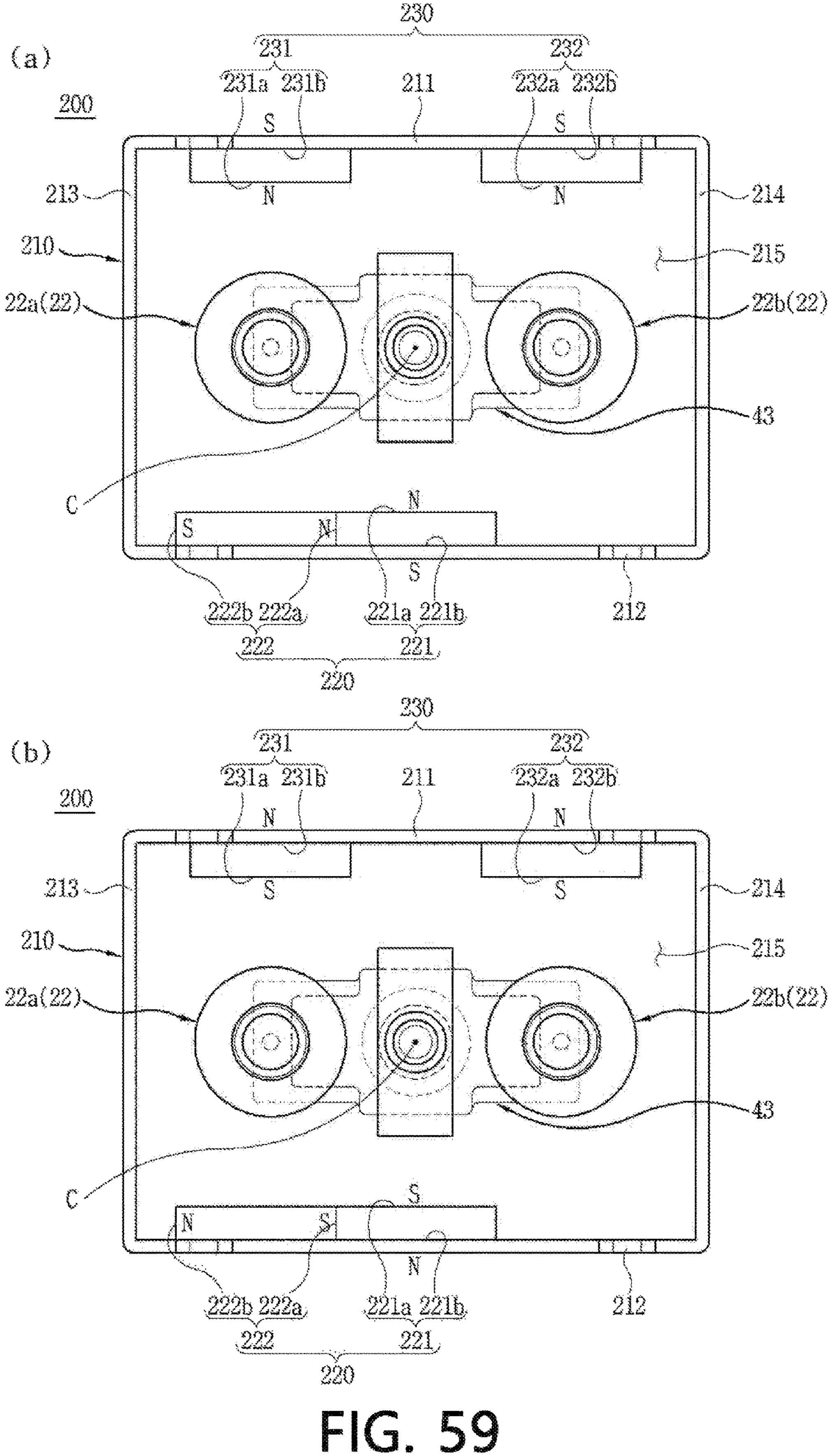
FIGS. 59 to 62 are conceptual diagrams illustrating the arc path generation unit according to another exemplary embodiment of the present disclosure.
Figure 60:
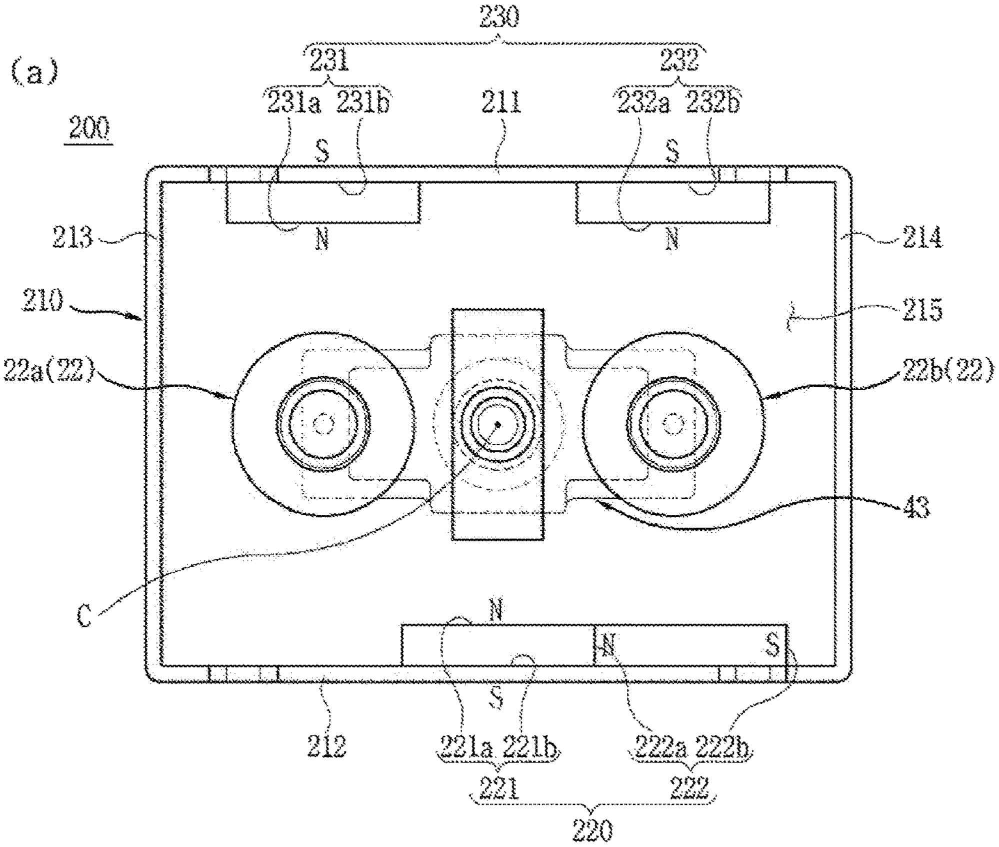
Figure 60:
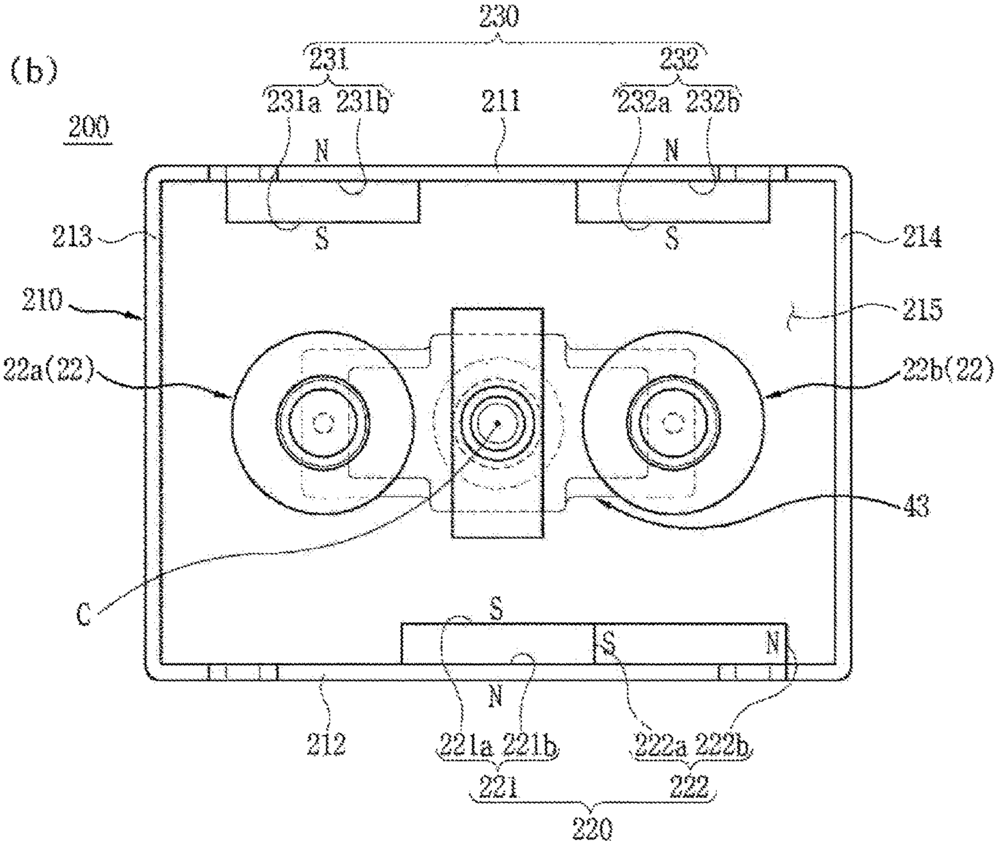

In the exemplary embodiment illustrated in FIGS. 59 and 60, the Halbach array 220 is disposed on the inner side of the second surface 212, adjacent to the second surface 212, so as to face the first magnet part 230 and the second magnet part 240 which are disposed on the inner side of the first surface 211.

Figure 61:
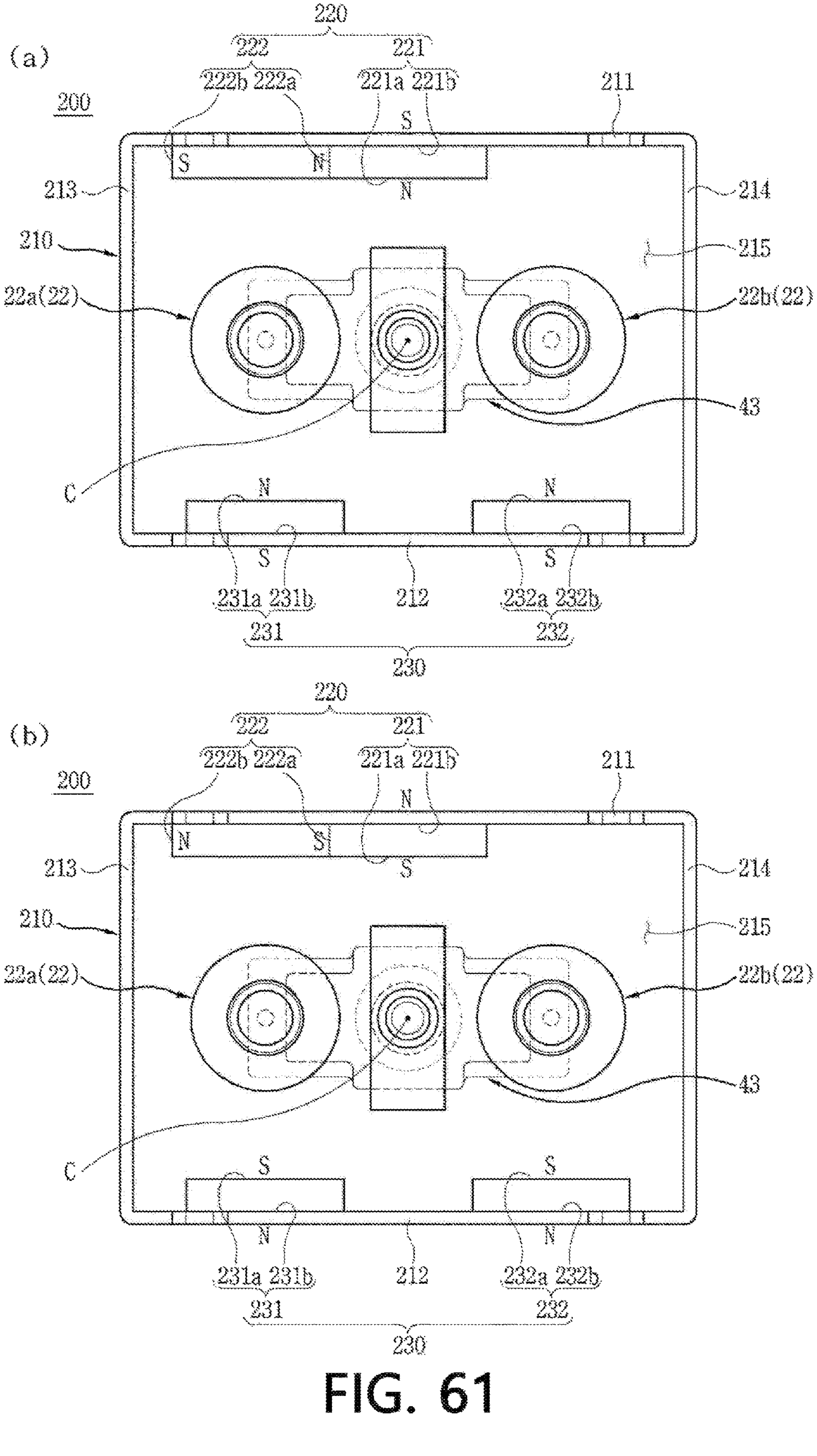
Figure 62:
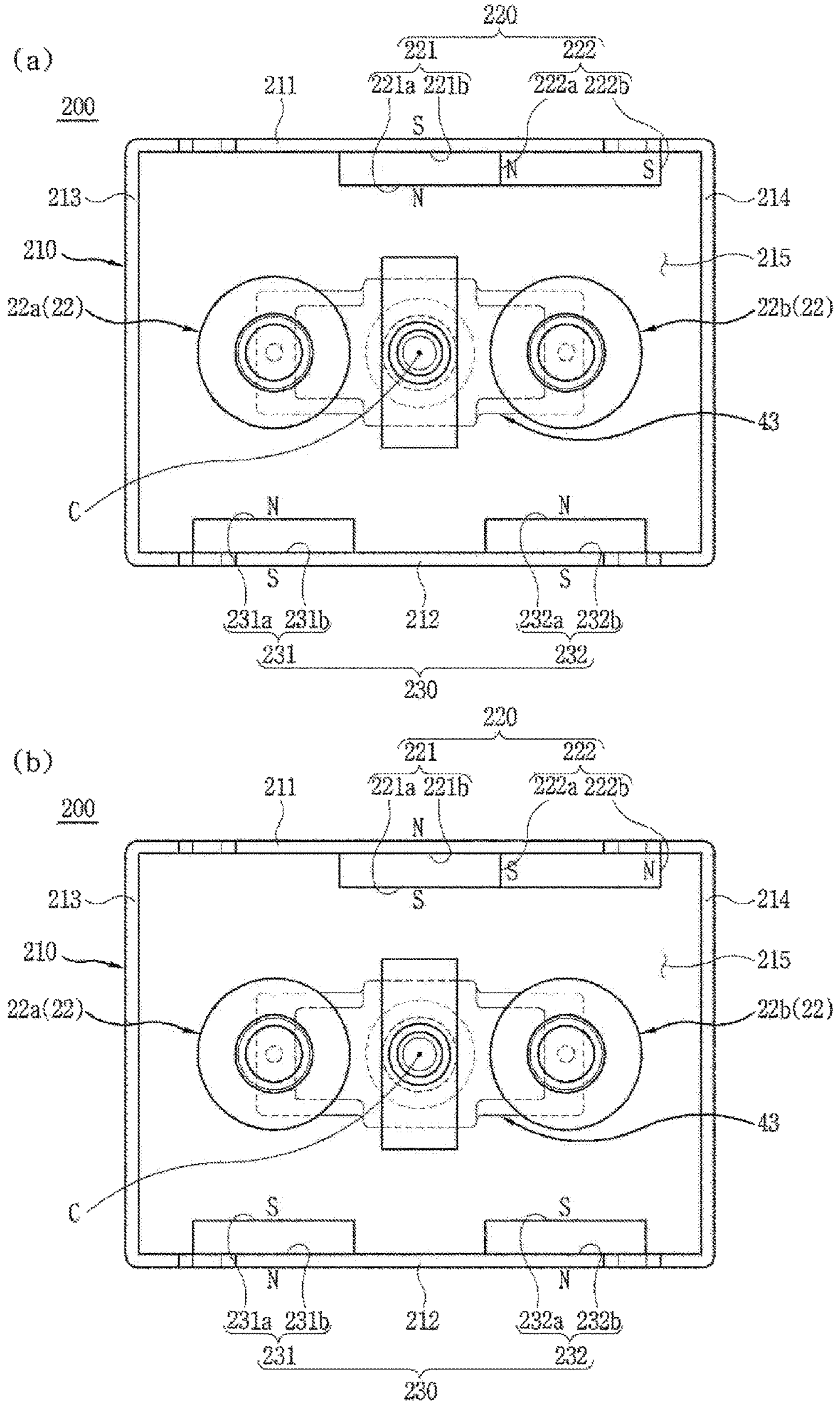

In the exemplary embodiment illustrated in FIGS. 61 and 62, the Halbach array 220 is disposed on the inner side of the first surface 211, adjacent to the first surface 211, so as to face the first magnet part 230 and the second magnet part 240 which are disposed on the inner side of the second surface 212.

The Halbach array 220 may be positioned to be biased toward any one of the third surface 213 and the fourth surface 214. In the exemplary embodiment illustrated in FIGS. 59 and 61, the Halbach array 220 is positioned to be biased toward the third surface 213. In the exemplary embodiment illustrated in FIGS. 60 and 62, the Halbach array 220 is positioned to be biased toward the fourth surface 214.

Between the Halbach array 220 and the first magnet part 230 or the second magnet part 240, the space part 215 and the fixed contact 22 and the movable contact 43 accommodated in the space part 215 are positioned.

The Halbach array 220 may enhance the strength of the magnetic field formed by itself and the magnetic field formed with the first magnet part 230 or the second magnet part 240. Since the direction of the magnetic field formed by the Halbach array 220 and the process of strengthening the magnetic field are well-known techniques, the detailed description thereof will be omitted.

In the illustrated exemplary embodiment, the Halbach array 220 includes a first block 221 and a second block 222. It will be understood that a plurality of magnetic materials constituting the Halbach array 220 are each named blocks 221, 222, respectively.

The first and second blocks 221, 222 may be formed of a magnetic material. In an exemplary embodiment, the first and second blocks 221, 222 may be provided as permanent magnets or electromagnets.

The first and second blocks 221, 222 may be arranged side by side in one direction. In the illustrated exemplary embodiment, the first and second blocks 221, 222 are arranged side by side in the extending direction of the first surface 211 or the second surface 212, that is, in the left-right direction.

The first and second blocks 221, 222 are arranged side by side along the above direction. Specifically, in the first and second blocks 221, 222, the first block 221 is disposed in the central portion, and the second block 222 is disposed on the left or right side of the first block 221.

In the exemplary embodiment illustrated in FIGS. 59 and 61, the second block 222 is positioned on the left side of the first block 221. In the exemplary embodiment illustrated in FIGS. 60 and 62, the second block 222 is positioned on the right side of the first block 221.

In an exemplary embodiment, each of the blocks 221, 222 disposed adjacent to each other may contact each other.

The second block 222 may be disposed to overlap any one of the first magnet part 230 and the second magnet part 240 in a direction toward the first magnet part 230 or the second magnet part 240, which is the front-rear direction in the illustrated exemplary embodiment.

In the exemplary embodiment illustrated in FIGS. 59 and 61, the second block 222 is disposed to overlap the first magnet part 230 in the front-rear direction. In the exemplary embodiment illustrated in FIGS. 60 and 62, the second block 222 is disposed to overlap the second magnet part 240 in the front-rear direction.

In this case, the second block 222 may be disposed to overlap the first fixed contact 22*a* or the second fixed contact 22*b* in a direction toward the second surface 212, which is the front-rear direction in the illustrated exemplary embodiment.

In the exemplary embodiment illustrated in FIGS. 59 and 61, the second block 222 is disposed to overlap the first fixed contact 22*a* in the front-rear direction. In the exemplary embodiment illustrated in FIGS. 60 and 62, the second block 222 is disposed to overlap the second fixed contact 22*b*.

Each of the blocks 221, 222 includes a plurality of surfaces.

Specifically, the first block 221 includes a first inner surface 221*a* facing the space part 215 or the first and second magnet parts 230, 240 and a first outer surface 221*b* opposite to the space part 215 or the first and second magnet parts 230, 240.

The second block 222 includes a second inner surface 222*a* facing the first block 221 and a second outer surface 222*b* opposite to the first block 221.

The plurality of surfaces of each of the blocks 221, 222 may be magnetized according to a predetermined rule to constitute a Halbach array.

Specifically, the first and second inner surfaces 221*a*, 222*a* may be magnetized with the same polarity. Similarly, the first and second outer surfaces 221*b*, 222*b* may be magnetized with the same polarity.

In this case, the first and second inner surfaces 221*a*, 222*a* may be magnetized with the same polarity as the first opposing surface 231 of the first magnet part 230 and the second opposing surface 241 of the second magnet part 240. Similarly, the first and second outer surfaces 221*b*, 222*b* may be magnetized with the same polarity as the first opposite surface 232 of the first magnet part 230 and the second opposite surface 242 of the second magnet part 240.

The first magnet part 230 forms a magnetic field by itself or with the Halbach array 220. The arc path (A.P) may be formed inside the arc chamber 21 by the magnetic field formed by the first magnet part 230.

The first magnet part 230 may be provided in any shape capable of forming a magnetic field by being magnetized. In an exemplary embodiment, the first magnet part 230 may be provided as a permanent magnet or an electromagnet.

The first magnet part 230 may be positioned adjacent to the other one surface of the first surface 211 and the second surface 212. In an exemplary embodiment, the first magnet part 230 may be coupled to the inner side of the other one surface (i.e., a direction toward the space part 215).

In the exemplary embodiment illustrated in FIGS. 59 and 60, the first magnet part 230 is disposed on the inner side of the first surface 211, adjacent to the first surface 211, so as to face the Halbach array 220 which is disposed on the inner side of the second surface 212.

In the exemplary embodiment illustrated in FIGS. 61 and 62, the first magnet part 230 is disposed on the inner side of the second surface 212, adjacent to the second surface 212, so as to face the Halbach array 2230 which is disposed on the inner side of the first surface 211.

The first magnet part 230 is positioned to be biased toward any one surface of the third surface 213 and the fourth surface 214. In the illustrated exemplary embodiment, the first magnet part 230 is positioned to be biased toward the third surface 213.

Between the first magnet part 230 and the Halbach array 220, the space part 215 and the fixed contact 22 and the movable contact 43 accommodated in the space part 215 are positioned.

The first magnet part 230 extends in the extending direction of the first surface 211 or the second surface 212, which is the left-right direction in the illustrated exemplary embodiment.

The first magnet part 230 is disposed to overlap the Halbach array 220 in a direction toward the space part 215 or the fixed contacts 22*a*, 22*b*, which is the front-rear direction in the illustrated exemplary embodiment. Specifically, the first magnet part 230 is disposed to overlap the second block 222 of the Halbach array 220 in the above direction.

In addition, the first magnet part 230 is disposed to overlap any one of the first fixed contact 22*a* and the second fixed contact 22*b* in the above direction. In the illustrated exemplary embodiment, the first magnet part 230 is disposed to overlap the first fixed contact 22*a* in the above direction.

The first magnet part 230 includes a plurality of surfaces.

Specifically, the first magnet part 230 includes a first opposing surface 231 facing the space part 215 or Halbach array 220 and a first opposite 232 opposite to the space part 215 or Halbach array 220.

The first opposing surface 231 and the first opposite surface 232 may be magnetized according to a predetermined rule.

Specifically, the first opposing surface 231 may be magnetized with the same polarity as the first and second inner surfaces 221*a*, 222*a* of the Halbach array 220. In addition, the first opposite surface 232 may be magnetized with the same polarity as the first and second outer surfaces 221*b*, 222*b* of the Halbach array 220.

The second magnet part 240 forms a magnetic field by itself or with the Halbach array 220. The arc path (A.P) may be formed inside the arc chamber 21 by the magnetic field formed by the second magnet part 240.

The second magnet part 240 may be provided in any shape capable of forming a magnetic field by being magnetized. In an exemplary embodiment, the second magnet part 240 may be provided as a permanent magnet or an electromagnet.

The second magnet part 240 may be positioned adjacent to the other one surface of the first surface 211 and the second surface 212. In an exemplary embodiment, the second magnet part 240 may be coupled to the inner side of the other one surface (i.e., a direction toward the space part 215).

In the exemplary embodiment illustrated in FIGS. 59 and 60, the second magnet part 240 is disposed on the inner side of the first surface 211, adjacent to the first surface 211, so as to face the Halbach array which is disposed on the inner side of the second surface 212.

In the exemplary embodiment illustrated in FIGS. 61 and 62, the second magnet part 240 is disposed on the inner side of the second surface 212, adjacent to the second surface 212, so as to face the Halbach array 220 which is disposed on the inner side of the first surface 211.

The second magnet part 240 is positioned to be biased toward any one surface of the third surface 213 and the fourth surface 214. In the illustrated exemplary embodiment, the second magnet part 240 is positioned to be biased toward the fourth surface 214.

The second magnet part 240 and the first magnet part 230 are arranged side by side in the extending direction thereof, which is the left and right direction in the illustrated exemplary embodiment. In an exemplary embodiment, the second magnet part 240 and the first magnet part 230 may be in contact with each other.

Between the second magnet part 240 and the Halbach array 220, the space part 215 and the fixed contact 22 and the movable contact 43 accommodated in the space part 215 are positioned.

The second magnet part 240 extends in the extending direction of the first surface 211 or the second surface 212, which is the left-right direction in the illustrated exemplary embodiment.

The second magnet part 240 is disposed to overlap the Halbach array 220 in a direction toward the space part 215 or the fixed contacts 22*a*, 22*b*, which is the front-rear direction in the illustrated exemplary embodiment. Specifically, the second magnet part 240 is disposed to overlap the second block 222 of the Halbach array 220 in the above direction.

In addition, the second magnet part 240 is disposed to overlap the other one of the first fixed contact 22*a* and the second fixed contact 22*b* in the above direction. In the illustrated exemplary embodiment, the second magnet part 240 is disposed to overlap the second fixed contact 22*b* in the above direction.

The second magnet part 240 includes a plurality of surfaces.

Specifically, the second magnet part 240 includes a second opposing surface 241 facing the space part 215 or Halbach array 220 and a second opposite surface 242 opposite to the space part 215 or Halbach array 220.

The second opposing surface 241 and the second opposite surface 242 may be magnetized according to a predetermined rule.

Specifically, the second opposing surface 241 may be magnetized with the same polarity as the first and second inner surfaces 221*a*, 222*a* of the Halbach array 220. In addition, the second opposite surface 242 may be magnetized with the same polarity as the first and second outer surfaces 221*b*, 222*b* of the Halbach array 220.

Hereinafter, the arc path (A.P) formed by the arc path generation unit 200 according to the present exemplary embodiment will be described in detail with reference to FIG. 63.

Figure 63:
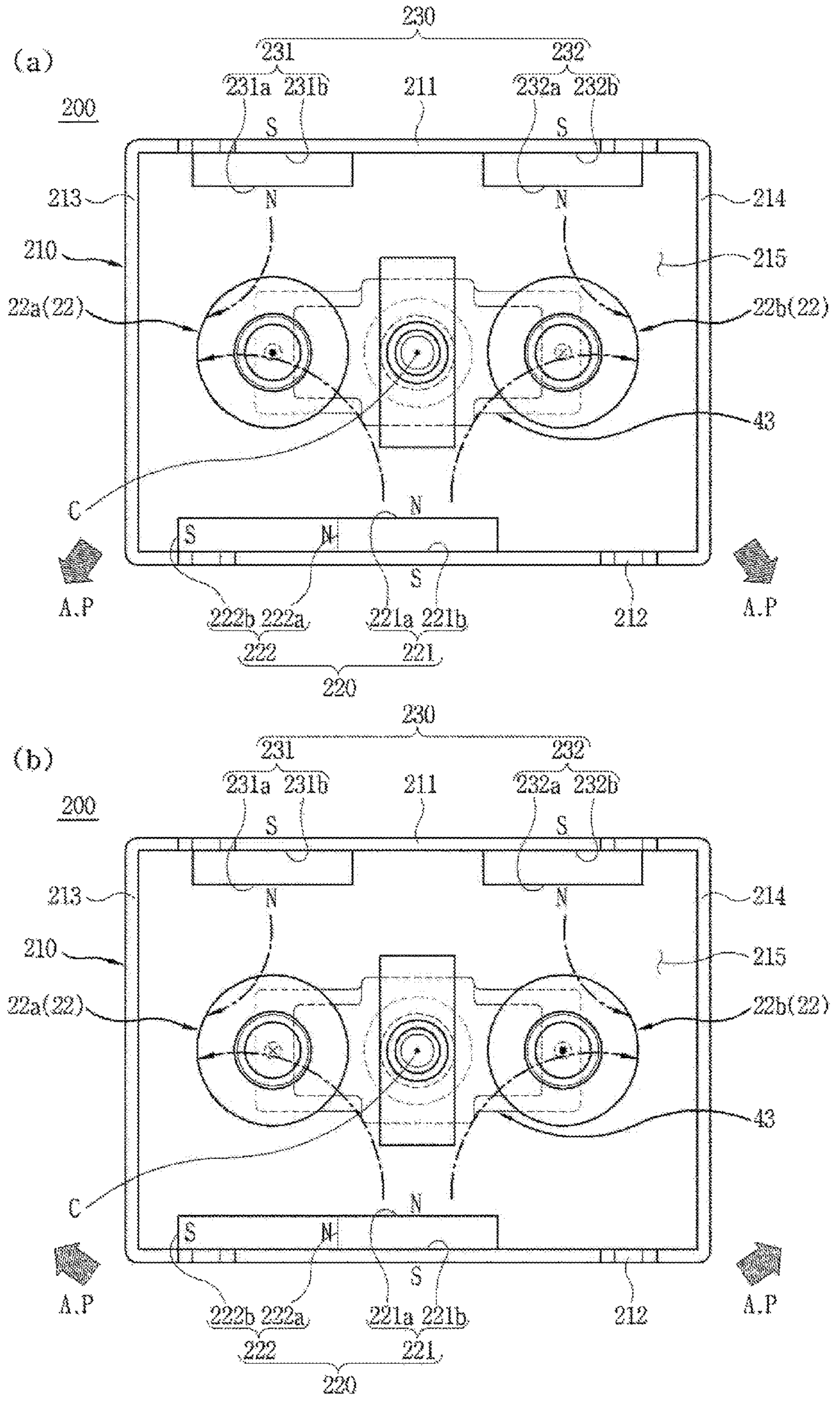
FIG. 63 is a conceptual diagram illustrating the paths path of a magnetic field and an arc formed by the arc path generation unit according to the exemplary embodiment of FIGS. 59 to 62.

Referring to FIG. 63, the first and second inner surfaces 221*a*, 222*a* of the Halbach array 220 are magnetized to the N pole. In addition, the first opposing surface 231 of the first magnet part 230 and the second opposing surface 241 of the second magnet part 240 are also magnetized to the N-pole.

In addition, according to the predetermined rule, the first and second outer surfaces 221*b*, 222*b* of the Halbach array 220 are magnetized to the S pole. In addition, the first opposite surface 232 of the first magnet part 230 and the second opposite surface 242 of the second magnet part 240 are also magnetized to the S pole.

Accordingly, a magnetic field in a direction to repel each other is formed between the Halbach array 220 and the first and second magnet parts 230, 240.

In the exemplary embodiment illustrated in (a) of FIG. 63, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 63, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach array 220 and the first and second magnet parts 230, 240 is changed, the directions of the magnetic fields formed by the Halbach array 220 and the first and second magnet parts 230, 240 become reversed. Accordingly, the path (A.P) of the generated electromagnetic force and arc is also formed to be reversed in the front-rear direction.

That is, in the energized situation as shown in (a) of FIG. 63, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 63, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 220 and the first and second magnet parts 230, 240 or the direction of the current flowing through the DC relay 1, the arc path generation unit 200 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(3) Description of the Arc Path Generation Unit 300 According to Another Exemplary Embodiment of the Present Disclosure Hereinafter, the arc path generation unit 300 according to another exemplary embodiment of the present disclosure will be described in detail with reference to FIGS. 64 to 68.

Referring to FIGS. 64 to 67, the arc path generation unit 300 according to the illustrated exemplary embodiment includes a magnetic frame 310 and a Halbach array 320.

The magnetic frame 310 according to the present exemplary embodiment has the same structure and function as the magnetic frame 310 according to the above-described exemplary embodiment. However, there is a difference in the arrangement method of the Halbach array 320 disposed on the magnetic frame 310 according to the present exemplary embodiment.

Accordingly, the description of the magnetic frame 310 will be replaced with the description of the magnetic frame 310 according to the above-described exemplary embodiment.

In the illustrated exemplary embodiment, a plurality of magnetic materials constituting the Halbach array 320 are sequentially arranged side by side from left to right. That is, in the illustrated exemplary embodiment, the Halbach array 320 is formed to extend in the left-right direction.

The Halbach array 320 may be positioned adjacent to any one surface of the first and second surfaces 311, 212. In an exemplary embodiment, the Halbach array 320 may be coupled to the inner side of the any one surface (i.e., a direction toward the space part 315).

Figure 64:
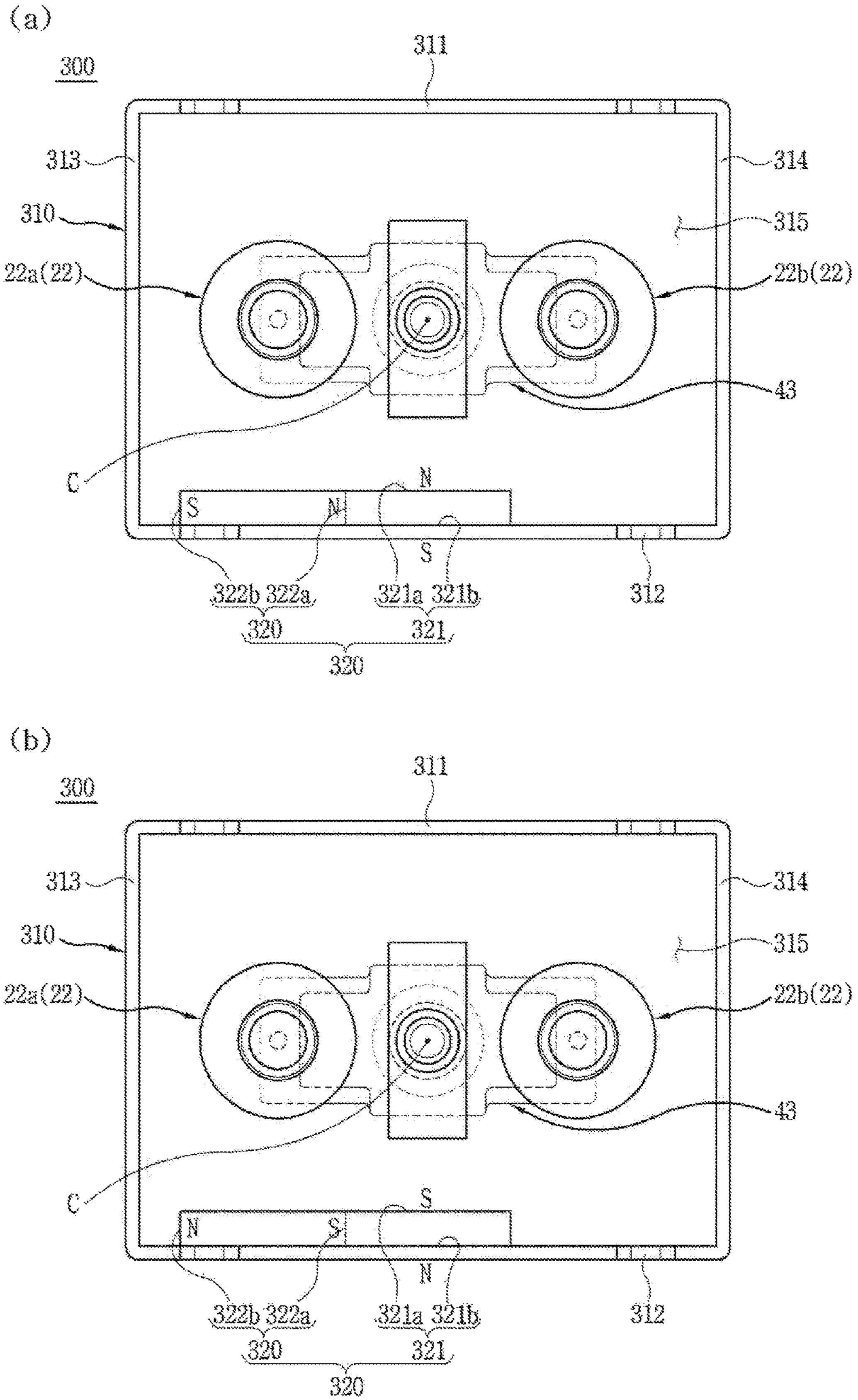
FIGS. 64 to 67 are conceptual diagrams illustrating the arc path generation unit according to still another exemplary embodiment of the present disclosure.
Figure 65:
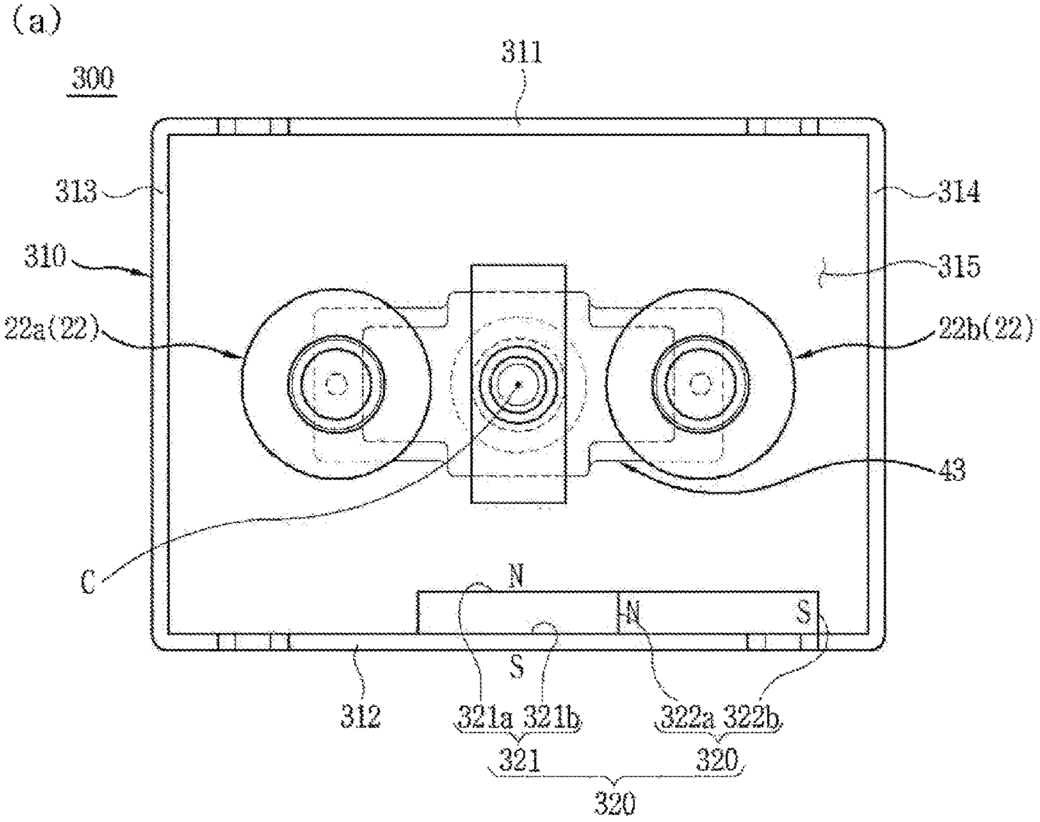
Figure 65:
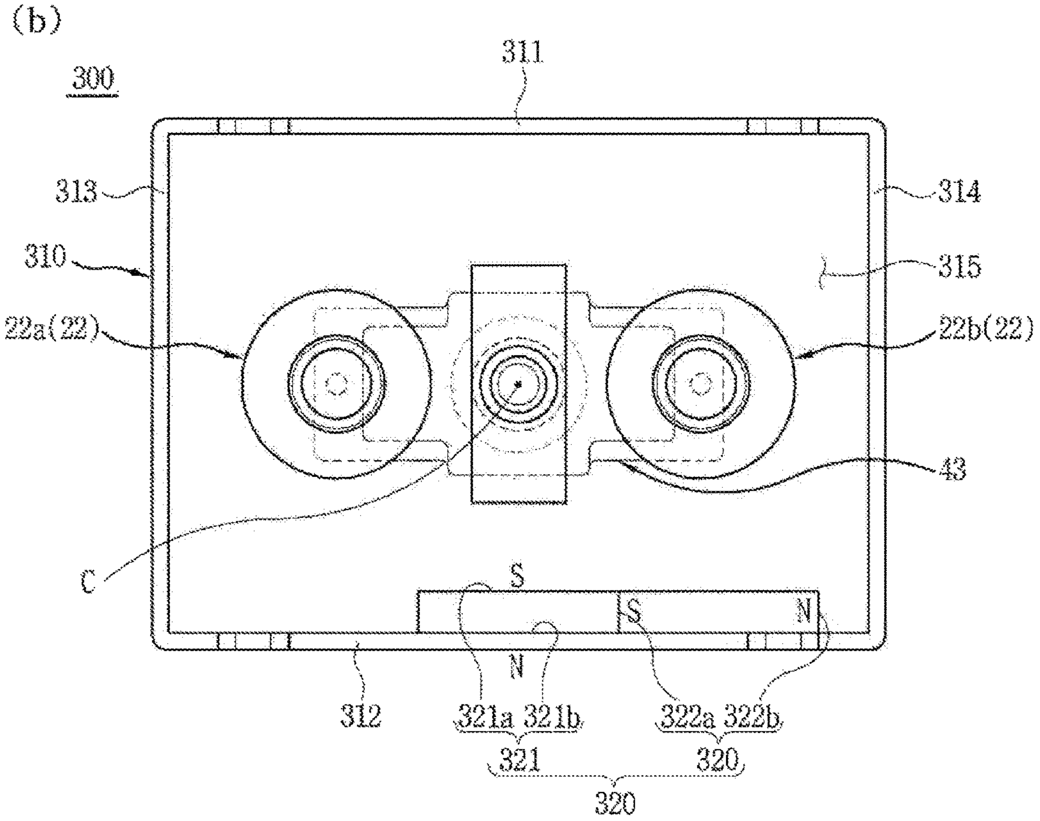

In the exemplary embodiment illustrated in FIGS. 64 and 65, the Halbach array 320 is disposed on the inner side of the second surface 312, adjacent the second surface 312, so as to face the first surface 311.

Figure 66:
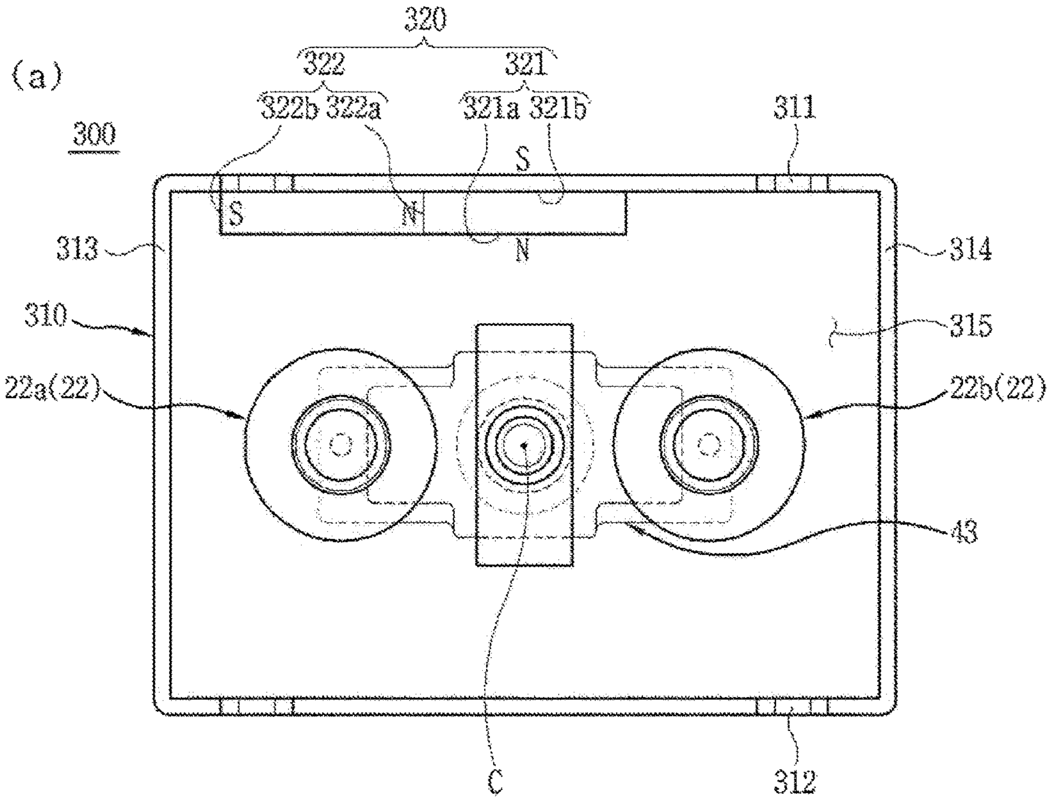
Figure 66:
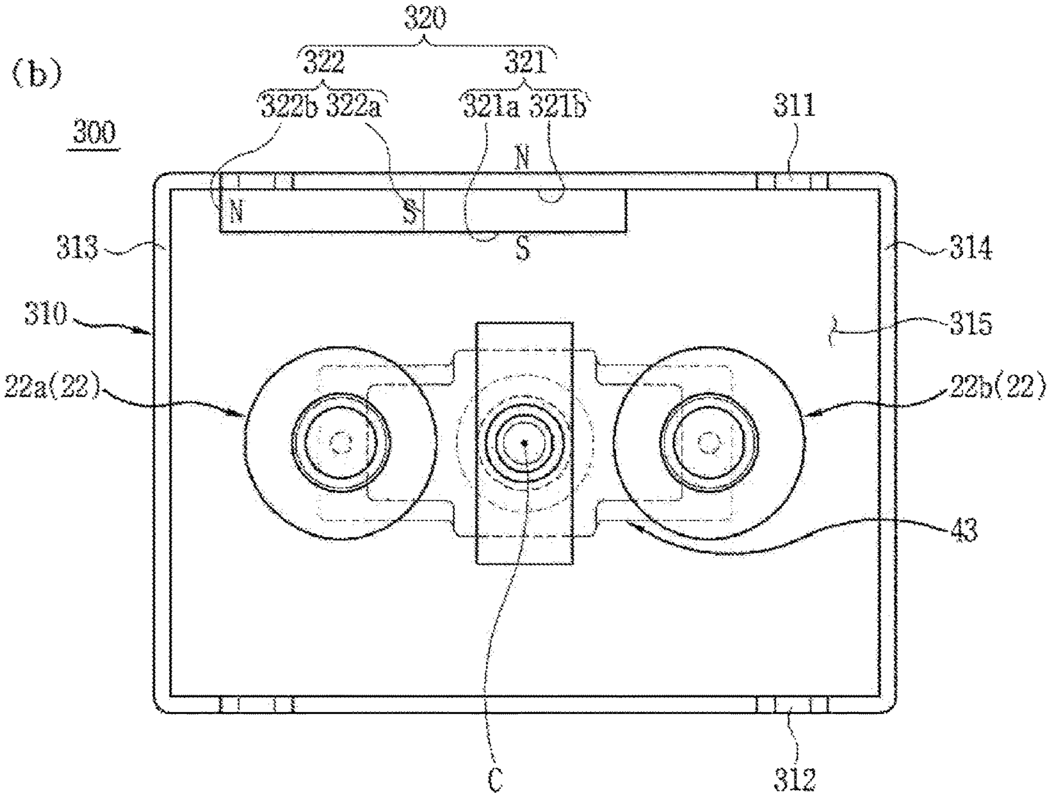
Figure 67:
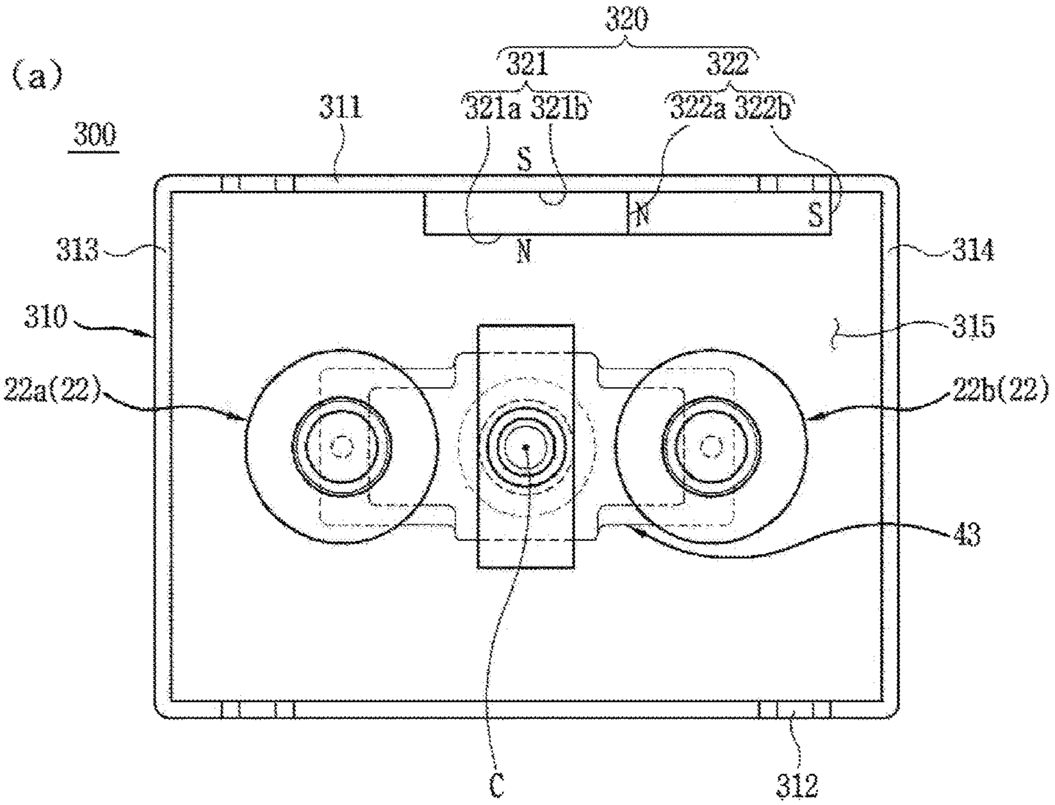
Figure 67:
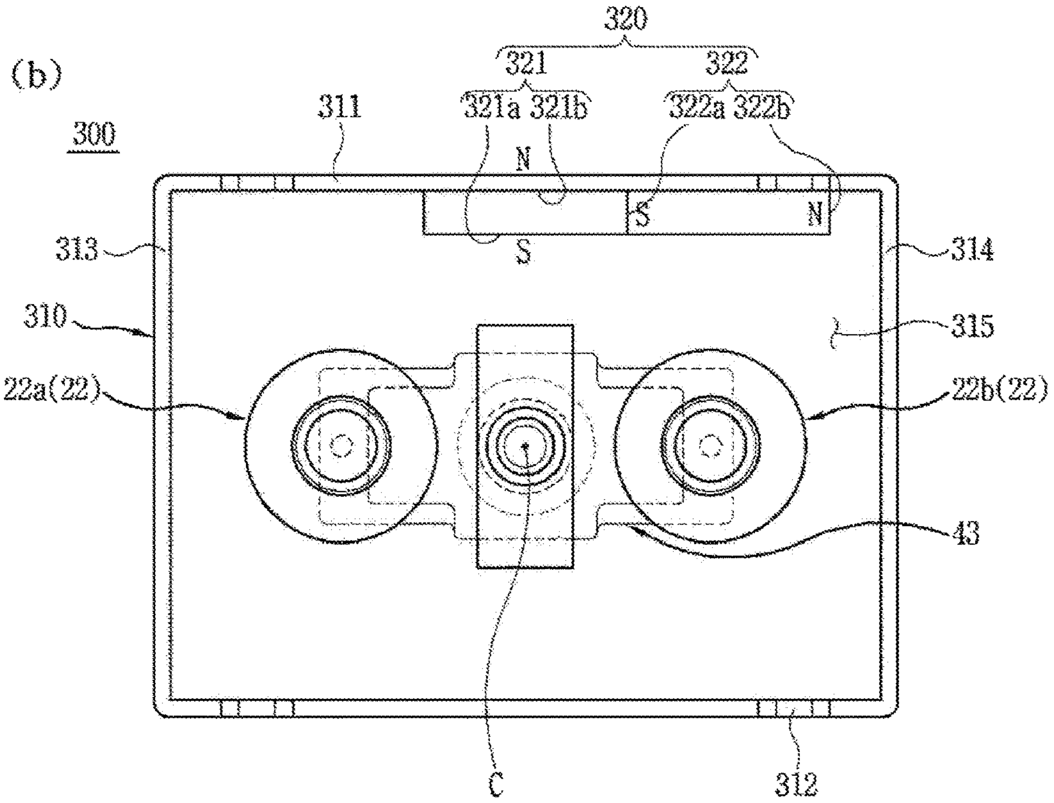

In the exemplary embodiment illustrated in FIGS. 66 and 67, the Halbach array 320 is disposed on the inner side of the first surface 311, adjacent the first surface 311, so as to face the second surface 312.

The Halbach array 320 may be positioned to be biased toward any one of the third surface 313 and the fourth surface 314. In the exemplary embodiment illustrated in FIGS. 64 and 66, the Halbach array 320 is positioned to be biased toward the third surface 313. In the exemplary embodiment illustrated in FIGS. 65 and 67, the Halbach array 320 is positioned to be biased toward the fourth surface 314.

Between the Halbach array 320 and the surfaces 311, 312 facing the Halbach array 320, the space part 315 and the fixed contact 22 and the movable contact 43 accommodated in the space part 315 are positioned.

The Halbach array 320 may intensify the strength of the magnetic field formed by itself. Since the direction of the magnetic field formed by the Halbach array 320 and the process of strengthening the magnetic field are well-known techniques, the detailed description thereof will be omitted.

In the illustrated exemplary embodiment, the Halbach array 320 includes a first block 321 and a second block 322. It will be understood that a plurality of magnetic materials constituting the Halbach array 320 are each named blocks 321, 322, respectively.

The first and second blocks 321, 322 may be formed of a magnetic material. In an exemplary embodiment, the first and second blocks 321, 322 may be provided as permanent magnets or electromagnets.

The first and second blocks 321, 322 may be arranged side by side in one direction. In the illustrated exemplary embodiment, the first and second blocks 321, 322 are arranged side by side in the extending direction of the first surface 311 or the second surface 312, that is, in the left-right direction.

The first and second blocks 321, 322 are arranged side by side along the above direction. Specifically, in the first and second blocks 321, 322, the first block 321 is disposed in the central portion, and the second block 322 is positioned on the left or right side of the first block 321.

In the exemplary embodiment illustrated in FIGS. 64 and 66, the second block 322 is positioned on the left side of the first block 321. In the exemplary embodiment illustrated in FIGS. 65 and 67, the second block 322 is positioned on the right side of the first block 321.

In an exemplary embodiment, each of the blocks 321, 322 disposed adjacent to each other may contact each other.

The second block 322 may be disposed to overlap the first fixed contact 22*a* or the second fixed contact 22*b* in a direction toward the space part 315, which is the front-rear direction in the illustrated exemplary embodiment.

In the exemplary embodiment illustrated in FIGS. 64 and 66, the second block 322 is disposed to overlap the first fixed contact 22*a* in the front-rear direction. In the exemplary embodiment illustrated in FIGS. 65 and 67, the second block 322 is disposed to overlap the second fixed contact 22*b*.

Each of the blocks 321, 322 includes a plurality of surfaces.

Specifically, the first block 321 includes a first inner surface 321*a* facing the space part 315 and a first outer surface 321*b* opposite to the space part 315.

The second block 322 includes a second inner surface 322*a* facing the first block 321 and a second outer surface 322*b* opposite to the first block 321.

The plurality of surfaces of each of the blocks 321, 322 may be magnetized according to a predetermined rule to constitute a Halbach array.

Specifically, the first and second inner surfaces 321*a*, 322*a* may be magnetized with the same polarity. Similarly, the first and second outer surfaces 321*b*, 322*b* may be magnetized with the same polarity.

Hereinafter, the arc path (A.P) formed by the arc path generation unit 300 according to the present exemplary embodiment will be described in detail with reference to FIG. 68.

Figure 68:
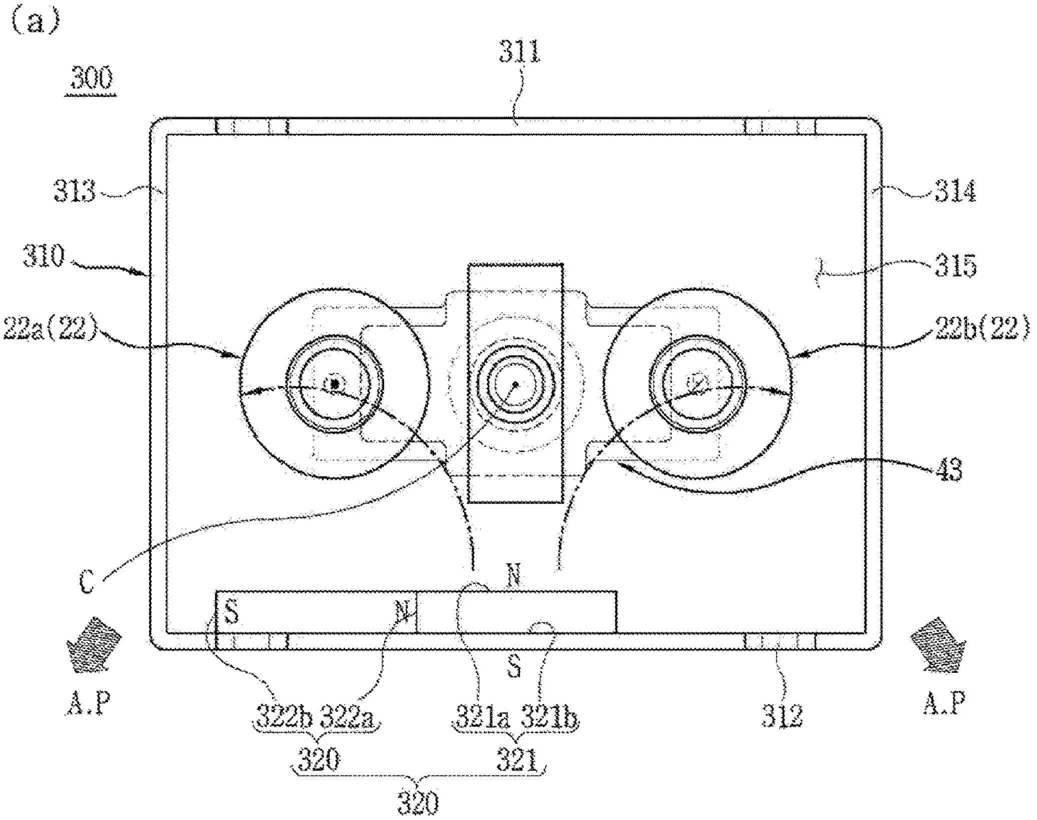
FIG. 68 is a conceptual diagram illustrating the paths of a magnetic field and an arc formed by the arc path generation unit according to the exemplary embodiment of FIGS. 64 to 67.
Figure 68:
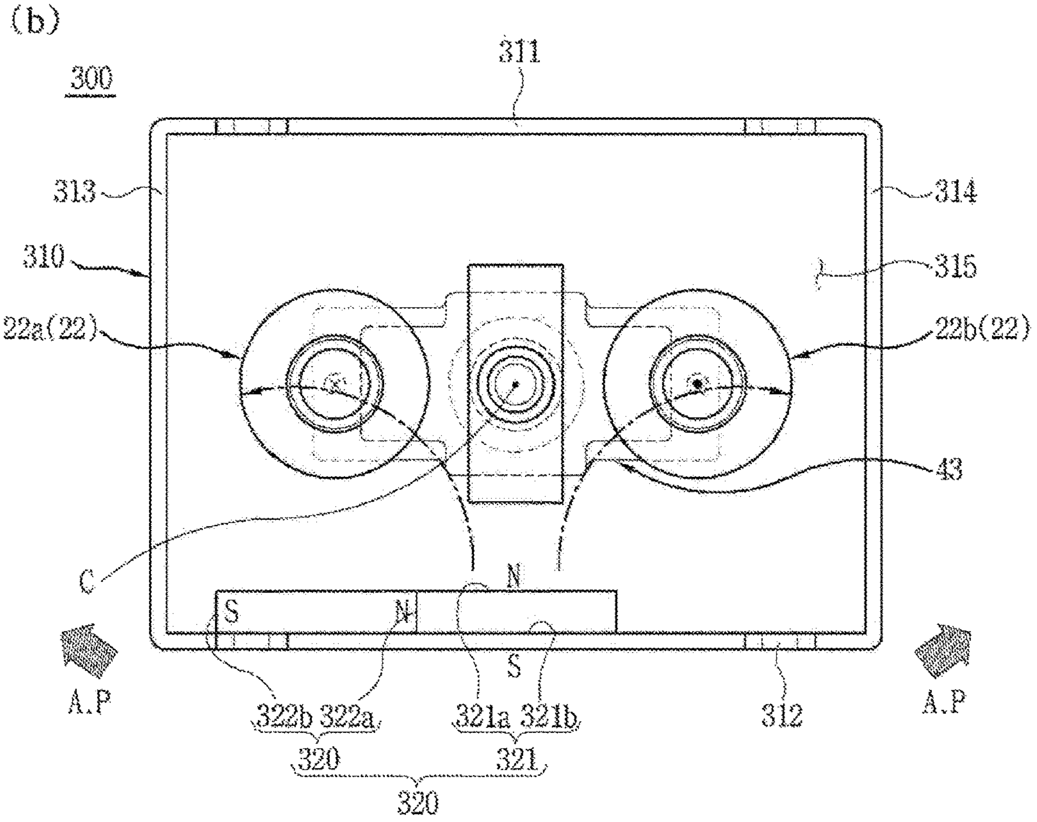

Referring to FIG. 68, the first and second inner surfaces 321*a*, 322*a* of the Halbach array 320 are magnetized to the N pole. In addition, according to the predetermined rule, the first and second outer surfaces 321*b*, 322*b* of the Halbach array 320 are magnetized to the S pole.

Accordingly, a magnetic field in a direction radiating from the first inner surface 321*a* toward the third surface 313 and the fourth surface 314 is formed around each of the fixed contacts 22*a*, 22*b*.

In the exemplary embodiment illustrated in (a) of FIG. 68, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 68, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach array 320 is changed, the direction of the magnetic field formed by the Halbach array 320 becomes reversed. Accordingly, the path (A.P) of the generated electromagnetic force and arc is also formed to be reversed in the front-rear direction.

That is, in the energized situation as shown in (a) of FIG. 68, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 68, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 320 or the direction of the current flowing through the DC relay 1, the arc path generation unit 300 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(4) Description of the Arc Path Generation Unit 400 According to Another Exemplary Embodiment of the Present Disclosure Hereinafter, the arc path generation unit 400 according to another exemplary embodiment of the present disclosure will be described in detail with reference to FIGS. 69 to 71.

Figure 69:
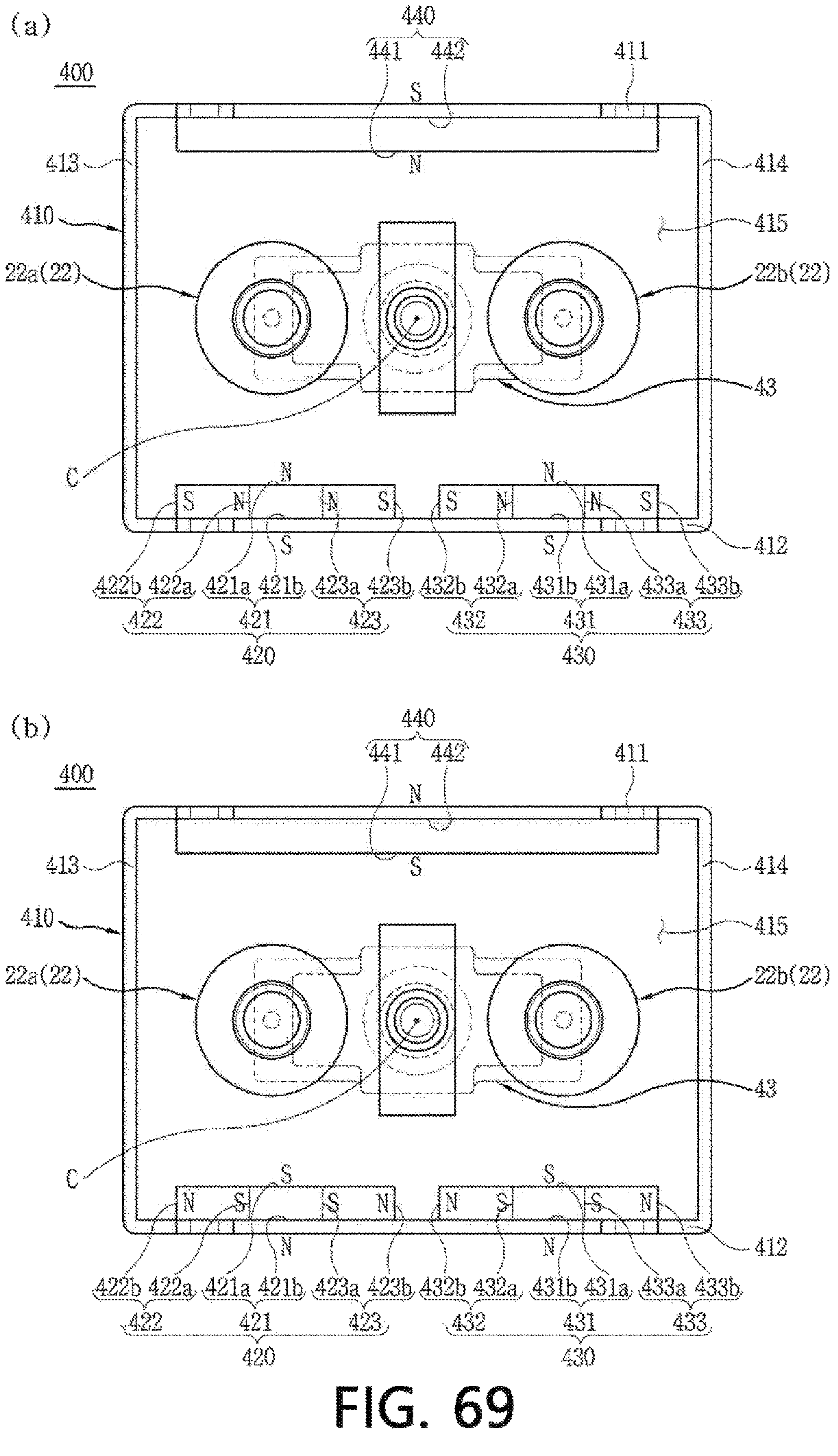
FIGS. 69 and 70 are conceptual diagrams illustrating the arc path generation unit according to another exemplary embodiment of the present disclosure.
Figure 70:
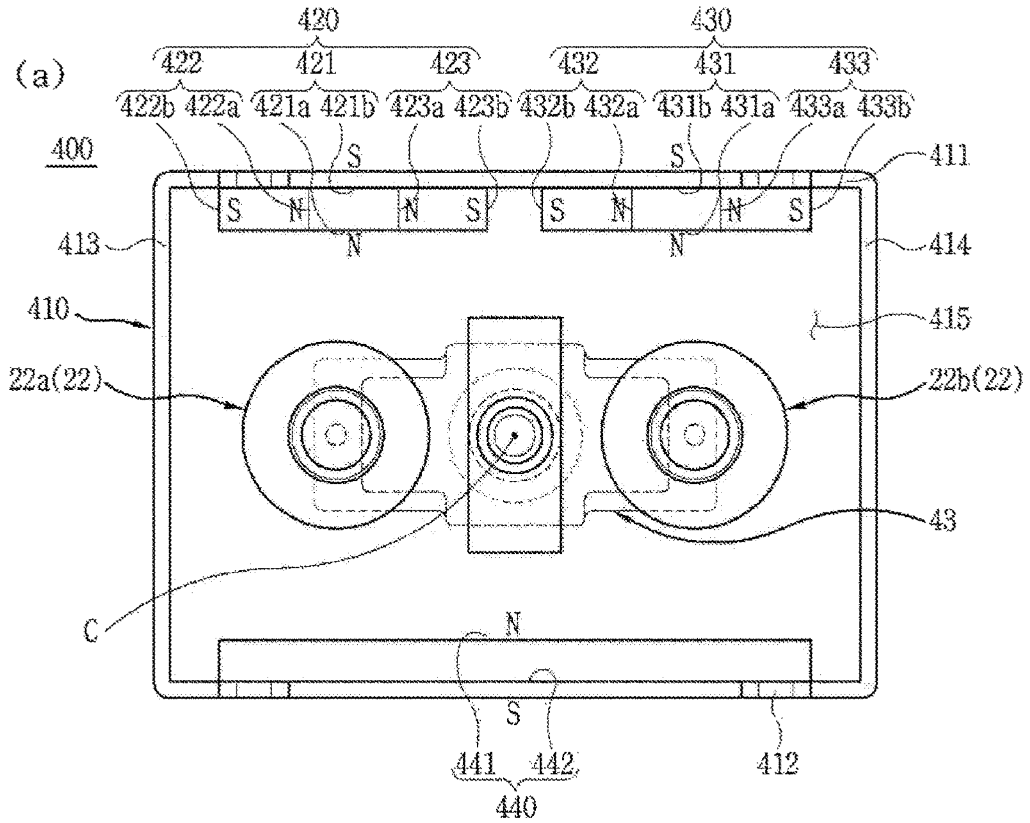
Figure 70:
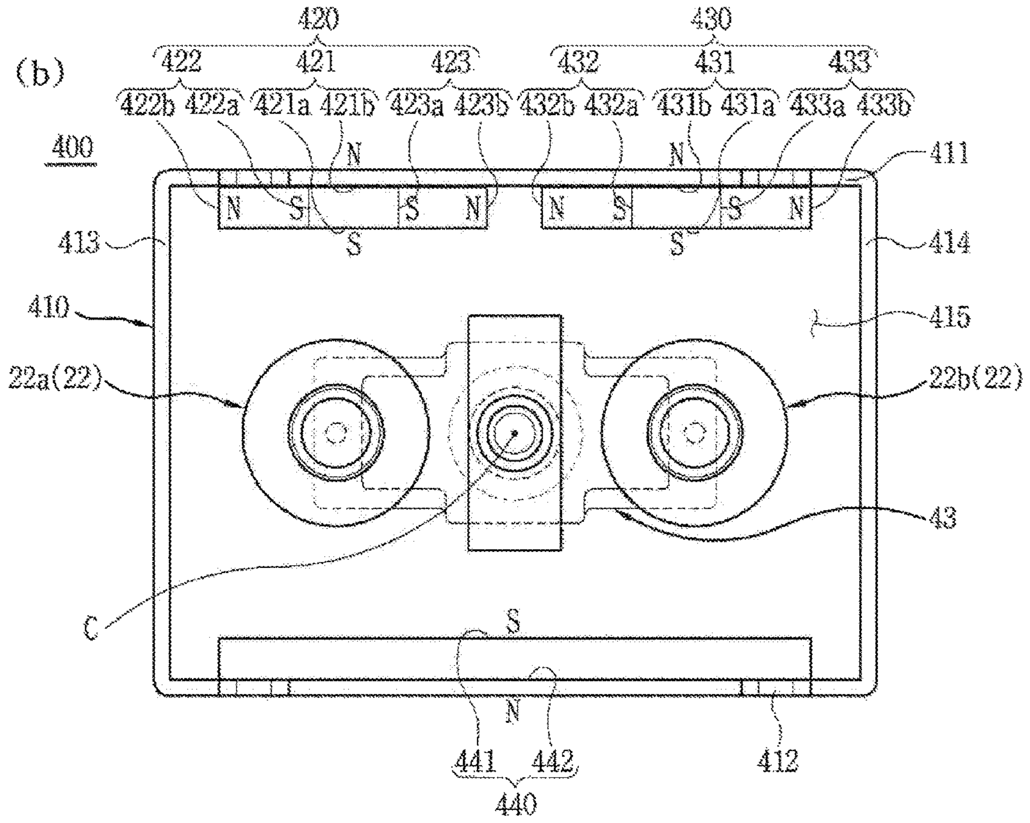

Referring to FIGS. 69 to 70, the arc path generation unit 400 according to the illustrated exemplary embodiment is a magnetic frame 410, a first Halbach array 420, a second Halbach array 430 and a magnet part 440.

The magnetic frame 410 according to the present exemplary embodiment has the same structure and function as the magnetic frame 410 according to the above-described exemplary embodiment. However, there is a difference in the arrangement method of the first Halbach array 420, the second Halbach array 430 and the magnet part 440 disposed on the magnetic frame 410 according to the present exemplary embodiment.

Accordingly, the description of the magnetic frame 410 will be replaced with the description of the magnetic frame 410 according to the above-described exemplary embodiment.

In the illustrated exemplary embodiment, a plurality of magnetic materials constituting the first Halbach array 420 are sequentially arranged side by side from left to right. That is, in the illustrated exemplary embodiment, the first Halbach array 420 is formed to extend in the left-right direction.

The first Halbach array 420 may form a magnetic field together with other magnetic materials. In the illustrated exemplary embodiment, the first Halbach array 420 may form a magnetic field together with the second Halbach array 430 or the magnet part 440.

The first Halbach array 420 may be positioned adjacent to any one surface of the first and second surfaces 411, 412. In an exemplary embodiment, the first Halbach array 420 may be coupled to the inner side of the any one surface (i.e., a direction toward the space part 415).

In the exemplary embodiment illustrated in FIG. 69, the first Halbach array 420 is disposed on the inner side of the second surface 412, adjacent to the second surface 412, so as to face the magnet part 440 which is disposed on the inner side of the first surface 411

In the exemplary embodiment illustrated in FIG. 70, the first Halbach array 420 is disposed on the inner side of the first surface 411, adjacent to the first surface 411, so as to face the magnet part 440 which is positioned on the inner side of the second surface 412.

The first Halbach array 420 may be positioned to be biased toward any one of the third surface 413 and the fourth surface 414. In the illustrated exemplary embodiment, the first Halbach array 420 is positioned to be biased toward the third surface 413.

The first Halbach array 420 is disposed to overlap the magnet part 440 in a direction toward the space part 415 or the magnet part 440, which is the front-rear direction in the illustrated exemplary embodiment. In addition, the first Halbach array 420 is disposed to overlap the first fixed contact 22*a* in the above direction.

Between the first Halbach array 420 and the magnet part 440, the space part 415 and the fixed contact 22 and the movable contact 43 accommodated in the space part 415 are positioned.

The first Halbach array 420 may enhance the strength of the magnetic field formed by itself and the magnetic field formed with the magnet part 440. Since the direction of the magnetic field formed by the first Halbach array 420 and the process of strengthening the magnetic field are well-known techniques, the detailed description thereof will be omitted.

In the illustrated exemplary embodiment, the first Halbach array 420 includes a first block 421, a second block 422 and a third block 423. It will be understood that a plurality of magnetic materials constituting the first Halbach array 420 are each named blocks 421, 422, 423, respectively.

The first to third blocks 421, 422, 423 may be formed of a magnetic material. In an exemplary embodiment, the first to third blocks 421, 422, 423 may be provided as permanent magnets or electromagnets.

The first to third blocks 421, 422, 423 may be arranged side by side in one direction. In the illustrated exemplary embodiment, the first to third blocks 421, 422, 423 are arranged side by side in the extending direction of the first surface 411 or the second surface 412, that is, in the left-right direction.

The first to third blocks 421, 422, 423 are arranged side by side along the above direction. Specifically, in the first to third blocks 421, 422, 423, the first block 421 is disposed in the central portion. The second block 422 is positioned on the left side of the first block 421, and the third block 423 is positioned on the right side of the first block 421.

In an exemplary embodiment, the first to third blocks 421, 422, 423 may contact each other.

The first block 421 may be disposed to overlap the first fixed contact 22*a* in a direction toward the space part 415 or the magnet part 440, which is the front-rear direction in the illustrated exemplary embodiment.

Each of the blocks 421, 422, 423 includes a plurality of surfaces.

Specifically, the first block 421 includes a first inner surface 421*a* facing the space part 415 or the magnet part 440 and a first outer surface 421*b* opposite to the space part 415 or the magnet part 440.

The second block 422 includes a second inner surface 422*a* facing the first block 421 and a second outer surface 422*b* opposite to the first block 421.

The third block 423 includes a third inner surface 423*a* facing the first block 421 and a third outer surface 423*b* opposite to the first block 421.

The plurality of surfaces of each of the blocks 421, 422, 423 may be magnetized according to a predetermined rule to constitute a Halbach array.

Specifically, the first to third inner surfaces 421*a*, 422*a*, 423*a* may be magnetized with the same polarity. Similarly, the first to third outer surfaces 421*b*, 422*b*, 423*b* may be magnetized with a polarity different from the polarity.

In this case, the first to third inner surfaces 421*a*, 422*a*, 423*a* may be magnetized with the same polarity as the first to third inner surfaces 431*a*, 432*a*, 433*a* of the second Halbach array 430 and the opposing surface 441 of the magnet part 440.

Similarly, the first to third outer surfaces 421*b*, 422*b*, 423*b* may be magnetized with the same polarity as the first to third outer surfaces 431*b*, 432*b*, 433*b* of the second Halbach array 430 and the opposite surface 442 of the magnet part 440.

In the illustrated exemplary embodiment, a plurality of magnetic materials constituting the second Halbach array 430 are sequentially arranged side by side from left to right. That is, in the illustrated exemplary embodiment, the second Halbach array 430 is formed to extend in the left-right direction.

The second Halbach array 430 may form a magnetic field together with other magnetic materials. In the illustrated exemplary embodiment, the second Halbach array 430 may form a magnetic field together with the first Halbach array 420 or the magnet part 440.

The second Halbach array 430 may be positioned adjacent to any one surface of the first and second surfaces 411, 412. In an exemplary embodiment, the second Halbach array 430 may be coupled to the inner side of the any one surface (i.e., a direction toward the space part 415).

In the exemplary embodiment illustrated in FIG. 69, the second Halbach array 430 is disposed on the inner side of the second surface 412, adjacent to the second surface 412, so as to face the magnet part 440 which is disposed on the inner side of the first surface 411.

In the exemplary embodiment illustrated in FIG. 70, the second Halbach array 430 is disposed on the inner side of the first surface 411, adjacent to the first surface 411, so as to face the magnet part 440 which is positioned on the inner side of the second surface 412.

The second Halbach array 430 may be positioned to be biased toward the other of the third surface 413 and the fourth surface 414. In the illustrated exemplary embodiment, the second Halbach array 430 is positioned to be biased toward the fourth surface 414.

The second Halbach array 430 and the first Halbach array 420 may be arranged side by side in the extending direction thereof, which is the left-right direction in the illustrated exemplary embodiment. In an exemplary embodiment, the second Halbach array 430 and the first Halbach array 420 may be in contact with each other.

The second Halbach array 430 is disposed to overlap the magnet part 440 in a direction toward the space part 415 or the magnet part 440, which is the front-rear direction in the illustrated exemplary embodiment. In addition, the second Halbach array 430 is disposed to overlap the second fixed contact 22*b* in the above direction.

Between the second Halbach array 430 and the magnet part 440, the space part 415 and the fixed contact 22 and the movable contact 43 accommodated in the space part 415 are positioned.

The second Halbach array 430 may enhance the strength of the magnetic field formed by itself and the magnetic field formed with the magnet part 440. Since the direction of the magnetic field formed by the second Halbach array 430 and the process of strengthening the magnetic field are well-known techniques, the detailed description thereof will be omitted.

In the illustrated exemplary embodiment, the second Halbach array 430 includes a first block 431, a second block 432 and a third block 433. It will be understood that a plurality of magnetic materials constituting the second Halbach array 430 are each named as blocks 431, 432, respectively.

The first to third blocks 431, 432, 433 may be formed of a magnetic material. In an exemplary embodiment, the first to third blocks 431, 432, 433 may be provided as permanent magnets or electromagnets.

The first to third blocks 431, 432, 433 may be arranged side by side in one direction. In the illustrated exemplary embodiment, the first to third blocks 431, 432, 433 are arranged side by side in the extending direction of the first surface 411 or the second surface 412, that is, in the left-right direction.

The first to third blocks 431, 432, 433 are arranged side by side along the above direction. Specifically, in the first to third blocks 431, 432, 433, the first block 431 is disposed in the central portion. The second block 432 is positioned on the left side of the first block 431, and the third block 433 is positioned on the right side of the first block 431.

In an exemplary embodiment, the first to third blocks 431, 432, 433 may contact each other.

The first block 431 may be disposed to overlap the second fixed contact 22*b* in a direction toward the space part 415 or the magnet part 440, which is the front-rear direction in the illustrated exemplary embodiment.

Each of the blocks 431, 432, 433 includes a plurality of surfaces.

Specifically, the first block 431 includes a first inner surface 431*a* facing the space part 415 or the magnet part 440 and a first outer surface 431*b* opposite to the space part 415 or the magnet part 440.

The second block 432 includes a second inner surface 432*a* facing the first block 431 and a second outer surface 432*b* opposite to the first block 431.

The third block 433 includes a third inner surface 433*a* facing the first block 431 and a third outer surface 433*b* opposite to the first block 431.

The plurality of surfaces of each of the blocks 431, 432, 433 may be magnetized according to a predetermined rule to constitute a Halbach array.

Specifically, the first to third inner surfaces 431*a*, 432*a*, 433*a* may be magnetized with the same polarity. Similarly, the first to third outer surfaces 431*b*, 432*b*, 433*b* may be magnetized with a polarity different from the polarity.

In this case, the first to third inner surfaces 431*a*, 432*a*, 433*a* may be magnetized with the same polarity as the first to third inner surfaces 421*a*, 422*a*, 423*a* of the first Halbach array 420 and the opposing surface 441 of the magnet part 440.

Similarly, the first to third outer surfaces 431*b*, 432*b*, 433*b* may be magnetized with the same polarity as the first to third outer surfaces 421*b*, 422*b*, 423*b* of the first Halbach array 420 and the opposite surface 442 of the magnet part 440.

The magnet part 440 forms a magnetic field by itself or together with the first Halbach array 420 and the second Halbach array 430. An arc path (A.P) may be formed inside the arc chamber 41 by the magnetic field formed by the magnet part 440.

The magnet part 440 may be provided in any shape capable of forming a magnetic field by being magnetized. In an exemplary embodiment, the magnet part 440 may be provided as a permanent magnet or an electromagnet.

The magnet part 440 may be positioned adjacent to the other one surface of the first surface 411 and the second surface 412. In an exemplary embodiment, the magnet part 440 may be coupled to the inner side of the other one surface (i.e., a direction toward the space part 415).

In the exemplary embodiment illustrated in FIG. 69, the magnet part 440 is disposed on the inner side of the first surface 411, adjacent to the first surface 411, so as to face the first Halbach array 420 and the second Halbach array 430 which are disposed on the inner side of the second surface 412.

In the exemplary embodiment illustrated in FIG. 70, the magnet part 440 is disposed on the inner side of the second surface 412, adjacent to the second surface 412, so as to face the first Halbach array 420 and the second Halbach array which are disposed on the inner side of the first surface 411.

The magnet part 440 may be located at the central portion of the first surface 411 or the second surface 412. In other words, the shortest distance between the magnet part 440 and the third surface 413 and the shortest distance between the magnet part 440 and the fourth surface 414 may be the same.

The magnet part 440 may extend in the extending direction of the first surface 411 or the second surface 412, which is the left-right direction in the illustrated exemplary embodiment. In an exemplary embodiment, the magnet part 440 may extend longer than the extension length of the first and second Halbach arrays 420, 430.

Between the magnet part 440 and the first and second Halbach arrays 420, 430, the space part 415 and the fixed contact 22 and the movable contact 43 accommodated in the space part 415 are positioned.

In the illustrated exemplary embodiment, a first fixed contact 22*a* is positioned between the magnet part 440 and the first Halbach array 420. In addition, a second fixed contact 22*b* is positioned between the magnet part 440 and the second Halbach array 430.

The magnet part 440 is disposed to overlap the first Halbach array 420 and the second Halbach array 430 in a direction toward the space part 415 or the fixed contacts 22*a*, 22*b*, which is the front-rear direction in the illustrated exemplary embodiment, respectively.

The magnet part 440 includes a plurality of surfaces.

Specifically, the magnet part 440 includes an opposing surface 441 facing the space part 415 or the first and second Halbach arrays 420, 430 and an opposite surface 442 opposite to the space part 415 or the first and second Halbach arrays 420, 430.

The opposing surface 441 and the opposite surface 442 may be magnetized according to a predetermined rule.

Specifically, the opposing surface 441 may be magnetized with the same polarity as the first to third inner surfaces 421*a*, 422*a*, 423*a* of the first Halbach array 420. Similarly, the opposing surface 441 may be magnetized with the same polarity as the first to third inner surfaces 431*a*, 432*a*, 433*a* of the second Halbach array 430.

In addition, the opposite surface 442 may be magnetized with the same polarity as the first to third outer surfaces 421*b*, 422*b*, 423*b* of the first Halbach array 420. Similarly, the opposing surface 441 may be magnetized with the same polarity as the first to third outer surfaces 431*b*, 432*b*, 433*b* of the second Halbach array 430.

Hereinafter, the arc path (A.P) formed by the arc path generation unit 400 according to the present exemplary embodiment will be described in detail with reference to FIG. 71.

Figure 71:
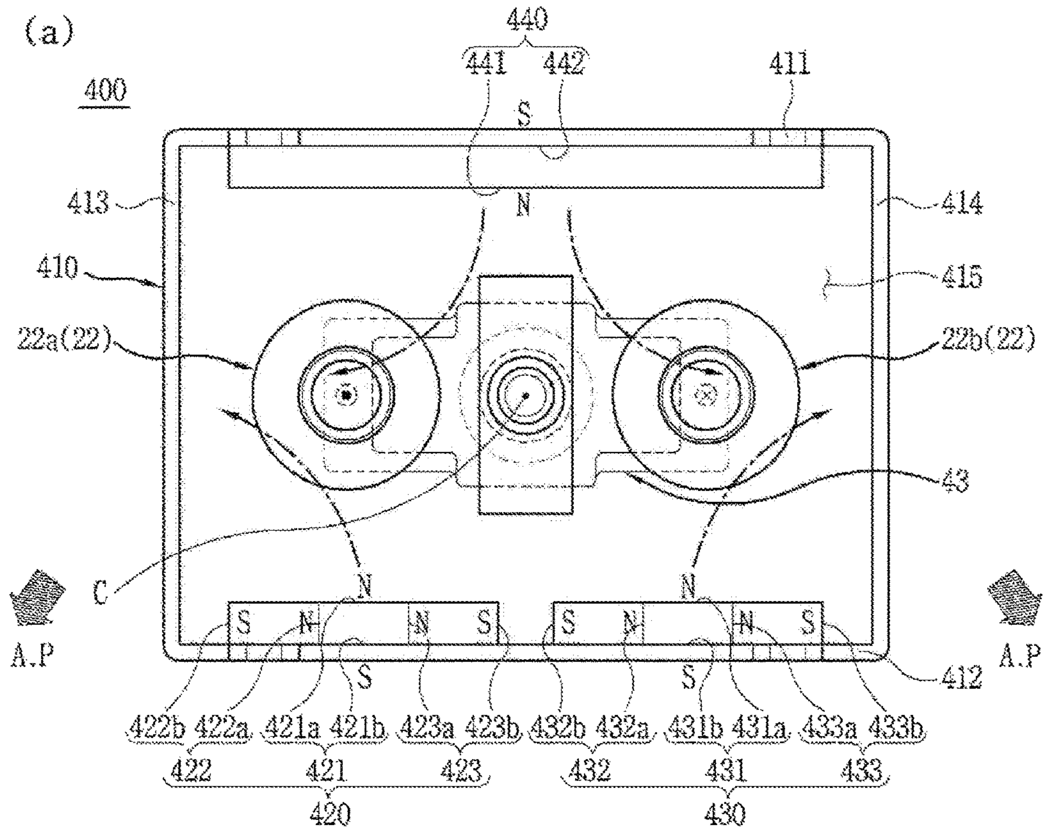
FIG. 71 is a conceptual diagram illustrating the paths of a magnetic field and an arc formed by the arc path generation unit according to the exemplary embodiment of FIGS. 69 and 70.
Figure 71:
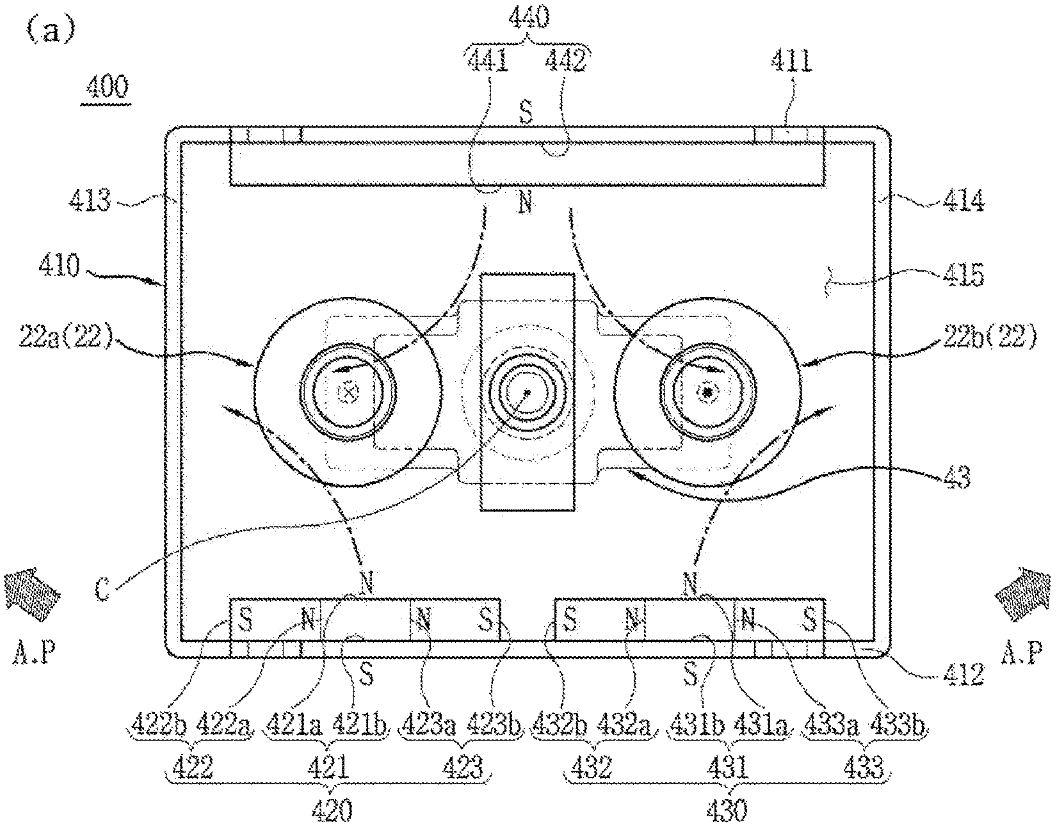

Referring to FIG. 71, the first to third inner surfaces 421*a*, 422*a*, 423*a* of the first Halbach array 420 are magnetized to the N pole. In addition, the first to third inner surfaces 431*a*, 432*a*, 433*a* of the second Halbach array 430 and the opposing surface 441 of the magnet part 440 are also magnetized to the N pole.

In addition, according to the predetermined rule, the first to third outer surfaces 421*b*, 422*b*, 423*b* of the first Halbach array 420 are magnetized to the S pole. In addition, the first to third outer surfaces 431*b*, 432*b*, 433*b* of the second Halbach array 430 and the opposite surface 442 of the magnet part 440 are also magnetized to the S pole.

Accordingly, a magnetic field in a direction to repel each other is formed between the first Halbach array 420 and the magnet part 440. In addition, a magnetic field in a direction to repel each other is also formed between the second Halbach array 430 and the magnet part 440.

In the exemplary embodiment illustrated in (a) of FIG. 71, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 71, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first Halbach array 420, the second Halbach array 430 and the magnet part 440 is changed, the directions of the magnetic fields formed by the first Halbach array 420, the second Halbach array 430 and the magnet part 440 become reversed. Accordingly, the path (A.P) of the generated electromagnetic force and arc is also formed to be reversed in the front-rear direction.

That is, in the energized situation as shown in (a) of FIG. 71, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 71, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the first Halbach array 420, the second Halbach array 430 and the magnet part 440 or the direction of the current flowing in the DC relay 1, the arc path generation unit 400 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(5) Description of the Arc Path Generation Unit 500 According to Another Exemplary Embodiment of the Present Disclosure Hereinafter, the arc path generation unit 500 according to another exemplary embodiment of the present disclosure will be described in detail with reference to FIGS. 72 to 74.

Figure 72:
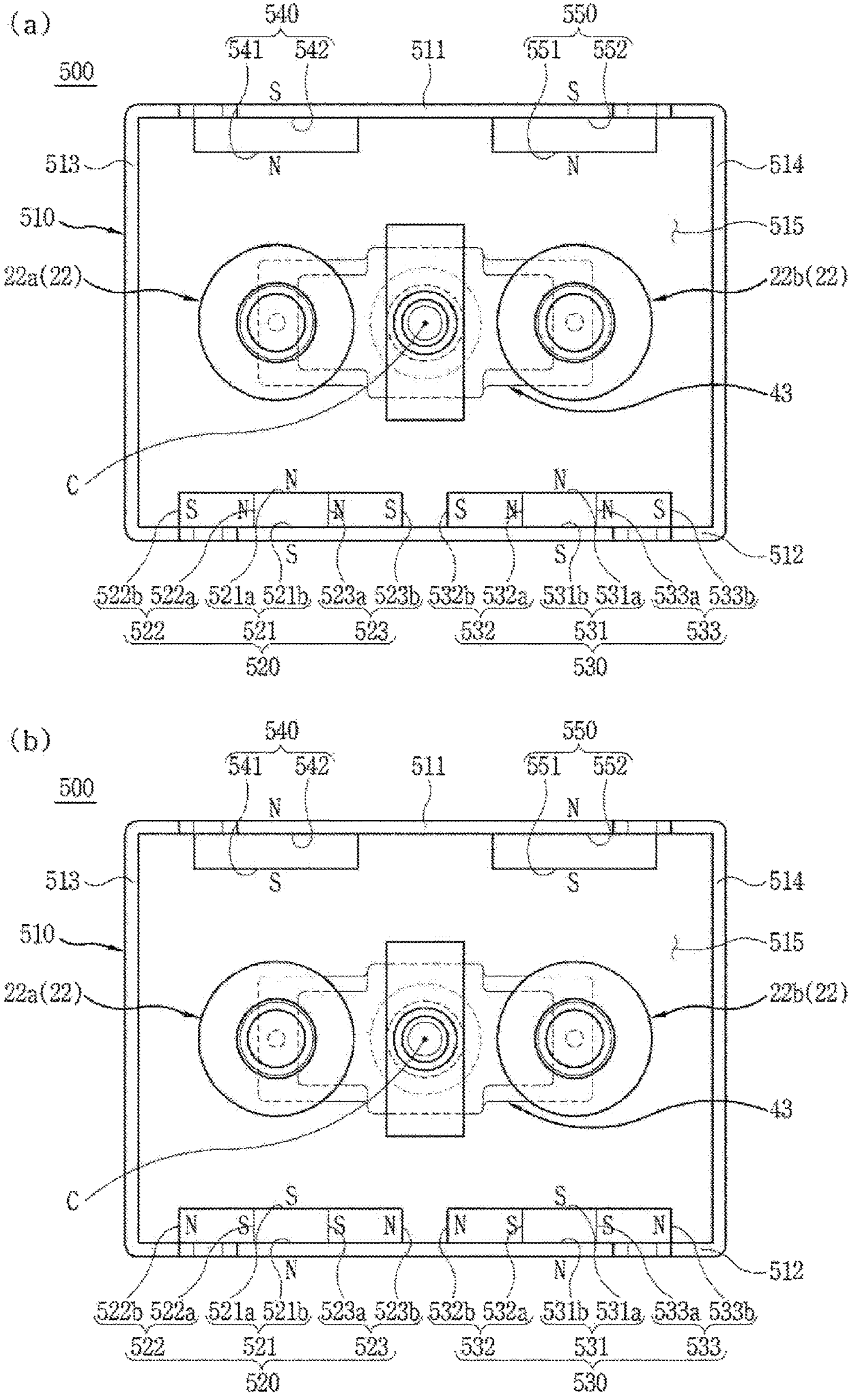
FIGS. 72 and 73 are conceptual diagrams illustrating the arc path generation unit according to still another exemplary embodiment of the present disclosure.
Figure 73:
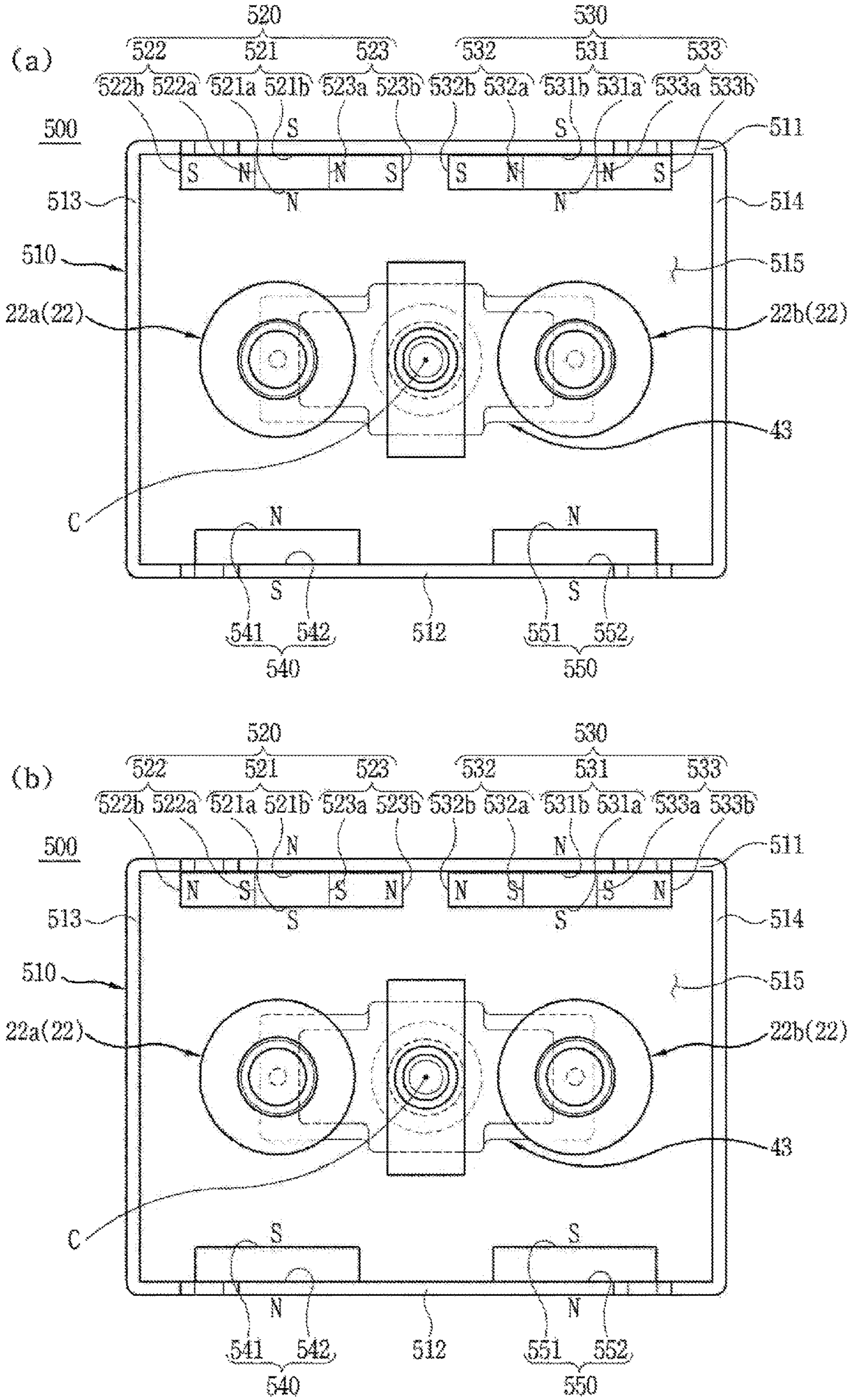

Referring to FIGS. 72 and 73, the arc path generation unit 500 according to the illustrated exemplary embodiment includes a magnetic frame 510, a first Halbach array 520, a second Halbach array 530, a first magnet part 540 and a second magnet part 550.

The magnetic frame 510 according to the present exemplary embodiment has the same structure and function as the magnetic frame 510 according to the above-described exemplary embodiment. However, there is a difference in the arrangement method of the first Halbach array 520, the second Halbach array 530, the first magnet part 540 and the second magnet part 550 disposed on the magnetic frame 510 according to the present exemplary embodiment.

Accordingly, the description of the magnetic frame 510 will be replaced with the description of the magnetic frame 510 according to the above-described exemplary embodiment.

In the illustrated exemplary embodiment, a plurality of magnetic materials constituting the first Halbach array 520 are sequentially arranged side by side from left to right. That is, in the illustrated exemplary embodiment, the first Halbach array 520 is formed to extend in the left-right direction.

The first Halbach array 520 may form a magnetic field together with other magnetic materials. In the illustrated exemplary embodiment, the first Halbach array 520 may form a magnetic field together with the second Halbach array 530 or the first magnet part 540.

The first Halbach array 520 may be positioned adjacent to any one surface of the first and second surfaces 511, 512. In an exemplary embodiment, the first Halbach array 520 may be coupled to the inner side of the any one surface (i.e., a direction toward the space part 515).

In the exemplary embodiment illustrated in FIG. 72, the first Halbach array 520 is disposed on the inner side of the second surface 512, adjacent to the second surface 512, so as to face the first magnet part 520 which is disposed on the inner side of the first surface 511.

In the exemplary embodiment illustrated in FIG. 73, the first Halbach array 520 is disposed on the inner side of the first surface 511, adjacent to the first surface 511, so as to face the first magnet part 540 which is positioned on the inner side of the second surface 512.

The first Halbach array 520 may be positioned to be biased toward any one of the third surface 513 and the fourth surface 514. In the illustrated exemplary embodiment, the first Halbach array 520 is positioned to be biased toward the third surface 513.

The first Halbach array 520 is disposed to overlap the first magnet part 540 in a direction toward the space part 515 or the first magnet part 540, which is the front-rear direction in the illustrated exemplary embodiment. In addition, the first Halbach array 520 is disposed to overlap the first fixed contact 22*a* in the above direction.

Between the first Halbach array 520 and the first magnet part 540, the space part 515 and the fixed contact 22 and the movable contact 43 accommodated in the space part 515 are positioned.

The first Halbach array 520 may enhance the strength of the magnetic field formed by itself and the magnetic field formed with the first magnet part 540. Since the direction of the magnetic field formed by the first Halbach array 520 and the process of strengthening the magnetic field are well-known techniques, the detailed description thereof will be omitted.

In the illustrated exemplary embodiment, the first Halbach array 520 includes a first block 521, a second block 522 and a third block 523. It will be understood that a plurality of magnetic materials constituting the first Halbach array 520 are each named as blocks 521, 522, 523, respectively.

The first to third blocks 521, 522, 523 may be formed of a magnetic material. In an exemplary embodiment, the first to third blocks 521, 522, 523 may be provided as permanent magnets or electromagnets.

The first to third blocks 521, 522, 523 may be arranged side by side in one direction. In the illustrated exemplary embodiment, the first to third blocks 521, 522, 523 are arranged side by side in the extending direction of the first surface 511 or the second surface 512, that is, in the left-right direction.

The first to third blocks 521, 522, 523 are arranged side by side along the above direction. Specifically, in the first to third blocks 521, 522, 523, the first block 521 is disposed in the central portion. The second block 522 is positioned on the left side of the first block 521, and the third block 523 is positioned on the right side of the first block 521.

In an exemplary embodiment, the first to third blocks 521, 522, 523 may contact each other.

The first block 521 may be disposed to overlap the first fixed contact 22*a* in a direction toward the space part 515 or the first magnet part 540, which is the front-rear direction in the illustrated exemplary embodiment.

Each of the blocks 521, 522, 523 includes a plurality of surfaces.

Specifically, the first block 521 includes a first inner surface 521*a* facing the space part 515 or the first magnet part 540 and a first outer surface 521*b* opposite to the space part 515 or the first magnet part 540.

The second block 522 includes a second inner surface 522*a* facing the first block 521 and a second outer surface 522*b* opposite to the first block 521.

The third block 523 includes a third inner surface 523*a* facing the first block 521 and a third outer surface 523*b* opposite to the first block 521.

The plurality of surfaces of each of the blocks 521, 522, 523 may be magnetized according to a predetermined rule to constitute a Halbach array.

Specifically, the first to third inner surfaces 521*a*, 522*a*, 523*a* may be magnetized with the same polarity. Similarly, the first to third outer surfaces 521*b*, 522*b*, 523*b* may be magnetized with a polarity different from the polarity.

In this case, the first to third inner surfaces 521*a*, 522*a*, 523*a* may be magnetized with the same polarity as the first to third inner surfaces 531*a*, 532*a*, 533*a* of the second Halbach array 530.

In addition, the first to third inner surfaces 521*a*, 522*a*, 523*a* may be magnetized with the same polarity as the first opposing surface 541 of the first magnet part 540 and the second opposing surface 551 of the second magnet part 550.

Similarly, the first to third outer surfaces 521*b*, 522*b*, 523*b* may be magnetized with the same polarity as the first to third outer surfaces 532*b*, 532*b*, 533*b* of the second Halbach array 530.

In addition, the first to third outer surfaces 521*b*, 522*b*, 523*b* may be magnetized with the same polarity as the first opposite surface 542 of the first magnet part 540 and the second opposite surface 552 of the second magnet part 550.

In the illustrated exemplary embodiment, a plurality of magnetic materials constituting the second Halbach array 530 are sequentially arranged side by side from left to right. That is, in the illustrated exemplary embodiment, the second Halbach array 530 is formed to extend in the left-right direction.

The second Halbach array 530 may form a magnetic field together with other magnetic materials. In the illustrated exemplary embodiment, the second Halbach array 530 may form a magnetic field together with the second magnet part 550.

The second Halbach array 530 may be positioned adjacent to any one surface of the first and second surfaces 511, 512. In an exemplary embodiment, the second Halbach array 530 may be coupled to the inner side of the any one surface (i.e., a direction toward the space part 515).

In the exemplary embodiment illustrated in FIG. 72, the second Halbach array 530 is disposed on the inner side of the second surface 512, adjacent to the second surface 512, so as to face the first magnet part 540 which is disposed on the inner side of the first surface 511.

In the exemplary embodiment illustrated in FIG. 73, the second Halbach array 530 is disposed on the inner side of the first surface 511, adjacent to the first surface 511, so as to face the first magnet part 540 which is positioned on the inner side of the second surface 512.

The second Halbach array 530 may be positioned to be biased toward the other of the third surface 513 and the fourth surface 514. In the illustrated exemplary embodiment, the second Halbach array 530 is positioned to be biased toward the fourth surface 514.

The second Halbach array 530 and the first Halbach array 520 may be arranged side by side in the extending direction thereof, which is the left-right direction in the illustrated exemplary embodiment. In an exemplary embodiment, the second Halbach array 530 and the first Halbach array 520 may be in contact with each other.

The second Halbach array 530 is disposed to overlap the second magnet part 550 in a direction toward the space part 515 or the second magnet part 550, which is the front-rear direction in the illustrated exemplary embodiment. In addition, the second Halbach array 530 is disposed to overlap the second fixed contact 22*b* in the above direction.

Between the second Halbach array 530 and the second magnet part 550, the space part 515 and the fixed contact 22 and the movable contact 43 accommodated in the space part 515 are positioned.

The second Halbach array 530 may enhance the strength of the magnetic field formed by itself and the magnetic field formed with the second magnet part 550. Since the direction of the magnetic field formed by the second Halbach array 530 and the process of strengthening the magnetic field are well-known techniques, the detailed description thereof will be omitted.

In the illustrated exemplary embodiment, the second Halbach array 530 includes a first block 531, a second block 532 and a third block 533. It will be understood that a plurality of magnetic materials constituting the second Halbach array 530 are each named as blocks 531, 432, respectively.

The first to third blocks 531, 532, 533 may be formed of a magnetic material. In an exemplary embodiment, the first to third blocks 531, 532, 533 may be provided as permanent magnets or electromagnets.

The first to third blocks 531, 532, 533 may be arranged side by side in one direction. In the illustrated exemplary embodiment, the first to third blocks 531, 532, 533 are arranged side by side in the extending direction of the first surface 511 or the second surface 512, that is, in the left-right direction.

The first to third blocks 531, 532, 533 are arranged side by side along the above direction. Specifically, in the first to third blocks 531, 532, 533, the first block 531 is disposed in the central portion. The second block 532 is positioned on the left side of the first block 531, and the third block 533 is positioned on the right side of the first block 531.

In an exemplary embodiment, the first to third blocks 531, 532, 533 may contact each other.

The first block 531 may be disposed to overlap the second fixed contact 22*b* in a direction toward the space part 515 or the second magnet part 550, which is the front-rear direction in the illustrated exemplary embodiment.

Each of the blocks 531, 532, 533 includes a plurality of surfaces.

Specifically, the first block 531 includes a first inner surface 531*a* facing the space part 515 or the second magnet part 550 and a first outer surface 531*b* opposite to the space part 515 or the second magnet part 550.

The second block 532 includes a second inner surface 532*a* facing the first block 531 and a second outer surface 532*b* opposite to the first block 531.

The third block 533 includes a third inner surface 533*a* facing the first block 531 and a third outer surface 533*b* opposite to the first block 531.

The plurality of surfaces of each of the blocks 531, 532, 533 may be magnetized according to a predetermined rule to constitute a Halbach array.

Specifically, the first to third inner surfaces 531*a*, 532*a*, 533*a* may be magnetized with the same polarity. Similarly, the first to third outer surfaces 532*b*, 532*b*, 533*b* may be magnetized with a polarity different from the polarity.

In this case, the first to third inner surfaces 531*a*, 532*a*, 533*a* may be magnetized with the same polarity as the first to third inner surfaces 521*a*, 522*a*, 523*a* of the first Halbach array 520.

In addition, the first to third inner surfaces 531*a*, 532*a*, 533*a* may be magnetized with the same polarity as the first opposing surface 541 of the first magnet part 540 and the second opposing surface 551 of the second magnet part 550.

Similarly, the first to third outer surfaces 531*b*, 532*b*, 533*b* may be magnetized with the same polarity as the first to third outer surfaces 521*b*, 522*b*, 523*b* of the first Halbach array 520.

In addition, the first to third outer surfaces 531*b*, 532*b*, 533*b* may be magnetized with the same polarity as the first opposite surface 543 of the first magnet part 540 and the second opposite surface 553 of the second magnet part 550.

The first magnet part 540 forms a magnetic field by itself or together with the first Halbach array 520 and the second Halbach array 530. The arc path (A.P) may be formed inside the arc chamber 21 by the magnetic field formed by the first magnet part 540.

The first magnet part 540 may be provided in any shape capable of forming a magnetic field by being magnetized. In an exemplary embodiment, the first magnet part 540 may be provided as a permanent magnet or an electromagnet.

The first magnet part 540 may be positioned adjacent to the other one surface of the first surface 511 and the second surface 512. In an exemplary embodiment, the first magnet part 540 may be coupled to the inner side of the other one surface (i.e., a direction toward the space part 515).

In the exemplary embodiment illustrated in FIG. 72, the first magnet part 540 is disposed on the inner side of the first surface 511, adjacent to the first surface 511, so as to face the first Halbach array 520 and the second Halbach array 530 which are disposed on the inner side of the second surface 512.

In the exemplary embodiment illustrated in FIG. 73, the first magnet part 540 is disposed on the inner side of the second surface 512, adjacent to the second surface 512, so as to face the first Halbach array 520 and the second Halbach array 530 which are disposed on the inner side of the first surface 511.

The first magnet part 540 may be positioned to be biased toward any one of the third surface 513 and the fourth surface 514. In the illustrated exemplary embodiment, the first magnet part 540 is positioned to be biased toward the third surface 513.

The first magnet part 540 may extend in the extending direction of the first surface 511 or the second surface 512, which is the left-right direction in the illustrated exemplary embodiment.

The first magnet part 540 may be disposed side by side with the second magnet part 550 in the extending direction thereof, which is the left-right direction in the illustrated exemplary embodiment. In an exemplary embodiment, the first magnet part 540 and the second magnet part 550 may be in contact.

Between the first magnet part 540 and the first and second Halbach arrays 520, 530, the space part 515 and the fixed contact 22 and the movable contact 43 accommodated in the space part 515 are positioned.

In the illustrated exemplary embodiment, the first fixed contact 22*a* is positioned between the first magnet part 540 and the first Halbach array 520.

The first magnet part 540 is disposed to overlap the first Halbach array 520 in a direction toward the space part 515 or the fixed contacts 22*a*, 22*b*, which is the front-rear direction in the illustrated exemplary embodiment, respectively.

The first magnet part 540 includes a plurality of surfaces.

Specifically, the first magnet part 540 includes a first opposing surface 541 facing the space part 515 or the first and second Halbach arrays 520, 530 and a first opposite surface 542 opposite to the space part 515 or the first and second Halbach arrays 520, 530.

The first opposing surface 541 and the first opposite surface 542 may be magnetized according to a predetermined rule.

Specifically, the first opposing surface 541 may be magnetized with the same polarity as the first to third inner surfaces 521*a*, 522*a*, 523*a* of the first Halbach array 520. Similarly, the first opposing surface 541 may be magnetized with the same polarity as the first to third inner surfaces 531*a*, 532*a*, 533*a* of the second Halbach array 530.

In addition, the first opposing surface 541 may be magnetized with the same polarity as the second opposing surface 551 of the second magnet part 550.

In addition, the first opposite surface 542 may be magnetized with the same polarity as the first to third outer surfaces 521*b*, 522*b*, 523*b* of the first Halbach array 520. Similarly, the first opposite surface 542 may be magnetized with the same polarity as the first to third outer surfaces 532*b*, 532*b*, 533*b* of the second Halbach array 530.

In addition, the first opposite surface 542 may be magnetized with the same polarity as the second opposite surface 552 of the second magnet part 550.

The second magnet part 550 forms a magnetic field by itself or together with the first Halbach array 520 and the second Halbach array 530. The arc path (A.P) may be formed inside the arc chamber 21 by the magnetic field formed by the second magnet part 550.

The second magnet part 550 may be provided in any shape capable of forming a magnetic field by being magnetized. In an exemplary embodiment, the second magnet part 550 may be provided as a permanent magnet or an electromagnet.

The second magnet part 550 may be positioned adjacent to the other one surface of the first surface 511 and the second surface 512. In an exemplary embodiment, the second magnet part 550 may be coupled to the inner side of the other one surface (i.e., a direction toward the space part 515).

In the exemplary embodiment illustrated in FIG. 72, the second magnet part 550 is disposed on the inner side of the first surface 511, adjacent to the first surface 511, so as to face the first Halbach array 520 and the second Halbach array 530 which are disposed on the inner side of the second surface 512.

In the exemplary embodiment illustrated in FIG. 73, the second magnet part 550 is disposed on the inner side of the second surface 512, adjacent to the second surface 512, so as to face the first Halbach array 520 and the second Halbach array 530 which are disposed on the inner side of the first surface 511.

The second magnet part 550 may be positioned to be biased toward any one of the third surface 513 and the fourth surface 514. In the illustrated exemplary embodiment, the second magnet part 550 is positioned to be biased toward the fourth surface 514.

The second magnet part 550 may extend in the extending direction of the first surface 511 or the second surface 512, which is the left-right direction in the illustrated exemplary embodiment.

The second magnet part 550 may be arranged side by side with the first magnet part 540 in the extending direction thereof, which is the left-right direction in the illustrated exemplary embodiment. In an exemplary embodiment, the second magnet part 550 and the first magnet part 540 may contact each other.

Between the second magnet part 550 and the first and second Halbach arrays 520, 530, the space part 515 and the fixed contact 22 and the movable contact 43 accommodated in the space part 515 are positioned.

In the illustrated exemplary embodiment, the second fixed contact 22*b* is positioned between the second magnet part 550 and the second Halbach array 530.

The second magnet part 550 is disposed to overlap the second Halbach array 530 in a direction toward the space part 515 or the fixed contacts 22*a*, 22*b*, which is the front-rear direction in the illustrated exemplary embodiment, respectively.

The second magnet part 550 includes a plurality of surfaces.

Specifically, the second magnet part 550 includes a second opposing surface 551 facing the space part 515 or the first and second Halbach arrays 520, 530 and a second opposite surface 552 opposite to the space part 515 or the first and second Halbach arrays 520, 530.

The second opposing surface 551 and the second opposite surface 552 may be magnetized according to a predetermined rule.

Specifically, the second opposing surface 551 may be magnetized with the same polarity as the first to third inner surfaces 521*a*, 522*a*, 523*a* of the first Halbach array 520. Similarly, the second opposing surface 551 may be magnetized with the same polarity as the first to third inner surfaces 531*a*, 532*a*, 533*a* of the second Halbach array 530.

In addition, the second opposing surface 551 may be magnetized with the same polarity as the first opposing surface 541 of the first magnet part 540.

In addition, the second opposite surface 552 may be magnetized with the same polarity as the first to third outer surfaces 521*b*, 522*b*, 523*b* of the first Halbach array 520. Similarly, the second opposite surface 552 may be magnetized with the same polarity as the first to third outer surfaces 532*b*, 532*b*, 533*b* of the second Halbach array 530.

In addition, the second opposite surface 552 may be magnetized with the same polarity as the first opposite surface 542 of the first magnet part 540.

Hereinafter, the arc path (A.P) formed by the arc path generation unit 500 according to the present exemplary embodiment will be described in detail with reference to FIG. 74.

Figure 74:
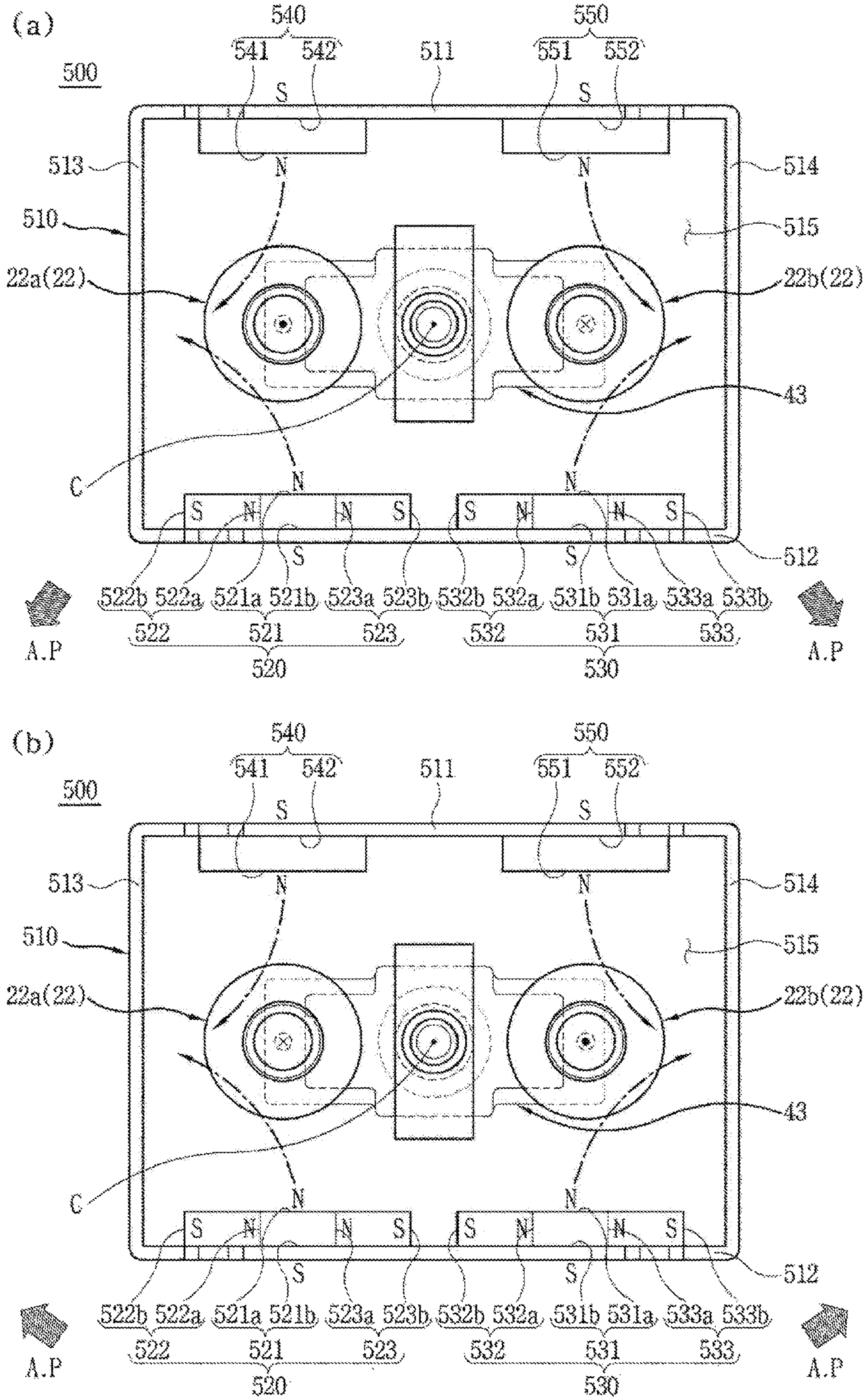
FIG. 74 is a conceptual diagram illustrating the paths of a magnetic field and an arc formed by the arc path generation unit according to the exemplary embodiment shown in FIGS. 72 and 73.

Referring to FIG. 74, the first to third inner surfaces 521*a*, 522*a*, 523*a* of the first Halbach array 520 and the first to third inner surfaces 531*a*, 532*a*, 533*a* of the second Halbach array 530 are magnetized to the N pole.

In addition, the first opposing surface 541 of the first magnet part 540 and the second opposing surface 551 of the second magnet part 550 are also magnetized to the N pole.

In addition, according to the predetermined rule, the first to third outer surfaces 521*b*, 522*b*, 523*b* of the first Halbach array 520 and the first to third outer surfaces 532*b* of the second Halbach array 530, 532*b*, 533*b* are magnetized to the S pole.

In addition, the first opposite surface 542 of the first magnet part 540 and the second opposite surface 552 of the second magnet part 550 are also magnetized to the S pole.

Accordingly, a magnetic field in a direction to repel each other is formed between the first Halbach array 520 and the first magnet part 540. In addition, a magnetic field in a direction to repel each other is also formed between the second Halbach array 530 and the second magnet part 550.

In the exemplary embodiment illustrated in (a) of FIG. 74, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 74, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first Halbach array 520, the second Halbach array 530, the first magnet part 540 and the second magnet part 550 is changed, the directions of the magnetic fields formed by the first Halbach array 520, the second Halbach array 530, the first magnet part 540 and the second magnet part 550 become reversed. Accordingly, the path (A.P) of the generated electromagnetic force and arc is also formed to be reversed in the front-rear direction.

That is, in the energized situation as shown in (a) of FIG. 74, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 74, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Accordingly, regardless of the polarity of the first Halbach array 520, the second Halbach array 530, the first magnet part 540 and the second magnet part 550 or the direction of the current flowing through the DC relay 1, the arc path generation unit 500 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(6) Description of the Arc Path Generation Unit 600 According to Another Exemplary Embodiment of the Present Disclosure Hereinafter, the arc path generation unit 600 according to another exemplary embodiment of the present disclosure will be described in detail with reference to FIGS. 75 to 77.

Figure 75:
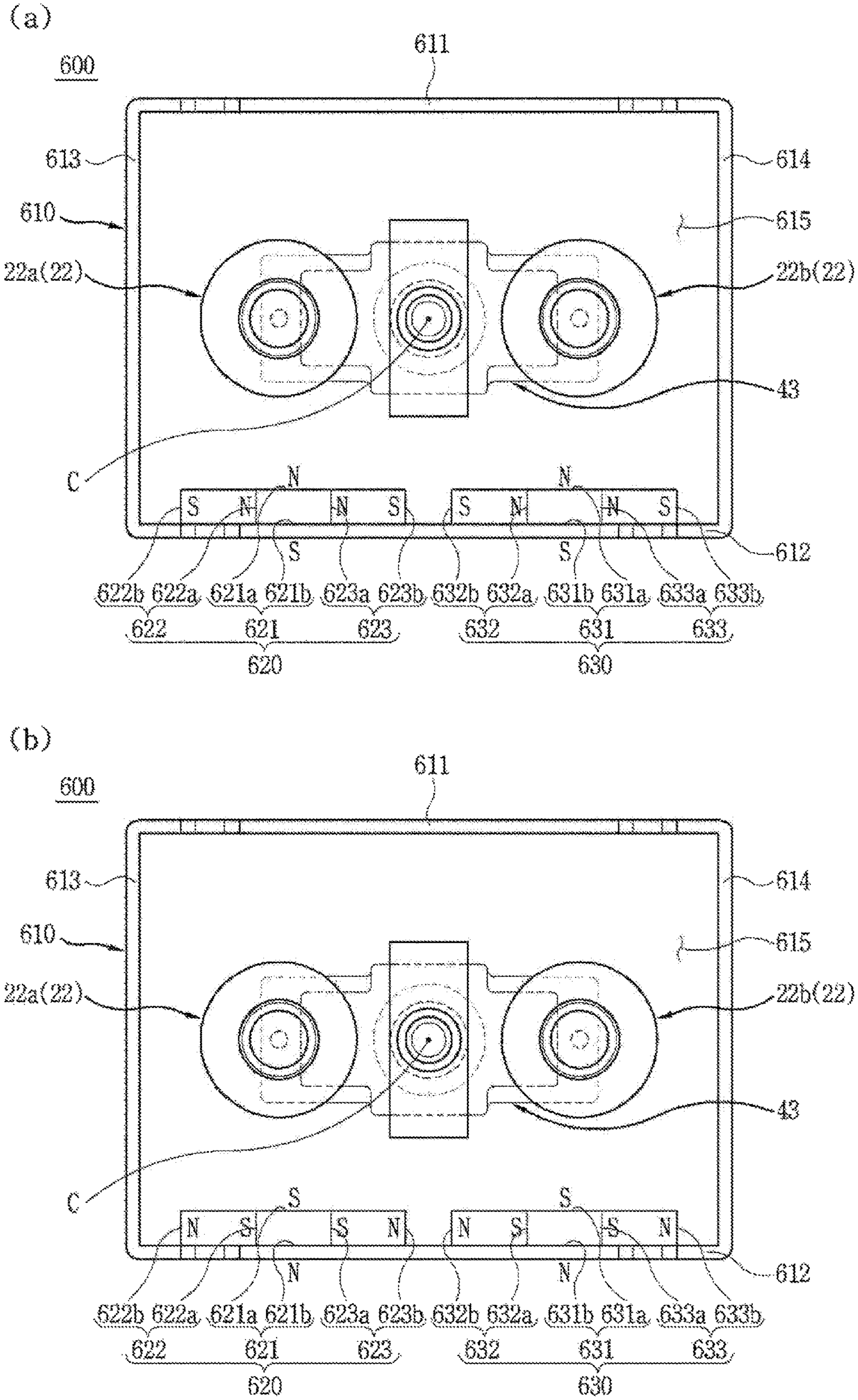
FIGS. 75 and 76 are conceptual diagrams illustrating the arc path generation unit according to still another exemplary embodiment of the present disclosure.
Figure 76:
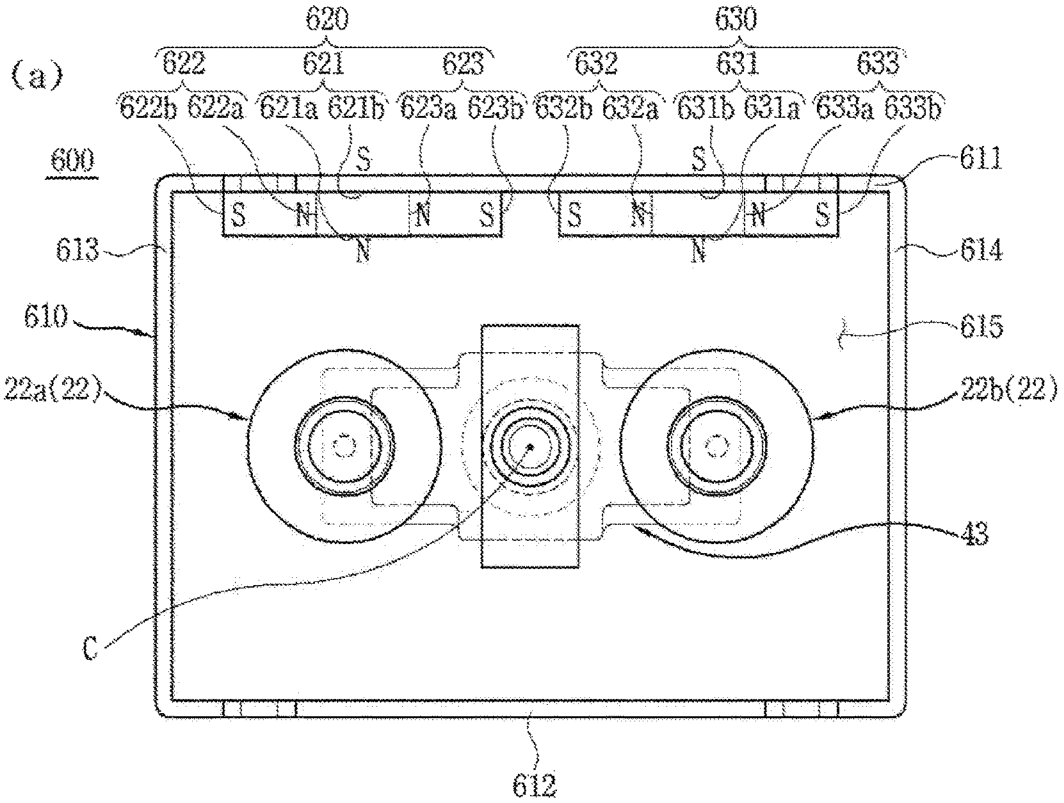
Figure 76:
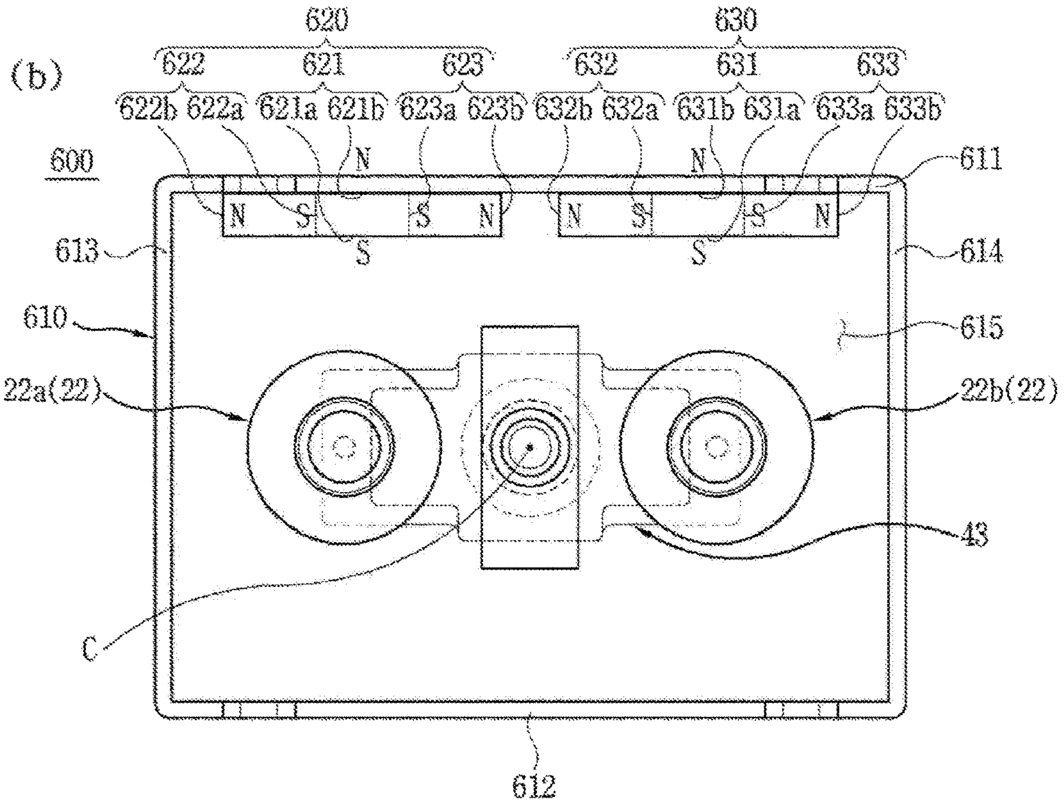

Referring to FIGS. 75 and 76, the arc path generation unit 600 according to the illustrated exemplary embodiment includes a magnetic frame 610, a first Halbach array 620 and a second Halbach array 630.

The magnetic frame 610 according to the present exemplary embodiment has the same structure and function as the magnetic frame 610 according to the above-described exemplary embodiment. However, there is a difference in the arrangement method of the first Halbach array 620 and the second Halbach array 630 disposed on the magnetic frame 610 according to the present exemplary embodiment.

Accordingly, the description of the magnetic frame 610 will be replaced with the description of the magnetic frame 610 according to the above-described exemplary embodiment.

In the illustrated exemplary embodiment, a plurality of magnetic materials constituting the first Halbach array 620 are sequentially arranged side by side from left to right. That is, in the illustrated exemplary embodiment, the first Halbach array 620 is formed to extend in the left-right direction.

The first Halbach array 620 may form a magnetic field together with other magnetic materials. In the illustrated exemplary embodiment, the first Halbach array 620 may form a magnetic field together with the second Halbach array 630.

The first Halbach array 620 may be positioned adjacent to any one surface of the first and second surfaces 611 and 612. In an exemplary embodiment, the first Halbach array 620 may be coupled to the inner side of the any one surface (i.e., a direction toward the space part 615).

In the exemplary embodiment illustrated in FIG. 75, the first Halbach array 620 is disposed on the inside the second surface 612, adjacent to the second surface 612, so as to face the first surface 611.

In the exemplary embodiment illustrated in FIG. 76, the first Halbach array 620 is disposed on the inner side of the first surface 611, adjacent to the first surface 611, so as to face the second surface 612.

The first Halbach array 620 may be positioned to be biased toward any one of the third surface 613 and the fourth surface 614. In the illustrated exemplary embodiment, the first Halbach array 620 is positioned to be biased toward the third surface 613.

The first Halbach array 620 is disposed to overlap the first fixed contact 22*a* in a direction toward the space part 615, which is the front-rear direction in the illustrated exemplary embodiment.

Between the first Halbach array 620 and the other one of the first surface 611 and the second surface 612, the space part 615 and the fixed contact 22 and the movable contact 43 accommodated in the space part 615 are positioned.

The first Halbach array 620 may enhance the strength of the magnetic field formed by itself and the magnetic field formed with the second Halbach array 630. Since the direction of the magnetic field formed by the first Halbach array 620 and the process of strengthening the magnetic field are well-known techniques, the detailed description thereof will be omitted.

In the illustrated exemplary embodiment, the first Halbach array 620 includes a first block 621, a second block 622 and a third block 623. It will be understood that a plurality of magnetic materials constituting the first Halbach array 620 are each named blocks 621, 622, 623, respectively.

The first to third blocks 621, 622, 623 may be formed of a magnetic material. In an exemplary embodiment, the first to third blocks 621, 622, 623 may be provided as permanent magnets or electromagnets.

The first to third blocks 621, 622, 623 may be arranged side by side in one direction. In the illustrated exemplary embodiment, the first to third blocks 621, 622, 623 are arranged side by side in the extending direction of the first surface 611 or the second surface 612, that is, in the left-right direction.

The first to third blocks 621, 622, 623 are arranged side by side along the above direction. Specifically, in the first to third blocks 621, 622, 623, the first block 621 is disposed in the central portion. The second block 622 is positioned on the left side of the first block 621, and the third block 623 is positioned on the right side of the first block 621.

In an exemplary embodiment, the first to third blocks 621, 622, 623 may contact each other.

The first block 621 may be disposed to overlap the first fixed contact 22*a* in a direction toward the space part 615, which is the front-rear direction in the illustrated exemplary embodiment.

Each of the blocks 621, 622, 623 includes a plurality of surfaces.

Specifically, the first block 621 includes a first inner surface 621*a* facing the space part 615 and a first outer surface 621*b* opposite to the space part 615.

The second block 622 includes a second inner surface 622*a* facing the first block 621 and a second outer surface 622*b* opposite to the first block 621.

The third block 623 includes a third inner surface 623*a* facing the first block 621 and a third outer surface 623*b* opposite to the first block 621.

The plurality of surfaces of each of the blocks 621, 622, 623 may be magnetized according to a predetermined rule to constitute a Halbach array. Specifically, the first to third inner surfaces 621*a*, 622*a*, 623*a* may be magnetized with the same polarity. Similarly, the first to third outer surfaces 621*b*, 622*b*, 623*b* may be magnetized to have a polarity different from the polarity.

In this case, the first to third inner surfaces 621*a*, 622*a*, 623*a* may be magnetized with the same polarity as the first to third inner surfaces 631*a*, 632*a*, 633*a* of the second Halbach array 630.

Similarly, the first to third outer surfaces 621*b*, 622*b*, 623*b* may be magnetized with the same polarity as the first to third outer surfaces 631*b*, 632*b*, 633*b* of the second Halbach array 630.

In the illustrated exemplary embodiment, a plurality of magnetic materials constituting the second Halbach array 630 are sequentially arranged side by side from left to right. That is, in the illustrated exemplary embodiment, the second Halbach array 630 is formed to extend in the left-right direction.

The second Halbach array 630 may form a magnetic field together with other magnetic materials. In the illustrated exemplary embodiment, the second Halbach array 630 may form a magnetic field together with the first Halbach array 620.

The second Halbach array 630 may be positioned adjacent to any one surface of the first and second surfaces 611, 612. In an exemplary embodiment, the second Halbach array 630 may be coupled to the inner side of the any one surface (i.e., a direction toward the space part 615).

In the exemplary embodiment illustrated in FIG. 75, the second Halbach array 630 is disposed on the inner side of the second surface 612, adjacent to the second surface 612, so as to face the first surface 611.

Figure 77:
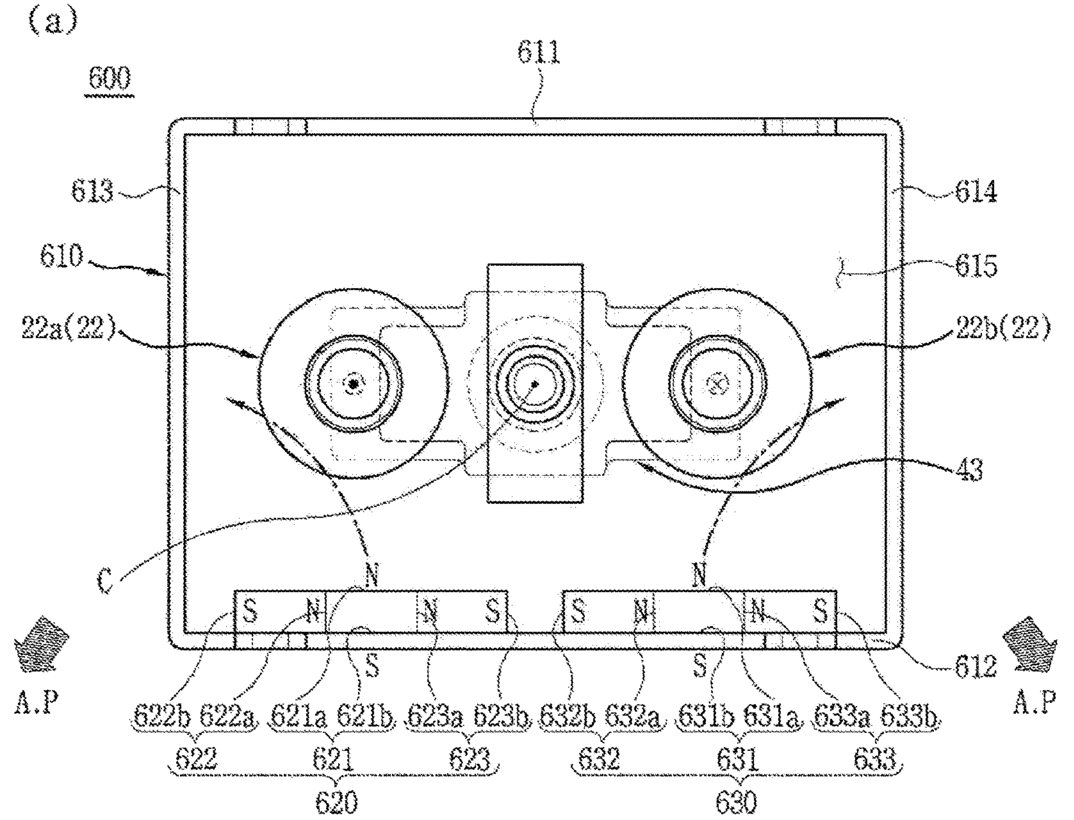
FIG. 77 is a conceptual diagram illustrating the paths of a magnetic field and an arc formed by the arc path generation unit according to the exemplary embodiment shown in FIGS. 75 and 76.
Figure 77:
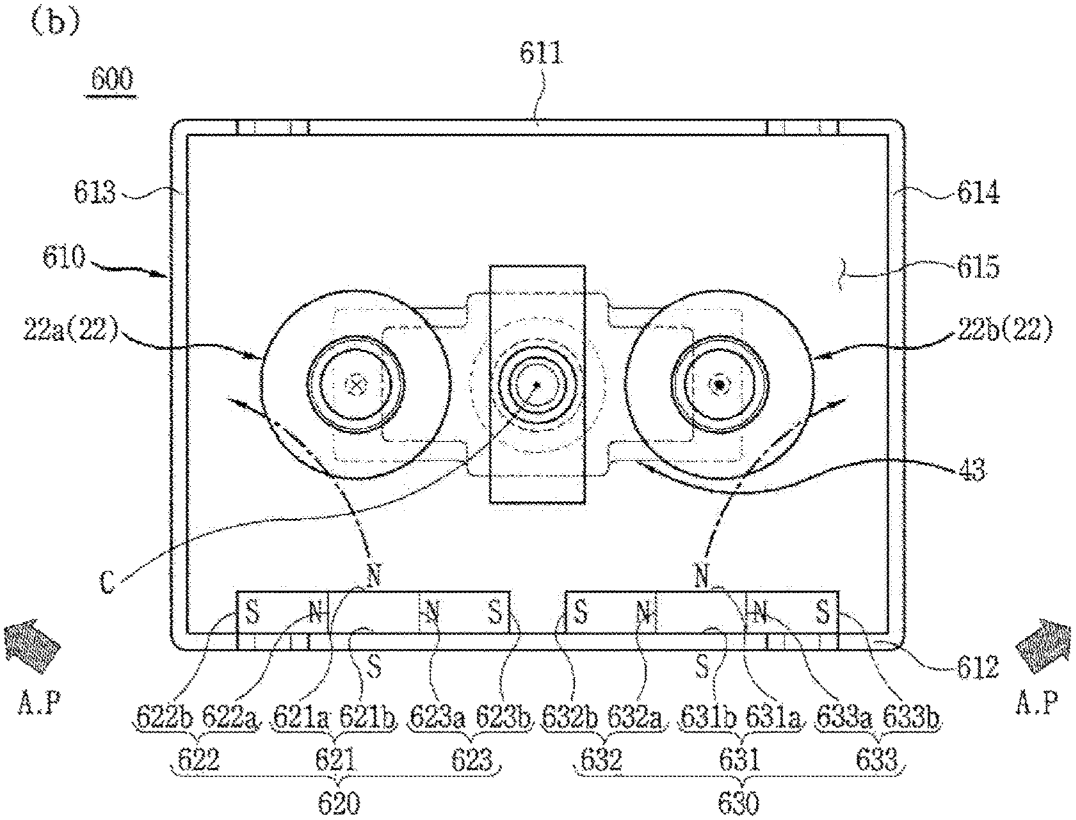

In the exemplary embodiment illustrated in FIG. 77, the second Halbach array 630 is disposed on the inner side of the first surface 611, adjacent to the first surface 611, so as to face the second surface 612.

The second Halbach array 630 may be positioned to be biased toward the other one of the third surface 613 and the fourth surface 614. In the illustrated exemplary embodiment, the second Halbach array 630 is positioned to be biased toward the fourth surface 614.

The second Halbach array 630 and the first Halbach array 620 may be arranged side by side in the extending direction thereof, which is the left-right direction in the illustrated exemplary embodiment. In an exemplary embodiment, the second Halbach array 630 and the first Halbach array 620 may be in contact with each other.

The second Halbach array 630 is disposed to overlap the second fixed contact 22*b* in a direction toward the space part 615, which is the front-rear direction in the illustrated exemplary embodiment.

Between the second Halbach array 630 and the other one of the first surface 611 and the second surface 612, the space part 615 and the fixed contact 22 and the movable contact 43 accommodated in the space part 615 are positioned.

The second Halbach array 630 may enhance the strength of the magnetic field formed by itself and the magnetic field formed with the first Halbach array 620. Since the direction of the magnetic field formed by the second Halbach array 630 and the process of strengthening the magnetic field are well-known techniques, the detailed description thereof will be omitted.

In the illustrated exemplary embodiment, the second Halbach array 630 includes a first block 631, a second block 632 and a third block 633. It will be understood that a plurality of magnetic materials constituting the second Halbach array 630 are each named blocks 631, 632, 633, respectively.

The first to third blocks 631, 632, 633 may be formed of a magnetic material. In an exemplary embodiment, the first to third blocks 631, 632, 633 may be provided as permanent magnets or electromagnets.

The first to third blocks 631, 632, 633 may be arranged side by side in one direction. In the illustrated exemplary embodiment, the first to third blocks 631, 632, 633 are arranged side by side in the extending direction of the first surface 611 or the second surface 612, that is, in the left-right direction.

The first to third blocks 631, 632, 633 are arranged side by side along the above direction. Specifically, in the first to third blocks 631, 632, 633, the first block 631 is disposed in the central portion. The second block 632 is positioned on the left side of the first block 631, and the third block 633 is positioned on the right side of the first block 631.

In an exemplary embodiment, the first to third blocks 631, 632, 633 may contact each other.

The first block 631 may be disposed to overlap the second fixed contact 22*b* in a direction toward the space part 615, which is the front-rear direction in the illustrated exemplary embodiment.

Each of the blocks 631, 632, 633 includes a plurality of surfaces.

Specifically, the first block 631 includes a first inner surface 631*a* facing the space part 615 and a first outer surface 631*b* opposite to the space part 615.

The second block 632 includes a second inner surface 632*a* facing the first block 631 and a second outer surface 632*b* opposite to the first block 631.

The third block 633 includes a third inner surface 633*a* facing the first block 631 and a third outer surface 633*b* opposite to the first block 631.

The plurality of surfaces of each of the blocks 631, 632, 633 may be magnetized according to a predetermined rule to constitute a Halbach array.

Specifically, the first to third inner surfaces 631*a*, 632*a*, 633*a* may be magnetized with the same polarity. Similarly, the first to third outer surfaces 631*b*, 632*b*, 633*b* may be magnetized with a polarity different from the polarity.

In this case, the first to third inner surfaces 631*a*, 632*a*, 633*a* may be magnetized with the same polarity as the first to third inner surfaces 621*a*, 622*a*, 623*a* of the first Halbach array 620.

Similarly, the first to third outer surfaces 631*b*, 632*b*, 633*b* may be magnetized with the same polarity as the first to third outer surfaces 621*b*, 622*b*, 623*b* of the first Halbach array 620.

Hereinafter, the arc path (A.P) formed by the arc path generation unit 600 according to the present exemplary embodiment will be described in detail with reference to FIG. 77.

Referring to FIGS. 77, the first to third inner surfaces 621*a*, 622*a*, 623*a* of the first Halbach array 620 and the first to third inner surfaces 631*a*, 632*a*, 633*a* of the second Halbach array 630 are magnetized to the N pole.

In addition, according to the predetermined rule, the first to third outer surfaces 621*b*, 622*b*, 623*b* of the first Halbach array 620 and the first to third outer surfaces 631*b* of the second Halbach array 630, 632*b*, 633*b* are magnetized to the S pole.

Accordingly, a magnetic field in a direction from the first inner surface 621*a* toward the third surface 613 is formed in the vicinity of the first fixed contact 22*a*. In addition, a magnetic field in a direction from the second inner surface 622*a* toward the fourth surface 614 is formed in the vicinity of the second fixed contact 22*b*.

In the exemplary embodiment illustrated in (a) of FIG. 77, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 77, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first Halbach array 620 and the second Halbach array 630 is changed, the directions of the magnetic fields formed by the first Halbach array 620 and the second Halbach array 630 become reversed. Accordingly, the path (A.P) of the generated electromagnetic force and arc is also formed to be reversed in the front-rear direction.

That is, in the energized situation as shown in (a) of FIG. 77, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in FIG. 77(*b*), the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Accordingly, regardless of the polarity of the first Halbach array 620 and the second Halbach array 630 or the direction of the current flowing through the DC relay 1, the arc path generation unit 600 according to the present exemplary embodiment may form the path (AP) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(7) Description of the Arc Path Generation Unit 700 According to Another Exemplary Embodiment of the Present Disclosure Hereinafter, the arc path generation unit 700 according to another exemplary embodiment of the present disclosure will be described in detail with reference to FIGS. 78 to 80.

Figure 78:
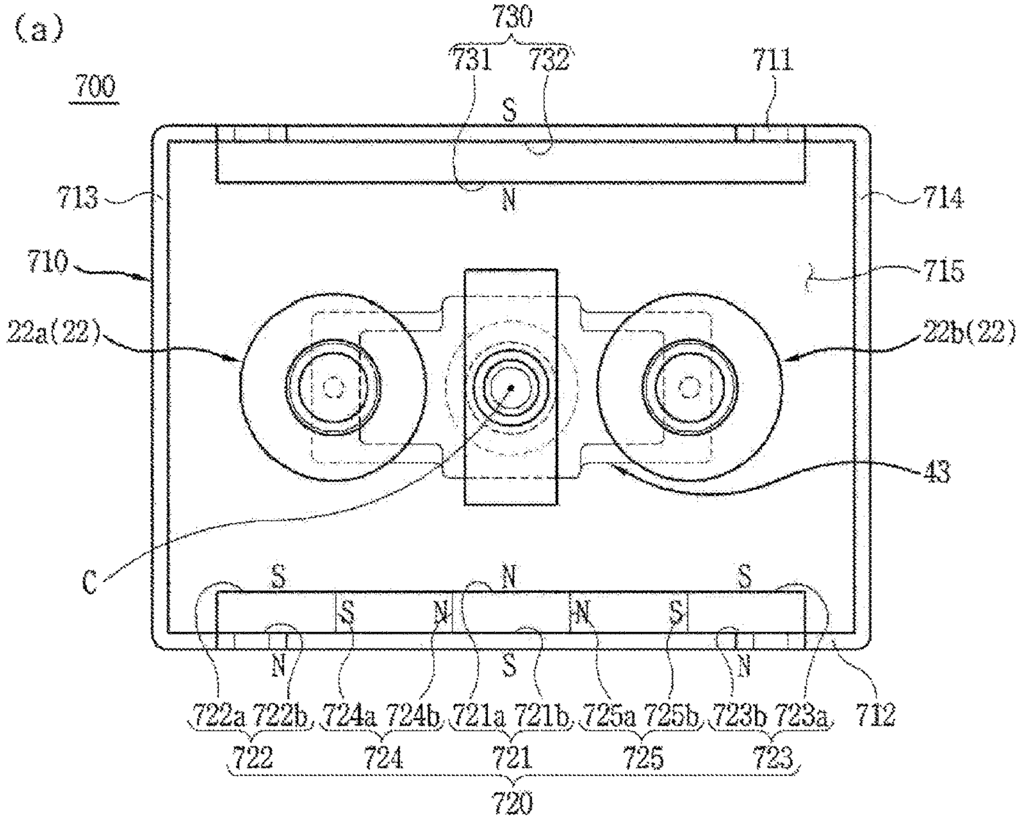
FIGS. 78 and 79 are conceptual diagrams illustrating the arc path generation unit according to still another exemplary embodiment of the present disclosure.
Figure 78:
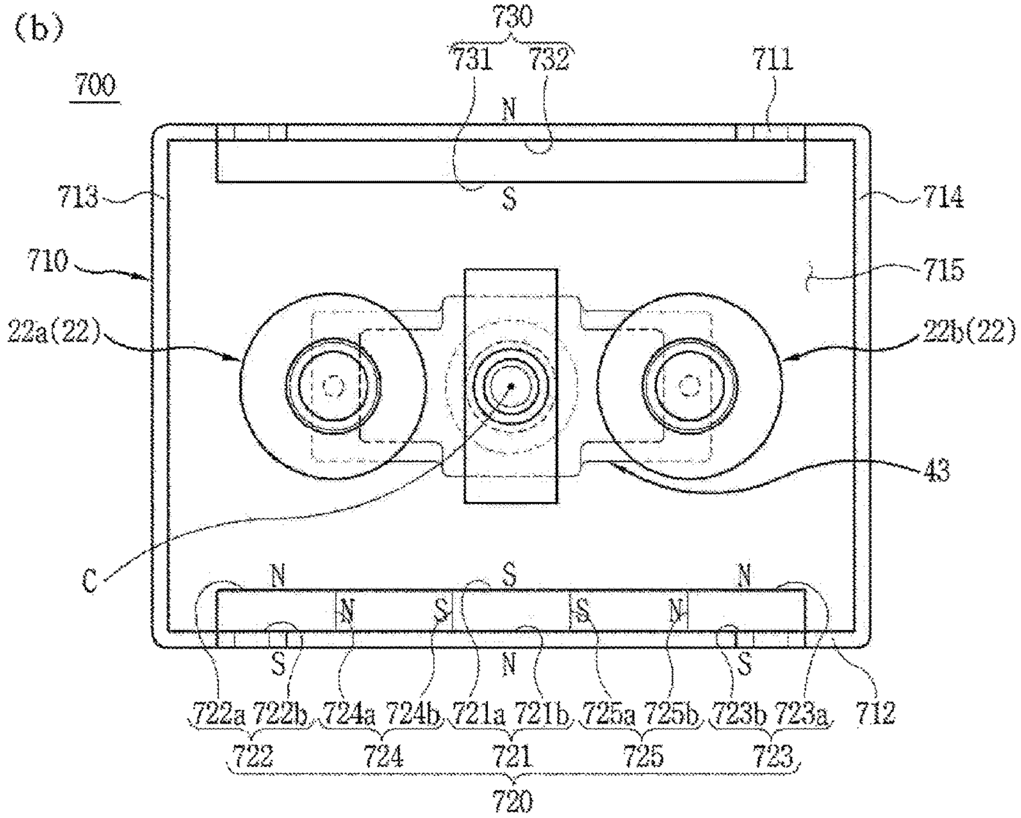
Figure 79:
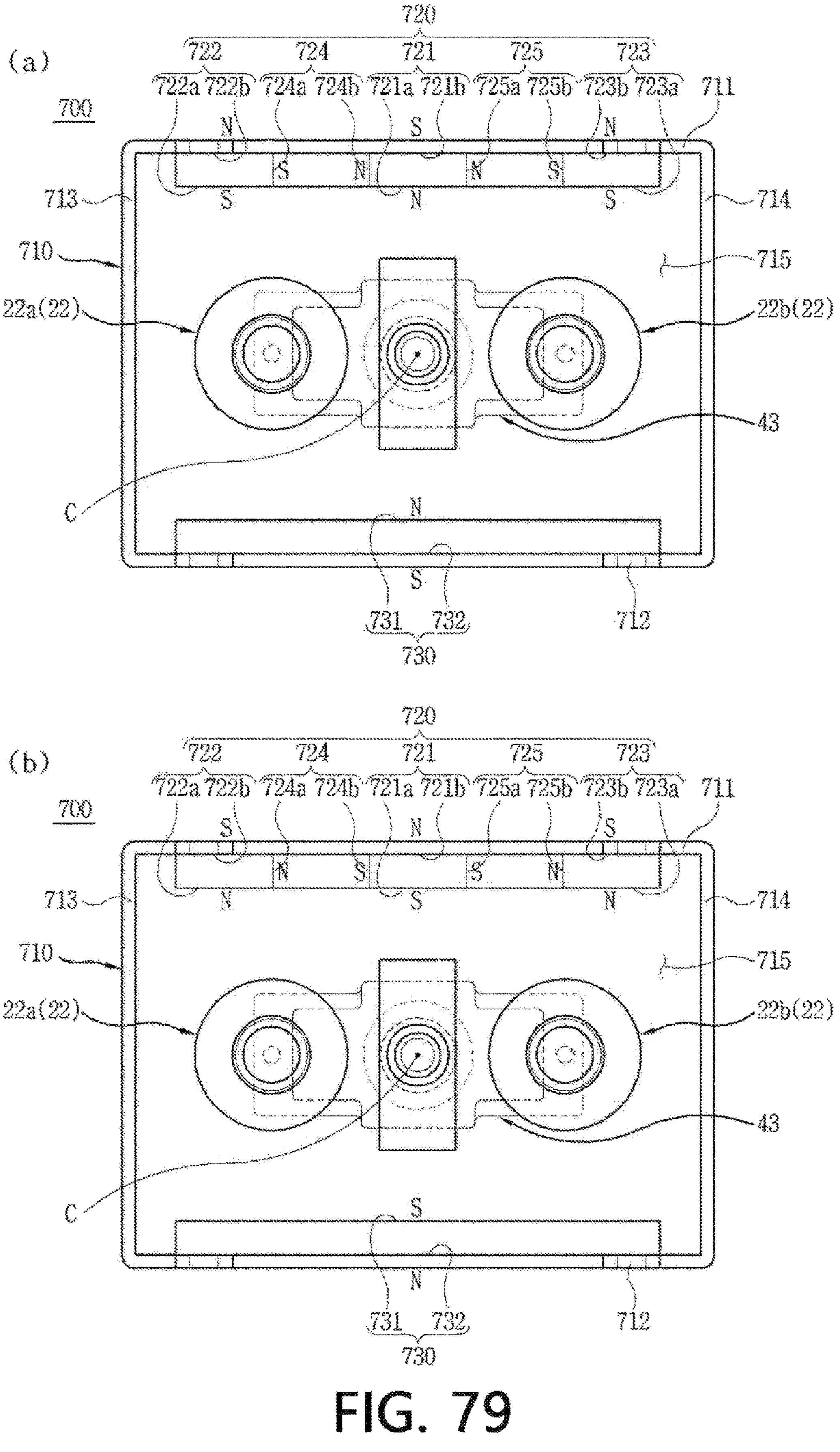

Referring to FIGS. 78 and 79, the arc path generation unit 700 according to the illustrated exemplary embodiment includes a magnetic frame 710, a Halbach array 720 and a magnet part 730.

The magnetic frame 710 according to the present exemplary embodiment has the same structure and function as the magnetic frame 710 according to the above-described exemplary embodiment. However, there is a difference in the arrangement method of the Halbach array 720 and the magnet part 730 disposed on the magnetic frame 710 according to the present exemplary embodiment.

Accordingly, the description of the magnetic frame 710 will be replaced with the description of the magnetic frame 710 according to the above-described exemplary embodiment.

In the illustrated exemplary embodiment, a plurality of magnetic materials constituting the Halbach array 720 are sequentially arranged side by side from left to right. That is, in the illustrated exemplary embodiment, the Halbach array 720 is formed to extend in the left-right direction.

The Halbach array 720 may form a magnetic field with other magnetic materials. In the illustrated exemplary embodiment, the Halbach array 720 may form a magnetic field together with the magnet part 730.

The Halbach array 720 may be positioned adjacent to any one surface of the first and second surfaces 711, 712. In an exemplary embodiment, the Halbach array 720 may be coupled to the inner side of the any one surface (i.e., a direction toward the space part 715).

In the exemplary embodiment illustrated in FIG. 78, the Halbach array 720 is disposed on the inner side of the second surface 712, adjacent the second surface 712, so as to face the magnet part 730 which is disposed on the inner side of the first surface 711.

In the exemplary embodiment illustrated in FIG. 79, the Halbach array 720 is disposed on the inner side of the first surface 711, adjacent to the first surface 711, so as to face the magnet part 730 which is positioned on the inner side of the second surface 712.

The Halbach array 720 may extend in the extending direction of the first surface 711 or the second surface 712, which is the left-right direction in the illustrated exemplary embodiment. The Halbach array 720 may be positioned near the center of the first surface 711 or the second surface 712.

In other words, the shortest distance between the Halbach array 720 and the third surface 713 and the shortest distance between the Halbach array 720 and the fourth surface 714 may be the same.

The Halbach array 720 is disposed to overlap the magnet part 730 in a direction toward the space part 715 or the magnet part 730, which is the front-rear direction in the illustrated exemplary embodiment. In an exemplary embodiment, the extension lengths of the Halbach array 720 and the magnet part 730 may be the same.

In addition, the Halbach array 720 is disposed to overlap the first fixed contact 22*a* and the second fixed contact 22*b* in the above direction.

Between the Halbach array 720 and the magnet part 730, the space part 715 and the fixed contact 22 and the movable contact 43 accommodated in the space part 715 are positioned.

The Halbach array 720 may enhance the strength of the magnetic field formed by itself and the magnetic field formed with the magnet part 730. Since the direction of the magnetic field formed by the Halbach array 720 and the process of strengthening the magnetic field are well-known techniques, the detailed description thereof will be omitted.

In the illustrated exemplary embodiment, the Halbach array 720 includes a first block 721, a second block 722, a third block 723, a fourth block 724 and a fifth block 725. It will be understood that a plurality of magnetic materials constituting the Halbach array 720 are each named as blocks 721, 722, 723, 724, 725, respectively.

The first to fifth blocks 721, 722, 723, 724, 725 may be formed of a magnetic material. In an exemplary embodiment, the first to fifth blocks 721, 722, 723, 724, 725 may be provided as permanent magnets or electromagnets.

The first to fifth blocks 721, 722, 723, 724, 725 may be arranged side by side in one direction. In the illustrated exemplary embodiment, the first to fifth blocks 721, 722, 723, 724, 725 are arranged side by side in the extending direction of the first surface 711 or the second surface 712, that is, in the left-right direction.

The first to fifth blocks 721, 722, 723, 724, 725 are arranged side by side along the above direction. Specifically, in the first to fifth blocks 721, 722, 723, 724, 725, the first block 721 is disposed in the central portion.

The second block 722 is positioned on the leftmost side of the Halbach array 720, and the third block 723 is positioned on the rightmost side of the Halbach array 720. The fourth block 724 is positioned between the first block 721 and the second block 722. The fifth block 725 is positioned between the first block 721 and the third block 723.

In an exemplary embodiment, each of the blocks 721, 722, 723, 724, 725 adjacent to each other may contact each other.

The second block 722 may be disposed to overlap the first fixed contact 22*a* in a direction toward the space part 715 or the magnet part 730, which is the front-rear direction in the illustrated exemplary embodiment.

The third block 723 may be disposed to overlap the second fixed contact 22*b* in a direction toward the space part 715 or the magnet part 730, which is the front-rear direction in the illustrated exemplary embodiment.

Each of the blocks 721, 722, 723, 724, 725 includes a plurality of surfaces.

Specifically, the first block 721 includes a first inner surface 721*a* facing the space part 715 or the magnet part 730 and a first outer surface 721*b* opposite to the space part 715 or the magnet part 730.

The second block 722 includes a second inner surface 722*a* facing the space part 715 or magnet part 730 and a second outer surface 722*b* opposite to the space part 715 or magnet part 730.

The third block 723 includes a third inner surface 723*a* facing the space part 715 or magnet part 730 and a third outer surface 723*b* opposite to the space part 715 or magnet part 730.

The fourth block 724 includes a fourth inner surface 724*a* facing the second block 722 and a fourth outer surface 724*b* facing the first block 721.

The fifth block 725 includes a fifth inner surface 725*a* facing the first block 721 and a fifth outer surface 725*b* facing the third block 723.

The plurality of surfaces of each of the blocks 721, 722, 723, 724, 725 may be magnetized according to a predetermined rule to constitute a Halbach array.

Specifically, the first inner surface 721*a*, the fourth outer surface 724*b* and the fifth inner surface 725*a* may be magnetized with the same polarity. In addition, the second to fourth inner surfaces 722*a*, 723*a*, 724*a*, the first outer surface 721*b* and the fifth outer surface 725*b* may be magnetized with a polarity different from the polarity.

In this case, the first inner surface 721*a* may be magnetized with the same polarity as the opposing surface 731 of the magnet part 730.

Similarly, the second to fourth inner surfaces 722*a*, 723*a*, 724*a* may be magnetized with the same polarity as the opposite surface 732 of the magnet part 730.

The magnet part 730 forms a magnetic field by itself or with the Halbach array 720. The arc path (A.P) may be formed inside the arc chamber 21 by the magnetic field formed by the magnet part 730.

The magnet part 730 may be provided in any shape capable of forming a magnetic field by being magnetized. In an exemplary embodiment, the magnet part 730 may be provided as a permanent magnet or an electromagnet.

The magnet part 730 may be positioned adjacent to the other one surface of the first surface 711 and the second surface 712. In an exemplary embodiment, the magnet part 730 may be coupled to the inner side of the one other surface (i.e., a direction toward the space part 715).

In the exemplary embodiment illustrated in FIG. 78, the magnet part 730 is disposed on the inner side of the first surface 711, adjacent to the first surface 711, so as to face the Halbach array 720 which is disposed on the inner side of the second surface 712.

In the exemplary embodiment illustrated in FIG. 79, the magnet part 730 is disposed on the inner side of the second surface 712, adjacent to the second surface 712, so as to face the Halbach array 720 which is disposed on the inner side of the first surface 711.

The magnet part 730 may be positioned at the central portion of the first surface 711 or the second surface 712. In other words, the shortest distance between the magnet part 730 and the third surface 713 and the shortest distance between the magnet part 730 and the fourth surface 714 may be the same.

The magnet part 730 may extend in the extending direction of the first surface 711 or the second surface 712, which is the left-right direction in the illustrated exemplary embodiment. In an exemplary embodiment, the magnet part 730 may extend by the same length as the Halbach array 720.

Between the magnet part 730 and the Halbach array 720, the space part 715 and the fixed contact 22 and the movable contact 43 accommodated in the space part 715 are positioned.

The magnet part 730 is disposed to overlap the Halbach array 720 in a direction toward the space part 715 or the fixed contacts 22*a*, 22*b*, which is the front-rear direction in the illustrated exemplary embodiment, respectively.

The magnet part 730 includes a plurality of surfaces.

Specifically, the magnet part 730 includes an opposing surface 731 facing the space part 715 or Halbach array 720 and an opposite surface 732 opposite to the space part 715 or Halbach array 720.

The opposing surface 731 and the opposite surface 732 may be magnetized according to a predetermined rule.

Specifically, the opposing surface 731 may be magnetized with the same polarity as the first inner surface 721*a* of the Halbach array 720. In addition, the opposing surface 731 may be magnetized with a polarity different from that of the second and third inner surfaces 722*a*, 723*a* of the Halbach array 720.

In addition, the opposite surface 732 may be magnetized with the same polarity as the second and third inner surfaces 722*a*, 723*a* of the Halbach array 720. In addition, the opposite surface 732 may be magnetized with a polarity different from that of the first inner surface 721*a* of the Halbach array 720.

Hereinafter, the arc path (A.P) formed by the arc path generation unit 700 according to the present exemplary embodiment will be described in detail with reference to FIG. 80.

Figure 80:
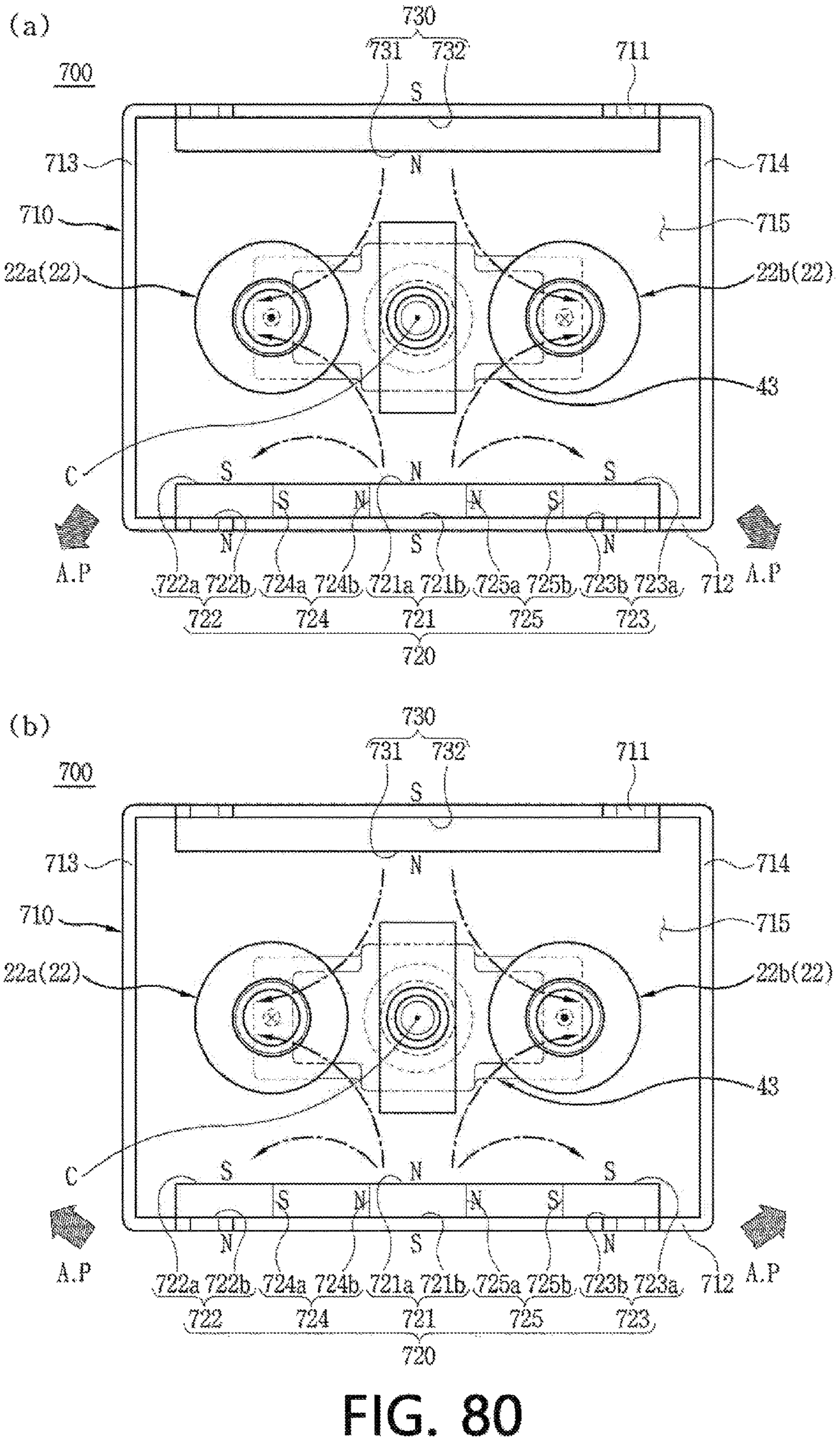
FIG. 80 is a conceptual diagram illustrating the paths of a magnetic field and an arc formed by the arc path generation unit according to the exemplary embodiment shown in FIGS. 78 and 79.

Referring to FIG. 80, the first inner surface 721*a* of the Halbach array 720 is magnetized to the N pole. In addition, the second and third inner surfaces 722*a*, 723*a* of the Halbach array 720 are magnetized to the S pole.

Accordingly, in the Halbach array 720, a magnetic field in a direction from the first inner surface 721*a* to the second and third inner surfaces 722*a*, 723*a* is formed.

In addition, according to the predetermined rule, the opposing surface 731 of the magnet part 730 is magnetized to the N pole.

Accordingly, between the Halbach array 720 and the magnet part 730, a magnetic field in a direction to repel each other is formed.

In the exemplary embodiment illustrated in (a) of FIG. 80, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 80, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach array 720 and the magnet part 730 is changed, the directions of the magnetic fields formed by the Halbach array 720 and the magnet part 730 become reversed. Accordingly, the path (A.P) of the generated electromagnetic force and arc is also formed to be reversed in the front-rear direction.

That is, in the energized situation as shown in (a) of FIG. 80, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 80, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 720 and the magnet part 730 or the direction of the current flowing through the DC relay 1, the arc path generation unit 700 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(8) Description of the Arc Path Generation Unit 800 According to Another Exemplary Embodiment of the Present Disclosure Hereinafter, the arc path generation unit 800 according to another exemplary embodiment of the present disclosure will be described in detail with reference to FIGS. 81 to 83.

Figure 81:
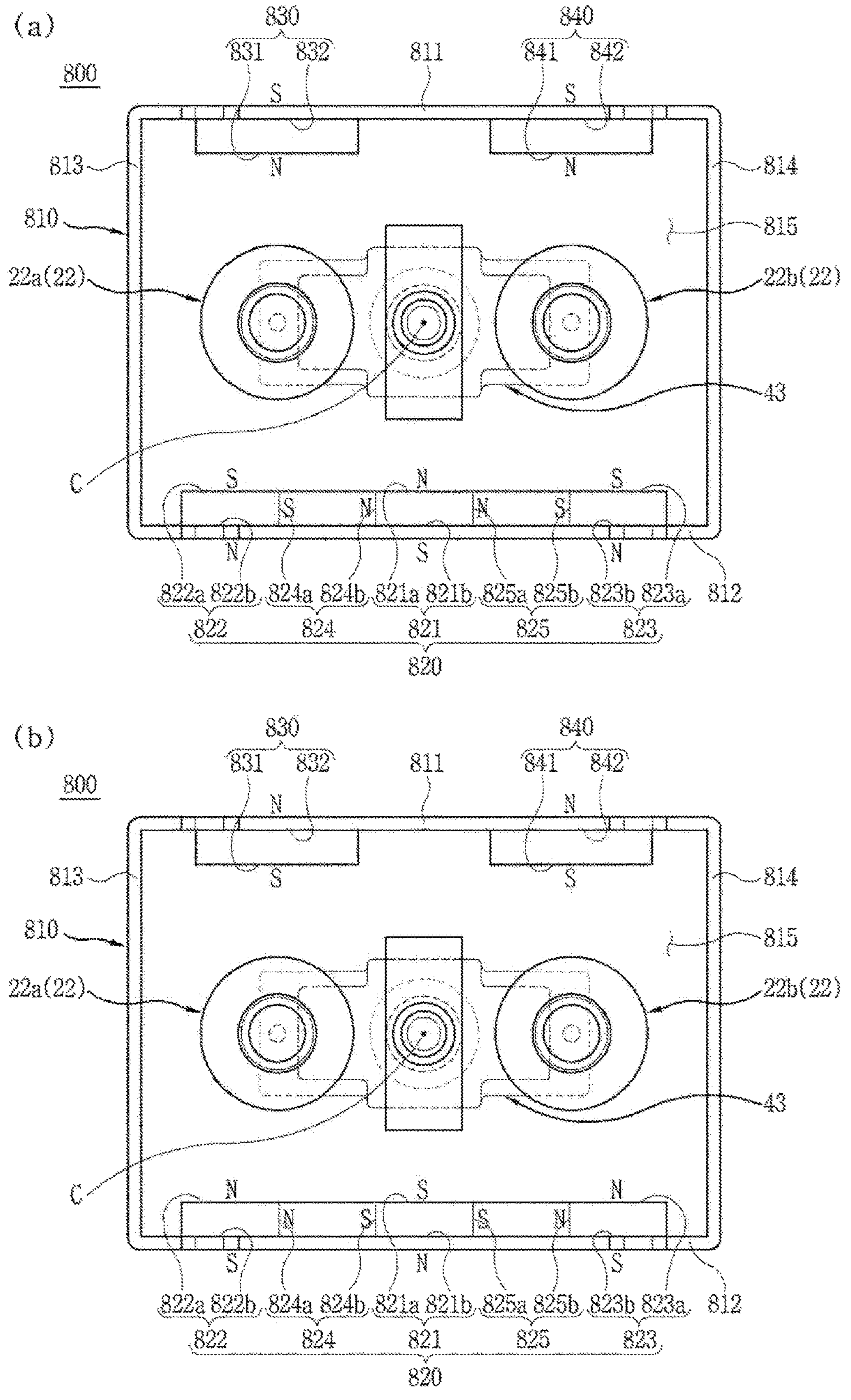
FIGS. 81 and 82 are conceptual diagrams illustrating the arc path generation unit according to still another exemplary embodiment of the present disclosure.
Figure 82:
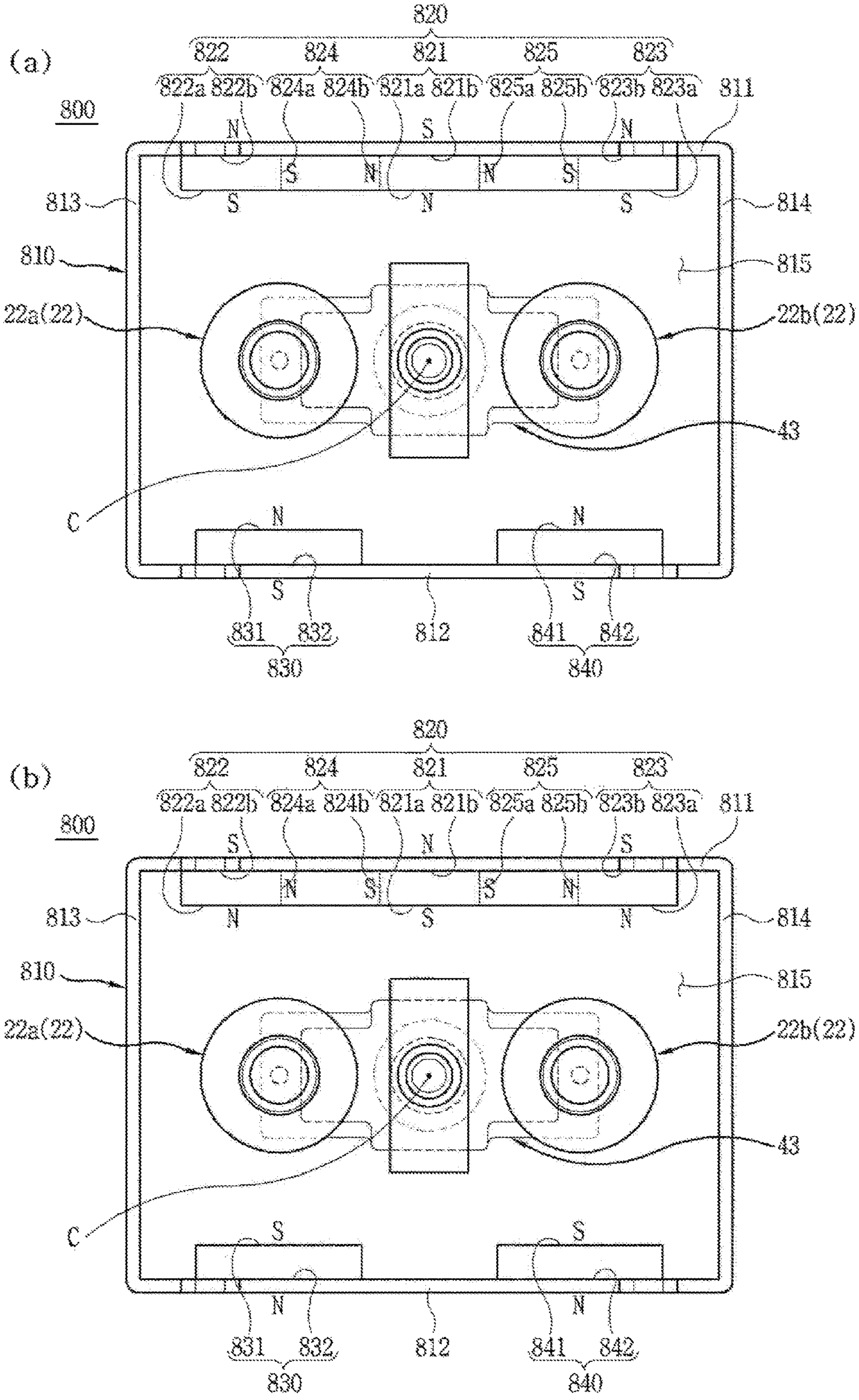

Referring to FIGS. 81 and 82, the arc path generation unit 800 according to the illustrated exemplary embodiment includes a magnetic frame 810, a Halbach array 820, a first magnet part 830 and a second magnet part 840.

The magnetic frame 810 according to the present exemplary embodiment has the same structure and function as the magnetic frame 810 according to the above-described exemplary embodiment. However, there is a difference in the arrangement method of the Halbach array 820, the first magnet part 830 and the second magnet part 840 disposed on the magnetic frame 810 according to the present exemplary embodiment.

Accordingly, the description of the magnetic frame 810 will be replaced with the description of the magnetic frame 810 according to the above-described exemplary embodiment.

In the illustrated exemplary embodiment, a plurality of magnetic materials constituting the Halbach array 820 are sequentially arranged side by side from left to right. That is, in the illustrated exemplary embodiment, the Halbach array 820 is formed to extend in the left-right direction.

The Halbach array 820 may form a magnetic field together with other magnetic materials. In the illustrated exemplary embodiment, the Halbach array 820 may form a magnetic field together with the first magnet part 830 and the second magnet part 840.

The Halbach array 820 may be positioned adjacent to any one surface of the first and second surfaces 811 and 812. In an exemplary embodiment, the Halbach array 820 may be coupled to the inner side of the any one surface (i.e., a direction toward the space part 815).

In the exemplary embodiment illustrated in FIG. 81, the Halbach array 820 is disposed on the inner side of the second surface 812, adjacent to the second surface 812, so as to face the first magnet part 830 and the second magnet part 840 which are disposed on the inner side of the first surface 811.

In the exemplary embodiment illustrated in FIG. 82, the Halbach array 820 is disposed on the inner side of the first surface 811, adjacent to the first surface 811, so as to face The first magnet part 830 and the second magnet part 840 which are positioned on the inner side of the second surface 812.

The Halbach array 820 may extend in the extending direction of the first surface 811 or the second surface 812, which is the left-right direction in the illustrated exemplary embodiment. The Halbach array 820 may be positioned near the center of the first surface 811 or the second surface 812.

In other words, the shortest distance between the Halbach array 820 and the third surface 813 and the shortest distance between the Halbach array 820 and the fourth surface 814 may be the same.

The Halbach array 820 is disposed to overlap the first and second magnet parts 830, 840 in a direction toward the space part 815 or the first and second magnet parts 830, 840, which is the front-rear direction in the illustrated exemplary embodiment. In an exemplary embodiment, the Halbach array 820 may extend longer than the first and second magnet parts 830, 840.

In addition, the Halbach array 820 is disposed to overlap the first fixed contact 22*a* and the second fixed contact 22*b* in the above direction.

Between the Halbach array 820 and the first and second magnet parts 830, 840, the space part 815 and the fixed contact 22 and the movable contact 43 accommodated in the space part 815 are positioned.

Specifically, the first fixed contact 22*a* is positioned between the Halbach array 820 and the first magnet part 830. In addition, a second fixed contact 22*b* is positioned between the Halbach array 820 and the second magnet part 840.

The Halbach array 820 may enhance the strength of the magnetic field formed by itself and the magnetic field formed with the first and second magnet parts 830, 840. Since the direction of the magnetic field formed by the Halbach array 820 and the process of strengthening the magnetic field are well-known techniques, the detailed description thereof will be omitted.

In the illustrated exemplary embodiment, the Halbach array 820 includes a first block 821, a second block 822, a third block 823, a fourth block 824 and a fifth block 825. It will be understood that a plurality of magnetic materials constituting the Halbach array 820 are each named blocks 821, 822, 823, 824, 825, respectively.

The first to fifth blocks 821, 822, 823, 824, 825 may be formed of a magnetic material. In an exemplary embodiment, the first to fifth blocks 821, 822, 823, 824, 825 may be provided as permanent magnets or electromagnets.

The first to fifth blocks 821, 822, 823, 824, 825 may be arranged side by side in one direction. In the illustrated exemplary embodiment, the first to fifth blocks 821, 822, 823, 824, 825 are arranged side by side in the extending direction of the first surface 811 or the second surface 812, that is, in the left-right direction.

The first to fifth blocks 821, 822, 823, 824, 825 are arranged side by side along the above direction. Specifically, in the first to fifth blocks 821, 822, 823, 824, 825, the first block 821 is disposed in the central portion.

The second block 822 is positioned on the leftmost side of the Halbach array 820, and the third block 823 is positioned on the rightmost side of the Halbach array 820. The fourth block 824 is positioned between the first block 821 and the second block 822. The fifth block 825 is located between the first block 821 and the third block 823.

In an exemplary embodiment, each of the blocks 821, 822, 823, 824, 825 adjacent to each other may contact each other.

Each of the blocks 821, 822, 823, 824, 825 includes a plurality of surfaces.

Specifically, the first block 821 includes a first inner surface 821*a* facing the space part 815 or the first magnet part 830 and the second magnet part 840 and a first outer surface 821*b* opposite to the space part 815 or the first magnet part 830 and the second magnet part 840.

The second block 822 includes a second inner surface 822*a* facing the space part 815 or the first magnet part 830 and the second magnet part 840 and a second outer surface 822*b* opposite the space part 815 or the first magnet part 830 and the second magnet part 840.

The third block 823 includes a third inner surface 823*a* facing the space part 815 or the first magnet part 830 and the second magnet part 840 and a third outer surface 823*b* opposite to the space part 815 or the first magnet part 830 and the second magnet part 840.

The fourth block 824 includes a fourth inner surface 824*a* facing the second block 822 and a fourth outer surface 824*b* facing the first block 821.

The fifth block 825 includes a fifth inner surface 825*a* facing the first block 821 and a fifth outer surface 825*b* facing the third block 823.

The plurality of surfaces of each of the blocks 821, 822, 823, 824, 825 may be magnetized according to a predetermined rule to constitute a Halbach array.

Specifically, the first inner surface 821*a*, the fourth outer surface 824*b* and the fifth inner surface 825*a* may be magnetized with the same polarity. In addition, the second to fourth inner surfaces 822*a*, 823*a*, 824*a*, the first outer surface 821*b* and the fifth outer surface 825*b* may be magnetized with a polarity different from the polarity.

In this case, the first inner surface 821*a* may be magnetized with the same polarity as the first opposing surface 831 of the first magnet part 830 and the second opposing surface 841 of the second magnet part 840.

Similarly, the second to fourth inner surfaces 822*a*, 823*a*, 824*a* may be magnetized with the same polarity as the first opposite surface 832 of the first magnet part 830 and the second opposite surface 842 of the second magnet part 840.

The first magnet part 830 forms a magnetic field by itself or with the Halbach array 820. The arc path (A.P) may be formed inside the arc chamber 21 by the magnetic field formed by the first magnet part 830.

The first magnet part 830 may be provided in any shape capable of forming a magnetic field by being magnetized. In an exemplary embodiment, the first magnet part 830 may be provided as a permanent magnet or an electromagnet.

The first magnet part 830 may be positioned adjacent to the other one surface of the first surface 811 and the second surface 812. In an exemplary embodiment, the first magnet part 830 may be coupled to the inner side of the other one surface (i.e., a direction toward the space part 815).

In the exemplary embodiment illustrated in FIG. 81, the first magnet part 830 is disposed on the inner side of the first surface 811, adjacent to the first surface 811, so as to face the Halbach array 820 which is disposed on the inner side of the second surface 812.

In the exemplary embodiment illustrated in FIG. 82, the first magnet part 830 is disposed on the inner side of the second surface 812, adjacent to the second surface 812, so as to face the Halbach array 820 which is disposed on the inner side of the first surface 811.

The first magnet part 830 may be positioned to be biased toward any one of the third surface 813 and the fourth surface 814. In the illustrated exemplary embodiment, the first magnet part 830 is positioned to be biased toward the third surface 813.

The first magnet part 830 may extend in the extending direction of the first surface 811 or the second surface 812, which is the left-right direction in the illustrated exemplary embodiment.

The first magnet part 830 may be disposed side by side with the second magnet part 840 in the extending direction thereof, which is the left-right direction in the illustrated exemplary embodiment. In an exemplary embodiment, the first magnet part 830 and the second magnet part 840 may contact each other.

Between the first magnet part 830 and the Halbach array 820, the space part 815 and the fixed contact 22 and the movable contact 43 accommodated in the space part 815 are positioned.

In the illustrated exemplary embodiment, the first fixed contact 22*a* is positioned between the first magnet part 830 and the Halbach array 820.

The first magnet part 830 is disposed to overlap the Halbach array 820 in a direction toward the space part 815 or the fixed contacts 22*a*, 22*b*, which is the front-rear direction in the illustrated exemplary embodiment, respectively.

The first magnet part 830 includes a plurality of surfaces.

Specifically, the first magnet part 830 includes a first opposing surface 831 facing the space part 815 or the Halbach array 820 and a first opposite surface 832 opposite to the space part 815 or the Halbach array 820.

The first opposing surface 831 and the first opposite surface 832 may be magnetized according to a predetermined rule.

Specifically, the first opposing surface 831 may be magnetized with the same polarity as the first inner surface 821*a* of the Halbach array 820. In addition, the first opposing surface 831 may be magnetized with a polarity different from that of the second inner surface 822*a* and the third inner surface 823*a* of the Halbach array 820.

In addition, the first opposing surface 831 may be magnetized with the same polarity as the second opposing surface 841 of the second magnet part 840.

In addition, the first opposite surface 842 may be magnetized with the same polarity as the second to fourth inner surfaces 822*a*, 823*a*, 824*a* of the Halbach array 820. Furthermore, the first opposite surface 832 may be magnetized with the same polarity as the second opposite surface 842 of the second magnet part 840.

The second magnet part 840 forms a magnetic field by itself or with the Halbach array 820. The arc path (A.P) may be formed inside the arc chamber 21 by the magnetic field formed by the second magnet part 840.

The second magnet part 840 may be provided in any shape capable of forming a magnetic field by being magnetized. In an exemplary embodiment, the second magnet part 840 may be provided as a permanent magnet or an electromagnet.

The second magnet part 840 may be positioned adjacent to the other one surface of the first surface 811 and the second surface 812. In an exemplary embodiment, the second magnet part 840 may be coupled to the inner side of the other one surface (i.e., a direction toward the space part 815).

In the exemplary embodiment illustrated in FIG. 81, the second magnet part 840 is disposed on the inner side of the first surface 811, adjacent to the first surface 811, so as to face the Halbach array 820 which is disposed on the inner side of the second surface 812.

In the exemplary embodiment illustrated in FIG. 82, the second magnet part 840 is disposed on the inner side of the second surface 812, adjacent to the second surface 812, so as to face the Halbach array 820 which is disposed on the inner side of the first surface 811.

The second magnet part 840 may be positioned to be biased toward the other of the third surface 813 and the fourth surface 814. In the illustrated exemplary embodiment, the second magnet part 840 is positioned to be biased toward the fourth surface 814.

The second magnet part 840 may extend in the extending direction of the first surface 811 or the second surface 812, which is the left-right direction in the illustrated exemplary embodiment.

The second magnet part 840 may be arranged side by side with the first magnet part 830 in the extending direction thereof, which is the left-right direction in the illustrated exemplary embodiment. In an exemplary embodiment, the second magnet part 840 and the first magnet part 830 may contact each other.

Between the second magnet part 840 and the Halbach array 820, the space part 815 and the fixed contact 22 and the movable contact 43 accommodated in the space part 815 are positioned.

In the illustrated exemplary embodiment, the second fixed contact 22*b* is positioned between the second magnet part 840 and the Halbach array 820.

The second magnet part 840 is disposed to overlap the Halbach array 820 in a direction toward the space part 815 or the fixed contacts 22*a*, 22*b*, which is in the front-rear direction in the illustrated exemplary embodiment, respectively.

The second magnet part 840 includes a plurality of surfaces.

Specifically, the second magnet part 840 includes a second opposing surface 841 facing the space part 815 or the Halbach array 820 and a second opposite surface 842 opposite to the space part 815 or the Halbach array 820.

The second opposing surface 841 and the second opposite surface 842 may be magnetized according to a predetermined rule.

Specifically, the second opposing surface 841 may be magnetized with the same polarity as the first inner surface 821*a* of the Halbach array 820. Similarly, the second opposing surface 841 may be magnetized with a polarity different from that of the second to fourth inner surfaces 822*a*, 823*a*, 824*a* of the Halbach array 820.

In addition, the second opposing surface 841 may be magnetized with the same polarity as the first opposing surface 831 of the first magnet part 830.

In addition, the second opposite surface 842 may be magnetized with the same polarity as the second to fourth inner surfaces 822*a*, 823*a*, 824*a* of the Halbach array 820. Similarly, the first inner surface 821*a* of the Halbach array 820 may be magnetized with a different polarity.

In addition, the second opposite surface 842 may be magnetized with the same polarity as the first opposite surface 832 of the first magnet part 830.

Hereinafter, the arc path (A.P) formed by the arc path generation unit 800 according to the present exemplary embodiment will be described in detail with reference to FIG. 83.

Figure 83:
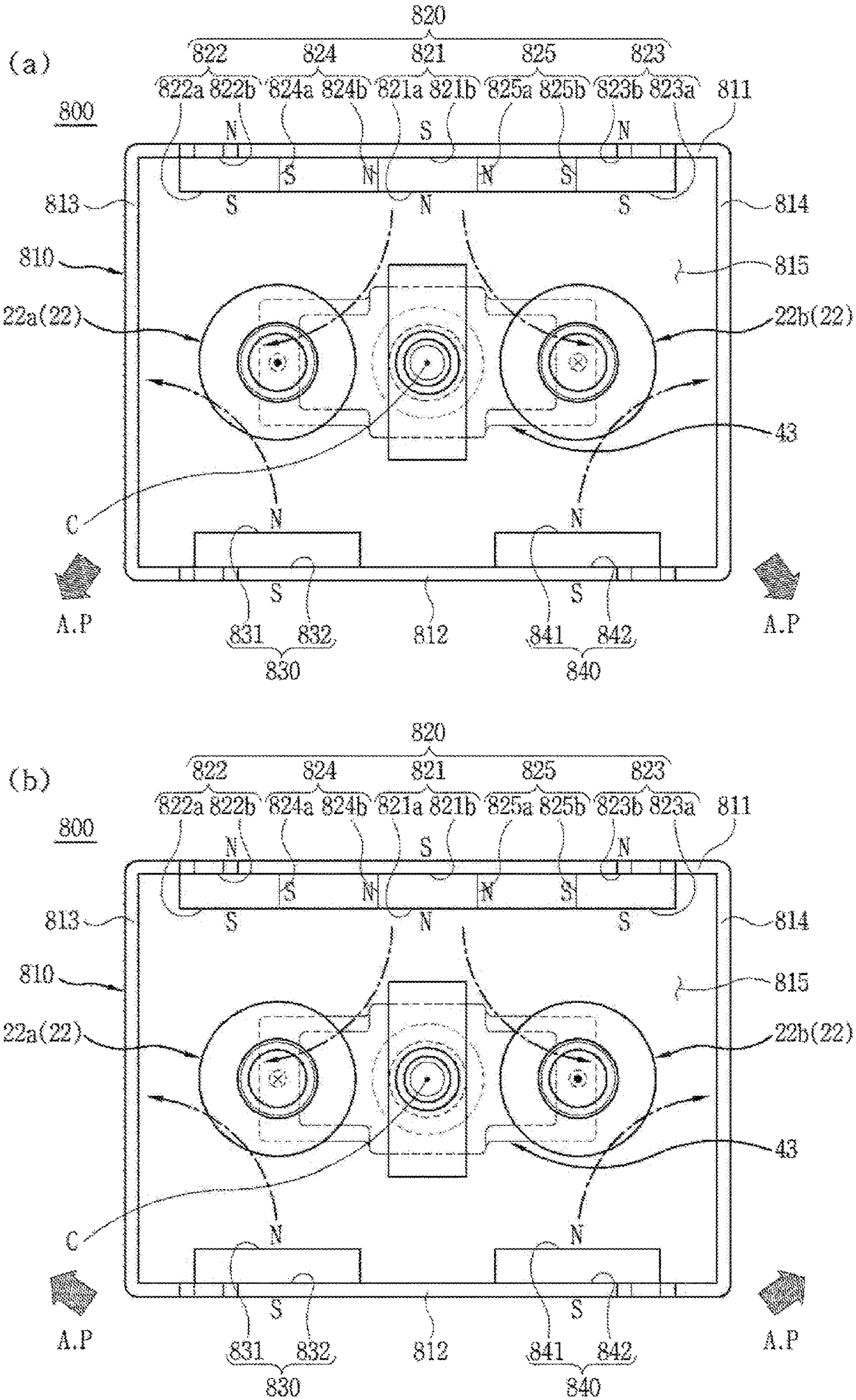
FIG. 83 is a conceptual diagram illustrating the paths of a magnetic field and an arc formed by the arc path generation unit according to the exemplary embodiment shown in FIGS. 81 and 82.

Referring to FIG. 83, the first inner surface 821*a* of the Halbach array 820 is magnetized to the N pole. In addition, the second and third inner surfaces 822*a*, 823*a* of the Halbach array 820 are magnetized to the S pole.

Accordingly, in the Halbach array 820, a magnetic field in a direction from the first inner surface 821*a* toward the second and third inner surfaces 822*a*, 823*a* is formed.

In addition, according to the predetermined rule, the first opposing surface 831 of the first magnet part 830 and the second opposing surface 841 of the second magnet part 840 are magnetized to the N pole.

Accordingly, between the Halbach array 820 and the first and second magnet parts 830, 840, a magnetic field in a direction to repel each other is formed.

In the exemplary embodiment illustrated in (a) of FIG. 83, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 83, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach array 820 is changed, the direction of the magnetic field formed by the Halbach array 820 becomes reversed. Accordingly, the path (A.P) of the generated electromagnetic force and arc is also formed to be reversed in the front-rear direction.

That is, in the energized situation as show in (a) of FIG. 83, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 83, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 820 or the direction of the current flowing through the DC relay 1, the arc path generation unit 800 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(9) Description of the Arc Path Generation Unit 900 According to Another Exemplary Embodiment of the Present Disclosure Hereinafter, the arc path generation unit 900 according to another exemplary embodiment of the present disclosure will be described in detail with reference to FIGS. 84 to 86.

Figure 84:
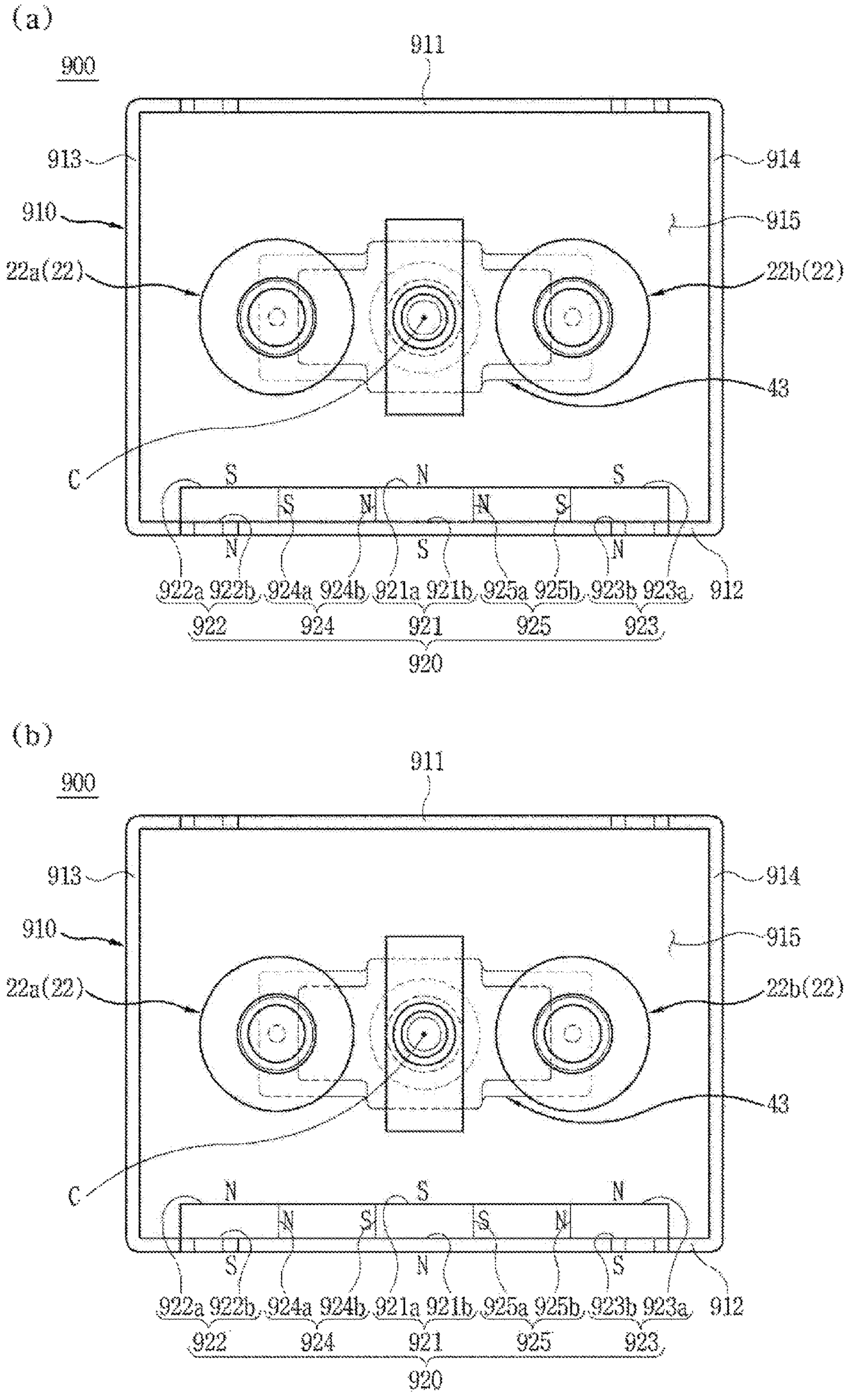
FIGS. 84 and 85 are conceptual diagrams illustrating the arc path generation unit according to another exemplary embodiment of the present disclosure.
Figure 85:
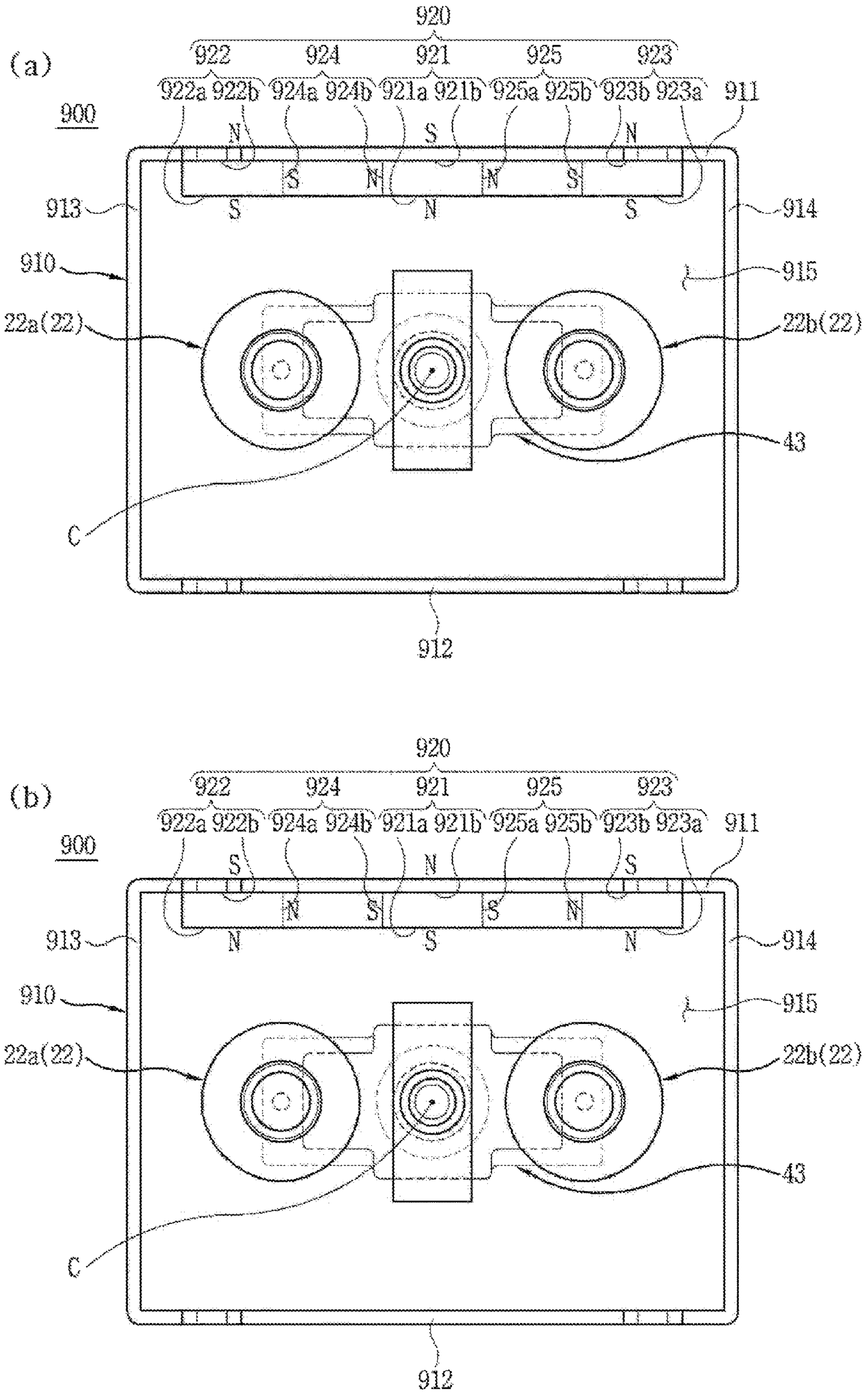

Referring to FIGS. 84 and 85, the arc path generation unit 900 according to the illustrated exemplary embodiment includes a magnetic frame 910 and a Halbach array 920.

The magnetic frame 910 according to the present exemplary embodiment has the same structure and function as the magnetic frame 910 according to the above-described exemplary embodiment. However, there is a difference in the arrangement method of the Halbach array 920 disposed on the magnetic frame 910 according to the present exemplary embodiment.

Accordingly, the description of the magnetic frame 910 will be replaced with the description of the magnetic frame 910 according to the above-described exemplary embodiment.

In the illustrated exemplary embodiment, a plurality of magnetic materials constituting the Halbach array 920 are sequentially arranged side by side from left to right. That is, in the illustrated exemplary embodiment, the Halbach array 920 is formed to extend in the left-right direction.

The Halbach array 920 may form a magnetic field together with other magnetic materials.

The Halbach array 920 may be positioned adjacent to any one surface of the first and second surfaces 911 and 912. In an exemplary embodiment, the Halbach array 920 may be coupled to the inner side of the any one surface (i.e., a direction toward the space part 915).

In the exemplary embodiment illustrated in FIG. 84, the Halbach array 920 is disposed on the inner side of the second surface 912, adjacent to the second surface 912, so as to face the first surface 911.

In the exemplary embodiment illustrated in FIG. 85, the Halbach array 920 is disposed on the inner side of the first surface 911, adjacent to the first surface 911, so as to face the second surface 912.

The Halbach array 920 may extend in the extending direction of the first surface 911 or the second surface 912, which is the left-right direction in the illustrated exemplary embodiment. The Halbach array 920 may be located near the center of the first surface 911 or the second surface 912.

In other words, the shortest distance between the Halbach array 920 and the third surface 913 and the shortest distance between the Halbach array 920 and the fourth surface 914 may be the same.

The Halbach array 920 is disposed to overlap the first fixed contact 22*a* and the second fixed contact 22*b* in a direction toward the space part 915, which is the front-rear direction in the illustrated exemplary embodiment.

Between the Halbach array 920 and the other one surface of the first surface 911 and the second surface 912, the space part 915 and the fixed contact 22 and the movable contact 43 accommodated in the space part 915 are positioned.

The Halbach array 920 may enhance the strength of the magnetic field formed by itself. Since the direction of the magnetic field formed by the Halbach array 920 and the process of strengthening the magnetic field are well-known techniques, the detailed description thereof will be omitted.

In the illustrated exemplary embodiment, the Halbach array 920 includes a first block 921, a second block 922, a third block 923, a fourth block 924 and a fifth block 925. It will be understood that a plurality of magnetic materials constituting the Halbach array 920 are each named as blocks 921, 922, 923, 924, 925, respectively.

The first to fifth blocks 921, 922, 923, 924, 925 may be formed of a magnetic material. In an exemplary embodiment, the first to fifth blocks 921, 922, 923, 924, 925 may be provided as permanent magnets or electromagnets.

The first to fifth blocks 921, 922, 923, 924, 925 may be arranged side by side in one direction. In the illustrated exemplary embodiment, the first to fifth blocks 921, 922, 923, 924, 925 are arranged side by side in the extending direction of the first surface 911 or the second surface 912, that is, in the left-right direction.

The first to fifth blocks 921, 922, 923, 924, 925 are arranged side by side along the above direction. Specifically, in the first to fifth blocks 921, 922, 923, 924, 925, the first block 921 is disposed in the central portion.

The second block 922 is positioned on the leftmost side of the Halbach array 920, and the third block 923 is positioned on the rightmost side of the Halbach array 920. The second block 922 is positioned between the first block 921 and the second block 922. The fifth block 925 is positioned between the first block 921 and the third block 923.

In an exemplary embodiment, each of the blocks 921, 922, 923, 924, 925 adjacent to each other may contact each other.

Each of the blocks 921, 922, 923, 924, 925 includes a plurality of surfaces.

Specifically, the first block 921 includes a first inner surface 921*a* facing the space part 915 and a first outer surface 921*b* opposite to the space part 915.

The second block 922 includes a second inner surface 922*a* facing the space part 915 and a second outer surface 922*b* opposite to the space part 915.

The third block 923 includes a third inner surface 923*a* facing the space part 915 and a third outer surface 923*b* opposite to the space part 915.

The fourth block 924 includes a fourth inner surface 924*a* facing the second block 922 and a fourth outer surface 924*b* facing the first block 921.

The fifth block 925 includes a fifth inner surface 925*a* facing the first block 921 and a fifth outer surface 925*b* facing the third block 923.

The plurality of surfaces of each of the blocks 921, 922, 923, 924, 925 may be magnetized according to a predetermined rule to constitute a Halbach array.

Specifically, the first inner surface 921*a*, the fourth outer surface 924*b* and the fifth inner surface 925*a* may be magnetized with the same polarity. In addition, the second to fourth inner surfaces 922*a*, 923*a*, 924*a*, the first outer surface 921*b* and the fifth outer surface 925*b* may be magnetized with a polarity different from the polarity.

Hereinafter, the arc path (A.P) formed by the arc path generation unit 900 according to the present exemplary embodiment will be described in detail with reference to FIG. 86.

Referring to FIG. 86, the first inner surface 921*a* of the Halbach array 920 is magnetized to the N pole. In addition, the second and third inner surfaces 922*a*, 923*a* of the Halbach array 920 are magnetized to the S pole.

Accordingly, in the Halbach array 920, a magnetic field in a direction from the first inner surface 921*a* toward the second and third inner surfaces 922*a*, 923*a* is formed. In this case, the magnetic field also proceeds toward the third surface 913 and the fourth surface 914.

In the exemplary embodiment illustrated in (a) of FIG. 86, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 86, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the Halbach array 920 is changed, the direction of the magnetic field formed by the Halbach array 920 becomes reversed. Accordingly, the path (A.P) of the generated electromagnetic force and arc is also formed to be reversed in the front-rear direction.

That is, in the energized situation as shown in (a) of FIG. 86, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 86, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Therefore, regardless of the polarity of the Halbach array 920 or the direction of the current flowing through the DC relay 1, the arc path generation unit 900 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

Although the present disclosure has been described above with reference to the preferred exemplary embodiments of the present disclosure, it will be understood that those of ordinary skill in the art can variously modify and change the present disclosure within the scope without departing from the spirit and scope of the present disclosure described in the claims below.

The invention claimed is:

1. An arc path generation unit, comprising:
- a magnetic frame having a space part in which a fixed contact and a movable contact are accommodated; and
- a Halbach array which is positioned in the space part of the magnetic frame to form a magnetic field in the space part, and a magnet part which is provided separately from the Halbach array,
- wherein the space part has a length in one direction formed to be longer than a length in the other direction,
- wherein the magnetic frame comprises:
  - a first surface and a second surface which extend in the one direction and are disposed to face each other to enclose a portion of the space part; and
  - a third surface and a fourth surface which extend in the other direction, are continuous with the first surface and the second surface, respectively, and are disposed to face each other to enclose the remaining portion of the space part,
- wherein the Halbach array comprises a plurality of blocks which are arranged side by side in the one direction and formed of a magnetic material, and is positioned adjacent to any one or more surfaces of the first surface and the second surface,
- wherein a plurality of magnet parts are provided such that at least any one of the plurality of magnet parts is positioned adjacent to the third surface, and
- wherein at least one other of the plurality of magnet parts is positioned adjacent to the fourth surface.

2. The arc path generation unit of claim 1, wherein the magnet part comprises:
- a first magnet part and a second magnet part which are positioned adjacent to any one surface of the third surface and the fourth surface and arranged side by side with each other in the other direction;
- a third magnet part and a fourth magnet part which are positioned adjacent to the other one surface of the third surface and the fourth surface and arranged side by side with each other in the other direction; and
- a fifth magnet part which is positioned adjacent to the other one surface of the first surface and the second surface and arranged to face the Halbach array with the space part therebetween.

3. The arc path generation unit of claim 2, wherein each surface on which any one block of a plurality of blocks and the fifth magnet part face each other is magnetized with the same polarity, and
- wherein each surface on which the first magnet part and the second magnet part face each other, and each surface on which the third magnet part and the fourth magnet part face each other are magnetized with a polarity different from the polarity.

4. The arc path generation unit of claim 3, wherein a plurality of blocks of the Halbach array comprise:
- a first block which is positioned to be biased toward any one surface of the third surface and the fourth surface;
- a third block which is positioned to be biased toward the other one surface of the third surface and the fourth surface; and
- a second block which is positioned between the first block and the third block,
- wherein a surface of the surfaces of the first block facing the second block, a surface of the surfaces of the third block facing the second block and a surface of the surfaces of the second block facing the fifth magnet are magnetized with the same polarity as the polarity.

5. The arc path generation unit of claim 3, wherein a plurality of blocks of the Halbach array comprise:
- a first block which is to be biased toward any one surface of the third surface and the fourth surface;
- a fifth block which is positioned to be biased toward the other one surface of the third surface and the fourth surface; and
- a second block, a third block and a fourth block which are positioned between the first block and the fifth block and sequentially arranged in a direction from the first block to the fifth block,
- wherein a surface of the surfaces of the second block facing the third block, a surface of the surfaces of the fourth block facing the third block and a surface of the surfaces of the third block facing the fifth magnet part are magnetized with the same polarity as the polarity.

6. The arc path generation unit of claim 1, wherein the Halbach array comprises:

a first Halbach array which is positioned adjacent to any one surface of the first surface and the second surface; and a second Halbach array which is positioned adjacent to the other one surface of the first surface and the second surface, and disposed to face the first Halbach array with the space part therebetween, and wherein the magnet part comprises:

a first magnet part and a second magnet part which are positioned adjacent to any one surface of the third surface and the fourth surface and arranged side by side with each other in the other direction; and a third magnet part and a fourth magnet part which are positioned adjacent to the other one surface of the third surface and the fourth surface and arranged side by side with each other in the other direction.

7. The arc path generation unit of claim 6, wherein each surface on which any one block of the plurality of blocks comprised in the first Halbach array and any one block of the plurality of blocks comprised in the second Halbach array face each other is magnetized with the same polarity, and wherein each surface on which the first magnet part and the second magnet part face each other, and each surface on which the third magnet part and the fourth magnet part face each other are magnetized with a polarity different from the polarity.

8. The arc path generation unit of claim 7, wherein the first Halbach array and the second Halbach array respectively comprise:

a first block which is positioned to be biased toward any one surface of the third surface and the fourth surface;

a fifth block which is positioned to be biased toward the other one surface of the third surface and the fourth surface; and a second block, a third block and a fourth block which are positioned between the first block and the fifth block and sequentially arranged in a direction from the first block to the fifth block, wherein in the first Halbach array, a surface of the surfaces of the second block facing the third block, a surface of the surfaces of the fourth block facing the third block and a surface of the surfaces of the third block facing the second Halbach array are magnetized with the same polarity as the polarity, and wherein in the second Halbach array, a surface of the surfaces of the second block facing the third block, a surface of the surfaces of the fourth block facing the third block and a surface of the surfaces of the third block facing the first Halbach array are magnetized with a polarity different from the polarity.

9. The arc path generation unit of claim 7, wherein the first Halbach array and the second Halbach array respectively comprise:

a first block which is positioned to be biased toward any one surface of the third surface and the fourth surface;

a third block which is positioned to be biased toward the other one surface of the third surface and the fourth surface; and a second block which is positioned between the first block and the third block, wherein in the first Halbach array, a surface of the surfaces of the first block facing the second block, a surface of the surfaces of the third block facing the second block and a surface of the surfaces of the second block facing the second Halbach array are magnetized with the same polarity as the polarity, and wherein in the second Halbach array, a surface of the surfaces of the first block facing the second block, a surface of the surfaces of the third block facing the second block and a surface of the surfaces of the second block facing the first Halbach array are magnetized with a polarity different from the polarity.

10. The arc path generation unit of claim 7, wherein the first Halbach array comprises:

a first block which is positioned to be biased toward any one surface of the third surface and the fourth surface;

a third block which is positioned to be biased toward the other one surface of the third surface and the fourth surface; and a second block which is positioned between the first block and the third block, wherein the second Halbach array comprises:

a first block which is positioned to be biased toward any one surface of the third surface and the fourth surface;

a fifth block which is positioned to be biased toward the other one surface of the third surface and the fourth surface; and a second block, a third block and a fourth block which are positioned between the first block and the fifth block and sequentially arranged in a direction from the first block to the fifth block, wherein in the first Halbach array, a surface of the surfaces of the first block facing the second block, a surface of the surfaces of the third block facing the second block and a surface of the surfaces of the second block facing the second Halbach array are magnetized with the same polarity as the polarity, and wherein in the second Halbach array, a surface of the surfaces of the second block facing the third block, a surface of the surfaces of the fourth block facing the third block and a surface of the surfaces of the third block facing the first Halbach array are magnetized with a polarity different from the polarity.

11. The arc path generation unit of claim 1, wherein the Halbach array comprises:

a first Halbach array which is positioned adjacent to any one surface of the first surface and the second surface; and a second Halbach array which is positioned adjacent to the other one surface of the first surface and the second surface, and disposed to face the first Halbach array with the space part therebetween, and wherein the magnet part comprises:

a first magnet part which is positioned adjacent to any one surface of the third surface and the fourth surface, and is positioned to be biased toward any one surface of the first surface and the second surface; and a second magnet part which is positioned adjacent to the other one surface of the third surface and the fourth surface, and is positioned to be biased toward the other one surface of the first surface and the second surface.

12. The arc path generation unit of claim 11, wherein each surface on which any one block of the plurality of blocks comprised in the first Halbach array and any one block of the plurality of blocks comprised in the second Halbach array face each other is magnetized with the same polarity, and wherein a surface of the first surface and the second surface among the surfaces of the first magnet part facing the other one surface, and a surface of the first surface and the second surface among the surfaces of the second magnet part facing the any one surface are magnetized with a polarity different from the polarity.

13. The arc path generation unit of claim 12, wherein the first Halbach array and the second Halbach array respectively comprise:

a first block which is positioned to be biased toward any one surface of the third surface and the fourth surface;

a third block which is positioned to be biased toward the other one surface of the third surface and the fourth surface; and a second block which is positioned between the first block and the third block, wherein in the first Halbach array, a surface of the surfaces of the first block facing the second block, a surface of the surfaces of the third block facing the second block and a surface of the surfaces of the second block facing the second Halbach array are magnetized with the same polarity as the polarity, and wherein in the second Halbach array, a surface of the surfaces of the first block facing the second block, a surface of the surfaces of the third block facing the second block and a surface of the surfaces of the second block facing the first Halbach array are magnetized with a polarity different from the polarity.

14. The arc path generation unit of claim 12, wherein the first Halbach array and the second Halbach array respectively comprise:

a first block which is positioned to be biased toward any one surface of the third surface and the fourth surface;

a fifth block which is positioned to be biased toward the other one surface of the third surface and the fourth surface; and a second block, a third block and a fourth block which are positioned between the first block and the fifth block and sequentially arranged in a direction from the first block to the fifth block, wherein in the first Halbach array, a surface of the surfaces of the second block facing the third block, a surface of the surfaces of the fourth block facing the third block and a surface of the surfaces of the third block facing the second Halbach array are magnetized with the same polarity as the polarity, and wherein in the second Halbach array, a surface of the surfaces of the second block facing the third block, a surface of the surfaces of the fourth block facing the third block and a surface of the surfaces of the third block facing the first Halbach array are magnetized with a polarity different from the polarity.

15. A direct current relay, comprising:

a plurality of fixed contacts provided to be spaced apart from each other in one direction;

a movable contact contacting or spaced apart from the fixed contact;

a magnetic frame having a space part in which the fixed contact and the movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array comprises a plurality of blocks which are arranged side by side in the one direction and formed of a magnetic material, and is positioned adjacent to any one or more surfaces of the first surface and the second surface, wherein a plurality of magnet parts are provided such that at least one of the plurality of magnet parts is positioned adjacent to the third surface, and wherein at least one other of the plurality of magnet parts is positioned adjacent to the fourth surface.

16. The direct current relay of claim 15, wherein the magnet part comprises:

a first magnet part and a second magnet part which are positioned adjacent to any one surface of the third surface and the fourth surface and arranged side by side with each other in the other direction;

a third magnet part and a fourth magnet part which are positioned adjacent to the other one surface of the third surface and the fourth surface and arranged side by side with each other in the other direction; and a fifth magnet part which is positioned adjacent to the other one surface of the first surface and the second surface and arranged to face the Halbach array with the space part therebetween, wherein each surface on which any one block of a plurality of blocks and the fifth magnet part face each other is magnetized with the same polarity, and wherein each surface on which the first magnet part and the second magnet part face each other, and each surface on which the third magnet part and the fourth magnet part face each other are magnetized with a polarity different from the polarity.

17. The direct current relay of claim 15, wherein the Halbach array comprises:

a first Halbach array which is positioned adjacent to any one surface of the first surface and the second surface; and a second Halbach array which is positioned adjacent to the other one surface of the first surface and the second surface, and disposed to face the first Halbach array with the space part therebetween, and wherein the magnet part comprises:

a first magnet part and a second magnet part which are positioned adjacent to any one surface of the third surface and the fourth surface and arranged side by side with each other in the other direction; and a third magnet part and a fourth magnet part which are positioned adjacent to the other one surface of the third surface and the fourth surface and arranged side by side with each other in the other direction, wherein each surface on which any one block of the plurality of blocks comprised in the first Halbach array and any one block of the plurality of blocks comprised in the second Halbach array face each other is magnetized with the same polarity, and wherein each surface on which the first magnet part and the second magnet part face each other, and each surface on which the third magnet part and the fourth magnet part face each other are magnetized with a polarity different from the polarity.

18. The direct current relay of claim 15, wherein the Halbach array comprises:

a first Halbach array which is positioned adjacent to any one surface of the first surface and the second surface; and a second Halbach array which is positioned adjacent to the other one surface of the first surface and the second surface, and disposed to face the first Halbach array with the space part therebetween, and wherein the magnet part comprises:

a first magnet part and a second magnet part which are positioned adjacent to any one surface of the third surface and the fourth surface and arranged side by side with each other in the other direction; and a third magnet part and a fourth magnet part which are positioned adjacent to the other one surface of the third surface and the fourth surface and arranged side by side with each other in the other direction, wherein each surface on which any one block of the plurality of blocks comprised in the first Halbach array and any one block of the plurality of blocks comprised in the second Halbach array face each other is magnetized with the same polarity, and wherein a surface of the surfaces of the first magnet part facing the other one surface of the first surface and the second surface, and a surface of the surfaces of the second magnet part facing the any one surface of the first surface and the second surface are magnetized with a polarity different from the polarity.

19. An arc path generation unit, comprising:

a magnetic frame having a space part in which a plurality of fixed contacts and a plurality of movable contacts are accommodated; and a Halbach array which is positioned in the space part of the magnetic frame to form a magnetic field in the space part, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array comprises:

a first Halbach array comprising a plurality of blocks that are arranged side by side in the one direction and formed of a magnetic material, and which is arranged adjacent to any one surface of the first surface and the second surface; and a second Halbach array comprising a plurality of blocks that are arranged side by side in the one direction and formed of a magnetic material, and which is arranged adjacent to the other one surface of the first surface and the second surface, and wherein the first Halbach array and the second Halbach array are arranged to overlap any one or more of the plurality of fixed contacts along the other direction, respectively.

20. The arc path generation unit of claim 19, wherein each surface on which the first Halbach array and the second Halbach array face each other is magnetized with the same polarity.

21. The arc path generation unit of claim 19, wherein the first Halbach array comprises:

a second block which is positioned to be biased toward any one surface of the third surface and the fourth surface;

a third block which is positioned to be biased toward the other one surface of the third surface and the fourth surface; and a first block which is positioned between the second block and the third block, and wherein the second Halbach array comprises:

a second block which is positioned to be biased toward the any one surface of the third surface and the fourth surface;

a third block which is positioned to be biased toward the other one surface of the third surface and the fourth surface; and a first block which is positioned between the second block and the third block.

22. The arc path generation unit of claim 21, wherein each surface on which the first block of the first Halbach array and the first block of the second Halbach array face each other is magnetized with the same polarity.

23. The arc path generation unit of claim 19, wherein the first Halbach array comprises:

a second block which is positioned to be biased toward any one surface of the third surface and the fourth surface;

a third block which is positioned to be biased toward the other one surface of the third surface and the fourth surface;

a first block which is positioned between the second block and the third block;

a fourth block which is positioned between the first block and the second block; and a fifth block which is positioned between the first block and the third block, and wherein the second Halbach array comprises:

a second block which is positioned to be biased toward the any one of the third surface and the fourth surface;

a third block which is positioned to be biased toward the other one surface of the third surface and the fourth surface;

a first block which is positioned between the second block and the third block;

a fourth block which is positioned between the first block and the second block; and a fifth block which is positioned between the first block and the third block.

24. The arc path generation unit of claim 23, wherein each surface on which the first block of the first Halbach array and the first block of the second Halbach array face each other is magnetized with the same polarity, wherein each surface on which the second block of the first Halbach array and the second block of the second Halbach array face each other is magnetized with a polarity different from the polarity, and wherein each surface on which the third block of the first Halbach array and the third block of the second Halbach array face each other is magnetized with a polarity different from the polarity.

25. The arc path generation unit of claim 19, wherein the first Halbach array comprises:

a second block which is positioned to be biased toward any one surface of the third surface and the fourth surface;

a third block which is positioned to be biased toward the other one surface of the third surface and the fourth surface; and a first block which is positioned between the second block and the third block, wherein the second Halbach array comprises:

a second block which is positioned to be biased toward the any one surface of the third surface and the fourth surface;

a third block which is positioned to be biased toward the other one surface of the third surface and the fourth surface;

a first block which is positioned between the second block and the third block;

a fourth block which is positioned between the first block and the second block; and a fifth block which is positioned between the first block and the third block, and wherein the first Halbach array is positioned to be biased toward any one surface of the third surface and the fourth surface.

26. The arc path generation unit of claim 25, wherein each surface on which the first block of the first Halbach array and the first block of the second Halbach array face each other is magnetized with the same polarity, and wherein each surface on which the second block of the second Halbach array faces the first Halbach array, and each surface on which the third block of the second Halbach array faces the first Halbach array are magnetized with a polarity different from the polarity.

27. An arc path generation unit, comprising:

a magnetic frame having a space part in which a plurality of fixed contacts and a plurality of movable contacts are accommodated; and a Halbach array which is positioned in the space part of the magnetic frame to form a magnetic field in the space part, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array comprises:

a first Halbach array comprising a plurality of blocks that are arranged side by side in the one direction and formed of a magnetic material, and which is arranged adjacent to any one surface of the first surface and the second surface; and a second Halbach array comprising a plurality of blocks that are arranged side by side in the one direction and formed of a magnetic material, and which is arranged adjacent to the other one surface of the first surface and the second surface, and is positioned to be biased toward the other one surface of the third surface and the fourth surface.

28. The arc path generation unit of claim 27, wherein each surface on which the first Halbach array and the second Halbach array face each other is magnetized with the same polarity.

29. The arc path generation unit of claim 27, wherein the first Halbach array comprises:

a first block which is arranged to overlap the second Halbach array along the other direction; and a second block which is positioned to be biased toward the other one surface of the third surface and the fourth surface, and wherein the second Halbach array comprises:

a first block which is arranged to overlap the first Halbach array along the other direction; and a second block which is positioned to be biased toward the any one surface of the third surface and the fourth surface.

30. The arc path generation unit of claim 29, wherein each surface on which the first block of the first Halbach array and the first block of the second Halbach array face each other is magnetized with the same polarity.

31. The arc path generation unit of claim 27, wherein the first Halbach array comprises:

a second block which is positioned to be biased toward the any one surface of the third surface and the fourth surface;

a third block which is positioned to be biased toward the other one surface of the third surface and the fourth surface; and a first block which is positioned between the second block and the third block, wherein the second Halbach array comprises:

a second block which is positioned to be biased toward the other one surface of the third surface and the fourth surface;

a third block which is positioned to be biased toward the any one surface of the third surface and the fourth surface; and a first block which is positioned between the second block and the third block, wherein the first Halbach array is arranged to overlap any one of the plurality of fixed contacts along the other direction, and wherein the second Halbach array is arranged to overlap the other one of the plurality of fixed contacts along the other direction.

32. The arc path generation unit of claim 31, wherein each surface of the surfaces of the first block of the first Halbach array facing the space part and each surface of the surfaces of the first block of the second Halbach array facing the space part are magnetized with the same polarity.

33. A direct current relay, comprising:

a plurality of fixed contacts provided to be spaced apart from each other in one direction;

a movable contact contacting or spaced apart from the fixed contact;

a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array comprises:

a first Halbach array comprising a plurality of blocks which are arranged side by side in the one direction and formed of a magnetic material, and which is disposed adjacent to any one surface of the first surface and the second surface; and a second Halbach array comprising a plurality of blocks which are arranged side by side in the one direction and formed of a magnetic material, and which is disposed adjacent to the other one surface of the first surface and the second surface, wherein the first Halbach array and the second Halbach array are arranged to overlap any one or more of the plurality of fixed contacts along the other direction, respectively, and wherein each surface on which the first Halbach array and the second Halbach array face each other is magnetized with the same polarity.

34. An arc path generation unit, comprising:

a magnetic frame having a space part in which a plurality of fixed contacts and a plurality of movable contacts are accommodated; and a Halbach array which is positioned in the space part of the magnetic frame to form a magnetic field in the space part, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, and wherein the Halbach array comprises a plurality of blocks which are arranged side by side in the one direction and formed of a magnetic material, and is arranged adjacent to any one surface of the first surface and the second surface, so as to be disposed to overlap any one or more of the plurality of fixed contacts in the other direction.

35. The arc path generation unit of claim 34, wherein the Halbach array is positioned to be biased toward any one surface of the third surface and the fourth surface, is positioned to overlap any one of the plurality of fixed contacts in the other direction, and comprises:

a first block which is positioned to be biased toward the any one surface of the third surface and the fourth surface; and a second block which is positioned to be biased toward the other one surface of the third surface and the fourth surface.

36. The arc path generation unit of claim 34, wherein the Halbach array comprises:

a first Halbach array which is biased toward any one surface of the third surface and the fourth surface; and a second Halbach array which is biased toward the other one surface of the third surface and the fourth surface.

37. The arc path generation unit of claim 36, wherein a surface of the surfaces of the first Halbach array facing the space part and a surface of the surfaces of the second Halbach array facing the space part are magnetized with the same polarity.

38. The arc path generation unit of claim 36, wherein the first Halbach array and the second Halbach array respectively comprise:

a second block which is positioned to be biased toward the any one surface of the third surface and the fourth surface;

a third block which is positioned to be biased toward the other one surface of the third surface and the fourth surface; and a first block which is positioned between the second block and the third block.

39. The arc path generation unit of claim 38, wherein a surface of the surfaces of the first block of the first Halbach array facing the space part and a surface of the surfaces of the first block of the second Halbach array facing the space part are magnetized with the same polarity.

40. The arc path generation unit of claim 34, wherein the Halbach array comprises:

a second block which is positioned to be biased toward any one surface of the third surface and the fourth surface;

a third block which is positioned to be biased toward the other one surface of the third surface and the fourth surface;

a first block which is positioned between the second block and the third block;

a fourth block which is positioned between the first block and the second block; and a fifth block which is positioned between the first block and the third block.

41. The arc path generation unit of claim 40, wherein a surface of the surfaces of the second block facing the space part and a surface of the surfaces of the third block facing the space part are magnetized with the same polarity, and wherein a surface of the surfaces of the first block facing the space part is magnetized with a polarity different from the polarity.

42. The arc path generation unit of claim 34, further comprising:

a magnet part that extends in the one direction and is disposed adjacent to the other one surface of the first surface and the second surface, so as to be disposed to face the Halbach array with the space part therebetween.

43. The arc path generation unit of claim 42, wherein the Halbach array is positioned to be biased toward any one surface of the third surface and the fourth surface, and is arranged to overlap any one of the plurality of fixed contacts in the other direction.

44. The arc path generation unit of claim 43, wherein each surface on which the magnet part and the Halbach array face each other is magnetized with the same polarity.

45. The arc path generation unit of claim 43, wherein the Halbach array comprises:

a first block which is positioned to be biased toward the other one surface of the third surface and the fourth surface; and a second block which is positioned to be biased toward the any one surface of the third surface and the fourth surface.

46. The arc path generation unit of claim 45, wherein a surface of the surfaces of the first block of the Halbach array facing the magnet part and a surface of the surfaces of the magnet part facing the Halbach array are magnetized with the same polarity.

47. The arc path generation unit of claim 42, wherein the Halbach array comprises:

a first Halbach array which is positioned to be biased toward any one surface of the third surface and the fourth surface, and is arranged to overlap any one of the plurality of fixed contacts in the other direction; and a second Halbach array which is positioned to be biased toward the other one surface of the third surface and the fourth surface, and is arranged to overlap the other one of the plurality of fixed contacts in the other direction.

48. The arc path generation unit of claim 47, wherein each surface on which the magnet part and the first Halbach array face each other and each surface on which the magnet part and the second Halbach array face each other are magnetized with the same polarity.

49. The arc path generation unit of claim 47, wherein the first Halbach array and the second Halbach array respectively comprise:

a second block which is positioned to be biased toward the any one surface of the third surface and the fourth surface;

a third block which is positioned to be biased toward the other one surface of the third surface and the fourth surface; and a first block which is positioned between the second block and the third block.

50. The arc path generation unit of claim 49, wherein a surface of the surfaces of the first block of the first Halbach array facing the magnet part, a surface of the surfaces of the first block of the second Halbach array facing the magnet part and a surface of the surfaces of the magnet part facing the space part are magnetized with the same polarity.

51. The arc path generation unit of claim 42, wherein the Halbach array comprises:

a second block which is positioned to be biased toward any one surface of the third surface and the fourth surface;

a third block which is positioned to be biased toward the other one surface of the third surface and the fourth surface;

a first block which is positioned between the second block and the third block;

a fourth block which is positioned between the first block and the second block; and a fifth block which is positioned between the first block and the third block.

52. The arc path generation unit of claim 51, wherein a surface of the surfaces of the second block facing the magnet part and a surface of the surfaces of the third block facing the magnet part are magnetized with the same polarity, and wherein each surface on which the first block and the magnet part face each other is magnetized with a polarity different from the polarity.

53. The arc path generation unit of claim 42, further comprising:

an additional magnet part that is arranged adjacent to the other one of the first surface and the second surface, and that is positioned to be biased toward different surfaces of the third surface and the fourth surface, relative to the magnet part so as the magnet part and the additional magnet part define a plurality of magnet parts that are disposed to face the Halbach array with the space part therebetween.

54. The arc path generation unit of claim 53, wherein the magnet part comprises:

a first magnet part which is positioned to be biased toward any one surface of the third surface and the fourth surface; and a second magnet part which is positioned to be biased toward the other one surface of the third surface and the fourth surface, and wherein the Halbach array is positioned to be biased toward the any one surface of the third surface and the fourth surface, so as to be arranged to overlap any one of the first magnet part and the second magnet part in the other direction.

55. The arc path generation unit of claim 54, wherein each surface on which the first magnet part and the Halbach array face each other, and each surface on which the second magnet part and the Halbach array face each other are magnetized with the same polarity.

56. The arc path generation unit of claim 54, wherein the Halbach array comprises:

a first block which is positioned to be biased toward the other one surface of the third surface and the fourth surface; and a second block which is positioned to be biased toward the any one surface of the third surface and the fourth surface, and is disposed to face any one of the first magnet part and the second magnet part.

57. The arc path generation unit of claim 56, wherein a surface of the surfaces of the first block of the Halbach array facing the first magnet part or the second magnet part, a surface of the surfaces of the first magnet part facing the Halbach array and a surface of the surfaces of the second magnet part facing the Halbach array are magnetized with the same polarity.

58. The arc path generation unit of claim 53, wherein the Halbach array comprises:

a first Halbach array which is positioned to be biased toward any one surface of the third surface and the fourth surface; and a second Halbach array which is positioned to be biased toward the other one surface of the third surface and the fourth surface, wherein the magnet part extends beyond a distance in which the plurality of fixed contacts are spaced apart from each other.

59. The arc path generation unit of claim 58, wherein each surface on which the first Halbach array and the magnet part face each other, and each surface on which the second Halbach array and the magnet part face each other are magnetized with the same polarity.

60. The arc path generation unit of claim 58, wherein the first Halbach array and the second Halbach array respectively comprise:

a second block which is positioned to be biased toward any one surface of the third surface and the fourth surface;

a third block which is positioned to be biased toward the other one surface of the third surface and the fourth surface; and a first block which is positioned between the second block and the third block.

61. The arc path generation unit of claim 60, wherein a surface of the surfaces of the first block of the first Halbach array facing the magnet part, a surface of the surfaces of the first block of the second Halbach array facing the magnet part and a surface of the surfaces of the magnet part facing the first Halbach array or the second Halbach array are magnetized with the same polarity.

62. The arc path generation unit of claim 53, wherein the Halbach array comprises:

a second block which is positioned to be biased toward any one surface of the third surface and the fourth surface;

a third block which is positioned to be biased toward the other one surface of the third surface and the fourth surface;

a first block which is positioned between the second block and the third block;

a fourth block which is positioned between the first block and the second block; and a fifth block which is positioned between the first block and the third block.

63. The arc path generation unit of claim 62, wherein a surface of the surfaces of the second block facing the magnet part and a surface of the surfaces of the third block facing the magnet part are magnetized with the same polarity, and wherein each surface on which the first block and the magnet part face each other is magnetized with a polarity different from the polarity.

64. A direct current relay, comprising:

a plurality of fixed contacts provided to be spaced apart from each other in one direction;

a movable contact contacting or spaced apart from the fixed contact;

a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, and wherein the Halbach array comprises a plurality of blocks that are arranged side by side in the one direction and are formed of a magnetic material, and is arranged adjacent to any one surface of the first surface and the second surface, so as to be arranged to overlap any one or more of the plurality of fixed contacts in the other direction.

* * * * *